United States Patent [19]

Rollhaus et al.

[11] Patent Number: 4,694,280
[45] Date of Patent: Sep. 15, 1987

[54] KEYBOARD ENTRY SYSTEM

[75] Inventors: Philip E. Rollhaus, Chicago, Ill.; Yukio Endo, Thornton, N.H.

[73] Assignee: Quixote Corporation, Chicago, Ill.

[21] Appl. No.: 856,644

[22] Filed: Apr. 25, 1986

Related U.S. Application Data

[63] Continuation-in-part of Ser. No. 574,894, Jan. 30, 1984, Pat. No. 4,638,306.

[51] Int. Cl.$^4$ .............................. G06F 3/02; G08C 9/00
[52] U.S. Cl. ............................. 340/365 R; 340/365 E; 340/365 S; 400/100; 364/709
[58] Field of Search ............ 340/365 R, 365 S, 365 E; 364/709; 400/91-93, 87, 100, 109-111, 482

[56] References Cited

U.S. PATENT DOCUMENTS

| | | | |
|---|---|---|---|
| 3,225,883 | 12/1965 | Ayres | 340/365 S |
| 3,381,270 | 4/1968 | James | 371/52 |
| 3,597,538 | 8/1971 | Birenbaum | 178/17.5 |
| 3,892,915 | 7/1975 | Budworth et al. | 340/365 S |
| 4,042,777 | 8/1977 | Bequaert et al. | 340/365 R |
| 4,344,069 | 8/1982 | Prame | 340/365 S |
| 4,360,892 | 11/1982 | Endfield | 340/365 S |
| 4,381,502 | 4/1983 | Prame | 340/365 R |
| 4,502,038 | 2/1985 | Lowenthal et al. | 340/365 S |

FOREIGN PATENT DOCUMENTS

| | | | |
|---|---|---|---|
| 0077658 | 4/1983 | European Pat. Off. | 340/365 R |
| 58-72493 | 11/1983 | Japan | 340/365 R |
| 2076743 | 12/1981 | United Kingdom | 340/365 R |

Primary Examiner—James L. Rowland
Assistant Examiner—T. Rittmaster
Attorney, Agent, or Firm—Willian Brinks Olds Hofer Gilson & Lione Ltd.

[57] ABSTRACT

A keyboard entry system is disclosed which comprises a keyboard which includes a plurality of letter keys, one for each letter of a selected language. The entry system responds to conventional sequential activation of individual keys by providing output signals indicative of the respective individual letters associated with the activated keys to an application program such as a word processor or printer control program. The keyboard entry system also responds to chords of simultaneously activated multiple keys by using these chords to retrieve stored words from a dictionary. It is the stored words rather than the entered chords which are applied as inputs to the application program. This system allows an operator to use both conventional sequential key entry techniques and chorded entry techniques for rapid data entry. Chords are detected by comparing a stored constant with the elapsed time between a key release and the immediately preceding key depression of an overlapping key. The overlapping keys are characterized as a chord when the elapsed time is greater than the stored constant. A biofeedback mechanism alerts the operator of inadvertent chords.

22 Claims, 7 Drawing Figures

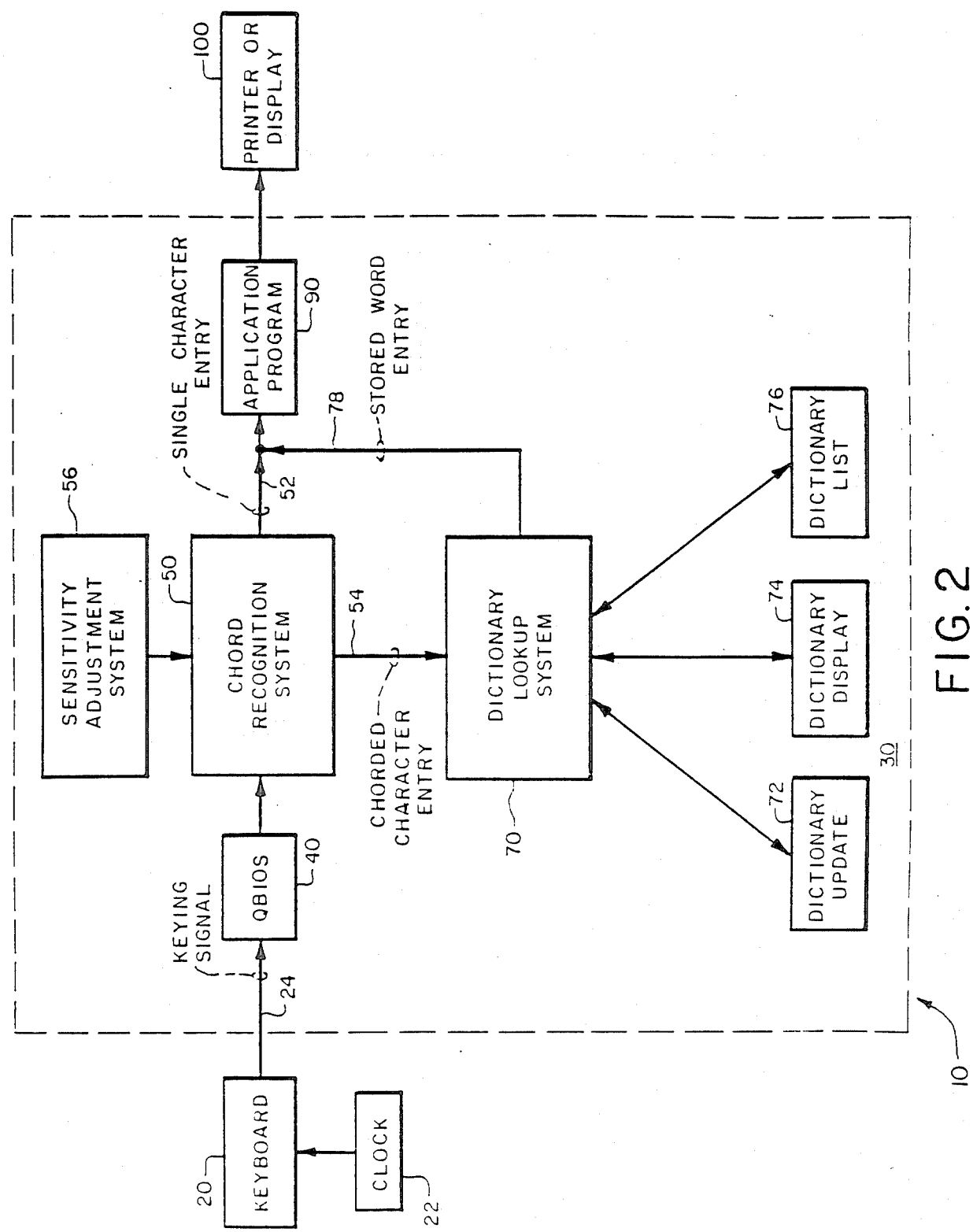

KEYBOARD ENTRY SYSTEM

CROSS REFERENCE TO RELATES APPLICATION

This application is a continuation-in-part of copending application Ser. No. 574,894, filed Jan. 30, 1984, now U.S. Pat. No. 4,638,306.

REFERENCE TO APPENDIX

An appendix is part of this specification. This appendix includes 10 page Appendix A, 20 page Appendix B, 12 page Appendix C, and 51 page Appendix D.

BACKGROUND OF THE INVENTION

The present invention relates to keyboard entry systems and in particular to an improved keyboard entry system which provides increased speed of data entry.

A wide variety of keyboard entry systems have been proposed in the past. Conventional QWERTY typewriter keyboards allow single finger activation of individual keys for single letter entry. Typically, keys are sequentially activated and words are entered letter by letter.

A variant of this conventional keyboard system is one which provides a control key which can be used to indicate that subsequently entered keys are to be treated in a special way. For example, sequential depression of a control key and then a number of letter keys may be used to indicate that the letter keys entered subsequently to the control key are to be interpreted as a code indicative of a stored word or phrase.

Other prior art keyboard entry systems have utilized specialized keyboards which react to the simultaneous depression of several keys differently than to the sequential activation of keys. See, for example, Endfield U.S. Pat. No. 4,360,892, Prame U.S. Pat. Nos. 4,344,069 and 4,381,502 and James U.S. Pat. No. 3,381,276. For example, the Prame patents disclose a keyboard entry system in which a twelve-key pad is used. Activation of a single key results in entry of a number, whereas simultaneous activation of multiple keys results in entry of a letter.

Yet another prior art approach is that described in Binenbaum U.S. Pat. No. 3,597,538 and Budworth U.S. Pat. No. 3,892,915. Both of these systems relate to devices for use with data generated by a stenographic keyboard.

Ayres U.S. Pat. No. 3,225,883 discloses an entry system in which multiple keys are simultaneously depressed in order to enter multiple characters constituting a syllable or word. In the Ayres system, certain letters are entered by simultaneous depression of adjacent keys by a single finger of the user.

Bequaert U.S. Pat. No. 4,042,777 discloses a variant on the specialized keyboard approach. The Bequart patent discloses a one hand keyboard which relies on simultaneous depression of one or more keys to indicate individual letters. In addition, Bequaert teaches that stored words may be retrieved by means of coded chords which do not correspond to any individual letter. Thus, when a coded chord is entered, the system disclosed by Bequaert retrieves the stored word associated with the specific chord and enters the stored word rather than the chord itself. The Bequaert system requires the simultaneous depression of two or four keys in order to enter a number of separate letters. Thus, each chorded entry must be checked to determine whether it is a letter chord indicative of a discrete letter or a coded chord indicative of a stored word. In certain applications, this need to check each chorded entry can slow the operation of the entry system to an undesirable degree. Furthermore, the Bequaert system requires an operator to learn a new entry format which differs fundamentally from that of the standard QWERTY keyboard in common use.

SUMMARY OF INVENTION

The present invention is directed to an improved keyboard entry system, which does not require extensive operator retraining, and which can improve the speed and accuracy of keyboard data entry.

According to this invention, a keyboard entry system is provided which includes a keyboard having a plurality of letter keys. First means are provided for generating keying signals in response to activation of the letter keys. Second means are provided for generating output signals in response to the keying signals. This second means includes means for storing a list of stored texts, each of which is associated with a respective stored index. Means, responsive to sequential activation of the letter keys, operate to set the output signal to the letters corresponding to the activated ones of the letter keys. In addition, means, responsive to activation of the letter keys in sets, or chords, operate to classify the corresponding keying signals as a key chord. Means are provided for comparing the key chords with the stored indexes and for selecting the corresponding ones of the stored texts in the event the key chord matches one of the stored indexes, along with means for setting the output signal to correspond with the selected stored text. The keyboard and first and second means cooperate automatically to set the output signal to correspond to associated ones of the letters in response to conventional sequential activation of the letter keys, and to set the output signal to correspond to an associated one of the stored texts in response to chorded activation of the letter keys.

According to this invention, key chords are distinguished from overlap of sequentially activated keys by comparing the elapsed time between a key release and the immediately preceding key depression. When this elapsed time is less than a selected time interval, the two keys are classified as sequentially activated. When this elapsed time is greater than the selected time interval, the keys are classified as a key chord. Preferably, a biofeedback tone is provided whenever an operator enters a chord which does not correspond to any of the stored texts.

The presently preferred embodiment of the invention provides the important advantage that the keyboard can be used for conventional consecutive letter entry without retraining the operator. Thus, the keyboard is fully usable in its conventional, sequential letter entry mode by an operator of conventional skills. To the extent the operator is trained and interested in using the advanced entry features of this invention, the operator can simply enter chords which are decoded as one of a number of stored words, phrases, or the like. As the skills of the operator increase, and the operator learns a greater and greater number of chords, the operator can obtain greater and greater benefit from this invention. These important advantages are achieved without interrupting or disturbing in any way sequential data entry. For this reason, an operator can use the data entry system of this invention in the convention manner without any additional instruction whatsoever, and the operator can gradually make use of the advanced features of this invention in a progressive manner as the operator's data entry skills increase.

The invention itself, together with further objects and attendant advantages, will best be understood by reference to the following detailed description, taken in conjunction with the accompanying drawings.

BRIEF DESCRIPTION OF THE DRAWINGS

FIG. 2 is a more detailed schematic representation of the embodiment of FIG. 1.

DETAILED DESCRIPTION OF THE PRESENTLY PREFERRED EMBODIMENTS

A. The First And Second Embodiments

Figure 1:
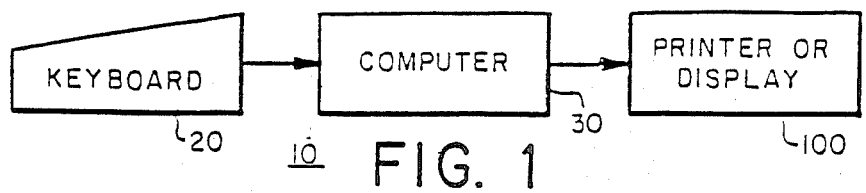
FIG. 1 is a block diagram showing a presently preferred embodiment of this invention.

Turning now to the drawings, FIG. 1 shows a schematic representation of a keyboard entry system 10 which incorporates a first preferred embodiment of this invention. The keyboard entry system 10 includes a keyboard 20, a computer 30 and an output device such a printer or CRT display 100.

FIG. 2 shows a more detailed block diagram of the system 10 of FIG. 1. As shown in FIG. 2, the keyboard 20 is coupled to a clock 22, and the keyboard 20 operates to generate keying signals which are applied to the computer 30 via a cable 24. Mechanically, the keyboard 20 is a conventional QWERTY keyboard such as that distributed by Amkey Corporation as part No. DIN-106 which includes a separate letter key for each of the 26 letters of the Roman alphabet. However, the keyboard 20 differs from the conventional Amkey keyboard described above, in that the read only memory included in the keyboard 20 has been reprogrammed with the program shown in Appendix A. The standard Amkey DIN-106 generates a eight-bit keystroke scan code in response to each depression or release of a key included on the keyboard. One bit of this eight-bit keystroke scan code designates whether the key stroke corresponds to the depression or release of a key, and the other seven bits operate to identify the key.

The revised software included in Appendix A causes the keyboard 20 to differ from the standard Amkey DIN-106 keyboard, in that the keyboard 20 generates a keying signal in response to the activation of each key in the following format: fddddddd ttttttt ttttttt, where f indicates the key depress/release flag, d indicates a key code bit, and t indicates a time code bit. The first eight bits of this 24-bit keying signal correspond to the conventional eight-bit keystroke scan code described above. That is, the most significant bit indicates whether the activated key has been depressed or released, and the remaining seven bits constitute a key code which identifies the key activated. The remaining 16 bits of the keying signal on cable 24 constitute a time code. In this embodiment, the clock 22 generates a clock pulse every seven milliseconds, and the 16-bit time code included in the keying signal on the cable 24 is simply a binary count of clock pulses generated by the clock 22. Thus, the 16-bit time code is a measure of the relative time of depression or release of the associated key, measured with a resolution of seven milliseconds.

In this preferred embodiment, the computer 30 is an IBM PC computer having 256K of random access of memory and supplied with the PCDOS 2.0 Disk Operating system and the standard MSPASCAL compiler. Both PCDOS 2.0 and MSPASCAL are conventional programs known to those skilled in the art which will not be described in detail here. The standard PCDOS 2.0 includes a module called BIOS which performs initial processing of keyboard entries.

In the embodiment of FIGS. 1 and 2, the conventional BIOS routine is replaced by a modified routine termed QBIOS, shown at reference number 40 in FIG. 2. QBIOS operates in much the same manner as the conventional BIOS routine in decoding the key code included in the first eight bits of the keying signal on cable 24 to obtain the ASCII code corresponding to the activated key on the keyboard 20. However, in addition the QBIOS routine stores the 16-bit time code included in the keying signal in association with the decoded key code. Appendix B provides a listing of QBIOS as implemented in this embodiment.

In this embodiment QBIOS is stored in RAM and the pointer in the Interrupt Vector Table is modified such that keyboard generated interrupts are directed to QBIOS in RAM instead of to BIOS in ROM.

The output of the QBIOS routine is an ASCII code indicative of the key activated, an indication of the whether the activated key has been released or depressed, and the time code indicative of the relative time of activation. This information is supplied to a chord recognition system 50. The chord recognition system 50 is discussed below in greater detail in conjunction with FIG. 3. Here is enough to state that the chord recognition system 50 classifies each of the activated letter keys either (1) as a discrete key which has been activated in sequence with other keys, or (2) as part of a key chord. As used herein the term "key chord" is used to designate a plurality of letter keys which are activated nearly simultaneously or in an overlapping manner. For example, the chord recognition system 50 distinguishes between the letters Q and X when activated sequentially and the letters QX when activated as a chord.

Those keys recognized by the chord recognition system 50 as single character entries are passed as output signals via data path 52 to an application program 90. The application program 90 can be a suitable program such as a printer or display control program or a word processor program for example.

Key chords recognized by the chord recognition system 50 are passed to a dictionary lookup system 70 via path 50. The dictionary lookup system 70 serves to store a list of stored texts. As used herein, the term "stored text" is used in its broad sense to encompass stored words, syllables, acronyms, phrases, sentences, and the like. Each of the stored texts included in the dictionary lookup system 70 is associated with a respective stored index. Table 1 shows an illustrative listing of a portion of the stored words and stored indexes which may be included in the dictionary lookup system 70.

TABLE 1

| Index | Stored Text |
| --- | --- |
| qx | Quixote Corporation |
| hr | however |
| fe | furthermore |
| ns | nevertheless |
| us | United States |
| asc | acetylsalicylic acid |

The dictionary look-up system 70 includes a dictionary update routine 72 which allows a user to add new stored texts and stored indexes to the dictionary lookup system 70. A dictionary display routine 74 allows the contents of the dictionary lookup system 70 to be displayed on a CRT. A dictionary list routine 76 allows the stored texts and indexes in the dictionary lookup system 70 to be printed.

The dictionary lookup system 70 and the routines 72, 74, 76 are standard systems well known to those skilled in the art. A variety of approaches can be used to implement the dictionary lookup system 70, but in this preferred embodiment a table lookup type dictionary is used. That is, each stored index is associated with a pointer which points to the beginning of the corresponding stored text. Each stored text is of variable length and extends to an end of text symbol such as a byte equal to zero. The output of the dictionary lookup system 70 is the one of the stored texts associated with the stored index that corresponds to the key chord supplied by the chord recognition system. This stored text output is supplied as an output signal via path 78 to the application program 90.

The embodiment of FIG. 2 operates to transmit discrete letters directly to the application program 90 and to use near simultaneous character entries as chords to retrieve associated ones of the stored texts from the dictionary lookup system 70, which are also supplied as inputs to the application program 90. If the application program 90 is, for example, a simple printer control program, then the application program 90 controls the printer 100 to cause both single character entries supplied via path 52 and stored test entries supplied via path 78 to be printed in sequence on the printer 100. Similarly, if the application program 90 is a word processing program, it operates to enter both single character entries and stored text entries into the document being created. The application program 90 does not per se form any part of this invention, and those skilled in the art will be aware of a wide variety of programs suitable for use with this invention. For this reason, the application program 90 will not be described in further detail here.

Figure 3:
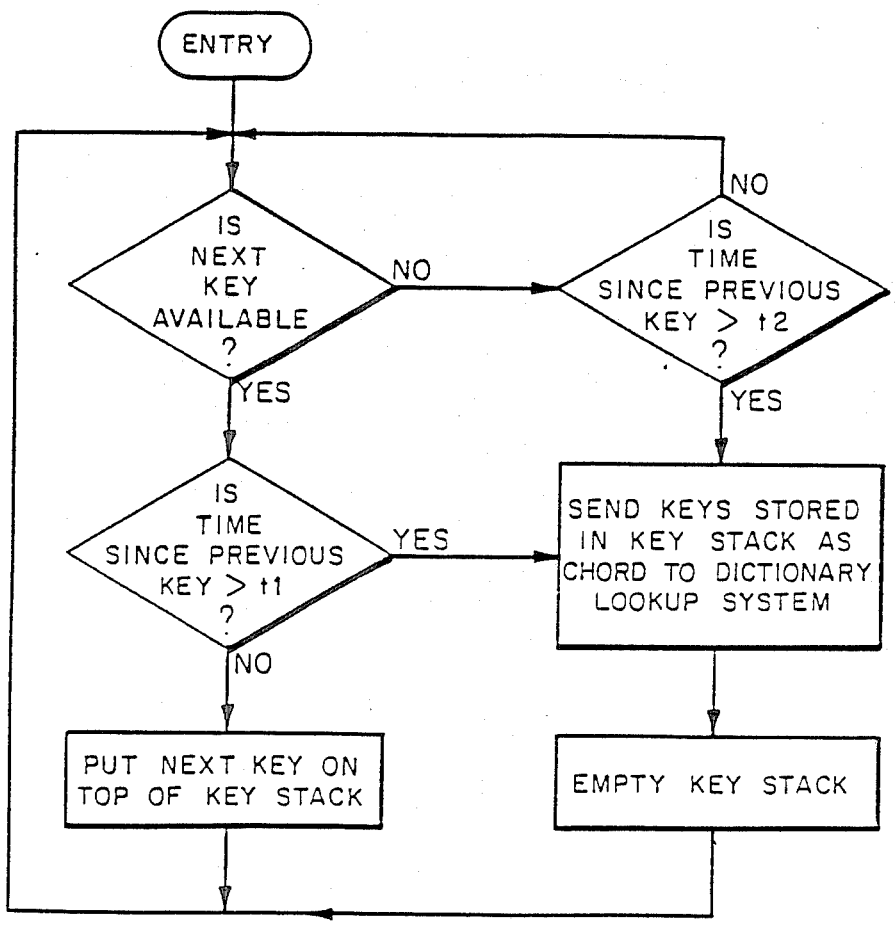
FIG. 3 is a flowchart of the chord recognition system of FIG. 2.

FIG. 3 shows a more detailed flowchart of the chord recognition system 50. As shown in FIG. 3, the chord recognition system first checks to see if a next key is available from QBIOS, as indicated by key release. If not, the action taken depends on the elapsed time since the previous key. If this elapsed time is less than t2, no action is taken. If this elapsed time is greater than t2, then the keys stored in the key stack are sent as a chord to the dictionary lookup system 70 and the key stack is cleared. If a next key is available from QBIOS, the system 70 then checks to determine whether the time code of the next key is more than t1 greater than the time code for the previous key. If not, the next key is put on top of the key stack; if so, the keys stored in the key stack are sent as a chord to the dictionary lookup system 70 and the key stack is cleared.

The sensitivity adjustment system 56 of FIG. 2 allows adjustment of t1 and t2 such that chords are recognized and reliably distinguished from standard sequential key entry. Preferably, this adjustment in t1 and t2 is made by the operator. For example, up and down keys may be provided to allow an operator to increase or decrease the value of t1 and t2 as desired. For many applications a value of t1 and t2 of less than 50 milliseconds will be appropriate. It is anticipated that a value of t1 in the range of 15-30 milliseconds may be suitable for some typists.

Figure 4:
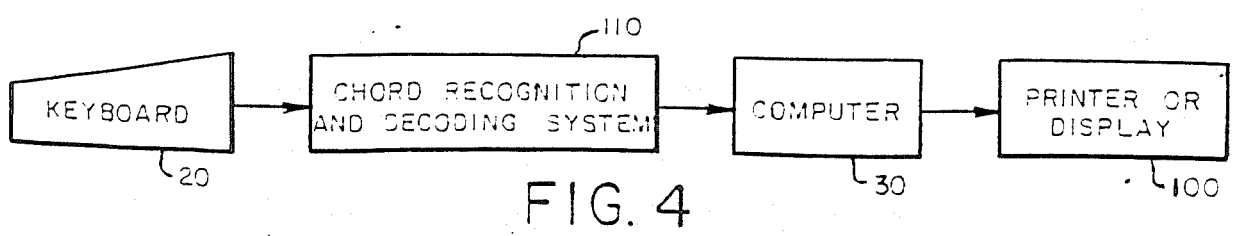
FIG. 4 is a schematic diagram showing a second preferred embodiment of this invention.

Of course, it should be understood that the arrangement of components shown in FIG. 1 is merely one of several alternative embodiments of this invention. In the system of FIG. 1, the clock 22 can either be included in the keyboard 20 as shown in FIG. 2 or it can alternately be included in the computer 30. In a second preferred embodiment of this invention, as shown in FIG. 4, the entire chord recognition and decoding system 110 is included in a separate module which is interposed between the keyboard 20 and computer 30. This approach may be preferable in applications where preexisting keyboards and computers are to be updated and provided with the enhanced chorded entry features of this invention. In the embodiment of FIG. 4, the clock (not shown) used to measure the relative times of key activation can be included either in the keyboard 20 or in the chord recognition and decoding system 110. In principle, the embodiment of FIG. 4 operates identically to that of FIG. 1. The only difference is in the hardware, and particularly in the module 110 which includes the chord recognition system 50 and the dictionary lookup system 70, along with the associated routines 56, 72, 74, 76 of FIG. 2.

From the foregoing, it should be apparent that an improved keyboard entry system has been described which provides particularly high data input rates. The system of this invention avoids the need for a separate control key to flag the entry of an abbreviation. Because the embodiments described above recognize a single key entry as indicative of a conventional single character and multiple chorded key entry as indicative of a code to be compared against stored indexes in the dictionary lookup system, these embodiments operate in a particularly fast and simple manner. An important feature of these embodiments is that because all chorded character entries but no single character entries are compared with stored indexes in the dictionary, the need to check every keyboard entry against the dictionary is avoided. This speeds the execution of these embodiments.

Another important advantage of this invention is that the entry of chorded keys is a fast, efficient way to allow an operator to enter an index code into the system. As explained above, the preferred embodiments described above can readily be used by an untrained operator, because the keyboard operates in the conventional single character entry mode without changes of any sort. To the extent the operator is capable of and interested in using the advanced chorded entry features of these embodiments, the operator can do so in a natural, progressive, and unstructured manner. Thus, the same keyboard entry system can be used by a range of operators with varying skills. Minimally skilled operators may use only the conventional single character entry features of the keyboard entry system, whereas more skilled operators can take full advantage of both the single character and the chorded character entry modes of the invention. Furthermore, an operator can readily customize the dictionary lookup system to include new stored texts and associated stored indexes, depending upon the individual preferences of the operator or the needs of an individual project.

Of course, it should be understood that a wide range of changes and modifications can be made to the preferred embodiments described above. For example, the preferred embodiments described above recognize a chorded character entry by analyzing the times of release of individual keys. In alternative embodiments, it may be preferable to use the times of key depression either as a substitute for or in conjunction with the time of key release to determine chorded character entries. In this specification and the following claims, the term "key activation" has been used in its broad sense to encompass either key depression or key release, or both.

Furthermore, the term "single finger activation" is used herein to denote patterns of one or more key activations achieved by use of a single finger by the operator. Thus, in some embodiments of this invention, single finger activation techniques may be used to activate two adjacent keys.

B. The Third Preferred Embodiment

Figure 5:
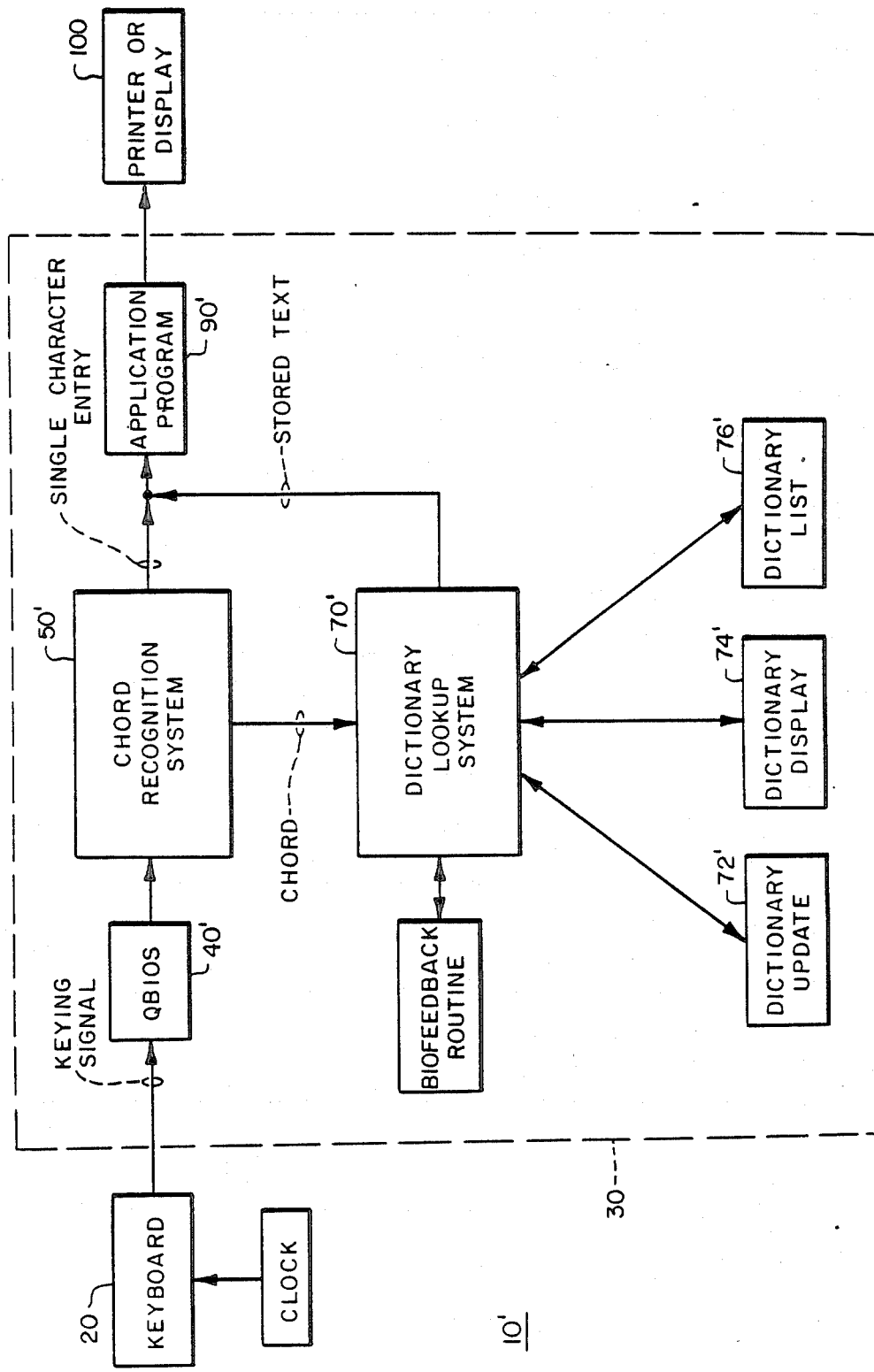
FIG. 5 is a schematic representation of a third preferred embodiment.
Figure 6:
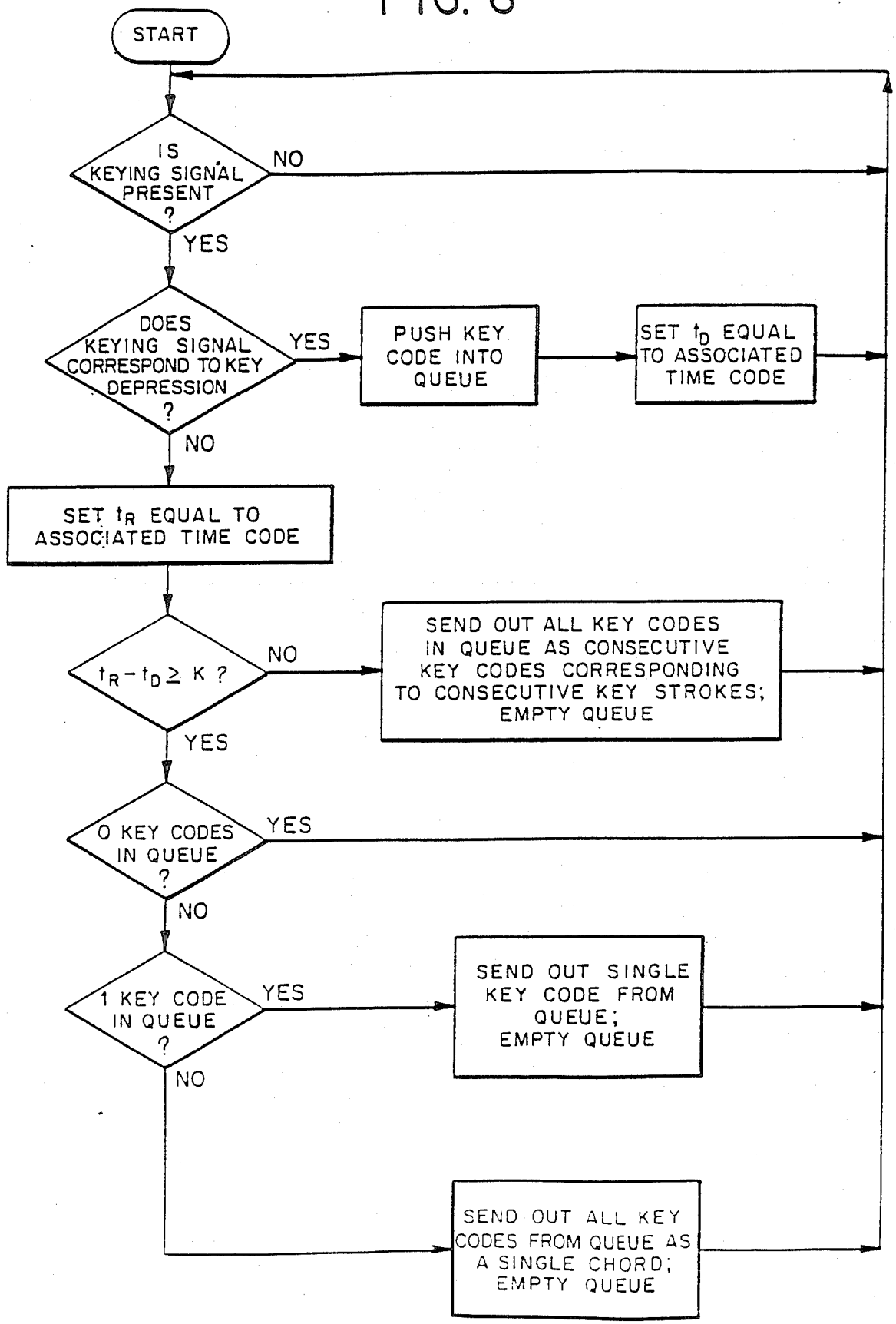
FIG. 6 is a flowchart of the chord recognition system of FIG. 5.
Figure 7:
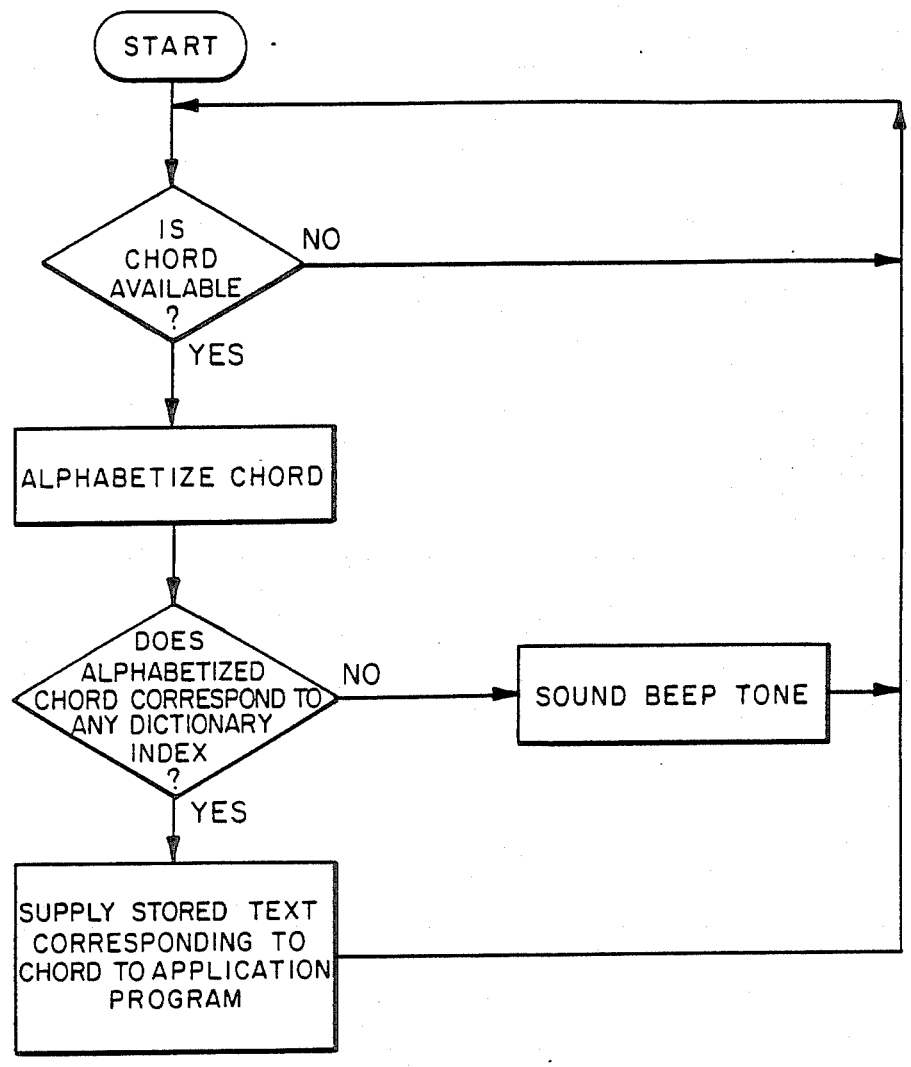
FIG. 7 is a flowchart of the dictionary lookup system and biofeedback routine of FIG. 5.

The third preferred embodiment 10' of FIGS. 5-7 is quite similar in function to the first embodiment of FIG. 2. The same keyboard 20, computer 30, and printer 100 can be used as those described above. As shown in FIG. 5, this embodiment 10' includes a QBIOS routine 40', a chord recognition system 50', a dictionary lookup system 70' and an application program 90' which cooperate to process sequentially activated keying signals and chorded keying signals in the manner described above in conjunction with FIG. 2. Appendix C is an object code listing of the QBIOS routine 40', the chord recognition system 50' and the dictionary lookup system 70', and Appendix D is an object code listing of the dictionary update, display and list routines 72', 74', 76'.

In order to use the programs of Appendices C and D, the hardware system of FIG. 1 is used, including the Disc Operating System described above. Then the program of Appendix C is loaded into RAM, becoming a RAM resident program. The Disc Operating System is directed to this modified keyboard BIOS by changing the BIOS keyboard driver pointer to point to QBIOS 40'. Then the program of Appendix D is loaded into RAM and executed in order to load a dictionary of indexes and associated stored texts into RAM. The program of Appendix D includes routines which allow the user to create new chords, delete old chords, modify old chords, or to print or display the dictionary. Upon completion of any maintenance routine the system reverts to the normal DOS prompt.

The program of Appendix C distinguishes chords from conventionally, sequentially activated keys. Sequentially activated keys are passed to the application program 90' for conventional processing. Chords are compared with the indexes of the dictionary. In the event of a match, the corresponding stored text from the dictionary is passed to the application program 90', just as if the user had typed the entire stored text at high speed.

This third embodiment differs from the first and second embodiments significantly in the approach used to recognize chords. As shown in FIG. 6, the program of Appendix C uses a simple approach to chord recognition which has been found to be reliable and easy to implement.

The chord recognition system 50' responds to keying signals in the format described above, which includes a key press/release flag, a seven bit key code identifying the activated key, and a sixteen bit time code identifying the time of key activation.

The program flowcharted in FIG. 6 first checks to determine whether a keying signal is present. If so, the press/release flag is checked to determine whether the keying signal corresponds to a key depression or to a key release. If the keying signal corresponds to a key depression, the seven bit key code is stored in a queue, and a variable $t_D$ is set equal to the associated time code. If the keying signal corresponds to a key release a variable $t_R$ is set equal to the associated time code. Thus, $t_D$ identifies the time of the most recently depressed key and $t_R$ identifies the time of the most recently released key.

The program then compares the elapsed time between $t_R$ and $t_D$ with a predetermined constant K. It has been found that a single stored constant is well-suited for a wide variety of typing styles. Thus, in this embodiment the constant K is a stored constant which does not change in value during operation of the system. That is, the constant K remains at the same value through a multiplicity of chord cycles. For many applications, it has been found that setting K equal to 70-85 milliseconds produces excellent results. At present, it is preferred to set K to 75 milliseconds.

In the event the elapsed time $t_R$-$t_D$ between a key release and the immediately preceding key depression is less than K, all of the key codes currently stored in the queue are treated as consecutive key codes corresponding to consecutive key strokes. These key codes are sent as consecutive key strokes to the application program 90' and the queue is emptied.

In the event the elapsed time $t_R$-$t_D$ is greater than or equal to K, the program then checks to determine the number of key codes stored in the queue. If no key codes are stored in the queue, no action is taken. If one key code is stored in the queue, the single key code from the queue is sent out as a single key stroke to the application program 90' and the queue is emptied. In the event that the queue contains more than one key code, all of the key codes from the queue are treated as a single chord and are sent as a chorded character entry to the dictionary lookup system 70. The queue is then emptied.

The approach described above has been found to operate reliably in distinguishing chords from over-lapping keys characteristic of rapid touch typing. It has been found that reliable chord detection is a difficult problem because rapid touch typing results in over-lapping keys, i.e., a second key is depressed before the first key has been released. It has been discovered that when the elapsed time between a first key release and the immediately preceding key depression is less than an experimentally determined constant, all of the keys that were depressed immediately prior to the first release can be treated as sequentially activated key codes. If this elapsed time is equal to or greater to the constant, all of the keys in the queue are treated as a single chord.

In order further to improve the reliability of chord detection, this embodiment includes a biofeedback mechanism which sounds a tone whenever an undefined chord is detected. FIG. 7 is a flowchart of the dictionary lookup system 70' including the biofeedback routine. As shown in FIG. 7, when a chord is available, this system 70' alphabetizes the chord and then compares the alphabetized chord with the stored indexes of the dictionary. If a match is found the stored text corresponding to the index and chord is supplied to the application program 90'. If the alphabetized chord does not correspond to any index stored in the dictionary lookup system 70', then a beep tone is sounded. This tone informs the typist at both a conscious and a sub-conscious level that non-chord keys are overlapping each other. In a short period of time, the typist will type in a more crisp manner in response to this biofeedback mechanism.

Of course, the approach to chord recognition described above in conjunction with FIGS. 5 and 6 can readily be adapted to a wide variety of system hardware. The hardware described in the embodiments of FIGS. 1 and 4 is suitable for use in the third preferred embodiment. Furthermore, this embodiment can readily be adapted to run on other hardware (such as other keyboards and computers) and other operating systems. For example, the keyboard marketed by Key-Tronics of Spokane, Washington as Model 5151 can readily be modified to generate the 24 bit keying signal described above.

It is therefore intended that the foregoing detailed description be regarded as illustrative rather than limiting, and that it be understood that it is the following claims, including all equivalents, which are intended to define the scope of this invention.

APPENDIX A

ASMB-48 DEVELOPMENT SYSTEM

```
0000                ; TITLE 'Q-4-106'
0000                ; RELEASED 8/4/33
0000                ; DIN-106        Q-4-106
0000                ;
0000                ; RAM MAP: 48/63   KEY BIT MAP
0000                ;
0000                ;  R7 LAST DEPRESSION CODE OUT
0000                ;  R6 DEBOUNCE COUNTER
0000                ;  R5 STATUS REGISTER
0000                ;  R4 REPEAT TIMER
0000                ;  R3 LAST KEY DOWN
0000                ;  R2 KEY POINTER
0000                ;  R1 MASK REGISTER
0000                ;  R0 BIT MAP POINTER
0000                ;  F0 REPEAT ENABLE
0000                ;
0000                ; RAM BANK 1
0000                ;
0000                ;  R7 BUFFER FIRST OUT
0000                ;  R6
0000                ;  R5
0000                ;  R4
0000                ;  R3
0000                ;  R2
0000                ;  R1 LOCAL SCRATCH REGISTER
0000                ;  R0 TOP OF BUFFER POINTER
0000                ;
0000                ;  R1F / R30 CHARACTER BUFFER
0000                ;  R31 / R3F KEY STATUS REGISTERS
0000                ;
0000                ; I/O MAP TO "KEY" INPUT
0000                ;  PORT 1 BITS 0/6 - KEY ADDRESS
0000                ;  PORT 1 BIT 7 - HYSTERESIS
0000                ;  PORT 2 BIT 4 - SERIAL DATA OUT
0000                ;  PORT 2 BIT 7 - SERIAL CLOCK OUT
0000                ;  PORT 2 BITS 5/6 - LED
0000                ;
0000                ; T1 CLOCK INPUT
0000                ; I DATA INPUT
0000                ; F1 BUFFER NOT EMPTY FLAG
0000                ;
0000   00           M00      NOP
0001   C5                    SEL      RB0
0002   15                    DIS      I
0003   35                    DIS      TCNT
0004   E5                    SEL      MB0
0005   A5                    CLR      F1
0006                ;
0006                ; INITIALIZE P2: LEDS OFF, CLOCK HIGH, DATA LOW
0006                ;
0006   2380                  MOV      A,#080H
```

```
0008  3A                      OUTL    P2,A
0009  27                      CLR     A
000A  02                      OUTL    BUS,A
000B  85                      CLR     F0      ;DISABLE AUTO-REPEAT
000C                  ;
000C                  ; CLEAR ALL RAM REGISTERS
000C                  ;
000C  27                      CLR     A
000D  B83F                    MOV     R0,#3FH
000F  A0            MOD       MOV     @R0,A
0010  E80F                    DJNZ    R0,MOD
0012  27            M10       CLR     A
0013  62                      MOV     T,A
0014  55                      STRT    T
0015                  ;
ASMB-48 DEVELOPMENT SYSTEM
0015                  ; DELAY TO BEGINNING OF SCAN
0015                  ;
0015  041D          START     JMP     M26
0017  5438          INCR0     CALL    M235    ;TEST FOR HOST COM
0019  18                      INC     R0      ;INCREMENT BMP
001A  F8                      MOV     A,R0
001B  B255                    JB      5,MASK  ;TEST SCAN COMPLETE
001D                  ;
001D                  ; SERVICE AUTO REPEAT FUNCTION
001D                  ;
001D  42            M26       MOV     A,T
001E  034D                    ADD     A,#4DH
0020  E61D                    JNC     M26
0022  27                      CLR     A
0023  62                      MOV     T,A
0024  D5                      SEL     RB1
0025  2301                    MOV     A,#1    ;MAINTAIN TIMER IN R5,R6
0027  6D                      ADD     A,R5
0028  AD                      MOV     R5,A
0029  27                      CLR     A
002A  7E                      ADDC    A,R6
002B  537F                    ANL     A,#07FH
002D  AE                      MOV     R6,A
002E  C5            SETUP     SEL     RB0
002F  B633                    JF0     REP     ;AUTO-REPEAT ENABLED?
0031  043A                    JMP     NOREP
0033  EC3A          REP       DJNZ    R4,NOREP ;TIME TO AUTO-REPEAT?
0035  BC10                    MOV     R4,#10H
0037  FF                      MOV     A,R7    ;GET LAST CODE OUT
0038  5403                    CALL    BUFFER
003A  23F7          NOREP     MOV     A,#0F7H
003C  39                      OUTL    P1,A
003D  B831                    MOV     R0,#31H ;BIT MAP POINTER
003F  BE01                    MOV     R6,#01H ;BIT MASK REGISTER
0041  AA                      MOV     R2,A    ;KEY ADDRESS
0042  A3                      MOVP    A,@A    ;DELAY
0043  A3                      MOVP    A,@A
0044  FE                      MOV     A,R6    ;LOAD MASK
0045  50                      ANL     A,@R0   ;TEST HISTORY
0046  9659                    JNZ     HIST1   ;KEY WAS DOWN
0048  A3            HIST0     MOVP    A,@A    ;DELAY
0049  3674                    JT0     COD     ;TEST KEY
004B  CA            FALSE     DEC     R2
004C  FA                      MOV     A,R2    ;NEXT ADDRESS
004D  39                      OUTL    P1,A    ;OUTPUT NEXT ADDRESS
004E  FE            SCAN      MOV     A,R6    ;ROTATE MASK
004F  E7                      RL      A
0050  AE                      MOV     R6,A
0051  1217                    JB      0,INCR0 ;TEST FOR BYTE DONE
0053  A3                      MOVP    A,@A
0054  A3                      MOVP    A,@A
0055  FE            MASK      MOV     A,R6
0056  50                      ANL     A,@R0   ;TEST HISTORY
0057  C648                    JZ      HIST0   ;KEY NOT DOWN LAST SCAN
0059  997F          HIST1     ANL     P1,#7FH ;KEY DOWN LAST SCAN
005B  A3                      MOVP    A,@A    ;DELAY
005C  A3                      MOVP    A,@A
```

```
005D  2661            JNT0      COR    ;TEST KEY
005F  044B            JMP       FALSE
0061          ;
0061  FE     COR      MOV       A,R6   ;RESET KEY BIT
0062  37              CPL       A
0063  50              ANL       A,@R0
0064  A0              MOV       @R0,A
0065  FA     RELEAS   MOV       A,R2
0066  537F            ANL       A,#7FH
0068  E3              MVP3      A,@A
0069  4380            ORL       A,#80H  ;SEND RELEASE CODE
006B  5403            CALL      BUFFER
006D  FB              MOV       A,R3   ;IS THIS LAST KEY DOWN?
006E  DA              XRL       A,R2
006F  963A            JNZ       NOREP
0071  85              CLR       F0   ;DISABLE AUTO-REPEAT
0072  043A            JMP       NOREP
0074  A3     COD      MOVP      A,@A
0075  A3              MOVP      A,@A
0076  264B            JNT0      FALSE
0078  FE     COD2     MOV       A,R6   ;SET KEY BIT
0079  40              ORL       A,@R0
007A  A0              MOV       @R0,A
007B  BC54            MOV       R4,#54H  ;INITIALIZE TIMER
007D  85              CLR       F0   ;ENABLE AUTO-REPEAT
007E  95              CPL       F0
007F  FA              MOV       A,R2
0080  AB              MOV       R3,A   ;SAVE LAST KEY ADX
0081  B938            MOV       R1,#38H
0083  F1              MOV       A,@R1
0084  12A6            JB        0,NOTCAP ;TEST FOR CONTROL
0086  FA              MOV       A,R2   ;GET XY CODE
0087  D3A7            XRL       A,#0A7H  ;TEST FOR NUM LOCK
0089  969B            JNZ       TSTCAP
008B  FD     NUML     MOV       A,R5
008C  4380            ORL       A,#80H
008E  D320            XRL       A,#20H
0090  AD              MOV       R5,A
0091  3A              OUTL      P2,A
0092  FA              MOV       A,R2
0093  537F            ANL       A,#7FH
0095  E3              MVP3      A,@A   ;GET CODE ON DEPRESSION
0096  AF              MOV       R7,A   ;SAVE DEPRESSION CODE
0097  7479            CALL      BUFFR1
0099  041D            JMP       M26
009B  D34F   TSTCAP   XRL       A,#4FH
009D  96A6            JNZ       NOTCAP
009F  FD     CAPSL    MOV       A,R5
00A0  4380            ORL       A,#80H
00A2  D340            XRL       A,#40H
00A4  AD     OUTP2    MOV       R5,A
00A5  3A              OUTL      P2,A
00A6  FA     NOTCAP   MOV       A,R2
00A7  537F            ANL       A,#7FH
00A9  E3              MVP3      A,@A   ;GET CODE ON DEPRESSION
00AA  AF              MOV       R7,A   ;SAVE DEPRESSION CODE
00AB  5403   SEND     CALL      BUFFER
00AD  044B            JMP       FALSE
00AF  A3     ME4      MOVP      A,@A
00B0  69     ME5      ADD       A,R1
00B1  A9              MOV       R1,A
00B2  F8              MOV       A,R0
00B3  83              RET
00B4                  ORG       100H
0100          ;
0100          ; MICRO COMPUTER SELF TEST
0100          ;
0100  C5     M100     SEL       RB0
0101  15              DIS       I
0102  35              DIS       TCNT
0103  E5              SEL       MB0
0104  85              CLR       F0
0105  A5              CLR       F1
```

```
0106  27                  CLR      A
0107  B83F                MOV      R0,#3FH
0109              ;
0109              ; CHECK ALL REGISTERS
0109              ;
0109  37        M109      CPL      A
010A  A0                  MOV      @R0,A
010B  D0                  XRL      A,@R0
010C  962B                JNZ      M128
010E  A0                  MOV      @R0,A
010F  D0                  XRL      A,@R0
0110  962B                JNZ      M128    ;IN CASE OF ERROR
0112  E809                DJNZ     R0,M109 ;DON'T SEND 0AAH
0114              ;
0114              ; TEST CHECKSUM OF ROM
0114              ;
0114  F8        M114      MOV      A,R0
0115  A3                  MOVP     A,@A
0116  14B0                CALL     ME5
0118  E3                  MVP3     A,@A
0119  14B0                CALL     ME5
011B  14AF                CALL     ME4
011D  5400                CALL     M200
011F  E814                DJNZ     R0,M114
0121  F9                  MOV      A,R1
0122              ; JNZ M128
0122  23AA                MOV      A,#0AAH
0124  7479                CALL     BUFFR1  ;PUT 0AAH ON BUFFER
0126  C5                  SEL      RB0
0127  BD80                MOV      R5,#80H
0129  FD                  MOV      A,R5
012A  3A                  OUTL     P2,A
012B  0412     M128       JMP      M10
012D                      ORG      200H
0200              ;
0200              ; ROM CHECKSUM CHECK
0200              ;
0200  A3        M200      MOVP     A,@A
0201  04B0                JMP      ME5
0203              ;
0203              ; POST OUTPUT BUFFER HANDLER
0203              ;
0203              ;
0203              ; BUFFER INPUT HANDLER
0203              ;
0203  D5        BUFFER    SEL      RB1
0204  7609                JF1      M226    ;BUFFER EMPTY?
0206  B820                MOV      R0,#20H ;INITIALIZE BUFFER
0208  B5                  CPL      F1      ;BUFFER INITIALIZED
0209  A9        M226      MOV      R1,A    ;SAVE CHARACTER IN R1
020A  F8                  MOV      A,R0    ;
020B  D330                XRL      A,#30H  ;BUFFER FULL?
020D  C637                JZ       M234    ;
020F  07                  DEC      A       ;BUFFER ONE CHAR FROM FULL?
0210  9614                JNZ      M231
0212  B9FF                MOV      R1,#0FFH ;REPORT BUFFER OVERFLOW
0214  F9        M231      MOV      A,R1    ;PUT CHARACTER IN BUFFER
0215  A0                  MOV      @R0,A
0216  18                  INC      R0
0217  C5                  SEL      RB0
0218  FD                  MOV      A,R5
0219  B21C                JB       5,TIMER
021B  93                  RETR
021C  D5        TIMER     SEL      RB1
021D  F8                  MOV      A,R0    ;
021E  D330                XRL      A,#30H  ;BUFFER FULL?
0220  C637                JZ       M234    ;
0222  07                  DEC      A       ;BUFFER ONE CHAR FROM FULL?
0223  9627                JNZ      M232
0225  B9FF                MOV      R1,#0FFH ;REPORT BUFFER OVERFLOW
0227  FD        M232      MOV      A,R5    ;PUT CHARACTER IN BUFFER
0229  A0                  MOV      @R0,A
```

```
0229  18              INC     R0
022A  FB              MOV     A,R0    ;
022B  D330            XRL     A,#30H    ;BUFFER FULL?
022D  C637            JZ      M234    ;
022F  07              DEC     A       ;BUFFER ONE CHAR FROM FULL?
0230  9634            JNZ     M233
0232  B9FF            MOV     R1,#0FFH ;REPORT BUFFER OVERFLOW
0234  FE      M233    MOV     A,R6    ;PUT CHARACTER IN BUFFER
0235  A0              MOV     @R0,A
0236  18              INC     R0
0237  93      M234    RETR
0238                  ;
0238                  ; TEST FOR HOST COMMUNICATION
0238                  ;
0238  D5      M235    SEL     RB1
0239                  ;
0239                  ; IF CLOCK IS LOW, HOST IS ATTEMPTING COMMUNICATIONS
0239                  ;
0239  469C            JNT1    M297
023B                  ;
023B                  ; IF FLAG 1 IS SET, ??
023B                  ;
023B  763E            JF1     M23D
023D  93              RETR
023E                  ;
023E                  ; IF F1 IS SET, SEND A CHARACTER
023E                  ;
023E  B920    M23D    MOV     R1,#20H   ;R1 = 1ST CHAR
0240  F1              MOV     A,@R1     ;GET CHAR
0241  97              CLR     C
0242  A7              CPL     C
0243  F7              RLC     A       ;USE CARRY FOR BIT BUFFER
0244  469C            JNT1    M297    ;HOST COMM?
0246  9A7F            ANL     P2,#07FH ;SEND DATA
0248  8A10            ORL     P2,#10H
024A  00              NOP
024B  00              NOP
024C  B90E            MOV     R1,#0EH
024E  8654    M24D    JNI     M253    ;WAIT FOR HANDSHAKE
0250  8656            JNI     M255
0252  445D            JMP     M25C
0254  4456    M253    JMP     M255
0256  E94E    M255    DJNZ    R1,M24D
0258  8A80            ORL     P2,#80H ;HOST NOT READY, RESTORE
025A  9AEF            ANL     P2,#0EFH
025C  93              RETR
025D  B909    M25C    MOV     R1,#09H  ;DELAY
025F  00              NOP
0260  E960    M25F    DJNZ    R1,M25F
0262  BA09            MOV     R2,#09H   ;SEND 9 BITS
0264  B90A    M263    MOV     R1,#0AH   ;PREPARE FOR DELAY
0266  1270            JB      0,M26D   ;TEST BIT
0268  9AEF            ANL     P2,#0EFH ;SEND A ZERO
026A  00              NOP
026B  00              NOP
026C  8A80            ORL     P2,#80H
026E  4478            JMP     M273
0270  8A10    M26D    ORL     P2,#010H ;SEND A ONE
0272  00              NOP
0273  00              NOP
0274  8A80            ORL     P2,#80H
0276  4478            JMP     M273
0278  E978    M273    DJNZ    R1,M273  ;DELAY
027A  00              NOP
027B  9A7F            ANL     P2,#07FH
027D  67              RRC     A       ;SHIFT NEXT BIT
027E  EA64            DJNZ    R2,M263  ;ALL BITS SENT?
0280  9AEF            ANL     P2,#0EFH ;
0282  00              NOP
0283  00              NOP
0284  00              NOP
0285  00              NOP
0286  00              NOP
```

ASMB-48 DEVELOPMENT SYSTEM

```
0287  8A80            ORL     P2,#80H  ;RESTORE P2
0289  F8      M203    MOV     A,R0
028A  A9              MOV     R1,A
028B  07              DEC     A
028C  A8              MOV     R0,A     ;UPDATE INPUT BUFFER POINTER
028D  D320            XRL     A,#20H   ;TEST FOR BUFFER EMPTY
028F  9693            JNZ     M20E     ;BUFFER NOT EMPTY
0291  A5              CLR     F1       ;REINITIALIZE BUFFER
0292  93      M20D    RETR
0293                  ;
0293                  ; BYTE SHIFT ALL CHARACTERS IN BUFFER
0293                  ;
0293  F9      M20E    MOV     A,R1
0294  03E1            ADD     A,#0E1H  ;CALCULATE NUMBER OF BYTES
0296  AA              MOV     R2,A
0297  21      SHIFTL  XCH     A,@R1
0298  C9              DEC     R1
0299  EA97            DJNZ    R2,SHIFTL
029B  93      M286    RETR
029C                  ;
029C                  ; DELAY, CHECK HOST COMM
029C                  ;
029C  2300    M287    MOV     A,#0
029E  B908            MOV     R1,#08H
02A0  E9A0    M289    DJNZ    R1,M289
02A2  569B            JT1     M286
02A4                  ;
02A4                  ; RECEIVE HOST COMMUNICATION
02A4                  ; CLOCK 0, DATA 1, DELAY
02A4                  ;
02A4  9A7F            ANL     P2,#07FH
02A6  8A10            ORL     P2,#010H
02A8  B911            MOV     R1,#11H
02AA  E9AA    M293    DJNZ    R1,M293
02AC                  ;
02AC                  ; RECEIVE 9 BITS
02AC                  ;
02AC  BA09            MOV     R2,#09H
02AE                  ;
02AE                  ; CLOCK 1, DELAY
02AE                  ;
02AE  8A80    M297    ORL     P2,#80H
02B0  B908            MOV     R1,#08H
02B2  E9B2    M29B    DJNZ    R1,M29B
02B4                  ;
02B4                  ; CLOCK 0, TEST DATA LINE
02B4                  ;
02B4  9A7F            ANL     P2,#07FH
02B6  86C1            JNI     M2AA
02B8  4301            ORL     A,#01H
02BA  86C5            JNI     M2AE
02BC  67      M2A5    RRC     A
02BD  EAAE            DJNZ    R2,M297
02BF  44C8            JMP     M2B1
02C1  53FE    M2AA    ANL     A,#0FEH
02C3  86BC            JNI     M2A5
02C5  00      M2AE    NOP
02C6  44BC            JMP     M2A5
02C8                  ;
02C8                  ; CLOCK = 1, DELAY
02C8                  ;
02C8  8A80    M2B1    ORL     P2,#080H
02CA  B905            MOV     R1,#05H
02CC  E9CC    M2B5    DJNZ    R1,M2B5
02CE                  ;
02CE                  ; DATA = 0,
02CE                  ;
02CE  9AEF            ANL     P2,#0EFH
02D0  37              CPL     A
```

ASMB-48 DEVELOPMENT SYSTEM

```
02D1  969B              JNZ     M286
02D3  E69B              JNC     M286
02D5  2400              JMP     M100
02D7                    ORG     300H
0300              ;
0300              ; CODE TABLES
0300              ;
0300  62    T00A  DB      98    ;XY 80 KEY 15
0301  63          DB      99    ;XY 81 KEY 16
0302  64          DB      100   ;XY 82 KEY 17
0303  61          DB      97    ;XY 83 KEY 14
0304  68          DB      104   ;XY 84 KEY 21
0305  65          DB      101   ;XY 85 KEY 18
0306  67          DB      103   ;XY 86 KEY 20
0307  66          DB      102   ;XY 87 KEY 19
0308  1A          DB      26    ;XY 88 KEY 53
0309  1B          DB      27    ;XY 89 KEY 54
030A  29          DB      41    ;XY 8A KEY 55
030B  00          DB      0     ;XY 8B KEY
030C  4A          DB      74    ;XY 8C KEY 59
030D  47          DB      71    ;XY 8D KEY 56
030E  49          DB      73    ;XY 8E KEY 58
030F  48          DB      72    ;XY 8F KEY 57
0310  28    T10A  DB      40    ;XY 90 KEY 73
0311  00          DB      0     ;XY 91 KEY
0312  1C          DB      28    ;XY 92 KEY 74
0313  27          DB      39    ;XY 93 KEY 72
0314  4E          DB      78    ;XY 94 KEY 78
0315  4B          DB      75    ;XY 95 KEY 75
0316  4D          DB      77    ;XY 96 KEY 77
0317  4C          DB      76    ;XY 97 KEY 76
0318  35          DB      53    ;XY 98 KEY 92
0319  36          DB      54    ;XY 99 KEY 93 SHIFT
031A  37          DB      55    ;XY 9A KEY 94
031B  34          DB      52    ;XY 9B KEY 91
031C  1C          DB      28    ;XY 9C KEY 98
031D  4F          DB      79    ;XY 9D KEY 95
031E  51          DB      81    ;XY 9E KEY 97
031F  50          DB      80    ;XY 9F KEY 96
0320  0C    T20A  DB      12    ;XY A0 KEY 35
0321  0D          DB      13    ;XY A1 KEY 36
0322  0E          DB      14    ;XY A2 KEY 37
0323  0B          DB      11    ;XY A3 KEY 34
0324  46          DB      70    ;XY A4 KEY 39
0325  00          DB      0     ;XY A5 KEY
0326  0A          DB      10    ;XY A6 KEY 33
0327  45          DB      69    ;XY A7 KEY 38 NUM
0328  00          DB      0     ;XY A8 KEY
0329  00          DB      0     ;XY A9 KEY
032A  09          DB      9     ;XY AA KEY 32
032B  07          DB      7     ;XY AB KEY 30
032C  00          DB      0     ;XY AC KEY
032D  00          DB      0     ;XY AD KEY
032E  00          DB      0     ;XY AE KEY
032F  08          DB      8     ;XY AF KEY 31
0330  2E    T30A  DB      46    ;XY B0 KEY 85
0331  2D          DB      45    ;XY B1 KEY 84
0332  2C          DB      44    ;XY B2 KEY 83
0333  2F          DB      47    ;XY B3 KEY 86
0334  41          DB      65    ;XY B4 KEY 79
0335  2A          DB      42    ;XY B5 KEY 82 SHIFT
0336  42          DB      66    ;XY B6 KEY 80
0337  2B          DB      43    ;XY B7 KEY 81
0338  21          DB      33    ;XY B8 KEY 66
0339  20          DB      32    ;XY B9 KEY 65
033A  1F          DB      31    ;XY BA KEY 64
033B  22          DB      34    ;XY BB KEY 67
033C  3F          DB      63    ;XY BC KEY 60
033D  1E          DB      30    ;XY BD KEY 63
```

ASMB-48 DEVELOPMENT SYSTEM

```
033E  40            DB     64    ;XY BE KEY 61
033F  1D            DB     29    ;XY BF KEY 62 CNTL
0340  13     T40A   DB     19    ;XY C0 KEY 46
0341  12            DB     18    ;XY C1 KEY 45
0342  11            DB     17    ;XY C2 KEY 44
0343  14            DB     20    ;XY C3 KEY 47
0344  3D            DB     61    ;XY C4 KEY 40
0345  10            DB     16    ;XY C5 KEY 43
0346  3E            DB     62    ;XY C6 KEY 41
0347  0F            DB     15    ;XY C7 KEY 42
0348  05            DB     5     ;XY C8 KEY 28
0349  04            DB     4     ;XY C9 KEY 27
034A  03            DB     3     ;XY CA KEY 26
034B  06            DB     6     ;XY CB KEY 29
034C  3B            DB     59    ;XY CC KEY 22
034D  02            DB     2     ;XY CD KEY 25
034E  3C            DB     60    ;XY CE KEY 23
034F  01            DB     1     ;XY CF KEY 24
0350  5A     T50A   DB     90    ;XY D0 KEY 7
0351  59            DB     89    ;XY D1 KEY 6
0352  58            DB     88    ;XY D2 KEY 5
0353  5B            DB     91    ;XY D3 KEY 8
0354  54            DB     84    ;XY D4 KEY 1
0355  57            DB     87    ;XY D5 KEY 4
0356  55            DB     85    ;XY D6 KEY 2
0357  56            DB     86    ;XY D7 KEY 3
0358  5C            DB     92    ;XY D8 KEY 9
0359  5D            DB     93    ;XY D9 KEY 10
035A  5E            DB     94    ;XY DA KEY 11
035B  60            DB     96    ;XY DB KEY 13
035C  00            DB     0     ;XY DC KEY
035D  5F            DB     95    ;XY DD KEY 12
035E  00            DB     0     ;XY DE KEY
035F  00            DB     0     ;XY DF KEY
0360  16     T60A   DB     22    ;XY E0 KEY 49
0361  18            DB     24    ;XY E1 KEY 51
0362  17            DB     23    ;XY E2 KEY 50
0363  19            DB     25    ;XY E3 KEY 52
0364  23            DB     35    ;XY E4 KEY 68
0365  15            DB     21    ;XY E5 KEY 48
0366  24            DB     36    ;XY E6 KEY 69
0367  25            DB     37    ;XY E7 KEY 70
0368  3A            DB     58    ;XY E8 KEY 103 CAPS
0369  52            DB     82    ;XY E9 KEY 104
036A  53            DB     83    ;XY EA KEY 105
036B  39            DB     57    ;XY EB KEY 102
036C  1C            DB     28    ;XY EC KEY 106
036D  38            DB     56    ;XY ED KEY 101 ALT
036E  43            DB     67    ;XY EE KEY 99
036F  44            DB     68    ;XY EF KEY 100
0370  00     T70A   DB     0     ;XY F0 KEY
0371  00            DB     0     ;XY F1 KEY
0372  26            DB     38    ;XY F2 KEY 71
0373  30            DB     48    ;XY F3 KEY 87
0374  31            DB     49    ;XY F4 KEY 88
0375  00            DB     0     ;XY F5 KEY
0376  32            DB     50    ;XY F6 KEY 89
0377  33            DB     51    ;XY F7 KEY 90
0378  00            DB     000H  ;FOR CHECKSUM = 0
0379  D5     BUFFR1 SEL    RB1
037A  767F         JF1    M426  ;BUFFER EMPTY?
037C  B820         MOV    R0,#20H ;INITIALIZE BUFFER
037E  B5           CPL    F1    ;BUFFER INITIALIZED
037F  A9     M426  MOV    R1,A  ;SAVE CHARACTER IN R1
0380  F8           MOV    A,R0  ;
0381  D330         XRL    A,#30H ;BUFFER FULL?
0383  C68D         JZ     M434  ;
0385  07           DEC    A     ;BUFFER ONE CHAR FROM FULL?
0386  968A         JNZ    M431
```

ASMB-48 DEVELOPMENT SYSTEM

```
0388  B9FF              MOV     R1,#0FFH ;REPORT BUFFER OVERFLOW
038A  F9       M431     MOV     A,R1     ;PUT CHARACTER IN BUFFER
038B  A0                MOV     @R0,A
038C  18                INC     R0
038D  93       M434     RETR
038E                    END
0000  ERRORS
```

| | | | | | | | |
|---|---|---|---|---|---|---|---|
| BUFFER | 0203 | BUFFR1 | 0379 | CAPSL | 009F | COD | 0074 |
| COD2 | 0078 | COR | 0061 | FALSE | 004B | HIST0 | 0048 |
| HIST1 | 0059 | INCR0 | 0017 | M00 | 0000 | M0D | 000F |
| M10 | 0012 | M100 | 0100 | M109 | 0109 | M114 | 0114 |
| M128 | 012B | M200 | 0200 | M203 | 0289 | M20D | 0292 |
| M20E | 0293 | M226 | 0209 | M231 | 0214 | M232 | 0227 |
| M233 | 0234 | M234 | 0237 | M235 | 0238 | M23D | 023E |
| M24D | 024E | M253 | 0254 | M255 | 0256 | M25C | 025D |
| M25F | 0260 | M26 | 001D | M263 | 0264 | M26D | 0270 |
| M273 | 0278 | M286 | 029B | M287 | 029C | M289 | 02A0 |
| M293 | 02AA | M297 | 02AE | M29B | 02B2 | M2A5 | 02BC |
| M2AA | 02C1 | M2AE | 02C5 | M2B1 | 02C8 | M2B5 | 02CC |
| M426 | 037F | M431 | 038A | M434 | 038D | MASK | 0055 |
| ME4 | 00AF | ME5 | 00B0 | NOREP | 003A | NOTCAP | 00A6 |
| NUML | 008B | OUTP2 | 00A4 | RELEAS | 0065 | REP | 0033 |
| SCAN | 004E | SEND | 00AB | SETUP | 002E | SHIFTL | 0297 |
| START | 0015 | T00A | 0300 | T10A | 0310 | T20A | 0320 |
| T30A | 0330 | T40A | 0340 | T50A | 0350 | T60A | 0360 |
| T70A | 0370 | TIMER | 021C | TSTCAP | 009B | | |

ASMB-48 DEVELOPMENT SYSTEM

APPENDIX B

```
KEYBOARD_VECTORS       SEGMENT AT 0H   ; LOCATIONS OF KEYBOARD INT. VECTORS
                       ORG     9H*4    ; ADDRESS IN LOW MEMORY
    VECTOR_9           LABEL   DWORD   ; KEYSTROKE OCCURRED INTERRUPT
                       ORG     16H*4   ; ADDRESS IN LOW MEMORY
    VECTOR_16          LABEL   DWORD   ; KEYBOARD I/O INTERRUPT
KEYBOARD_VECTORS       ENDS

;-----------------------------------------
;               EQUATES                  :
;-----------------------------------------

EOI                EQU     20H
    KB_DATA            EQU     60H       ; KEYBOARD SCAN CODE PORT
    KB_CTL             EQU     61H       ; CONTROL BITS FOR KB SENSE DATA

;-----------------------------------------
;           ROM BIOS DATA AREAS          :
;-----------------------------------------

DATA                   SEGMENT AT 40H

;-----------------------------------------
;        KEYBOARD DATA AREAS             :
;-----------------------------------------

ORG     017H    ;zzzzzz ; TO MATCH IBM-BIOS
    KB_FLAG            DB      ?
```

```
;------ SHIFT FLAG EQUATES WITHIN KB_FLAG

INS_STATE      EQU     80H             ; INSERT STATE IS ACTIVE
CAPS_STATE     EQU     40H             ; CAPS LOCK STATE HAS BEEN TOGGLED
NUM_STATE      EQU     20H             ; NUM LOCK STATE HAS BEEN TOGGLED
SCROLL_STATE   EQU     10H             ; SCROLL LOCK STATE HAS BEEN TOGGLED
ALT_SHIFT      EQU     08H             ; ALTERNATE SHIFT KEY DEPRESSED
CTL_SHIFT      EQU     04H             ; CONTROL SHIFT KEY DEPRESSED
LEFT_SHIFT     EQU     02H             ; LEFT SHIFT KEY DEPRESSED
RIGHT_SHIFT    EQU     01H             ; RIGHT SHIFT KEY DEPRESSED

KB_FLAG_1      DB      ?               ; SECOND BYTE OF KEYBOARD STATUS
INS_SHIFT      EQ      80H             ; INSERT KEY IS DEPRESSED
CAPS_SHIFT     EQU     40H             ; CAPS LOCK KEY IS DEPRESSED
NUM_SHIFT      EQU     20H             ; NUM LOCK KEY IS DEPRESSED
SCROLL_SHIFT   EQU     10H             ; SCROLL LOCK KEY IS DEPRESSED
HOLD_STATE     EQU     08H             ; SUSPEND KEY HAS BEEN TOGGLED

ALT_INPUT      DB      ?               ; STORAGE FOR ALTERNATE KEYPAD ENTRY
BUFFER_HEAD    DW      ?               ; POINTER TO HEAD OF KEYBOARD BUFFER
BUFFER_TAIL    DW      ?               ; POINTER TO TAIL OF KEYBOARD BUFFER
; KB_BUFFER    DW      16 DUP(?)       ; ROOM FOR 15 ENTRIES
; KB_BUFFER_END LABEL  WORD

;------ HEAD = TAIL INDICATES THAT THE BUFFER IS EMPTY

NUM_KEY        EQU     69              ; SCAN CODE FOR NUMBER LOCK
SCROLL_KEY     EQU     70              ; SCROLL LOCK KEY
ALT_KEY        EQU     56              ; ALTERNATE SHIFT KEY SCAN CODE
CTL_KEY        EQU     29              ; SCAN CODE FOR CONTROL KEY
CAPS_KEY       EQU     58              ; SCAN CODE FOR SHIFT LOCK
LEFT_KEY       EQU     42              ; SCAN CODE FOR LEFT SHIFT
RIGHT_KEY      EQU     54              ; SCAN CODE FOR RIGHT SHIFT
INS_KEY        EQU     82              ; SCAN CODE FOR INSERT KEY
DEL_KEY        EQU     83              ; SCAN CODE FOR DELETE KEY

;----------------------------------------
;           VIDEO DISPLAY DATA AREA      :
;----------------------------------------
               ORG     049H    ;zzzzzz  ; TO MATCH IBM-BIOS
CRT_MODE       DB      ?                ; CURRENT CRT MODE
               ORG     065H    ;zzzzzz  ; TO MATCH IBM-BIOS
CRT_MODE_SET   DB      ?                ; CURRENT SETTING OF THE 3X8 REGISTER ;----------------------------------------
;           SYSTEM DATA AREA             :
;----------------------------------------
```

```
                ORG       071H    ;zzzzzz ; TO MATCH IBM-BIOS
BIOS_BREAK      DB        ?               ; BIT 7 = 1 IF BREAK KEY WAS DEPRESSED
RESET_FLAG      DW        ?               ; WORD = 1234H IF KB RESET UNDERWAY ;----------------------------------------
;       EXTRA KEYBOARD DATA AREAS       :
;----------------------------------------

ORG       080H    ;zzzzzz ; TO MATCH IBM-BIOS
BUFFER_END      DW
KB_BUFFER       DW        32 DUP(?) ;12/2 ; ROOM FOR ? ENTRIES
KB_BUFFER_END   LABEL     WORD      ;12/2
BYTE1           DB        ?       ;xx12/2-; FIRST KEYBOARD SCANCODE BYTE
BYTE2           DB        ?       ;xx12/2 ; SECOND KEYBOARD SCANCODE BYTE
BYTE3           DB        ?       ;xx12/2 ; THIRD KEYBOARD SCANCODE BYTE
;xx TEMPWORD    DW        ?       ;xx12/3 ; TEMPORARY STORAGE OF SCANCODE IN AX
NUMBYTE         DB        0       ;x12/11 ; NUMBER OF INPUT BYTE
DATA            ENDS ;----------------------------------------
;--------8088 PROCESSOR TEST
; DESCRIPTION                                                :
;        VERIFY 8088 FLAGS, REGISTERS AND CONDITIONAL JUMPS  :
;----------------------------------------
RESET_ROUTINE   SEGMENT AT 0F000H ;zzzz ; DEFINED AT CORRECT SEG:OFFSET IN BIOS
                ORG       0E05BH
RESET           LABEL     FAR
RESET_ROUTINE   ENDS              ;zzzz ; DEFINED AT CORRECT SEG:OFFSET IN BIOS CODE            SEGMENT           ;zzzzzz ; 'AT 3000H' OMITTED (PG. 5-39 MAC-ASM)
;---- INT 16 ----------------------------------------------------
; KEYBOARD I/O                                                :
;       THESE ROUTINES PROVIDE KEYBOARD SUPPORT               :
; INPUT                                                       :
;       (AH)=0  READ THE NEXT ASCII CHARACTER STRUCK FROM THE KEYBOARD :
;               RETURN THE RESULT IN (AL), SCAN CODE IN (AH)  :
;       (AH)=1  SET THE Z FLAG TO INDICATE IF AN ASCII CHARACTER IS :
;               AVAILABLE TO BE READ.                         :
;                       (ZF)=1 -- NO CODE AVAILABLE           :
;                       (ZF)=0 -- CODE IS AVAILABLE           :
;               IF ZF = 0, THE NEXT CHARACTER IN THE BUFFER TO BE READ :
;               IS IN AX, AND THE ENTRY REMAINS IN THE BUFFER :
;       (AH)=2  RETURN THE CURRENT SHIFT STATUS IN AL REGISTER :
;               THE BIT SETTINGS FOR THIS CODE ARE INDICATED IN THE :
;               THE EQUATES FOR KB_FLAG                       :
; OUTPUT                                                      :
;       AS NOTED ABOVE, ONLY AX AND FLAGS CHANGED             :
;       ALL REGISTERS PRESERVED                               :
```

```
;-------------------------------------------------------------------
        ASSUME  CS:CODE,DS:DATA
;xxxxxx ORG     0E82EH          ;xx12/1 ; MOVE CODE BACK BY 16 BYTES TO AVOID
        ORG     0E81EH          ;xx12/1 ;   OVERLAPPING INTO INT_9 CODE (E987)
        PUSH    DS                      ; SAVE CURRE   DS
        PUSH    BX                      ; SAVE BX TEMPORARILY
        CALL    DDS
        OR      AH,AH                   ; AH=0
        JZ      K1                      ; ASCII_READ
        DEC     AH                      ; AH=1
        JZ      K2                      ; ASCII_STATUS
        DEC     AH                      ; AH=2
        JZ      K3                      ; SHIFT_STATUS
        JMP     SHORT INT10_END         ; EXIT

;----- READ THE KEY TO FIGURE OUT WHAT TO DO

K1:                                     ; ASCII READ
        STI                             ; INTERRUPTS BACK ON DURING LOOP
        NOP                             ; ALLOW AN INTERRUPT TO OCCUR
        CLI                             ; INTERRUPTS BACK OFF
        MOV     BX,BUFFER_HEAD          ; GET POINTER TO HEAD OF BUFFER
        CMP     BX,BUFFER_TAIL          ; TEST END OF BUFFER
        JZ      K1                      ; LOOP UNTIL SOMETHING IN BUFFER
        MOV     AX,[BX]                 ; GET SCAN CODE AND ASCII CODE
        MOV     CX,[BX+2]       ;xx12/1 ; RECOVER 2ND TWO BYTES FROM KEY BUFFER
        CALL    K4                      ; MOVE POINTER TO NEXT POSITION
        MOV     BUFFER_HEAD,BX          ; STORE VALUE IN VARIABLE
        JMP     SHORT INT10_END         ; RETURN

;----- ASCII STATUS

K2:
        CLI                             ; INTERRUPTS OFF
        MOV     BX,BUFFER_HEAD          ; GET HEAD POINTER
        CMP     BX,BUFFER_TAIL          ; IF EQUAL (Z=1) THEN NOTHING THERE
        MOV     AX,[BX]
        MOV     CX,[BX+2]       ;xx12/1 ; RECOVER 2ND TWO BYTES FROM KEY BUFFER
        STI                             ; INTERRUPTS BACK ON
        POP     BX                      ; RECOVER REGISTER
        POP     DS                      ; RECOVER SEGMENT
        RET     2                       ; THROW AWAY FLAGS

;----- SHIFT STATUS
```

```
K3:
        POP     BX                      ; RECOVER REGISTER
        POP     DS                      ; RECOVER REGISTERS
        IRET                            ; RETURN TO CALLER
KEYBOARD_IO     ENDP

;----- INCREMENT A BUFFER POINTER

K4      PROC    NEAR
        INC     BX                      ; MOVE TO NEXT WORD IN LIST
        INC     BX
        INC     BX              ;xx12/1 ; TO ACCOMODATE THE NEW 4-BYTE
        INC     BX              ;xx12/1 ;   KB_BUFFER (UP FROM 2 BYTES)
        CMP     BX,BUFFER_END           ; AT END OF BUFFER?
        JNE     K5                      ; NO, CONTINUE
        MOV     BX,BUFFER_START         ; YES, RESET TO BUFFER BEGINNING
K5:
        RET
K4      ENDP

;----- TABLE OF SHIFT KEYS AND MASK VALUES

K6      LABEL   BYTE
        DB      INS_KEY                 ; INSERT KEY
        DB      CAPS_KEY,NUM_KEY,SCROLL_KEY,ALT_KEY,CTL_KEY
        DB      LEFT_KEY,RIGHT_KEY
K6L     EQU     $-K6

;----- SHIFT MASK TABLE

K7      LABEL   BYTE
        DB      INS_SHIFT               ; INSERT MODE SHIFT
        DB      CAPS_SHIFT,NUM_SHIFT,SCROLL_SHIFT,ALT_SHIFT,CTL_SHIFT
        DB      LEFT_SHIFT,RIGHT_SHIFT

;----- SCAN CODE TABLES

K8              DB      27,-1,0,-1,-1,-1,30,-1
                DB      -1,-1,-1,31,-1,127,-1,17
                DB      23,5,18,20,25,21,9,15
                DB      16,27,29,10,-1,1,19
                DB      4,6,7,8,10,11,12,-1,-1
                DB      -1,-1,28,26,24,3,22,2
CTL TABLE SCAN
    LABEL   BYTE
                DB      94,95,96,97,98,99,100,101
                DB      102,103,-1,-1,119,-1,132,-1
```

```
            DB      115,-1,116,-1,117,-1,118,-1
            DB      -1
--- LC TABLE
    LABEL   BYTE
            DB      01BH,'1234567890-=',08H,09H
            DB      'qwertyuiop[]',0DH,-1,'asdfghjkl;',027H
            DB      60H,-1,5CH,'zxcvbnm,./',-1,'*',-1,' ',
            DB      -1
--- UC TABLE
    LABEL   BYTE
            DB      27,'!@#$',37,05EH,'&*()_+',08H,0
            DB      'QWERTYUIOP§↑',0DH,-1,'ASDFGHJKL:"'
            DB      07EH,-1,'¶ZXCVBNM<>?',-1,0,-1,' ',-1
--- UC TABLE SCAN
    LABEL   BYTE
            DB      84,85,86,87,88,89,90
            DB      91,92,93
--- ALT TABLE SCAN
    LABEL   BYTE
            DB      104,105,106,107,108
            DB      109,110,111,112,113
--- NUM STATE TABLE
    LABEL   BYTE
            DB      '789-456+1230.'
--- BASE CASE TABLE
    LABEL   BYTE
            DB      71,72,73,-1,75,-1,77
            DB      -1,79,80,81,82,83
            DB      4 DUP(0FFH)         ;zzzzzz ; TO MATCH ROM-BIOS
    K_COUNT DW      0                   ;wwwww ; COUNT OF KEY HITS
;----- KEYBOARD INTERRUPT ROUTINE ORG     0E987H
    KB_INT  PROC    FAR
            STI                         ; ALLOW FURTHER INTERRUPTS
            PUSH    AX
            PUSH    BX
            PUSH    CX
            PUSH    DX
            PUSH    SI
            PUSH    DI
            PUSH    DS
            PUSH    ES
    ;xx     MOV     CL,0                ;xx12/2 ; CL CONTAINS ORDINAL OF INPUT BYTE
            CLD                         ; FORWARD DIRECTION:
            CALL    DDS
```

```
;xx J0:
        IN      AL,KB_DATA              ; READ IN THE CHARACTER
        PUSH    AX                      ; SAVE IT
        IN      AL,KB_CTL               ; GET THE CONTROL PORT
        MOV     AH,AL                   ; SAVE VALUE
        OR      AL,80H                  ; RESET BIT FOR KEYBOARD
        OUT     KB_CTL,AL
        XCHG    AH,AL                   ; GET BACK ORIGINAL CONTROL
        OUT     KB_CTL,AL               ; KB HAS BEEN RESET
        POP     AX                      ; RECOVER SCAN CODE
        MOV     AH,AL                   ; SAVE SCAN CODE IN AH ALSO

J1:                                     ;xx12/2 ; TEST FOR FIRST INPUT BYTE
        MOV     CL,NUMBYTE              ;x12/11 ; GET BYTE COUNT
        OR      CL,CL                   ;xx12/2 ; IS THIS FIRST INPUT BYTE?
        JNZ     J2                      ;xx12/2 ; JUMP IF NOT
;xx     MOV     TEMPWORD,AX             ;xx12/3 ; SAVE FIRST SCANCODE TEMPORARILY
        MOV     BYTE1,AH                ;xx12/2 ; SAVE FIRST INPUT BYTE
;xx     MOV     CL,1                    ;xx12/2 ; SET UP FOR SECOND INPUT BYTE
        MOV     NUMBYTE,1               ;x12/11 ; SET UP FOR SECOND INPUT BYTE
        JMP     K26                     ;x12/11 ; INTERRUPT RETURN
J2:                                     ;xx12/2 ; TEST FOR SECOND INPUT BYTE
        MOV     CL,NUMBYTE              ;x12/11 ; GET BYTE COUNT
        DEC     CL                      ;xx12/2 ; IS THIS SECOND INPUT BYTE?
        JNZ     J3                      ;xx12/2 ; JUMP IF NOT
        MOV     BYTE2,AH                ;xx12/2 ; SAVE SECOND INPUT BYTE
;xx     MOV     CL,2                    ;xx12/2 ; SET UP FOR THIRD INPUT BYTE
        MOV     NUMBYTE,2               ;x12/11 ; SET UP FOR THIRD INPUT BYTE
;xx     JMP     SHORT J0                ;xx12/2 ; GO BACK FOR THIRD INPUT BYTE
        JMP     K26                     ;x12/11 ; INTERRUPT RETURN
J3:                                     ;xx12/2 ; PROCESS THIRD INPUT BYTE
        MOV     BYTE3,AH                ;xx12/2 ; SAVE THIRD INPUT BYTE

;xx     MOV     AX,TEMPWORD             ;xx12/3 ; RESTORE ORIGINAL SCANCODE INTO AX
        MOV     NUMBYTE,0               ;x12/11 ; RESET COUNT FOR NEXT BYTE TRIO
        MOV     AL,BYTE1                ;x12/11 ; RESTORE ORIGINAL SCANCODE INTO AX
        MOV     AH,BYTE1                ;x12/11 ;
        JMP     K61                     ;x12/11 ; PUT IT INTO THE BUFFER

NOP                             ;wwwww
        NOP                             ;wwwww
        NOP                             ;wwwww

;----- TEST FOR OVERRUN SCAN CODE FROM KEYBOARD

CMP     AL,0FFH                 ; IS THIS AN OVERRUN CHAR
```

```
                JNZ     K16                     ; NO, TEST FOR SHIFT KEY
                JMP     K62                     ; BUFFER_FULL_BEEP

;----- TEST FOR SHIFT KEYS

K16:                                    ; TEST_SHIFT
                AND     AL,07FH                 ; TURN OFF THE BREAK BIT
                PUSH    CS
                POP     ES                      ; ESTABLISH ADDRESS OF SHIFT TABLE
                MOV     DI,OFFSET K6            ; SHIFT KEY TABLE
                MOV     CX,K6L                  ; LENGTH
                REPNE   SCASB                   ; LOOK THROUGH THE TABLE FOR A MATCH
                MOV     AL,AH                   ; RECOVER SCAN CODE
                JE      K17                     ; JUMP IF MATCH FOUND
                JMP     K25                     ; IF NO MATCH, THEN SHIFT NOT FOUND

;----- SHIFT KEY FOUND
        K17:    SUB     DI,OFFSET K6+1          ; ADJUST PTR TO SCAN CODE MTCH
                MOV     AH,CS:K7[DI]            ; GET MASK INTO AH
                TEST    AL,80H                  ; TEST FOR BREAK KEY
                JNZ     K23                     ; BREAK_SHIFT_FOUND

;----- SHIFT MAKE FOUND, DETERMINE SET OR TOGGLE

CMP     AH,SCROLL_SHIFT
                JAE     K18                     ; IF SCROLL SHIFT OR ABOVE, TOGGLE KEY

;----- PLAIN SHIFT KEY, SET SHIFT ON

OR      KB_FLAG,AH              ; TURN ON SHIFT BIT
                JMP     K26                     ; INTERRUPT_RETURN

;----- TOGGLED SHIFT KEY, TEST FOR 1ST MAKE OR NOT

K18:                                    ; SHIFT-TOGGLE
                TEST    KB_FLAG, CTL_SHIFT      ; CHECK CTL SHIFT STATE
                JNZ     K25                     ; JUMP IF CTL STATE
                CMP     AL, INS_KEY             ; CHECK FOR INSERT KEY
                JNZ     K22                     ; JUMP IF NOT INSERT KEY
                TEST    KB_FLAG, ALT_SHIFT      ; CHECK FOR ALTERNATE SHIFT
                JNZ     K25                     ; JUMP IF ALTERNATE SHIFT
        K19:    TEST    KB_FLAG, NUM_STATE      ; CHECK FOR BASE STATE
                JNZ     K21                     ; JUMP IF NUM LOCK IS ON
                TEST    KB_FLAG, LEFT_SHIFT+ RIGHT_SHIFT
                JZ      K22                     ; JUMP IF BASE STATE
```

```
K20:                                    ; NUMERIC ZERO, NOT INSERT KEY
        MOV     AX, 5230H               ; PUT OUT AN ASCII ZERO
        JMP     K57                     ; BUFFER_FILL
K21:                                    ; MIGHT BE NUMERIC
        TEST    KB_FLAG, LEFT_SHIFT+ RIGHT_SHIFT
        JZ      K20                     ; JUMP NUMERIC, NOT INSERT

K22:                                    ; SHIFT TOGGLE KEY HIT; PROCESS IT
        TEST    AH,KB_FLAG_1            ; IS KEY ALREADY DEPRESSED
        JNZ     K26                     ; JUMP IF KEY ALREADY DEPRESSED
        OR      KB_FLAG_1,AH            ; INDICATE THAT THE KEY IS DEPRESSED
        XOR     KB_FLAG,AH              ; TOGGLE THE SHIFT STATE
        CMP     AL,INS_KEY              ; TEST FOR 1ST MAKE OF INSERT KEY
        JNE     K26                     ; JUMP IF NOT INSERT KEY
        JAE     K24                     ; YES, HANDLE BREAK TOGGLE
        NOT     AH                      ; INVERT MAS.
        AND     KB_FLAG,AH              ; TURN OFF SHIFT BIT
        CMP     AL,ALT_KEY+80H          ; IS THIS ALTERNATE SHIFT RELEASE
        JNE     K26                     ; INTERRUPT_RETURN

;----- ALTERNATE SHIFT KEY RELEASED, GET THE VALUE INTO BUFFER

MOV     AL,ALT_INPUT
        MOV     AH,0                    ; SCAN CODE OF 0
        MOV     ALT_INPUT,AH            ; ZERO OUT THE FIELD
        CMP     AL,0                    ; WAS THE INPUT=0
        JE      K26                     ; INTERRUPT_RETURN
        JMP     K58                     ; IT WASN'T, SO PUT IN BUFFER
K24:                                    ; BREAK-TOGGLE
        NOT     AH                      ; INVERT MASK
        AND     KB_FLAG_1,AH            ; INDICATE NO LONGER DEPRESSED
        JMP     SHORT K26               ; INTERRUPT_RETURN

;----- TEST FOR HOLD STATE

K25:                                    ; NO-SHIFT-FOUND
        CMP     AL,80H                  ; TEST FOR BREAK KEY
        JAE     K26                     ; NOTHING FOR BREAK CHARS FROM HERE ON
        TEST    KB_FLAG_1,HOLD_STATE    ; ARE WE IN HOLD STATE
        JZ      K28                     ; BRANCH AROUND TEST IF NOT
        CMP     AL,NUM_KEY
        JE      K26                     ; CAN'T END HOLD ON NUM_LOCK
        AND     KB_FLAG_1,NOT HOLD_STATE        ; TURN OFF THE HOLD STATE BIT
K26:                                    ; INTERRUPT-RETURN
        CLI                             ; TURN OFF INTERRUPTS
        MOV     AL,EOI                  ; END OF INTERRUPT COMMAND
        OUT     020H,AL                 ; SEND COMMAND TO INT CONTROL PORT
```

```
K27:                                    ; INTERRUPT-RETURN-NO-EOI
        POP     ES
        POP     DS
        POP     DI
        POP     DX
        POP     CX
        POP     BX
        POP     AX                      ; RESTORE STATE
        IRET                            ; RETURN, INTERRUPTS BACK ON
                                        ; WITH FLAG CHANGE

;----- NOT IN HOLD STATE, TEST FOR SPECIAL CHARS

K28:                                    ; NO-HOLD-STATE
        TEST    KB_FLAG,ALT_SHIFT       ; ARE WE IN ALTERNATE SHIFT
        JNZ     K29                     ; JUMP IF ALTERNATE SHIFT
        JMP     K38                     ; JUMP IF NOT ALTERNATE

;----- TEST FOR RESET KEY SEQUENCE (CTL ALT DEL)

K29:                                    ; TEST-RESET
        TEST    KB_FLAG,CTL_SHIFT       ; ARE WE IN CONTROL SHIFT ALSO
        JZ      K31                     ; NO_RESET
        CMP     AL,DEL_KEY              ; SHIFT STATE IS THERE, TEST KEY
        JNE     K31                     ; NO_RESET

;----- CTL-ALT-DEL HAS BEEN FOUND, DO I/O CLEANUP

MOV     RESET_FLAG,1234H        ; SET FLAG FOR RESET FUNCTION
        JMP     RESET                   ; JUMP TO POWER ON DIAGNOSTICS

;----- ALT-INPUT-TABLE
K30     LABEL   BYTE
        DB      82,79,80,81,75,76,77
        DB      71,72,73                ; 10 NUMBERS ON KEYPAD
;----- SUPER-SHIFT-TABLE
        DB      16,17,18,19,20,21,22,23 ; A-Z TYPEWRITER CHARS
        DB      24,25,30,31,32,33,34,35
        DB      36,37,38,44,45,46,47,48
        DB      49,50

;----- IN ALTERNATE SHIFT, RESET NOT FOUND

K31:                                    ; NO-RESET
        CMP     AL,57                   ; TEST FOR SPACE KEY
        JNE     K32                     ; NOT THERE
```

```
             MOV     AL,' '                    ; SET SPACE CHAR
;----- LOOK FOR KEY PAD ENTRY

K32:                                      ; ALT-KEY-PAD
             MOV     DI,OFFSET K30             ; ALT-INPUT-TABLE
             MOV     CX,10                     ; LOOK FOR ENTRY USING KEYPAD
             REPNE   SCASB                     ; LOOK FOR MATCH
             JNE     K33                       ; NO_ALT_KEYPAD
             SUB     DI,OFFSET K30+1           ; DI NOW HAS ENTRY VALUE
             MOV     AL,ALT_INPUT              ; GET THE CURRENT BYTE
             MOV     AH,10                     ; MULTIPLY BY 10
             MUL     AH
             ADD     AX,DI                     ; ADD IN THE LATEST ENTRY
             MOV     ALT_INPUT,AL              ; STORE IT AWAY
             JMP     K26                       ; THROW AWAY THAT KEYSTROKE

;----- LOOK FOR SUPERSHIFT ENTRY

K33:                                      ; NO-ALT-KEYPAD
             MOV     ALT_INPUT,0               ; ZERO ANY PREVIOUS ENTRY INTO INPUT
             MOV     CX,26                     ; DI,ES ALREADY POINTING
             REPNE   SCASB                     ; LOOK FOR MATCH IN ALPHABET
             JNE     K34                       ; NOT FOUND, FUNCTION KEY OR OTHER
             MOV     AL,0                      ; ASCII CODE OF ZERO
             JMP     K57                       ; PUT IT IN THE BUFFER

;----- LOOK FOR TOP ROW OF ALTERNATE SHIFT

K34:                                      ; ALT-TOP-ROW
             CMP     AL,2                      ; KEY WITH '1' ON IT
             JB      K35                       ; NOT ONE OF INTERESTING KEYS
             CMP     AL,14                     ; IS IT IN THE REGION
             JAE     K35                       ; ALT-FUNCTION
             ADD     AH,118                    ; CONVERT PSUEDO SCAN CODE TO RANGE
             MOV     AL,0                      ; INDICATE AS SUCH
             JMP     K57                       ; BUFFER_FILL

;----- TRANSLATE ALTERNATE SHIFT PSEUDO SCAN CODES

K35:                                      ; ALT-FUNCTION
             CMP     AL,59                     ; TEST FOR IN TABLE
             JAE     K37                       ; ALT-CONTINUE
     K36:                                      ; CLOSE-RETURN

K37:                                      ; ALT-CONTINUE
             CMP     AL,71                     ; IN KEYPAD REGION
             JAE     K36                       ; IF SO, IGNORE
```

```
            MOV     BX,OFFSET K13           ; ALT SHIFT PSEUDO SCAN TABLE
            JMP     K63                    ; TRANSLATE THAT

;----- NOT IN ALTERNATE SHIFT

K38:                                       ; NOT-ALT-SHIFT
            TEST    KB_FLAG,CTL_SHIFT      ; ARE WE IN CONTROL SHIFT
            JZ      K44                    ; NOT-CTL-SHIFT

;----- CONTROL SHIFT, TEST SPECIAL CHARACTERS
;----- TEST FOR BREAK AND PAUSE KEYS

CMP     AL,SCROLL_KEY          ; TEST FOR BREAK
            JNE     K39                    ; NO-BREAK
            MOV     BX,BUFFER_START        ; RESET BUFFER TO EMPTY
            MOV     BUFFER_HEAD,BX
            MOV     BUFFER_TAIL,BX
            MOV     BIOS_BREAK,80H         ; TURN ON BIOS_BREAK BIT
            INT     1BH                    ; BREAK INTERRUPT VECTOR
            SUB     AX,AX                  ; PUT OUT DUMMY CHARACTER
            JMP     K57                    ; BUFFER_FILL
K39:                                       ; NO-BREAK
            CMP     AL,NUM_KEY             ; LOOK FOR PAUSE KEY
            JNE     K41                    ; NO-PAUSE
            OR      KB_FLAG_1,HOLD_STATE   ; TURN ON THE HOLD FLAG
            MOV     AL,EOI                 ; END OF INTERRUPT TO CONTROL PORT
            OUT     020H,AL                ; ALLOW FURTHER KEYSTROKE INTS

;----- DURING PAUSE INTERVAL, TURN CRT BACK ON

CMP     CRT_MODE,7             ; IS THIS BLACK AND WHITE CARD
            JE      K40                    ; YES, NOTHING TO DO
            MOV     DX,03D8H               ; PORT FOR COLOR CARD
            MOV     AL,CRT_MODE_SET        ; GET THE VALUE OF THE CURRENT MODE
            OUT     DX,AL                  ; SET THE CRT MODE, SO THAT CRT IS ON
K40:                                       ; PAUSE-LOOP
            TEST    KB_FLAG_1,HOLD_STATE
            JNZ     K40                    ; LOOP UNTIL FLAG TURNED OFF
            JMP     K27                    ; INTERRUPT_RETURN_NO_EOI
K41:                                       ; NO-PAUSE
;----- TEST SPECIAL CASE KEY 55

CMP     AL,55
            JNE     K42                    ; NOT-KEY-55
            MOV     AX,114*256             ; START/STOP PRINTING SWITCH
            JMP     K57                    ; BUFFER_FILL
```

;----- SET UP TO TRANSLATE CONTROL SHIFT

```
K42:                                    ; NOT-KEY-55
        MOV     BX,OFFSET K8            ; SET UP TO TRANSLATE CTL
        CMP     AL,59                   ; IS IT IN TABLE
                                        ; CTL-TABLE-TRANSLATE
        JB      K56                     ; YES, GO TRANSLATE CHAR
K43:                                    ; CTL-TABLE-TRANSLATE
        MOV     BX,OFFSET K9            ; CTL TABLE SCAN
        JMP     K63                     ; TRANSLATE_SCAN
```

;----- NOT IN CONTROL SHIFT

```
K44:                                    ; NOT-CTL-SHIFT
        CMP     AL,71                   ; TEST FOR KEYPAD REGION
        JAE     K48                     ; HANDLE KEYPAD REGION
        TEST    KB_FLAG,LEFT_SHIFT+RIGHT_SHIFT
        JZ      K54                     ; TEST FOR SHIFT STATE
```

;----- UPPER CASE, HANDLE SPECIAL CASES

```
        CMP     AL,15                   ; BACK TAB KEY
        JNE     K45                     ; NOT-BACK-TAB
        MOV     AX,15*256               ; SET PSEUDO SCAN CODE
        JMP     SHORT K57               ; BUFFER_FILL
K45:                                    ; NOT-BACK-TAB
        CMP     AL,55                   ; PRINT SCREEN KEY
        JNE     K46                     ; NOT-PRINT-SCREEN
```

;----- ISSUE INTERRUPT TO INDICATE PRINT SCREEN FUNCTION

```
        MOV     AL,EOI                  ; END OF CURRENT INTERRUPT
        OUT     020H,AL                 ;  SO FURTHER THINGS CAN HAPPEN
        INT     5H                      ; ISSUE PRINT SCREEN INTERRUPT
        JMP     K27                     ; GO BACK WITHOUT EOI OCCURRING
K46:                                    ; NOT-PRINT-SCREEN
        JB      K47                     ; NOT-UPPER-FUNCTION
        MOV     BX,OFFSET K12           ; UPPER CASE PSEUDO SCAN CODES
        JMP     K63                     ; TRANSLATE SCAN
K47:                                    ; NOT-UPPER-FUNCTION
        MOV     BX,OFFSET K11           ; POINT TO UPPER CASE TABLE
        JMP     SHORT K56               ; OK, TRANSLATE THE CHAR
```

;----- KEYPAD KEYS, MUST TEST NUM LOCK FOR DETERMINATION

```
K48:                                    ; KEYPAD-REGION
        TEST    KB_FLAG,NUM_STATE       ; ARE WE IN NUM_LOCK
        JNZ     K52                     ; TEST FOR SURE
        TEST    KB_FLAG,LEFT_SHIFT+RIGHT_SHIFT  ; ARE WE IN SHIFT STATE
        JNZ     K53                     ; IF SHIFTED, REALLY NUM STATE
```

```
;----- BASE CASE FOR KEYPAD
    K49:                                    ; BASE-CASE
            CMP     AL,74                   ; SPECIAL CASE FOR A COUPLE OF KEYS
            JE      K50                     ; MINUS
            CMP     AL,78
            JE      K51
            SUB     AL,71                   ; CONVERT ORIGIN
            MOV     BX,OFFSET K15           ; BASE CASE TABLE
            JMP     SHORT K64               ; CONVERT TO PSEUDO SCAN
    K50:
            MOV     AX,74*256+'-'           ; MINUS
            JMP     SHORT K57               ; BUFFER_FILL
    K51:
            MOV     AX,78*256+'+'           ; PLUS
            JMP     SHORT K57               ; BUFFER_FILL

;----- MIGHT BE NUM LOCK, TEST SHIFT STATUS
    K52:                                    ; ALMOST-NUM_STATE
            TEST    KB_FLAG,LEFT_SHIFT+RIGHT_SHIFT
            JNZ     K49                     ; SHIFTED TEMP OUT OF NUM STATE
    K53:                                    ; REALLY_NUM_STATE
            SUB     AL,70                   ; CONVERT ORIGIN
            MOV     BX,OFFSET K14           ; NUM STATE TABLE
            JMP     SHORT K56               ; TRANSLATE_CHAR

;----- PLAIN OLD LOWER CASE
    K54:                                    ; NOT-SHIFT
            CMP     AL,59                   ; TEST FOR FUNCTION KEYS
            JB      K55                     ; NOT-LOWER-FUNCTION
            MOV     AL,0                    ; SCAN CODE IN AH ALREADY
            JMP     SHORT K57               ; BUFFER_FILL
    K55:                                    ; NOT-LOWER-FUNCTION
            MOV     BX,OFFSET K10           ; LC TABLE

;----- TRANSLATE THE CHARACTER

K56:                                    ; TRANSLATE-CHAR
            DEC     AL                      ; CONVERT ORIGIN
            XLAT    CS:K11                  ; CONVERT THE SCAN CODE TO ASCII

;----- PUT CHARACTER INTO BUFFER
    K57:                                    ; BUFFER FILL
            CMP     AL,-1                   ; IS THIS AN IGNORE CHAR
            JE      K59                     ; YES, DO NOTHING WITH IT
            CMP     AH,-1                   ; LOOK FOR -1 PSEUDO SCAN
            JE      K59                     ; NEAR_INTERRUPT_RETURN

;----- HANDLE THE CAPS LOCK PROBLEM
```

```
K58:                                        ; BUFFER-FILL-NOTEST
        TEST    KB_FLAG,CAPS_STATE          ; ARE WE IN CAPS LOCK STATE
        JZ      K61                         ; SKIP IF NOT

;----- IN CAPS LOCK STATE

TEST    KB_FLAG,LEFT_SHIFT+RIGHT_SHIFT  ; TEST FOR SHIFT STATE
        JZ      K60                         ; IF NOT SHIFT, CONVERT LOWER TO UPPER

;----- CONVERT ANY UPPER CASE TO LOWER CASE

CMP     AL,'A'                      ; FIND OUT IF ALPHABETIC
        JB      K61                         ; NOT_CAPS_STATE
        CMP     AL,'Z'
        JA      K61                         ; NOT_CAPS_STATE
        ADD     AL,'a'-'A'                  ; CONVERT TO LOWER CASE
        JMP     SHORT K61                   ; NOT_CAPS_STATE
K59:                                        ; NEAR-INTERRUPT-RETURN
        JMP     K26                         ; INTERRUPT_RETURN

;----- CONVERT ANY LOWER CASE TO UPPER CASE

K60:                                        ; LOWER-TO-UPPER
        CMP     AL,'a'                      ; FIND OUT IF ALPHABETIC
        JB      K61                         ; NOT_CAPS_STATE
        CMP     AL,'z'
        JA      K61                         ; NOT_CAPS_STATE
        SUB     AL,'a'-'A'                  ; CONVERT TO UPPER CASE
K61:                                        ; NOT-CAPS-STATE
        MOV     BX,BUFFER_TAIL              ; GET THE END POINTER TO THE BUFFER
        MOV     SI,BX                       ; SAVE THE VALUE
        CALL    K4                          ; ADVANCE THE TAIL
        CMP     BX,BUFFER_HEAD              ; HAS THE BUFFER WRAPPED AROUND
        JE      K62                         ; BUFFER_FULL_BEEP
        MOV     [SI],AX                     ; STORE THE VALUE
        MOV     AL,BYTE2        ;x12/11     ; GET SECOND SCANCODE BYTE (LO-TIME)
        MOV     AH,BYTE3        ;x12/11     ; GET THIRD SCANCODE BYTE (HI-TIME)
        MOV     [SI+2],AX       ;x12/11     ; PUT THEM INTO KEYBOARD BUFFER
        MOV     BUFFER_TAIL,BX              ; MOVE THE POINTER UP
        JMP     K26                         ; INTERRUPT_RETURN

;----- BUFFER IS FULL, SOUND THE BEEPER

K62:                                        ; BUFFER-FULL-BEEP
        MOV     AL,EOI                      ; END OF INTERRUPT COMMAND
        OUT     20H,AL                      ; SEND COMMAND TO INT CONTROL PORT
        MOV     BX,080H                     ; NUMBER OF CYCLES FOR 1/12 SECOND TONE
        IN      AL,KB_CTL                   ; GET CONTROL INFORMATION
        PUSH    AX                          ; SAVE
```

;----- TRANSLATE SCAN FOR PSEUDO SCAN CODES

```
K63:                                    ; TRANSLATE-SCAN
        SUB     AL,59                   ; CONVERT ORIGIN TO FUNCTION KEYS
K64:                                    ; TRANSLATE-SCAN-ORGD
        XLAT    CS:K9                   ; CTL TABLE SCAN
        MOV     AH,AL                   ; PUT VALUE INTO AH
        MOV     AL,0                    ; ZERO ASCII CODE
        JMP     K57                     ; PUT IT INTO THE BUFFER

KB_INT  ENDP

K65:                                    ; BEEP-CYCLE
        AND     AL,0FCH                 ; TURN OFF TIMER GATE AND SPEAKER DATA
        MOV     CX,48H                  ; HALF C   E TIME FOR TONE
K66:
        LOOP    K66                     ; SPEAKER OFF
        OR      AL,2                    ; TURN ON SPEAKER BIT
        OUT     KB_CTL,AL               ; OUTPUT TO CONTROL
        MOV     CX,48H                  ; SET UP COUNT
K67:
        LOOP    K67                     ; ANOTHER HALF CYCLE
        DEC     BX                      ; TOTAL TIME COUNT
        JNZ     K65                     ; DO ANOTHER CYCLE
        POP     AX                      ; RECOVER CONTROL
        OUT     KB_CTL,AL               ; OUTPUT THE CONTROL
        JMP     K27

ORG     0FF3EH      ;xxxxxx ; MAKE BIOS *identical*
DDS     PROC    NEAR
        PUSH    AX                      ; SAVE AX
        MOV     AX,DATA
        MOV     DS,AX                   ; SET DATA SEGMENT
        POP     AX                      ; RESTORE AX
        RET
DDS     ENDP
```

; STORAGE FOR ROM INTERRUPT VECTORS 9H AND 16H

```
ROM_VECTOR_16   DD                      ;xx12/9 ; KEYBOARD I/O VECTOR ADDRESS
ROM_VECTOR_9    DD                      ;xx12/9 ; KEYBOARD INT VECTOR ADDRESS
```

; PASCAL DEFINITION OF VECTOR CHANGING ROUTINE:
;
;       PROCEDURE LOAD_VS;
;           EXTERNAL;

```
LOAD_VS PROC    FAR

PUBLIC  LOAD_VS

ASSUME  CS:CODE,DS:DATA         ;xx12/3 ; ALLOW DS TO REFERENCE DATA

PUSH    BP                      ;xx12/9 ; SAVE PASCAL BP
        PUSH    AX                      ;xx12/8   AVE PASCAL AX
        PUSH    SI                      ;xx12/8 ; SAVE PASCAL SI
        PUSH    DS                      ;xx12/8 ; SAVE PASCAL DS

DEC     BYTE PTR [BP+6]         ;xx12/9 ; INT VECTORS STORE/RESTORE PAR
        JNZ     RESTORE_VEC             ;xx12/9 ; IF WAS 0, RESTORE INT VECTORS

; ARGUMENT = 1, SO INTIALIZE KEYBOARD BUFFER AND LOAD INTERRUPT VECTORS

MOV     AX,DATA                 ;xx12/3 ; PUT THE DATA SEGMENT
        MOV     DS,AX                   ;xx12/3 ;   INTO DS

;xx12/3 ; SEE PG. A-17 OF TECH-REF
        MOV     SI,OFFSET KB_BUFFER     ;xx12/3 ; SETUP NEW KEYBOARD PARAMS.
        MOV     BUFFER_HEAD,SI          ;xx12/3 ; INITIALIZE BUFFER_HEAD
        MOV     BUFFER_TAIL,SI          ;xx12/3 ; INTIIALIZE BUFFER_TAIL
        MOV     BUFFER_START,SI         ;xx12/3 ; INITIALIZE BUFFER_START
        ADD     SI,64                   ;xx12/3 ; ALLOW FOR 16 4-BYTE QUANTIES.
        MOV     BUFFER_END,SI           ;xx12/3 ; INTIIALIZE BUFFER_END

ASSUME  DS:KEYBOARD_VECTORS

MOV     AX,KEYBOARD_VECTORS             ; PUT THE KEYBOARD_VECTORS
        MOV     DS,AX                           ; SEGMENT INTO DS
; FIRST SAVE THE CURRENT KEYBOARD INTERRUPT VECTORS

MOV     AX,VECTOR_9             ;xx12/9 ; SAVE ADDRESS OF ROM
        MOV     ROM_VECTOR_9,AX         ;xx12/9 ;   KEYBOARD I/O VECTOR
        MOV     AX,VECTOR_9[2]          ;xx12/9 ;
        MOV     ROM_VECTOR_9[2],AX      ;xx12/9 ;

MOV     AX,VECTOR_16            ;xx12/9 ; SAVE ADDRESS OF ROM
        MOV     ROM_VECTOR_16,AX        ;xx12/9 ;   KEYBOARD INTERRUPT VECTOR
        MOV     AX,VECTOR_16[2]         ;xx12/9 ;
        MOV     ROM_VECTOR_16[2],AX     ;xx12/9 ;

; NOW RESET THESE VECTORS TO POINT TO OUR KEYBOARD ROUTINES

MOV     AX,OFFSET KB_INT                ; RESET THE INT 9 VECTOR TO
        MOV     VECTOR_9,AX                     ;   POINT TO KB_INT; FIRST
        MOV     VECTOR_9[2],CS                  ;   OFFSET, THEN SEGMENT
```

```
        MOV     TOR_16,AX               ; POINT TO KEYBOARD_IO; FIRST
        MOV     VECTOR_16[2],CS         ; OFFSET, THEN SEGMENT
        JMP     SHORT FINISH_UP         ;xx12/9 ; JUMP AROUND VECTOR RESTORE

; ARGUMENT = 0, SO RESTORE KEYBOARD VECTORS WITH ORIGINAL ROM ADDRESSES

RESTORE_VEC:                            ;xx12/9 ; RESTORE ORIGINAL KEYBD INTS

MOV     AX,KEYBOARD_VECTORS     ;xx12/9 ; PUT THE KEYBOARD_VECTORS
        MOV     DS,AX                   ;xx12/9 ;   SEGMENT INTO DS

MOV     AX,ROM_VECTOR_9         ;xx12/9 ; RESTORE ADDRESS OF ROM
        MOV     VECTOR_9,AX             ;xx12/9 ;   KEYBOARD I/O VECTOR
        MOV     AX,ROM_VECTOR_9[2]      ;xx12/9 ;
        MOV     VECTOR_9[2],AX          ;xx12/9 ;

MOV     AX,ROM_VECTOR_16        ;xx12/9 ; RESTORE ADDRESS OF ROM
        MOV     VECTOR_16,AX            ;xx12/9 ;   KEYBOARD INTERRUPT VECTOR
        MOV     AX,ROM_VECTOR_16[2]     ;xx12/9 ;
        MOV     VECTOR_16[2],AX         ;xx12/9 ;

FINISH_UP:
        POP     DS                      ;xx12/8 ; RESTORE PASCAL DS
        POP     SI                      ;xx12/8 ; RESTORE PASCAL SI
        POP     AX                      ;xx12/8 ; RESTORE PASCAL AX
        POP     BP                      ;xx12/9 ; RESTORE PASCAL BP

RET                             ;xx12/8 ; RETURN TO PASCAL

CODE    ENDS
```

COPYRIGHT 1986, QUIXOTE CORPORATION (UNPUBLISHED)

APPENDIX C

```
00000  5A 9A 01 5C 00 87 00 40 00 00 00 FF FF 00 00 00 00 E6 88 00 00 00 00 1E
00018  00 00 00 01 00 16 00 00 00 4D 00 00 00 72 00 00 00 7E 00 00 00 8A 00 00
00030  00 96 00 00 00 A2 00 00 00 AE 00 00 00 B1 00 00 00 07 01 00 00 33 01 00
00048  00 AF 02 00 00 B6 02 00 00 22 03 00 00 2E 04 00 00 A8 04 00 00 BE 04 00
00060  00 C6 04 00 00 D4 05 00 00 E4 04 00 00 0A 05 00 00 39 05 00 00 3E 05 00
00078  00 69 05 00 00 6E 05 00 00 7F 05 00 00 89 05 00 00 90 05 00 00 98 05 00
00090  00 B5 05 00 00 BA 05 00 00 BF 05 00 00 D4 05 00 00 01 06 00 00 51 06 00
000A8  00 75 06 00 00 D6 06 00 00 F7 06 00 00 3F 07 00 00 6A 07 00 00 85 07 00
000C0  00 AD 07 00 00 B5 07 00 00 04 08 00 00 24 08 00 00 44 08 00 00 DC 08 00
000D8  00 F9 08 00 00 34 09 00 00 4B 09 00 00 53 09 00 00 B6 09 00 00 D1 09 00
000F0  00 0D 0A 00 00 14 0A 00 00 5E 0A 00 00 A4 0A 00 00 E1 0A 00 00 E8 0A 00
00108  00 0D 0C 00 00 34 0C 00 00 79 0C 00 00 9F 0C 00 00 AB 0C 00 00 74 0D 00
00120  00 35 0E 00 00 5D 0E 00 00 6E 0E 00 00 BF 0E 00 00 C8 0E 00 00 D1 0E 00
00138  00 DA 0E 00 00 E3 0E 00 00 EC 0E 00 00 77 0F 00 00 8B 0F 00 00 DF 0F 00
00150  00 E4 0F 00 00 93 10 00 00 0C 11 00 00 11 11 00 00 1E 11 00 00 A2 11 00
00168  00 B5 11 00 00 00 12 00 00 12 12 00 00 1D 12 00 00 23 12 00 00 54 12 00
00180  00 66 12 00 00 71 12 00 00 77 12 00 00 A4 12 00 00 BF 12 00 00 E4 12 00
00198  00 FF 12 00 00 26 13 00 00 32 13 00 00 49 13 00 00 5E 13 00 00 F4 13 00
001B0  00 08 14 00 00 15 14 00 00 1A 14 00 00 39 14 00 00 67 14 00 00 E6 14 00
001C8  00 FC 14 00 00 C5 15 00 00 12 16 00 00 3A 16 00 00 52 16 00 00 6D 16 00
001E0  00 94 16 00 00 C8 16 00 00 D2 16 00 00 E9 16 00 00 16 17 00 00 20 17 00
001F8  00 7E 17 00 00 95 17 00 00 B8 17 00 00 C3 17 00 00 CE 17 00 00 AC 18 00
```

```
00210  00 B8 19 00 00 CA 19 00 00 F1 19 00 00 05 1A 00 00 43 1A 00 00 A5 97 BE
00228  01 E6 1A 00 00 F9 1A 00 00 2C 1B 00 00 67 1B 00 00 00 00 00 00 00 00 00
.......ALL ZEROS
003F0  00 00 00 00 00 00 00 00 00 00 00 00 00 00 B8 00 00 8E D8 A1 58 00 50
00408  A1 5A 00 50 A1 24 00 50 A1 26 00 50 B8 BE 01 8E D8 58 A3 BC 4D 58 A3 BA
00420  4D 58 A3 B4 4D 58 A3 B2 4D C7 06 D0 4F 00 00 C6 06 D0 4D 00 C6 06 E4 4D
00438  00 C6 06 E5 4D 00 C6 06 E6 4D 00 C7 06 E8 4D 00 00 9A 70 0B 00 00 A2 D4
00450  54 F6 06 D4 54 01 75 09 C7 06 D2 4F 00 B8 EB 07 90 C7 06 D2 4F 00 B0 C7
00468  06 CC 4F D4 4F C7 06 CE 4F BE 01 C7 06 B6 4D D1 00 C7 06 B8 4D 00 00 C7
00480  06 BE 4D 4F 01 C7 06 C0 4D 00 00 C7 06 C2 4D 00 00 C7 06 C4 4D BE 01 C7
00498  06 CA 4D B2 0D C7 06 CC 4D BE 01 C7 06 C6 4D B2 4D C7 06 C8 4D BE 01 B8
004B0  BE 01 50 B8 B2 4D 50 B8 40 00 8E D8 C6 06 84 00 00 58 A3 F8 00 58 A3 FA
004C8  00 BA C0 0B B4 31 CD 21 FB 1E 53 51 06 E8 DB 03 E8 E8 03 80 3E 84 00 00
004E0  75 03 E8 E6 03 0A E4 74 11 FE CC 74 0A FE CC 74 03 EB 56 90 EB 50 90 EB
004F8  32 90 E8 B6 03 FB 90 FA B8 00 00 9A 70 08 00 00 8B 1E 1C 00 8B 1E 1A 00
00510  3B 1E 1C 00 74 E4 8B 07 43 43 3B 1E 82 00 75 04 8B 1E 80 00 89 1E 1A 00
00528  EB 1F 90 FA B8 01 00 9A 70 08 00 00 8B 1E 1A 00 3B 1E 1C 00 8B 07 FB 07
00540  59 5B 1F CA 02 00 A0 17 00 07 59 5B 1F CF FB 50 53 51 52 56 57 1E 06 FC
00558  E8 58 03 E8 65 03 80 3E 84 00 00 75 03 E8 63 03 E4 60 50 E4 61 8A E0 0C
00570  80 E6 61 86 E0 E6 61 58 8A E0 E8 46 03 26 8A 0E 05 00 0A C9 75 0E 26 88
00588  26 00 00 26 C6 06 05 00 01 E9 E9 00 26 8A 0E 05 00 FE C9 75 0E 26 88 26
005A0  01 00 26 C6 06 05 00 02 E9 D2 00 26 88 26 02 00 26 C6 06 05 00 00 26 A0
005B8  00 00 26 8A 26 00 00 90 90 90 3C FF 75 03 E9 8B 02 24 7F 50 B8 00 F0 8E
005D0  C0 58 BF 7E E8 B9 08 00 F2 AE 8A C4 74 03 E9 85 00 81 EF 7F E8 26 8A A5
005E8  86 E8 A8 80 75 51 80 FC 10 73 07 08 26 17 00 E9 83 00 F6 06 17 00 04 75
00600  65 3C 52 75 22 F6 06 17 00 08 75 5A F6 06 17 00 20 75 0D F6 06 17 00 03
00618  74 0D B8 30 52 E9 C0 01 F6 06 17 00 03 74 F3 84 26 18 00 75 50 08 26 18
00630  00 30 26 17 00 3C 52 75 44 B8 00 52 E9 A1 01 80 FC 10 73 1A F6 D4 20 26
00648  17 00 3C B8 75 2F A0 19 00 B4 00 88 26 19 00 3C 00 74 22 E9 8B 01 F6 D4
00660  20 26 18 00 EB 17 3C 80 78 03 E9 0C 02 F6 06 18 00 08 74 17 3C 45 74 05
00678  80 26 18 00 F7 FA B0 20 E6 20 07 1F 5F 5E 5A 59 5B 58 CF F6 06 17 00 08
00690  75 03 EB 7F 90 F6 06 17 00 04 74 20 3C 53 75 0B C7 06 72 00 34 12 EA 5B
006A8  E0 00 F0 9A 00 16 00 00 75 CB 9A F0 0B 00 00 E8 F9 01 EB C6 3C 39 75 05
006C0  B0 20 E9 1B 01 BF 87 EA B9 0A 00 F2 AE 75 12 81 EF 88 EA A0 19 00 B4 0A
006D8  F6 E4 03 C7 A2 19 00 EB 9C C6 06 19 00 00 B9 1A 00 F2 AE 75 05 B0 00 E9
006F0  EE 00 3C 02 72 0C 3C 0E 73 08 80 C4 76 B0 00 E9 DE 00 3C 3B 73 03 E9 74
00708  FF 3C 47 73 F9 BB 5F E9 E9 37 01 F6 06 17 00 04 74 51 3C 46 75 11 9A 30
00720  0C 00 00 C6 06 71 00 80 CD 1B 2B C0 E9 4E FF 3C 45 75 21 80 0E 18 00 08
00738  B0 20 E6 20 80 3E 49 00 07 74 07 BA D8 03 A0 65 00 EE F6 06 18 00 08 75
00750  F9 E9 2E FF 3C 37 75 06 B8 00 72 E9 82 00 BB 8E E8 3C 3B 72 77 BB C8 E8
00768  E9 DF 00 3C 47 73 2C F6 06 17 00 03 74 5B 3C 0F 75 05 B8 00 0F EB 61 3C
00780  37 75 09 B0 20 E6 20 CD 05 E9 F6 FE 3C 3B 72 06 BB 55 E9 E9 B4 00 BB 1B
00798  E9 EB 41 F6 06 17 00 20 75 21 F6 06 17 00 03 75 21 3C 4A 74 0C 3C 4E 74
007B0  0D 2C 47 BB 76 E9 E9 93 00 B8 2D 4A EB 22 B8 2B 4E EB 1D F6 06 17 00 03
007C8  75 DF 2C 46 BB 69 E9 EB 0B 3C 3B 72 04 B0 00 EB 07 BB E1 E8 FE C8 26 D7
007E0  3C FF 74 1F 80 FC FF 74 1A F6 06 17 00 40 74 20 F6 06 17 00 03 74 0F 3C
007F8  41 72 15 3C 5A 77 11 04 20 EB 0D E9 77 FE 3C 61 72 06 3C 7A 77 02 2C 20
00810  06 E8 AF 00 26 83 3E E6 54 08 79 2A 26 80 3E 28 55 01 74 22 26 C6 06 F4
00828  54 09 9A 70 08 00 00 26 C6 06 F4 54 10 26 A0 01 00 26 8A 26 02 00 26 A3
00840  F2 54 07 E9 37 FE 07 EB 0B 90 2C 3B 26 D7 8A E0 B0 00 EB 8C B0 20 E6 20
00858  BB 80 00 E4 61 50 24 FC E6 61 B9 48 00 E2 FE 0C 02 E6 61 B9 48 00 E2 FE
00870  4B 75 EB 58 E6 61 E9 09 FE F6 06 46 00 24 26 83 3E E6 54 00 74 2A 26 80 3E
00888  28 55 01 74 22 51 26 8A 0E 01 00 26 8A 2E 02 00 26 89 0E 02 55 59 26 C6
008A0  06 F4 54 09 9A 70 08 00 00 26 C6 06 F4 54 10 07 E9 CA FD 50 B8 40 00 8E
008B8  D8 58 C3 50 B8 BE 01 8E D8 58 C3 50 B8 BE 01 8E C0 58 C3 C6 06 84 00 01
008D0  9A 30 0C 00 00 C3 00 00 00 00 00 00 00 00 1E 53 51 B9 BE 01 8E D9 8A
008E8  CC 80 E9 80 79 2E 3C 41 7C 0F 3C 5A 7E 10 3C 61 7C 07 3C 7A 7F 03 EB 06
00900  90 C6 06 01 55 01 9A 20 08 00 00 FF 06 E6 54 3B 06 08 55 74 10 A3 08 55
00918  59 5B 1F CB C7 06 08 55 00 00 EB 06 90 C6 06 07 55 01 A2 06 55 FF 0E E6
00930  54 78 0C 75 0D 9A 00 08 00 00 9A 40 08 00 00 E9 96 00 80 3E E6 4D 01 75
00948  08 C6 06 05 55 00 EB 4C 90 F6 06 07 55 01 75 F1 E8 9B 00 F6 06 00 55 01
00960  75 E7 E8 C2 00 9A 70 06 00 00 9A F0 06 00 00 F6 06 D7 54 01 75 0D C6 06
00978  05 55 01 9A 90 0B 00 00 EB 1A 90 33 C0 9A 40 08 00 00 8B C3 9A 40 08 00
00990  00 A1 14 55 9A 40 08 00 00 EB 3D 90 8B 0E E6 54 41 C7 06 E6 54 00 00 80
009A8  3E 05 55 01 75 08 B8 AE 00 9A 40 08 00 00 9A 00 08 00 00 9A 40 08 00 00
009C0  FF 06 E6 54 E2 F0 80 3E 05 55 01 75 0B B8 AF 00 9A 40 08 00 00 EB 01 90
009D8  C7 06 E6 54 00 00 C6 06 00 55 00 C6 06 01 55 00 C6 06 05 55 00 C6 06 07
```

| | | | | | | | | | | | | |
|---|---|---|---|---|---|---|---|---|---|---|---|---|
| 009F0 | 55 00 | 59 5B | 1F CB | F6 06 | 01 55 | 01 75 | 1F 9A | 00 08 | 00 00 | 3A 06 | 06 55 | 74 13 |
| 00A08 | 8B 1E | F2 54 | 03 1E | EA 4D | 3B 1E | 02 55 | 78 05 | C6 06 | 00 55 | 01 C3 | C6 06 | 00 55 |
| 00A20 | 01 C6 | 06 01 | 55 00 | C3 51 | 55 8B | 0E E6 | 54 51 | B9 0A | 00 49 | 2B 0E | E6 54 | BD 00 |
| 00A38 | 00 3E | C6 86 | D8 54 | 20 45 | E2 F7 | 8B 0E | E6 54 | 41 C7 | 06 E6 | 54 00 | 00 9A | 00 08 |
| 00A50 | 00 00 | 3E 88 | 86 D8 | 54 45 | FF 06 | E6 54 | E2 EF | 59 89 | 0E E6 | 54 5D | 59 C3 | 00 00 |
| 00A68 | 00 00 | 00 00 | 00 00 | 1E 50 | 51 55 | B8 BE | 01 8E | D8 B9 | 0A 00 | BD 00 | 00 3E | 80 |
| 00A80 | BE D8 | 54 60 | 7C 06 | 3E 80 | AE D8 | 54 20 | 45 E2 | EF B4 | 00 B9 | 0A 00 | 49 BD | 00 00 |
| 00A98 | 3E 8A | 86 D8 | 54 3E | 3A 86 | D9 54 | 7E 0C | 3E 86 | 86 D9 | 54 3E | 88 86 | D8 54 | B4 01 |
| 00AB0 | 45 E2 | E5 80 | FC 00 | 75 D7 | 5D 59 | 58 1F | CB 53 | BD 00 | 00 B9 | 05 00 | B3 18 | B7 00 |
| 00AC8 | 3E 8A | A6 D8 | 54 3E | 8A 86 | D9 54 | 9A D9 | 0A 00 | 00 45 | 45 FE | C3 E2 | EB 5B | EB D8 |
| 00AE0 | 00 00 | 00 00 | 00 00 | 00 00 | 00 00 | 00 00 | 00 00 | 50 06 | 57 1E | 56 51 | B8 BE | 01 |
| 00AF8 | 8E D8 | 83 3E | CE 4D | 00 75 | 0E C7 | 06 D5 | 54 00 | 00 C6 | 06 D7 | 54 00 | E9 93 | 00 C7 |
| 00B10 | 06 10 | 55 00 | 00 A1 | CE 4D | A3 12 | 55 FF | 0E 12 | 55 C6 | 06 D7 | 54 01 | A1 12 | 55 2B |
| 00B28 | 06 10 | 55 74 | 33 3D | 01 00 | 74 49 | D1 E8 | 03 06 | 10 55 | A3 D5 | 54 9A | AA 07 | 00 00 |
| 00B40 | 74 53 | 7F 0E | 8B 0E | D5 54 | 89 0E | 10 55 | FF 06 | 10 55 | EB CD | 8B 0E | D5 54 | 89 0E |
| 00B58 | 12 55 | FF 0E | 12 55 | EB BF | A1 10 | 55 A3 | D5 54 | 9A AA | 07 00 | 00 74 | 28 C6 | 06 D7 |
| 00B70 | 54 00 | 7C 2E | FF 06 | D5 54 | EB 28 | 90 A1 | 10 55 | A3 D5 | 54 9A | AA 07 | 00 00 | 74 0D |
| 00B88 | C6 06 | D7 54 | 00 7F | 13 FF | 06 10 | 55 EB | 8A 8B | 1E D5 | 54 56 | 5F 1E | 07 47 | 47 E8 |
| 00BA0 | 29 00 | 59 5E | 1F 5F | 07 58 | CB 1E | 06 B9 | BE 01 | 8E D9 | BE 06 | 00 B9 | BE 01 | 8E C1 |
| 00BB8 | BF D8 | 54 B9 | 0E 00 | F7 E1 | 03 F0 | FC B9 | 0A 00 | F3 A6 | 07 1F | CB 1E | B8 40 | 00 8E |
| 00BD0 | D8 26 | 8B 05 | F6 06 | 17 00 | 40 75 | 0D F6 | 06 17 | 00 03 | 74 10 | 0D 02 | 00 EB | 0B 90 |
| 00BE8 | F6 06 | 17 00 | 03 75 | 03 0D | 04 00 | 26 A3 | 14 55 | 33 C0 | 1F C3 | 00 00 | 00 00 | 00 1E |
| 00C00 | 55 51 | B9 BE | 01 8E | D9 59 | B8 02 | 00 F7 | 26 E6 | 54 8B | E8 3E | 8B 86 | 7C 4F | 5D 1F |
| 00C18 | CB 00 | 00 00 | 00 00 | 00 1E | 55 51 | B9 BE | 01 8E | D9 59 | 50 B8 | 02 00 | F7 26 | E6 54 |
| 00C30 | 8B E8 | 58 3E | 89 86 | 7C 4F | 5D 1F | CB 00 | 00 00 | 00 1E | 55 51 | B9 BE | 01 8E | D9 59 |
| 00C48 | 8B 2E | E2 54 | 3E 89 | 86 EC | 4D 83 | C5 02 | 81 FD | 90 01 | 75 03 | BD 00 | 00 89 | 2E E2 |
| 00C60 | 54 5D | 1F CB | 00 00 | 00 00 | 00 00 | 00 00 | 00 00 | 1E 06 | 53 51 | 56 E8 | C9 00 | E8 |
| 00C78 | D6 00 | 26 80 | 3E 28 | 55 01 | 74 0B | 26 80 | 3E F4 | 54 09 | 75 53 | EB 21 | 90 26 | A1 20 |
| 00C90 | 55 26 | 8B 0E | 24 55 | 26 89 | 0E 02 | 55 26 | 8B 0E | 26 55 | 26 89 | 0E F2 | 54 26 | 8B 0E |
| 00CA8 | 22 55 | EB 06 | 90 26 | 8B 0E | E6 54 | 50 80 | FC 80 | 78 09 | 41 41 | 41 E8 | 9A 00 | EB 0F |
| 00CC0 | 90 26 | 3B 06 | 08 55 | 75 07 | 41 41 | 41 41 | E8 89 | 00 58 | 26 80 | 3E 28 | 55 01 | 74 05 |
| 00CD8 | 9A E0 | 04 00 | 00 8B | 1E 1C | 00 8B | F3 43 | 43 3B | 1E 82 | 00 75 | 04 8B | 1E 80 | 00 3B |
| 00CF0 | 1E 1A | 00 74 | 45 9A | B0 09 | 00 00 | 74 3E | 89 04 | 89 1E | 1C 00 | 9C 55 | E8 41 | 00 F6 |
| 00D08 | 06 F0 | 54 01 | 74 27 | 80 FC | 80 79 | 22 80 | 3E F1 | 54 01 | 74 1B | 8B 2E | E2 4D | 3E 89 |
| 00D20 | 86 B2 | 0D FF | 06 E2 | 4D FF | 06 E2 | 4D C6 | 06 72 | 97 01 | 9A 60 | 1B 00 | 00 5D | 9D E8 |
| 00D38 | 06 00 | 5E 59 | 5B 07 | 1F CB | 50 B8 | 40 00 | 8E D8 | 58 C3 | 50 B8 | BE 01 | 8E D8 | 58 C3 |
| 00D50 | 50 B8 | BE 01 | 8E C0 | 58 C3 | 53 26 | 8B 1E | E2 54 | 83 C3 | 04 81 | FB 90 | 01 75 | 03 BB |
| 00D68 | 00 00 | 26 3B | 1E E4 | 54 74 | 05 E2 | EB EB | 29 90 | 26 C6 | 06 28 | 55 01 | 26 A3 | 20 55 |
| 00D80 | 26 8B | 0E E6 | 54 26 | 89 0E | 22 55 | 26 8B | 0E 02 | 55 26 | 89 0E | 24 55 | 26 8B | 0E F2 |
| 00D98 | 54 26 | 89 0E | 26 55 | 5B C3 | 00 00 | 00 00 | 00 00 | 00 00 | 00 00 | 00 00 | 00 00 | 00 1E |
| 00DB0 | 56 55 | 53 51 | B9 BE | 01 8E | D9 F6 | 06 30 | 55 01 | 74 03 | EB 71 | 90 8B | 1E E4 | 54 3B |
| 00DC8 | 1E E2 | 54 74 | 35 9A | A0 0A | 00 00 | 3D 00 | 00 74 | 31 3D | 1B 01 | 75 26 | 83 3E | 80 6A |
| 00DE0 | 01 78 | 1F A1 | 80 6A | D1 E0 | D1 E0 | BE 82 | 6A 03 | F0 8B | 1C 46 | 46 8B | 04 A3 | EC 54 |
| 00DF8 | FF 0E | 80 6A | B8 00 | 00 EB | 29 90 | 59 5B | 5D 5E | 1F CB | 50 9A | A0 0A | 00 00 | 8B D8 |
| 00E10 | 9A A0 | 0A 00 | 00 A3 | EC 54 | 58 B8 | 0E 00 | F7 E3 | 05 0A | 00 8B | E8 3E | 8B 9E | 06 00 |
| 00E28 | 33 C0 | C6 06 | 30 55 | 01 89 | 1E EA | 54 8B | 2E EA | 54 3E | 8A 86 | B2 0D | FF 06 | EA 54 |
| 00E40 | F7 06 | EC 54 | 01 00 | 74 0A | 45 3E | 8A A6 | B2 0D | FF 06 | EA 54 | 3C FF | 74 0C | 3C 9D |
| 00E58 | 75 1D | 9A C0 | 15 00 | 00 E9 | 57 FF | 83 3E | 80 6A | 00 75 | 06 C7 | 06 EC | 54 00 | 00 C6 |
| 00E70 | 06 30 | 55 00 | E9 42 | FF 9C | F7 06 | EC 54 | 02 00 | 75 0B | F7 06 | EC 54 | 04 00 | 75 03 |
| 00E88 | EB 11 | 90 81 | 26 EC | 54 FD | FF 3C | 61 78 | 06 3C | 7B 79 | 02 2C | 20 9D | E9 63 | FF 1E |
| 00EA0 | 55 51 | B9 BE | 01 8E | D9 59 | 8B 2E | E4 54 | 3B 2E | E2 54 | 74 18 | 3E 8B | 86 EC | 4D 83 |
| 00EB8 | C5 02 | 81 FD | 90 01 | 75 03 | BD 00 | 00 89 | 2E E4 | 54 5D | 1F CB | 33 C0 | 5D 1F | CB 00 |
| 00ED0 | 00 00 | 00 00 | B0 00 | B8 00 | 06 1E | 55 57 | 53 51 | 50 B8 | 00 00 | 8E D8 | 9A 70 | 0B 00 |
| 00EE8 | 00 A2 | D8 0A | F6 06 | D8 0A | 01 75 | 06 A1 | D6 0A | EB 04 | 90 A1 | D4 0A | 50 07 | FE CB |
| 00F00 | B8 0C | 00 F6 | E3 8B | F8 58 | 88 26 | D0 0A | 88 26 | D1 0A | A2 D2 | 0A A2 | D3 0A | B9 04 |
| 00F18 | 00 D2 | 0E D0 | 0A B9 | 04 00 | D2 0E | D2 0A | BD 00 | 00 B9 | 04 00 | 33 C0 | 3E 8A | 86 D0 |
| 00F30 | 0A 24 | 0F EB | 13 90 | 47 47 | 45 E2 | EF FE | CF 75 | 26 B4 | 01 CD | 16 74 | FA EB | 1E 90 |
| 00F48 | 3C 0A | 7C 02 | 04 07 | 04 30 | F6 06 | D8 0A | 01 75 | 07 26 | 88 85 | 00 00 | EB D8 | 26 88 |
| 00F60 | 85 00 | 00 EB | D1 59 | 5B 5F | 5D 1F | 07 CB | 00 00 | 00 55 | 1E CD | 11 2A | E4 24 | 30 3C |
| 00F78 | 30 74 | 06 B8 | 00 EB | 04 90 | B8 01 | 00 1F | 5D CB | 00 00 | 00 00 | 00 00 | 00 00 | 00 55 |
| 00F90 | 1E 50 | 51 B0 | B6 E6 | 43 B8 | 97 0A | E6 42 | 8A C4 | E6 42 | E4 61 | 0C 43 | E6 61 | E8 31 |
| 00FA8 | 00 B0 | B6 E6 | 43 B8 | F1 07 | E6 42 | 8A C4 | E6 42 | E4 61 | 0C 43 | E6 61 | E8 1B | 00 B0 |
| 00FC0 | B6 E6 | 43 B8 | B0 06 | E6 42 | 8A C4 | E6 42 | E4 61 | 0C 43 | E6 61 | E8 05 | 00 59 | 58 1F |
| 00FD8 | 5D CB | B9 FF | 2F E2 | FE E4 | 61 24 | FC E6 | 61 C3 | 00 00 | 00 00 | 00 00 | 00 00 | 00 FA |
| 00FF0 | 50 53 | 51 55 | BB 3C | 00 E4 | 61 50 | 24 FD | E6 61 | B9 19 | 00 E2 | FE 0C | 02 E6 | 61 50 |
| 01008 | 53 9A | 70 0B | 00 00 | 5B 58 | B9 19 | 00 E2 | FE 4B | 75 E2 | 58 E6 | 61 5D | 59 5B | 58 FB |
| 01020 | CB 00 | 00 00 | 00 00 | 00 00 | 00 00 | 00 00 | 00 00 | 00 00 | 00 56 | 1E 06 | BE BE | 01 8E DE C6 |

| | | | | | | | | | | | | | | | | |
|---|---|---|---|---|---|---|---|---|---|---|---|---|---|---|---|---|
| 01038 | 06 | 05 | 00 | 00 | C7 | 06 | E6 | 54 | 00 | 00 | C7 | 06 | E4 | 54 | 00 | 00 | C7 | 06 | E2 | 54 | 00 | 00 | BE | 40 |
| 01050 | 00 | 8E | DE | BE | 1E | 00 | 89 | 36 | 1A | 00 | 89 | 36 | 1C | 00 | 89 | 36 | 80 | 00 | 83 | C6 | 20 | 89 | 36 | 82 |
| 01068 | 00 | 07 | 1F | 5E | CB | 00 | 00 | 50 | 53 | 51 | 1E | 06 | 55 | 9A | F0 | 0B | 00 | 00 | E8 | B5 | 01 | C7 | 06 | E8 |
| 01080 | 4D | 14 | 00 | FC | C4 | 3E | CC | 4F | C5 | 36 | D0 | 4F | 81 | C6 | 20 | 03 | B9 | 80 | 02 | F3 | A5 | E8 | 9A | 01 |
| 01098 | BD | 30 | 6A | 9A | E0 | 14 | 00 | 00 | E8 | 8F | 01 | 56 | BE | A5 | 69 | 9A | 60 | 14 | 00 | 00 | 5E | C4 | 3E | D0 |
| 010B0 | 4F | 81 | C7 | 80 | 03 | BE | D0 | 4D | 46 | B9 | 0E | 00 | A4 | 47 | E2 | FC | E8 | 6F | 01 | C4 | 3E | D0 | 4F | 81 |
| 010C8 | C7 | C2 | 03 | C5 | 36 | C2 | 4D | BB | 00 | 00 | A1 | D5 | 54 | 05 | 06 | 00 | 39 | 06 | CE | 4D | 79 | 0E | A1 | CE |
| 010E0 | 4D | 2D | 06 | 00 | 79 | 03 | B8 | 00 | 00 | A3 | D5 | 54 | 8B | 36 | C2 | 4D | A1 | D5 | 54 | B9 | 0E | 00 | F7 | E1 |
| 010F8 | 03 | F0 | FC | B9 | 0A | 00 | A4 | 26 | C6 | 05 | 70 | 47 | E2 | F8 | B9 | 02 | 00 | E8 | 2E | 01 | 8B | 2C | 46 | 46 |
| 01110 | 8B | 0C | 89 | 0E | 42 | 55 | BE | B2 | 0D | 03 | F5 | F7 | 06 | 42 | 55 | 01 | 00 | 75 | 05 | B4 | 6F | EB | 03 | 90 |
| 01128 | B4 | 6A | B9 | 50 | 00 | 83 | E9 | 04 | 83 | E9 | 0A | 80 | 3C | FF | 75 | 06 | E8 | FF | 00 | EB | 15 | 90 | A4 | 26 |
| 01140 | 88 | 25 | 47 | 45 | F7 | 06 | 42 | 55 | 01 | 00 | 74 | 01 | 46 | E2 | E4 | EB | 01 | 90 | 83 | C7 | 04 | FF | 06 | D5 |
| 01158 | 54 | 43 | 83 | FB | 06 | 74 | 2C | A1 | CE | 4D | 3B | 06 | D5 | 54 | 74 | 14 | 78 | 02 | EB | 80 | 56 | BE | 49 | 69 |
| 01170 | 9A | 60 | 14 | 00 | 00 | 5E | 81 | C7 | 40 | 01 | 43 | 43 | B9 | 4E | 00 | E8 | B8 | 00 | 83 | C7 | 04 | 43 | 83 | FB |
| 01188 | 06 | 75 | F1 | E8 | 9C | 00 | B0 | 20 | E6 | 20 | E8 | 9D | 00 | 80 | 3E | 40 | 55 | 00 | 74 | 07 | FE | 0E | 40 | 55 |
| 011A0 | EB | 57 | 90 | 80 | 3E | 41 | 55 | 00 | 74 | 07 | FE | 0E | 41 | 55 | EB | 32 | 90 | B4 | 01 | CD | 16 | 74 | DB | B4 |
| 011B8 | 00 | CD | 16 | 3C | 1B | 74 | 52 | 3D | 33 | 51 | 74 | 11 | 3D | 00 | 51 | 74 | 19 | 3D | 39 | 49 | 74 | 1C | 3D | 00 |
| 011D0 | 49 | 74 | 26 | EB | BD | C6 | 06 | 41 | 55 | 04 | 83 | 2E | D5 | 54 | 05 | E9 | BE | FE | 83 | 2E | D5 | 54 | 05 | E9 |
| 011E8 | B6 | FE | C6 | 06 | 40 | 55 | 04 | 83 | 2E | D5 | 54 | 07 | 78 | 0D | E9 | A7 | FE | 83 | 2E | D5 | 54 | 07 | 78 | 03 |
| 01200 | E9 | 9D | FE | C6 | 06 | 40 | 55 | 00 | C7 | 06 | D5 | 54 | 00 | 00 | E9 | 8F | FE | FC | C4 | 3E | D0 | 4F | 81 | C7 |
| 01218 | 20 | 03 | C5 | 36 | CC | 4F | B9 | 80 | 02 | F3 | A5 | 5D | 07 | 1F | 59 | 5B | 58 | CB | 50 | B8 | 40 | 00 | 8E | D8 |
| 01230 | 58 | C3 | 50 | B8 | BE | 01 | 8E | D8 | 58 | C3 | 26 | C6 | 05 | 20 | 47 | 26 | C6 | 05 | 6F | 47 | E2 | F4 | C3 | 00 |
| 01248 | 00 | 00 | 00 | 00 | 00 | 00 | 50 | 53 | 51 | 52 | 1E | 06 | 55 | E8 | 59 | 03 | 9A | F0 | 0B | 00 | 00 | 8A | 0E |
| 01260 | E6 | 4D | 88 | 0E | 3A | 67 | C6 | 06 | E6 | 4D | 01 | FC | B9 | BE | 01 | 8E | C1 | BF | 50 | 55 | C5 | 36 | D0 | 4F |
| 01278 | B9 | 00 | 08 | F3 | A5 | E8 | 3A | 03 | B0 | 20 | E6 | 20 | B4 | 03 | B7 | 00 | CD | 10 | E8 | 25 | 03 | 89 | 16 | 30 |
| 01290 | 67 | 89 | 16 | 32 | 67 | 89 | 0E | 34 | 67 | B9 | 1E | 00 | 89 | 0E | E8 | 4D | C4 | 3E | D0 | 4F | 47 | B9 | 00 | 08 |
| 012A8 | 26 | C6 | 05 | 07 | 47 | 47 | E2 | F8 | E8 | 6D | 03 | C6 | 06 | 39 | 67 | 01 | BD | 36 | 6A | 9A | E0 | 14 | 00 | 00 |
| 012C0 | 56 | BE | 59 | 68 | 9A | 60 | 14 | 00 | 00 | 5E | EB | 22 | 90 | 9A | F0 | 0B | 00 | 00 | 56 | BE | AA | 68 | 9A | 60 |
| 012D8 | 14 | 00 | 00 | 5E | EB | 10 | 90 | 9A | F0 | 0B | 00 | 00 | 56 | BE | FA | 68 | 9A | 60 | 14 | 00 | 00 | 5E | C4 | 3E |
| 012F0 | D0 | 4F | 81 | C7 | A2 | 00 | B9 | 0A | 00 | 26 | C6 | 05 | 20 | 47 | 26 | C6 | 05 | 70 | 47 | E2 | F4 | E8 | AA | 02 |
| 01308 | B4 | 02 | BA | 01 | 01 | B7 | 00 | CD | 10 | C6 | 06 | 38 | 67 | 00 | C6 | 06 | 37 | 67 | 00 | B4 | 01 | CD | 16 | 74 |
| 01320 | FA | B4 | 00 | CD | 16 | 80 | FC | 1C | 74 | 64 | 3C | 1B | 74 | 3E | 3C | 08 | 74 | 48 | 3D | 00 | 4B | 75 | 06 | B8 |
| 01338 | 08 | 0E | EB | 3E | 90 | 3D | 00 | 4D | 74 | 17 | 3D | 20 | 39 | 74 | 12 | 3C | 41 | 78 | D0 | 3C | 5B | 78 | 0A | 3C |
| 01350 | 61 | 78 | C8 | 3C | 7B | 78 | 02 | EB | C2 | FE | 06 | 37 | 67 | 80 | 3E | 37 | 67 | 0B | 74 | 0B | B4 | 0E | B7 | 00 |
| 01368 | CD | 10 | EB | AF | E9 | A3 | 01 | FE | 0E | 37 | 67 | 9A | F0 | 0B | 00 | 00 | EB | A1 | FE | 0E | 37 | 67 | 78 | 02 |
| 01380 | EB | E2 | C6 | 06 | 37 | 67 | 00 | 9A | F0 | 0B | 00 | 00 | EB | 8D | B9 | 0A | 00 | BD | 00 | 00 | C6 | 06 | 37 | 67 |
| 01398 | 00 | C4 | 3E | D0 | 4F | 81 | C7 | A2 | 00 | 26 | 8A | 05 | 3C | 41 | 7C | 2F | 3C | 5A | 7E | 08 | 3C | 61 | 7C | 27 |
| 013B0 | 3C | 7A | 7F | 23 | FE | 06 | 37 | 67 | E8 | 07 | 02 | 3E | 88 | 86 | D8 | 54 | 3C | 20 | 74 | 04 | FE | 06 | 38 | 67 |
| 013C8 | 45 | 47 | 47 | E2 | D4 | 80 | 3E | 38 | 67 | 02 | 79 | 07 | E9 | 08 | FF | B0 | 20 | EB | D9 | 9A | 70 | 06 | 00 | 00 |
| 013E0 | 9A | F0 | 06 | 00 | 00 | 80 | 3E | D7 | 54 | 01 | 75 | 03 | E9 | DE | FE | E8 | 16 | 03 | B8 | 21 | 00 | A3 | E8 | 4D |
| 013F8 | B4 | 01 | CD | 16 | 74 | FA | B4 | 00 | CD | 16 | 80 | FC | 2E | 75 | 12 | C6 | 06 | F0 | 54 | 01 | B9 | 20 | 00 | 89 |
| 01410 | 0E | E8 | 4D | E8 | 9C | 01 | E9 | 76 | 01 | 3C | 1B | 75 | 03 | E9 | F2 | 00 | 80 | FC | 14 | 75 | D3 | E8 | BA | 01 |
| 01428 | B4 | 02 | B7 | 00 | 8B | 16 | 30 | 67 | CD | 10 | A1 | 30 | 67 | D1 | E0 | 33 | DB | 8A | D8 | 8A | C4 | 32 | E4 | B9 |
| 01440 | 50 | 00 | F7 | E1 | FE | C3 | 03 | C3 | 8B | E8 | C6 | 06 | 36 | 67 | 00 | B8 | 1F | 00 | A3 | E8 | 4D | E8 | 36 | 02 |
| 01458 | B4 | 01 | CD | 16 | 74 | FA | B4 | 00 | CD | 16 | 80 | FC | 2E | 74 | 2F | 3D | 00 | 4B | 74 | 42 | 3D | 00 | 4D | 74 |
| 01470 | 68 | 3D | 00 | 48 | 75 | 03 | E9 | B3 | 00 | 3D | 00 | 50 | 75 | 03 | E9 | C0 | 00 | 3C | 0D | 75 | 03 | E9 | 80 | 00 |
| 01488 | 3C | 1B | 75 | 03 | E9 | 83 | 00 | 9A | F0 | 0B | 00 | 00 | EB | C2 | 80 | 36 | 36 | 67 | 01 | 80 | 3E | 39 | 67 | 01 |
| 014A0 | 75 | 06 | E8 | 5E | 01 | EB | 04 | 90 | E8 | AC | 01 | E9 | B9 | 00 | 4D | 4D | 80 | 3E | 30 | 67 | 00 | 74 | 07 | FF |
| 014B8 | 0E | 30 | 67 | E9 | 95 | 00 | 80 | 3E | 31 | 67 | 00 | 75 | 05 | 45 | 45 | E9 | 89 | 00 | C6 | 06 | 30 | 67 | 4F | FE |
| 014D0 | 0E | 31 | 67 | E8 | B8 | 01 | EB | 7B | 90 | 45 | 45 | FF | 06 | 30 | 67 | 80 | 3E | 30 | 67 | 50 | 74 | 03 | EB | 6B |
| 014E8 | 90 | 80 | 3E | 31 | 67 | 18 | 75 | 09 | FF | 0E | 30 | 67 | 4D | 4D | EB | 5B | 90 | C6 | 06 | 30 | 67 | 00 | FE | 06 |
| 01500 | 31 | 67 | E8 | 89 | 01 | EB | 4C | 90 | 9A | 30 | 13 | 00 | 00 | 9A | F0 | 13 | 00 | 00 | EB | 70 | 90 | C4 | 3E | D0 |
| 01518 | 4F | BE | 50 | 65 | B9 | BE | 01 | 8E | D9 | B9 | F0 | 00 | F3 | A5 | E8 | 89 | 00 | E9 | 2C | FF | 80 | 3E | 31 | 67 |
| 01530 | 00 | 74 | 20 | FE | 0E | 31 | 67 | 81 | ED | A0 | 00 | E8 | 50 | 01 | EB | 13 | 90 | 80 | 3E | 31 | 67 | 18 | 74 | 0B |
| 01548 | FE | 06 | 31 | 67 | 81 | C5 | A0 | 00 | E8 | 3B | 01 | B4 | 02 | 8B | 16 | 30 | 67 | B7 | 00 | CD | 10 | F6 | 06 | 36 |
| 01560 | 67 | 01 | 75 | 03 | E9 | F1 | FE | C4 | 3E | D0 | 4F | 03 | FD | 80 | 3E | 39 | 67 | 01 | 75 | 09 | 81 | FD | DF | 01 |
| 01578 | 79 | 03 | E9 | DB | FE | 26 | 80 | 35 | 77 | E9 | D4 | FE | E8 | 2B | 00 | 8A | 0E | 3A | 67 | 88 | 0E | E6 | 4D | B4 |
| 01590 | 02 | B7 | 00 | 8B | 16 | 32 | 67 | CD | 10 | C4 | 3E | D0 | 4F | BE | 50 | 55 | B9 | BE | 01 | 8E | D9 | B9 | 00 | 08 |
| 015A8 | F3 | A5 | 5D | 07 | 1F | 5A | 59 | 5B | 58 | CB | 50 | B8 | BE | 01 | 8E | D8 | 58 | C3 | 50 | B8 | 40 | 00 | 8E | D8 |
| 015C0 | 58 | C3 | 55 | 51 | BD | 00 | 00 | 8A | 0E | 37 | 67 | 32 | ED | EB | 09 | 90 | 3E | 3A | 86 | D8 | 54 | 74 | 06 | 45 |
| 015D8 | E2 | F6 | 59 | 5D | C3 | B0 | 20 | 59 | 5D | C3 | C4 | 3E | D0 | 4F | 81 | C7 | A2 | 00 | BE | D8 | 54 | B9 | 0A | 00 |
| 015F0 | A4 | 26 | C6 | 05 | 70 | 47 | E2 | F8 | 56 | BE | 42 | 67 | 9A | 60 | 14 | 00 | 00 | 5E | C3 | F6 | 06 | 36 | 67 | 01 |
| 01608 | 75 | 0B | 56 | BE | 96 | 67 | 9A | 60 | 14 | 00 | 00 | 5E | C3 | 56 | BE | 84 | 67 | 9A | 60 | 14 | 00 | 00 | 5E | C3 |
| 01620 | FC | B9 | BE | 01 | 8E | C1 | BF | 50 | 65 | C5 | 36 | D0 | 4F | B9 | F0 | 00 | F3 | A5 | E8 | 7D | FF | C3 | C4 | 3E |
| 01638 | D0 | 4F | 81 | C7 | 62 | 0E | BE | D8 | 54 | B9 | 0A | 00 | A4 | 26 | C6 | 05 | 70 | 47 | E2 | F8 | 56 | BE | A8 | 67 |
| 01650 | 9A | 60 | 14 | 00 | 00 | 5E | C3 | F6 | 06 | 36 | 67 | 01 | 75 | 0B | 56 | BE | FC | 67 | 9A | 60 | 14 | 00 | 00 | 5E |
| 01668 | C3 | 56 | BE | EA | 67 | 9A | 60 | 14 | 00 | 00 | 5E | C3 | FC | B9 | BE | 01 | 8E | C1 | BF | 50 | 65 | C5 | 36 | D0 |

```
01680  4F 81 C6 C0 0D B9 F0 00 F3 A5 E8 25 FF C3 81 FD E0 01 79 36 80 3E 39 67
01698  01 75 6C C4 3E D0 4F BE 50 65 B9 BE 01 8E D9 B9 F0 00 F3 A5 E8 03 FF C6
016B0  06 39 67 02 55 E8 BC FF BD 3C 6A 9A E0 14 00 00 E8 73 FF E8 91 FF 5D EB
016C8  3E 90 81 FD C0 0D 78 37 80 3E 39 67 02 75 30 C4 3E D0 4F 81 C7 C0 0D BE
016E0  50 65 B9 BE 01 8E D9 B9 F0 00 F3 A5 E8 C3 FE C6 06 39 67 01 55 E8 28 FF
016F8  BD 36 6A 9A E0 14 00 00 E8 DF FE E8 FD FE 5D C3 C4 3E D0 4F 81 C7 A2 00
01710  BE D8 54 B9 0A 00 A4 26 C6 05 70 47 E2 F8 56 BE 0E 68 9A 60 14 00 00 5E
01728  C3 00 00 00 00 00 00 1E B8 BE 01 8E D8 83 3E CE 4D 00 75 09 C7 06 D5 54
01740  00 00 E9 93 00 9A F0 06 00 00 83 2E D5 54 04 79 06 C7 06 D5 54 00 00 A1
01758  D5 54 9A AA 07 00 00 79 0F FF 06 D5 54 A1 D5 54 3B 06 CE 4D 74 6A EB E7
01770  A1 CE 4D 2B 06 D5 54 74 5F B9 0E 00 D1 E9 F7 E1 40 50 A1 CE 4D B9 0E 00
01788  F7 E1 8B F0 05 0E 00 C4 3E C2 4D 03 F7 03 F8 59 FD F3 A5 46 46 8B FE BE
017A0  D8 54 B9 0A 00 FC F3 A4 80 3E F0 54 01 75 11 A1 EE 54 26 89 05 47 47 B8
017B8  01 00 26 89 05 EB 0E 00 A1 E2 4D 26 89 05 47 47 33 C0 26 89 05 FF 06 CE
017D0  4D C6 06 E5 4D 01 1F CB A1 CE 4D B9 0E 00 F7 E1 C4 3E C2 4D 03 F8 EB B7
017E8  00 00 00 00 00 00 00 1E 57 56 B8 BE 01 8E D8 C4 3E D0 4F 80 3E 39 67 01
01800  74 04 81 C7 C0 0D B9 BE 01 8E D9 BE 50 65 B9 F0 00 F3 A5 B8 BE 01 8E D8
01818  B9 BE 01 8E C1 BF B2 0D 03 3E E2 4D C5 36 D0 4F B9 00 08 E8 16 00 26 C6
01830  05 FF 47 81 EF B2 0D B8 BE 01 8E D8 89 3E E2 4D 5E 5F 1F CB 8B 04 46 46
01848  3C 00 75 02 B0 20 80 FC 70 75 04 26 88 05 47 E2 EB C3 00 00 00 00 00 50
01860  51 1E 06 57 56 B8 BE 01 8E D8 8A 0C 88 0E 2D 6A 46 8A 0C 46 8A 24 88 26
01878  2E 6A 46 80 3C 2A 75 05 46 46 EB 1A 90 32 ED B8 A0 00 F6 24 46 51 8A 0C
01890  D0 E1 32 ED 03 C1 59 46 C4 3E D0 4F 03 F8 8A 26 2E 6A FC 80 3C FF 75 0D
018A8  E8 1D 00 46 FE 0E 2D 6A 75 BF EB 0D 90 A4 26 88 25 47 FE C9 79 E4 41 EB
018C0  E1 5E 5F 07 1F 59 58 CB 83 F9 01 78 0B 26 C6 05 20 47 26 88 25 47 E2 F5
018D8  C3 00 00 00 00 00 00 1E 55 50 51 52 B8 BE 01 8E D8 B0 06 32 E4 3E F6 66
018F0  00 45 BE 48 6A 03 F0 BF 42 6A B9 BE 01 8E C1 B9 06 00 F3 A4 3E 8B 56 00
01908  45 45 FE CE FE CA B8 A0 00 F6 E6 32 F6 D0 E2 03 C2 C4 3E D0 4F 03 F8 3E
01920  8A 66 00 45 3E 8B 56 00 A0 42 6A 26 89 05 57 A0 47 6A 33 C9 8A CE E8 6A
01938  00 A0 44 6A 26 89 05 59 57 8B F9 47 47 A0 46 6A 33 C9 8A CA E8 4C 00 A0
01950  43 6A 26 89 05 A0 47 6A 33 C9 8A CE E8 44 00 A0 45 6A 26 89 05 5F 47 47
01968  A0 46 6A 33 C9 8A CA E8 29 00 BE 61 6A 80 FA 16 79 13 80 FA 0B 79 03 EB
01980  14 90 83 EF 16 B1 0B E8 27 00 EB 09 90 83 EF 2C B1 16 E8 1C 00 5A 59 58
01998  5D 1F CB 26 89 05 47 47 E2 F9 C3 81 C7 A0 00 26 89 05 E2 F7 81 C7 A0 00
019B0  C3 A4 26 88 25 47 E2 F9 C3 00 00 00 00 00 00 1E 57 55 51 BF BE 01 8E DF
019C8  C6 06 30 55 00 FF 06 80 6A 8B 2E 80 6A B9 02 00 D3 E5 BF 82 6A 03 FD 8B
019E0  2E EA 54 89 2D 47 47 8B 2E EC 54 89 2D 59 5D 5F 1F CB 00 00 00 00 00 00
019F8  00 00 00 00 00 00 50 51 1E 55 B9 40 00 8E D9 8B 0E 1A 00 3B 0E 1C 00
01A10  B9 BE 01 8E D9 C6 06 FA 6A 00 74 03 E9 08 01 F6 06 30 55 01 74 03 E9 FE
01A28  00 3D 23 23 75 13 BD 00 00 E8 16 01 74 23 9A 70 17 00 00 BD 00 00 E9 F0
01A40  00 3D 26 26 75 16 BD 02 00 E8 FE 00 74 0B 9A 70 0C 00 00 BD 02 00 E9 D8
01A58  00 E9 CB 00 3D 2E 2E 75 27 BD 04 00 E8 E3 00 74 F0 9A 50 0E 00 00 80 3E
01A70  F0 54 01 75 0D A1 E2 4D A3 EE 54 C6 06 FA 6A 01 EB D7 BD 04 00 E9 A9 00
01A88  3D 31 31 75 10 B8 9D EE 9A 40 08 00 00 C6 06 FA 6A 02 E9 8A 00 3D 01 01
01AA0  75 37 80 3E F0 54 01 75 7E A1 EE 54 A3 E2 4D A0 3A 67 A2 E6 4D C6 06 F0
01AB8  54 00 C6 06 FA 6A 02 C6 06 72 97 03 9A 60 1B 00 00 C6 06 72 97 03 9A E0
01AD0  1A 00 00 BD 04 00 EB 5E 90 3D 1F 1F 75 49 80 3E F0 54 01 75 42 9A 30 13
01AE8  00 00 C6 06 F0 54 00 C6 06 FA 6A 02 A0 3A 67 A2 E6 4D 8B 2E E2 4D 3E C7
01B00  86 B2 0D FF FF FF 06 E2 4D FF 06 E2 4D C6 06 72 97 02 9A 60 1B 00 00 C6
01B18  06 72 97 02 9A E0 1A 00 00 BD 04 00 EB 10 90 80 3E FA 6A 01 5D 1F 59 58
01B30  CB C6 06 FA 6A 01 3E 8B 8E E2 6A 89 0E E0 6A 3E 8B 8E F4 6A 89 0E E8 4D
01B48  EB DD 8B 0E E0 6A 3E 85 8E E8 6A 74 17 3E 89 8E E2 6A 3E 8B 8E EE 6A 89
01B60  0E E0 6A 8B 0E E8 4D 3E 89 8E F4 6A C3 00 00 50 55 1E 52 B8 40 00 8E D8
01B78  B0 20 E6 20 BA BE 01 8E DA C6 06 F1 54 01 8B 2E E8 4D D1 E5 3E 8B B6 1A
01B90  87 9A B0 17 00 00 C6 06 F1 54 00 5A 1F 5D 58 CB 00 00 00 00 00 00 00 00
01BA8  00 00 00 00 00 00 50 53 51 1E 06 57 56 B8 BE 01 8E D8 89 36 80 87 9A
01BC0  B0 19 00 00 8B 36 80 87 8B EE 9A E0 14 00 00 8B 36 80 87 46 B8 A0 00 8B
01BD8  0C F6 E5 32 ED 03 C1 03 C1 C4 3E D0 4F 03 F8 89 3E 76 87 89 3E 78 87 46
01BF0  46 46 8A 24 88 26 7B 87 46 8A 24 88 26 7C 87 46 8A 24 88 26 7A 87 46 89
01C08  36 7E 87 8B 3E 76 87 89 3E 78 87 8A 3E 7C 87 C6 06 7D 87 00 FA E8 95 00
01C20  FB 80 3E 82 87 00 74 07 FE 0E 82 87 EB 4A 90 80 3E 83 87 00 74 07 FE 0E
01C38  83 87 EB 42 90 B4 01 CD 16 74 DE B4 00 CD 16 3D 33 51 74 1A 3D 39 49 74
01C50  36 3D 00 49 74 28 3D 00 51 74 1D 3D 00 47 74 3D 3C 1B 74 40 EB BB 33 C9
01C68  8A 0E 7C 87 49 49 88 0E 82 87 8B 36 72 87 EB 93 8B 36 72 87 EB 8D 8B 36
01C80  70 87 EB ED 00 EB 84 8B 36 7E 87 33 C9 8A 0E 7C 87 49 49 88 0E 83 87 E8
01C98  D8 00 E9 6E FF 8B 36 7E 87 E9 67 FF 8B 36 80 87 9A 3B 1A 00 00 5E 5F 07
01CB0  1F 59 5B 58 CB 89 36 70 87 89 36 72 87 89 36 74 87 E8 61 00 FE CF 74 57
01CC8  F6 06 7D 87 01 75 37 89 36 72 87 89 36 74 87 81 06 78 87 A0 00 8B 3E 78
```

```
01CE0  87 E8 41 00 FE CF 74 37 F6 06 7D 87 01 75 17 89 36 74 87 81 06 78 87 A0
01CF8  00 8B 3E 78 87 E8 25 00 FE CF 74 1B EB E2 33 C9 8A 0E 7B 87 81 06 78 87
01D10  A0 00 8B 3E 78 87 E8 4A 00 FE CF 74 02 EB E7 C6 06 7D 87 00 C3 B0 20 8A
01D28  26 7A 87 33 C9 8A 0E 7B 87 FC 80 3C FF 74 23 80 3C FD 74 19 A4 26 88 25
01D40  47 E2 EF 80 3C 20 74 10 4E 80 3C 20 74 0A 4F 4F 26 89 05 EB F3 E8 0B 00
01D58  46 C3 C6 06 7D 87 01 E8 01 00 C3 8A 26 7A 87 B0 20 FC 26 89 05 47 47 E2
01D70  F9 C3 50 51 4E 80 3C 20 75 01 4E 8B C6 33 C9 8A 0E 7B 87 2B C1 8B F0 3B
01D88  36 7E 87 79 07 8B 36 7E 87 EB 0A 90 80 3C 20 74 03 46 EB F8 46 59 58 C3
01DA0  00 00 00 00 00 00 00 00 00 00 00 00 00 00 50 51 1E 06 57 56 55 B8 BE
01DB8  01 8E D8 83 3E 5A 97 14 78 03 EB 57 90 E8 D4 00 B9 BE 01 8E C1 8B 3E 5E
01DD0  97 57 03 3E 62 97 3B 3E 60 97 5F 79 4E 8B 2E 5A 97 D1 E5 3E 89 BE 32 97
01DE8  C5 36 D0 4F 03 F0 1E B9 BE 01 8E D9 89 36 5C 97 FC 33 C9 8A 0E 65 97 1F
01E00  1E F3 A5 B8 BE 01 8E D8 FE 0E 64 97 74 0C 81 06 5C 97 A0 00 8B 36 5C 97
01E18  EB DE 58 FF 06 5A 97 89 3E 5E 97 5D 5E 5F 07 1F 59 58 CB 8B 2E 5A 97 D1
01E30  E5 3E C7 86 32 97 FE FF EB E1 50 51 1E 06 57 56 55 B8 BE 01 8E D8 E8 53
01E48  00 C4 3E D0 4F 03 F8 89 3E 5C 97 FF 0E 5A 97 83 3E 5A 97 14 78 03 EB 34
01E60  90 8B 2E 5A 97 D1 E5 3E 8B B6 32 97 81 FE FE FF 75 03 EB 20 90 89 36 5E
01E78  97 FC 33 C9 8A 0E 65 97 F3 A5 FE 0E 64 97 74 0C 81 06 5C 97 A0 00 8B 3E
01E90  5C 97 EB E5 5D 5E 5F 07 1F 59 58 CB 46 8B 0C B8 A0 00 FE CD FE C9 F6 E5
01EA8  32 ED 03 C1 03 C1 46 46 46 8B 0C FE C5 FE C5 FE C1 FE C1 88 2E 64 97 88
01EC0  0E 65 97 50 33 C0 8A C1 F6 E5 D1 E0 A3 62 97 58 C3 00 00 00 00 00 00 00
01ED8  00 00 00 00 00 00 51 1E 57 06 56 B9 BE 01 8E D9 C4 3E A3 97 B9 18 00
01EF0  FC C5 36 D0 4F F3 A5 B9 BE 01 8E D9 56 80 3E 72 97 01 75 06 BE DA 69 EB
01F08  1F 90 80 3E 72 97 02 75 06 BE F7 69 EB 12 90 80 3E 72 97 03 75 06 BE 10
01F20  6A EB 05 90 5E EB 16 90 9A 60 14 00 00 5E 8B 0E 70 97 80 3E 72 97 01 74
01F38  02 D1 E1 E2 FE C6 06 72 97 01 B9 18 00 FC C4 3E D0 4F C5 36 A3 97 F3 A5
01F50  5E 07 5F 1F 59 CB 00 00 00 00 00 00 00 00 1E 06 51 53 57 56 B9 BE 01
01F68  8E D9 8E C1 80 3E 72 97 01 75 43 80 3E B1 97 01 74 29 BF B2 97 C5 36 D0
01F80  4F 46 B9 04 00 FC A4 4E C6 04 70 46 46 E2 F7 B9 04 00 FC A4 4E C6 04 07
01F98  46 46 E2 F7 06 1F C6 06 B1 97 01 C4 3E D0 4F 47 B9 08 00 26 80 35 77 47
01FB0  47 E2 F8 EB 1D 90 80 3E B1 97 01 75 15 BE B2 97 C4 3E D0 4F 47 B9 08 00
01FC8  FC A4 47 E2 FC C6 06 B1 97 00 5E 5F 5B 59 07 1F CB 00 00 00 00 00 00 00
01FE0  00 00 00 00 00 20 20 20 20 20 20 20 20 20 20 20 20 20 20 20 20 20 20 20
.......ALL 20'S
06D80  20 20 20 20 20 20 20 20 20 20 20 20 20 20 20 20 00 00 00 00 00 00 00
.......ALL ZERO'S
06DC8  00 4B 00 00 00 00 00 00 00 00 00 00 00 00 00 00 00 00 00 00 00 00 00
.......ALL ZERO'S
08718  00 00 00 00 00 00 00 00 00 03 2E 5F 01 0B 20 3C 43 3E 3D 48 69 67 68 4C
08730  69 67 68 74 20 4F 6E 2F 4F 66 66 20 20 20 20 20 20 20 20 20 FF 0A 2F 2A 0A
08748  20 52 65 74 3D 53 61 76 65 3B FF 0C 1F 2A 0A 20 45 73 63 3D 43 61 6E 63
08760  65 6C FF 01 0C 5F 01 21 20 20 4E 6F 77 20 4F 6E 3B 20 20 20 FF 01 0C 5F
08778  01 21 20 20 4E 6F 77 20 4F 66 66 3B 20 20 FF 03 2E 5F 17 0B 20 3C 43 3E
08790  3D 48 69 67 68 4C 69 67 68 74 20 4F 6E 2F 4F 66 66 20 20 20 20 20 20 20
087A8  20 FF 0A 2F 2A 0A 20 52 65 74 3D 53 61 76 65 3B FF 0C 1F 2A 0A 20 45 73
087C0  63 3D 43 61 6E 63 65 6C FF 01 0C 5F 17 21 20 20 4E 6F 77 20 4F 6E 3B 20
087D8  20 20 FF 01 0C 5F 17 21 20 20 4E 6F 77 20 4F 66 66 3B 20 20 FF 02 38 5F
087F0  01 0B 20 3C 54 3E 3D 20 43 72 65 61 74 65 20 54 65 78 74 20 4D 61 63 72
08808  6F 3B 20 20 20 3C 43 3E 3D 20 43 72 65 61 74 65 20 43 6F 6D 6D 61 6E 64
08820  20 4D 61 63 72 6F 3B FF 0C 1F 2A 0A 20 45 73 63 3D 43 61 6E 63 65 6C FF
08838  03 0F 5F 01 0B 20 54 79 70 65 20 49 6E 20 43 68 6F 72 64 3B FF 29 2F 2A
08850  0B 20 3C 52 65 74 75 72 6E 3E 20 3D 20 43 6F 6E 74 69 6E 75 65 20 57 69
08868  74 68 20 44 65 66 69 6E 69 74 69 6F 6E 3B 20 20 FF 0C 1F 2A 0A 20 45 73
08880  63 3D 43 61 6E 63 65 6C FF 03 27 4F 01 0B 20 43 68 6F 72 64 20 41 6C 72
08898  65 61 64 79 20 45 78 69 73 74 73 2C 20 50 6C 65 61 73 65 20 52 65 2D 45
088B0  6E 74 65 72 3B FF 0D 2F 2A 0A 20 52 65 74 20 3D 20 43 6F 6E 74 3B FF 10
088C8  1F 2A 0A 20 45 73 63 20 3D 20 43 61 6E 63 65 6C FF 03 27 4F 01 0B 20 4E
088E0  6F 6E 20 4C 65 74 74 65 72 20 49 6E 20 43 68 6F 72 64 2C 20 50 6C 65 61
088F8  73 65 20 52 65 2D 45 6E 74 65 72 3B FF 0D 2F 2A 0A 20 52 65 74 20 3D 20
08910  43 6F 6E 74 3B FF 10 1F 2A 0A 20 45 73 63 20 3D 20 43 61 6E 63 65 6C FF
08928  03 4E 6F 06 01 20 20 20 20 20 20 20 20 20 20 20 20 20 FF 4E 6F 07 01
08940  20 20 20 20 20 20 20 20 20 20 20 20 20 FF 4E 6F 08 01 20 20 20 20
08958  20 20 20 20 20 20 20 20 20 20 20 20 20 20 20 20 20 20 20 20 20 20
08970  44 69 63 74 69 6F 6E 61 72 79 20 69 73 20 65 6D 70 74 79 FF 02 15 3E 05
08988  04 20 43 68 6F 72 64 3B 20 20 44 65 66 69 6E 69 74 69 6F 6E 3B FF 17 3E
089A0  05 19 43 75 72 72 65 6E 74 20 44 69 63 74 69 6F 6E 61 72 79 20 49 73 20
089B8  FF 01 17 4F 00 00 52 65 63 6F 72 64 69 6E 67 20 43 6F 6D 6D 61 6E 64 20
089D0  4D 61 63 72 6F FF 01 17 2F 00 00 43 6F 6D 6D 61 6E 64 20 4D 61 63 72 6F
```

```
089E8  20 53 61 76 65 64 FF 01 17 1F 00 00 43 6F 6D 6D 61 6E 64 20 4D 61 63 72
08A00  6F 20 43 61 6E 63 65 6C 65 64 20 FF 00 00 00 02 01 06 3E 4E 06 02 01 01
08A18  30 4E 01 02 01 17 30 4E 01 00 00 00 00 00 00 DA BF C0 D9 C4 B3 C9 BB C8
08A30  BC CD BA D5 B8 D4 BE CD B3 D6 B7 D3 BD C4 BA 70 52 61 70 69 64 57 72 69
08A48  74 65 72 20 62 79 20 51 75 69 78 6F 74 65 00 00 00 00 00 00 00 00 00 00
.......ALL ZERO'S
08AA8  00 00 00 00 00 00 00 00 00 00 00 00 00 00 00 00 00 00 00 00 00 00 00 FF
08AC0  FF 00 00 00 00 00 00 01 00 02 00 04 00 00 00 01 00 03 00 00 00 00 00 00
08AD8  00 00 00 00 00 00 00 02 01 10 6E 4E 08 3F 47 45 4E 45 52 41 4C 20 53 59
08AF0  53 54 45 4D 20 49 4E 46 4F 3A 20 43 6F 6E 74 72 6F 6C 20 6B 65 79 73 20
08B08  66 6F 72 20 61 6C 6C 20 68 65 6C 70 20 73 63 72 65 65 6E 73 20 61 72 65
08B20  3A FD 20 20 20 20 3C 45 73 63 3E 20 74 6F 20 65 78 69 74 20 68 65 6C 70
08B38  20 73 63 72 65 65 6E FD 20 20 20 20 3C 50 61 67 65 55 70 3E 20 6F 72 20
08B50  3C 50 61 67 65 44 6F 77 6E 3E 20 6F 6E 20 20 63 75 72 73 6F 72 20 70 61 64
08B68  20 74 6F 20 73 63 72 6F 6C 6C 20 6F 6E 65 20 6C 69 6E 65 FD 20 20 20 20
08B80  3C 53 68 69 66 74 2D 50 61 67 65 55 70 3E 20 6F 72 20 3C 53 68 69 66 74
08B98  2D 50 61 67 65 44 6F 77 6E 3E 20 6F 6E 20 63 75 72 73 6F 72 20 70 61 64
08BB0  20 74 6F 20 73 63 72 6F 6C 6C 20 6F 6E 65 20 70 61 67 65 FD 20 20 20 20
08BC8  3C 48 6F 6D 65 3E 20 74 6F 20 67 6F 20 74 6F 20 73 74 61 72 74 20 6F 66
08BE0  20 77 69 6E 64 6F 77 20 74 65 78 74 FD 52 61 70 69 64 57 72 69 74 65 72
08BF8  20 61 6C 6C 6F 77 73 20 79 6F 75 20 74 6F 20 64 65 66 69 6E 65 20 27 63
08C10  68 6F 72 64 73 20 27 20 6F 66 20 32 20 74 6F 20 38 20 64 69 66 66 65 72
08C28  65 6E 74 20 6C 65 74 74 65 72 73 2C 20 61 6E 64 20 74 6F 20 61 73 73 6F
08C40  63 69 61 74 65 20 65 61 63 68 20 6F 66 20 74 68 65 73 65 20 63 68 6F 72
08C58  64 73 20 77 69 74 68 20 61 20 64 65 66 69 6E 69 74 69 6F 6E 20 73 75 63
08C70  68 20 61 73 20 61 20 77 6F 72 64 2C 20 70 68 72 61 73 65 2C 20 73 65 6E
08C88  74 65 6E 63 65 2C 20 65 74 63 2E 20 57 68 65 6E 20 79 6F 75 20 73 69 6D
08CA0  75 6C 74 61 6E 65 6F 75 73 6C 79 20 64 65 70 72 65 73 73 20 61 6E 64 20
08CB8  74 68 65 6E 20 72 65 6C 65 61 73 65 20 74 68 65 20 6C 65 74 74 65 72 73
08CD0  20 6F 66 20 61 20 73 70 65 63 69 66 69 63 20 63 68 6F 72 64 2C 20 52 61
08CE8  70 69 64 57 72 69 74 65 72 20 73 65 6E 64 73 20 74 68 61 74 20 63 68 6F
08D00  72 64 27 73 20 64 65 66 69 6E 69 74 69 6F 6E 20 74 6F 20 74 68 65 20 73
08D18  63 72 65 65 6E 20 69 6E 73 74 65 61 64 20 6F 66 20 74 68 65 20 6C 65 74
08D30  74 65 72 73 20 6F 66 20 74 68 65 20 63 68 6F 72 64 2E 20 54 68 75 73 20
08D48  69 74 20 69 73 20 70 6F 73 73 69 62 6C 65 20 74 6F 20 69 6E 70 75 74 20
08D60  6C 6F 6E 67 2C 20 63 6F 6D 70 6C 65 78 2C 20 6F 72 20 6F 66 74 65 6E 20
08D78  75 73 65 64 20 74 65 78 74 20 77 69 74 68 20 6F 6E 65 20 71 75 69 63 6B
08D90  20 6B 65 79 62 6F 61 72 64 20 61 63 74 69 6F 6E 2E FD 20 20 20 20 41 76
08DA8  61 69 6C 61 62 6C 65 20 4F 6E 6C 69 6E 65 20 52 61 70 69 64 57 72 69 74
08DC0  65 72 20 66 75 6E 63 74 69 6F 6E 73 20 61 72 65 3A FD 20 20 20 20 20 20
08DD8  31 29 20 43 72 65 61 74 65 20 63 68 6F 72 64 73 20 77 69 74 68 20 3C 43
08DF0  74 72 6C 2D 41 6C 74 2D 43 3E FD 20 20 20 20 20 20 32 29 20 4C 69 73 74
08E08  20 63 68 6F 72 64 73 20 77 69 74 68 20 3C 43 74 72 6C 2D 41 6C 74 2D 4C
08E20  3E FD 20 20 20 20 20 20 33 29 20 47 65 74 20 69 6D 6D 65 64 69 61 74 65
08E38  20 66 75 6E 63 74 69 6F 6E 20 72 65 6C 61 74 65 64 20 68 65 6C 70 20 77
08E50  69 74 68 20 3C 43 74 72 6C 2D 41 6C 74 2D 48 3E 2E FF 02 01 10 6E 4E 08
08E68  3F 47 45 4E 57 4F 52 44 20 53 59 53 54 45 4D 20 49 4E 46 4F 3A 20 43 6F
08E80  6E 74 72 6F 6C 20 6B 65 79 73 20 61 72 65 3A FD 20 20 20 20 3C 41 72 72
08E98  6F 77 3E 20 6F 6E 20 63 75 72 73 6F 72 20 70 61 64 20 74 6F 20 6D 6F 76
08EB0  65 20 63 75 72 73 6F 72 20 69 6E 20 64 69 72 65 63 74 69 6F 6E 20 6F 66
08EC8  20 61 72 72 6F 77 FD 20 20 20 20 3C 53 68 69 66 74 3E 20 26 20 3C 41 72
08EE0  72 6F 77 3E 20 6F 6E 20 63 75 72 73 6F 72 20 70 61 64 20 74 6F 20 6D 6F
08EF8  76 65 20 72 69 67 68 74 20 61 6E 64 20 6C 65 66 74 20 62 79 20 77 6F 72
08F10  64 FD 20 20 20 20 20 20 20 20 20 20 20 20 6F 72 20 74 6F 20 6D 6F 76 65
08F28  20 75 70 20 61 6E 64 20 64 6F 77 6E 20 62 79 20 74 68 72 65 65 20 6C 69
08F40  6E 65 73 FD 20 20 20 20 3C 48 6F 6D 65 3E 20 74 6F 20 6D 6F 76 65 20 63
08F58  75 72 73 6F 72 20 74 6F 20 6C 65 66 74 20 6D 61 72 67 69 6E FD 20 20 20
08F70  20 20 20 20 20 20 20 20 20 69 66 20 61 74 20 6C 65 66 74 20 6D 61 72 67 69
08F88  6E 2C 20 6D 6F 76 65 20 74 6F 20 6C 65 66 74 20 6F 66 20 74 6F 70 20 6C
08FA0  69 6E 65 FD 20 20 20 20 3C 44 65 6C 65 74 65 3E 20 74 6F 20 64 65 6C 65
08FB8  74 65 20 63 68 61 72 61 63 74 65 72 20 61 74 20 63 75 72 73 6F 72 FD 20
08FD0  20 20 20 3C 53 68 69 66 74 2D 44 65 6C 65 74 65 3E 20 74 6F 20 64 65 6C
08FE8  65 74 65 20 77 6F 72 64 FD 20 20 20 20 3C 42 61 63 6B 20 53 70 61 63 65
09000  3E 20 74 6F 20 64 65 6C 65 74 65 20 63 68 61 72 61 63 74 65 72 20 6F 72
09018  20 66 61 6C 73 65 20 63 68 6F 72 64 20 74 6F 20 6C 65 66 74 20 6F 66 20
09030  63 75 72 73 6F 72 FD 20 20 20 20 3C 50 61 67 65 55 70 3E 20 6F 72 20 3C
09048  50 61 67 65 44 6F 77 6E 3E 20 74 6F 20 73 63 72 6F 6C 6C 20 74 65 78 74
09060  20 6F 6E 20 73 63 72 65 65 6E 20 62 79 20 6F 6E 65 20 6C 69 6E 65 FD 20
```

```
09078   20 20 20 3C 53 68 69 66 74 2D 50 61 67 65 55 70 3E 20 6F 72 20 3C 53 68
09090   69 66 74 2D 50 61 67 65 44 6F 77 6E 3E 20 74 6F 20 73 63 72 6F 6C 6C 20
090A8   74 65 78 74 20 6F 6E 20 73 63 72 65 65 6E 20 62 79 20 31 35 20 6C 69 6E
090C0   65 73 FD 20 20 20 20 3C 46 36 3E 20 74 6F 20 6C 6F 61 64 20 6E 65 77 20
090D8   64 69 63 74 69 6F 6E 61 72 79 FD 20 20 20 20 3C 46 37 3E 20 74 6F 20 66
090F0   6F 72 6D 61 74 20 74 65 78 74 FD 20 20 20 20 3C 46 38 3E 20 74 6F 20 70
09108   72 69 6E 74 20 74 65 78 74 FD 20 20 20 20 3C 46 31 30 3E 20 74 6F 20 64
09120   65 66 69 6E 65 20 72 65 67 69 6F 6E 20 28 64 65 66 69 6E 65 20 6E 65 77
09138   20 63 68 6F 72 64 29 FD 20 20 20 20 3C 43 74 72 6C 2D 41 6C 74 2D 48 3E
09150   20 66 6F 72 20 68 65 6C 70 FD 20 20 20 20 3C 43 74 72 6C 2D 41 6C 74 2D
09168   43 3E 20 74 6F 20 64 65 66 69 6E 65 20 6E 65 77 20 63 68 6F 72 64 FD 20
09180   20 20 20 3C 43 74 72 6C 2D 41 6C 74 2D 4C 3E 20 74 6F 20 6C 69 73 74 20
09198   64 69 63 74 69 6F 6E 61 72 79 20 63 6F 6E 74 65 6E 74 73 FF 02 01 10 6E
091B0   4E 08 3F 46 49 4C 45 20 4E 41 4D 45 20 44 45 46 49 4E 49 54 49 4F 4E 3A
091C8   FD 54 65 78 74 20 66 69 6C 65 20 6E 61 6D 65 20 63 61 6E 20 62 65 20 75
091E0   70 20 74 6F 20 65 69 67 68 74 20 61 6C 70 68 61 2D 6E 75 6D 65 72 69 63
091F8   20 63 68 61 72 61 63 74 65 72 73 20 70 72 65 63 65 65 64 65 64 20 62 79
09210   20 61 6E 20 6F 70 74 69 6F 6E 61 6C 20 20 3C 44 72 69 76 65 4C 65 74 74
09228   65 72 3A 3E 2E 20 42 61 63 6B 20 73 70 61 63 65 20 74 6F 20 63 6F 72 72
09240   65 63 74 20 65 72 72 6F 72 73 2E 20 53 79 73 74 65 6D 20 77 69 6C 6C 20
09258   61 75 74 6F 6D 61 74 69 63 61 6C 6C 79 20 61 64 64 20 3C 2E 74 78 74 3E
09270   20 73 75 66 66 69 78 20 74 6F 20 74 65 78 74 20 66 69 6C 65 20 6E 61 6D
09288   65 2E 20 3C 52 65 74 75 72 6E 3E 20 6C 6F 61 64 73 20 74 68 65 20 73 70
092A0   65 63 69 66 69 65 64 20 66 69 6C 65 2E 20 3C 45 73 63 3E 20 72 65 74 75
092B8   72 6E 73 20 79 6F 75 20 74 6F 20 74 68 65 20 70 72 69 6D 61 72 79 20 6D
092D0   65 6E 75 2E FF 02 01 10 6E 4E 08 3F 46 4F 52 4D 41 54 3A FD 46 6F 72 6D
092E8   61 74 20 61 73 6B 73 20 69 66 20 69 74 20 69 73 20 61 20 66 69 6C 65 20
09300   6F 72 20 70 61 67 65 20 66 6F 72 6D 61 74 2E 20 50 61 67 65 20 6F 6E 6C
09318   79 20 66 6F 72 6D 61 74 73 20 74 68 65 20 74 65 78 74 20 6F 6E 20 74 68
09330   65 20 73 63 72 65 65 6E 2E 20 46 69 6C 65 20 66 6F 72 6D 61 74 73 20 74
09348   68 65 20 65 6E 74 69 72 65 20 66 69 6C 65 2E FF 02 01 10 6E 4E 08 3F 52
09360   45 47 49 4F 4E 53 3A FD 41 73 20 79 6F 75 20 6D 6F 76 65 20 74 68 65 20
09378   63 75 72 73 6F 72 20 72 69 67 68 74 20 6F 72 20 64 6F 77 6E 20 74 68 65
09390   20 74 65 78 74 20 62 65 74 77 65 65 6E 20 74 68 65 20 6F 72 69 67 69 6E
093A8   61 6C 20 63 75 72 73 6F 72 20 61 6E 64 20 65 6E 65 77 20 65 6E 65 77 20
093C0   72 73 6F 72 20 69 73 20 68 69 67 68 6C 69 67 68 74 65 64 2E 20 4D 6F 76
093D8   69 6E 67 20 74 68 65 20 63 75 72 73 6F 72 20 75 70 20 6F 72 20 6C 65 66
093F0   74 20 72 65 6D 6F 76 65 73 20 74 68 65 20 68 69 67 68 6C 69 67 68 74 20
09408   62 65 74 77 65 65 6E 20 74 68 65 20 6F 72 69 67 69 6E 61 6C 20 63 75 72
09420   73 6F 72 20 61 6E 64 20 74 68 65 20 6E 65 77 20 63 75 72 73 6F 72 2E 20
09438   54 68 65 20 68 69 67 68 6C 69 67 68 74 65 64 20 74 65 78 74 20 69 73 20
09450   74 68 65 20 64 65 66 69 6E 65 64 20 72 65 67 69 6F 6E 2E 20 57 68 65 6E
09468   20 3C 45 73 63 3E 20 69 73 20 70 72 65 73 73 65 64 20 61 20 77 69 6E 64
09480   6F 77 20 61 70 70 65 61 72 73 20 61 73 6B 69 6E 67 20 77 68 65 74 68 65
09498   72 20 79 6F 75 20 77 61 6E 74 20 74 6F 20 66 75 72 74 68 65 72 20 6D 6F
094B0   64 69 66 79 20 74 68 65 20 72 65 67 69 6F 6E 20 64 65 66 69 6E 65 64 2C
094C8   20 63 72 65 61 74 65 20 61 20 63 68 6F 72 64 20 69 6E 20 74 68 65 20 64
094E0   69 63 74 69 6F 6E 61 72 79 20 77 69 74 68 20 74 68 65 20 72 65 67 69 6F
094F8   6E 20 61 73 20 69 74 73 20 64 65 66 69 6E 69 74 69 6F 6E 20 6F 72 20 63
09510   61 6E 63 65 6C 20 74 68 65 20 72 65 67 69 6F 6E 20 64 65 66 69 6E 69 74
09528   69 6F 6E 2E FF 02 01 10 6E 4E 08 3F 48 65 6C 70 20 73 63 72 65 65 6E 20
09540   66 6F 72 20 27 47 45 4E 57 4F 52 44 27 20 6D 61 72 67 69 6E 73 20 66 75
09558   6E 63 74 69 6F 6E FF 02 01 10 6E 4E 08 3F 50 52 49 4E 54 49 4E 47 3A FD
09570   57 68 65 6E 20 3C 46 38 3E 20 69 73 20 70 72 65 73 73 65 64 20 61 20 70
09588   61 72 61 6D 65 74 65 72 20 77 69 6E 64 6F 77 20 61 70 70 65 61 72 73 2E
095A0   20 54 68 65 73 65 20 70 61 72 61 6D 65 74 65 72 73 20 63 6F 6E 74 72 6F
095B8   6C 20 74 68 65 20 68 61 72 64 63 6F 70 79 20 70 72 69 6E 74 20 66 6F 72
095D0   6D 61 74 2E 20 41 66 74 65 72 20 79 6F 75 20 68 61 76 65 20 73 65 74 20
095E8   74 68 65 73 65 20 70 61 72 61 6D 65 74 65 72 73 2C 20 3C 46 38 3E 20 70
09600   72 69 6E 74 73 20 6F 6E 65 20 70 61 67 65 2C 20 3C 53 68 69 66 74 2D 46
09618   38 3E 20 70 72 69 6E 74 73 20 74 68 65 20 65 6E 74 69 72 65 20 66 69 6C
09630   65 2E 20 3C 45 73 63 3E 20 72 65 74 75 72 6E 73 20 79 6F 75 20 74 6F 20
09648   74 68 65 20 47 65 6E 57 6F 72 64 20 65 64 69 74 69 6E 67 20 73 63 72 65
09660   65 6E 2E FF 02 01 10 6E 4E 08 3F 4C 49 53 54 20 43 48 4F 52 44 53 20 41
09678   4E 44 20 45 49 4E 49 54 49 4F 4E 53 3A 20 43 6F 6E 74 72 6F 6C
09690   6B 65 79 73 20 61 72 65 3A FD 20 20 20 20 3C 45 73 63 3E 20 74 6F 20 65
096A8   78 69 74 20 6C 69 73 74 20 66 75 6E 63 74 69 6F 6E FD 20 20 20 20 3C 50
096C0   61 67 65 55 70 3E 20 6F 72 20 3C 50 61 67 65 44 6F 77 6E 3E 20 6F 6E 20
```

```
096D8  63 75 72 73 6F 72 20 70 61 64 20 74 6F 20 73 63 72 6F 6C 6C 20 6F 6E 65
096F0  20 6C 69 6E 65 FD 20 20 20 20 3C 53 68 69 66 74 2D 50 61 67 65 55 70 3E
09708  20 6F 72 20 3C 53 68 69 66 74 2D 50 61 67 65 44 6F 77 6E 3E 20 6F 6E 20
09720  63 75 72 73 6F 72 20 70 61 64 20 74 6F 20 73 63 72 6F 6C 6C 20 6F 6E 65
09738  20 70 61 67 65 FD 53 74 61 72 74 69 6E 67 20 66 72 6F 6D 20 74 68 65 20
09750  6C 61 73 74 20 63 68 6F 72 64 20 61 63 63 65 73 73 65 64 20 62 79 20 74
09768  68 65 20 73 79 73 74 65 6D 2C 20 74 68 65 20 6C 69 73 74 20 66 75 6E 63
09780  74 69 6F 6E 20 64 69 73 70 6C 61 79 73 20 74 68 65 20 63 68 6F 72 64 73
09798  20 69 6E 20 74 68 65 20 63 75 72 72 65 6E 74 20 64 69 63 74 69 6F 6E 61
097B0  72 79 20 61 6E 64 20 74 68 65 20 66 69 72 73 74 20 36 36 20 63 68 61 72
097C8  61 63 74 65 72 73 20 6F 66 20 65 61 63 68 20 63 68 6F 72 64 27 73 20 64
097E0  65 66 69 6E 69 74 69 6F 6E 2E FF 02 01 10 6E 4E 08 3F 48 65 6C 70 20 73
097F8  63 72 65 65 6E 20 66 6F 72 20 27 47 45 4E 57 4F 52 44 27 20 64 69 73 70
09810  6C 61 79 20 63 68 6F 72 64 20 66 75 6E 63 74 69 6F 6E FF 02 01 10 6E 4E
09828  08 3F 44 45 46 49 4E 45 20 41 20 4E 45 57 20 43 48 4F 52 44 3A 20 20 43
09840  6F 6E 74 72 6F 6C 20 6B 65 79 73 20 61 72 65 3A FD 20 20 20 20 3C 45 73
09858  63 3E 20 74 6F 20 65 78 69 74 20 77 69 74 68 6F 75 74 20 6D 6F 64 69 66
09870  79 69 6E 67 20 64 69 63 74 69 6F 6E 61 72 79 FD 20 20 20 20 3C 52 65 74
09888  75 72 6E 3E 20 74 6F 20 64 65 66 69 6E 65 20 74 65 78 74 FD 4C 65 74 74
098A0  65 72 73 20 74 6F 20 62 65 20 75 73 65 64 20 61 73 20 63 68 6F 72 64 20
098B8  6D 61 79 20 62 65 20 74 79 70 65 64 20 69 6E 20 61 6E 64 20 77 69 6C 6C
098D0  20 64 69 73 70 6C 61 79 20 61 74 20 74 6F 70 20 6C 65 66 74 2E 20 50 72
098E8  65 73 73 20 3C 52 65 74 75 72 6E 3E 20 61 66 74 65 72 20 74 79 70 69 6E
09900  67 20 69 6E 20 74 68 65 20 6C 65 74 74 65 72 73 20 6F 66 20 74 68 65 20
09918  63 68 6F 72 64 2E 20 49 66 20 79 6F 75 20 68 61 76 65 20 75 73 65 64 20
09930  6E 6F 6E 20 6C 65 74 74 65 72 20 63 68 61 72 61 63 74 65 72 73 20 6F 72
09948  20 61 6E 20 61 6C 72 65 61 64 79 20 65 78 69 73 74 69 6E 67 20 63 6F 6D
09960  62 69 6E 61 74 69 6F 6E 20 6F 66 20 6C 65 74 74 65 72 73 20 79 6F 75 20
09978  77 69 6C 6C 20 62 65 20 61 73 6B 65 64 20 74 6F 20 63 68 6F 6F 73 65 20
09990  61 20 64 69 66 66 65 72 65 6E 74 20 63 6F 6D 62 69 6E 61 74 69 6F 6E 20
099A8  6F 66 20 6C 65 74 74 65 72 73 2E FF 02 01 10 6E 4E 08 3F 53 50 45 43 49
099C0  46 59 20 54 45 58 54 20 44 45 46 49 4E 49 54 49 4F 4E 20 4F 46 20 4E 45
099D8  57 20 43 48 4F 52 44 3A 20 43 6F 6E 74 72 6F 6C 20 6B 65 79 73 20 61 72
099F0  65 3A FD 20 20 20 20 3C 45 73 63 3E 20 74 6F 20 65 78 69 74 20 77 69 74
09A08  68 6F 75 74 20 6D 6F 64 69 66 79 69 6E 67 20 64 69 63 74 69 6F 6E 61 72
09A20  79 FD 20 20 20 20 3C 41 72 72 6F 77 73 3E 20 6F 6E 20 63 75 72 73 6F 72
09A38  20 70 61 64 20 74 6F 20 6D 6F 76 65 20 63 75 72 73 6F 72 FD 20 20 20 20
09A50  3C 43 3E 20 3D 20 6F 6E 2F 6F 66 66 20 74 6F 67 67 6C 65 20 74 6F 20 68
09A68  69 67 68 6C 69 67 68 74 20 74 65 78 74 20 6F 66 20 64 65 66 69 6E 69 74
09A80  69 6F 6E FD 20 20 20 20 3C 52 65 74 75 72 6E 3E 20 74 6F 20 73 61 76 65
09A98  20 63 68 6F 72 64 20 61 6E 64 20 68 69 67 68 6C 69 67 68 74 65 64 20 64
09AB0  65 66 69 6E 69 74 69 6F 6E FD 59 6F 75 20 61 72 65 20 64 65 66 69 6E 69
09AC8  6E 67 20 74 68 65 20 64 65 73 69 72 65 64 20 63 6F 6E 74 65 6E 74 73 20
09AE0  6F 66 20 61 20 27 54 45 58 54 27 20 6D 61 63 72 6F 20 61 6E 64 20 68 61
09AF8  76 65 20 62 65 65 6E 20 72 65 74 75 72 6E 65 64 20 74 6F 20 79 6F 75 72
09B10  20 77 6F 72 6B 20 73 63 72 65 65 6E 2E 20 41 6E 79 20 74 65 78 74 20 74
09B28  6F 20 62 65 20 61 73 73 6F 63 69 61 74 65 64 20 77 69 74 68 20 74 68 65
09B40  20 6E 65 77 20 63 68 6F 72 64 20 73 68 6F 75 6C 64 20 61 6C 72 65 61 64
09B58  79 20 62 65 20 6F 6E 20 74 68 69 73 20 77 6F 72 6B 20 73 63 72 65 65 6E
09B70  2E 20 54 68 65 20 63 75 72 73 6F 72 20 69 73 20 77 68 65 72 65 20 79 6F
09B88  75 20 6C 65 66 74 20 69 74 20 61 6E 64 20 74 68 65 20 6E 65 77 20 63 68
09BA0  6F 72 64 20 69 73 20 64 69 73 70 6C 61 79 65 64 20 61 74 20 6C 65 66 74
09BB8  20 6F 66 20 70 72 6F 6D 70 74 20 77 69 6E 64 6F 77 2E 20 4E 65 78 74 2C
09BD0  20 61 6C 6C 20 74 65 78 74 20 74 6F 20 62 65 20 72 65 70 72 65 73 65 6E
09BE8  74 65 64 20 61 73 20 61 20 63 68 6F 72 64 20 73 68 6F 75 6C 64 20 62 65
09C00  20 68 69 67 68 6C 69 67 68 74 65 64 20 69 6E 20 27 72 65 76 65 72 73 65
09C18  2D 76 69 64 65 6F 27 2E 20 57 68 65 6E 20 74 68 65 20 68 69 67 68 6C 69
09C30  67 68 74 69 6E 67 20 66 75 6E 63 74 69 6F 6E 20 69 73 20 27 6F 6E 27 2C
09C48  20 74 68 65 20 76 69 64 65 6F 20 69 6D 61 67 65 20 6F 66 20 74 68 65 20
09C60  63 68 61 72 61 63 74 65 72 20 61 74 20 74 68 65 20 63 75 72 73 6F 72 20
09C78  77 69 6C 6C 20 62 65 20 63 68 61 6E 67 65 64 2E 20 57 68 65 6E 20 69 6E
09C90  20 27 6F 66 66 27 20 6D 6F 64 65 20 74 68 65 20 63 75 72 73 6F 72 20 63
09CA8  61 6E 20 62 65 20 6D 6F 76 65 64 20 77 69 74 68 6F 75 74 20 61 66 66 65
09CC0  63 74 69 6E 67 20 63 68 61 72 61 63 74 65 72 73 2E 20 54 68 75 73 20 62
09CD8  79 20 75 73 69 6E 67 20 63 6F 6D 62 69 6E 61 74 69 6F 6E 73 20 6F 66 20
09CF0  3C 43 3E 20 61 6E 64 20 63 75 72 73 6F 72 2D 70 61 64 20 27 61 72 72 6F
09D08  77 73 27 2C 20 61 6E 79 20 63 68 61 72 61 63 74 65 72 20 6F 6E 20 74 68
09D20  65 20 73 63 72 65 65 6E 20 63 61 6E 20 62 65 20 68 69 67 68 6C 69 67 68
```

```
09D38  74 65 64 2E FD 20 20 20 20 4F 6E 63 65 20 74 68 65 20 64 65 73 69 72 65
09D50  64 20 74 65 78 74 20 68 61 73 20 62 65 65 6E 20 68 69 67 68 6C 69 67 68
09D68  74 65 64 20 69 6E 20 27 72 65 76 65 72 73 65 2D 76 69 64 65 6F 27 20 70
09D80  72 65 73 73 20 3C 52 65 74 75 72 6E 3E 20 74 6F 20 73 61 76 65 20 74 68
09D98  65 20 63 68 6F 72 64 20 61 6E 64 20 64 65 66 69 6E 69 74 69 6F 6E 2E 20
09DB0  59 6F 75 72 20 73 63 72 65 65 6E 20 77 69 6C 6C 20 62 65 20 73 63 61 6E
09DC8  6E 65 64 20 66 72 6F 6D 20 74 68 65 20 74 6F 70 20 6C 65 66 74 20 61 6E
09DE0  64 20 61 6E 79 20 61 6E 64 20 61 6C 6C 20 63 68 61 72 61 63 74 65 72 73
09DF8  20 61 70 70 65 61 72 69 6E 67 20 69 6E 20 27 72 65 76 65 72 73 65 2D 76
09E10  69 64 65 6F 27 20 77 69 6C 6C 20 62 65 20 73 61 76 65 64 2C 20 69 6E 20
09E28  6F 72 64 65 72 2C 20 61 6E 64 20 77 69 6C 6C 20 62 65 20 61 73 73 6F 63
09E40  69 61 74 65 64 20 77 69 74 68 20 74 68 65 20 63 68 6F 72 64 20 79 6F 75
09E58  20 68 61 76 65 20 6A 75 73 74 20 63 72 65 61 74 65 64 2E FF 02 01 10 6E
09E70  4E 08 3F 44 45 46 49 4E 45 20 43 4F 4D 4D 41 4E 44 20 4D 41 43 52 4F 3A
09E88  20 43 6F 6E 74 72 6F 6C 20 6B 65 79 73 20 61 72 65 3A FD 20 20 20 20 3C
09EA0  43 74 72 6C 2D 41 6C 74 2D 45 73 63 3E 20 74 6F 20 63 61 6E 63 65 6C 20
09EB8  63 6F 6D 6D 61 6E 64 20 64 65 66 69 6E 69 74 69 6F 6E 20 77 69 74 68 6F 75
09ED0  74 20 6D 6F 64 69 66 79 69 6E 67 20 64 69 63 74 69 6F 6E 61 72 79 FD 20
09EE8  20 20 20 3C 43 74 72 6C 2D 41 6C 74 2D 53 3E 20 74 6F 20 74 65 72 6D 69
09F00  6E 61 74 65 20 63 6F 6D 6D 61 6E 64 20 64 65 66 69 6E 69 74 69 6F 6E 20
09F18  61 6E 64 20 73 61 76 65 20 6E 65 77 20 63 68 6F 72 64 2E FD 59 6F 75 20
09F30  61 72 65 20 64 65 66 69 6E 69 6E 67 20 61 20 27 43 4F 4D 4D 41 4E 44 27
09F48  20 6D 61 63 72 6F 2E 20 41 6C 6C 20 76 61 6C 69 64 20 6B 65 79 73 74 72
09F60  6F 6B 65 73 20 65 6E 74 65 72 65 64 20 61 74 20 74 68 65 20 6B 65 79 62
09F78  6F 61 72 64 20 61 72 65 20 73 61 76 65 64 20 61 73 20 74 68 65 79 20 61
09F90  72 65 20 65 6E 74 65 72 65 64 2E 20 54 68 65 20 63 6F 6D 70 75 74 65 72
09FA8  20 72 65 73 70 6F 6E 64 73 20 6E 6F 72 6D 61 6C 6C 79 20 65 78 63 65 70
09FC0  74 20 61 6E 20 72 65 6D 69 6E 64 65 72 20 74 68 65 20 75 70 70 65
09FD8  72 20 6C 65 66 74 20 63 6F 72 6E 65 72 20 77 69 6C 6C 20 62 6C 69 6E 6B
09FF0  20 61 73 20 65 61 63 68 20 6B 65 79 73 74 72 6F 6B 65 20 69 73 20 61 69
0A008  63 65 70 74 65 64 2E 20 41 66 74 65 72 20 61 6C 6C 20 6B 65 79 73 74 72
0A020  6F 6B 65 73 20 6F 66 20 74 68 65 20 64 65 73 69 72 65 64 20 63 6F 6D 6D
0A038  61 6E 64 20 68 61 76 65 20 62 65 65 6E 20 65 6E 74 65 72 65 64 2C 20 70
0A050  72 65 73 73 20 3C 43 74 72 6C 2D 41 6C 74 2D 53 3E 20 74 6F 20 73 61 76
0A068  65 20 74 68 65 20 63 6F 6D 6D 61 6E 64 20 61 6E 64 20 74 65 72 6D 69 6E
0A080  61 74 65 20 74 68 65 20 63 72 65 61 74 65 20 66 75 6E 63 74 69 6F 6E 2E
0A098  20 41 74 20 61 6E 79 20 74 69 6D 65 2C 20 74 6F 20 65 78 69 74 20 74 68
0A0B0  65 20 63 6F 6D 6D 61 6E 64 20 63 72 65 61 74 65 20 66 75 6E 63 74 69 6F
0A0C8  6E 20 77 69 74 68 6F 75 74 20 73 61 76 69 6E 67 20 74 68 65 20 6E 65 77
0A0E0  20 63 68 6F 72 64 2C 20 70 72 65 73 73 20 3C 43 74 72 6C 2D 41 6C 74 2D
0A0F8  45 73 63 3E 2E FF 02 01 10 6E 4E 08 3F 43 48 4F 4F 53 45 20 27 54 45 58
0A110  54 27 20 4F 52 20 27 43 4F 4D 4D 41 4E 44 27 20 4D 41 43 52 4F 3A 20 43
0A128  6F 6E 74 72 6F 6C 20 6B 65 79 73 20 61 72 65 3A FD 20 20 20 20 3C 43 3E
0A140  20 3D 20 43 6F 6D 6D 61 6E 64 20 6D 61 63 72 6F 20 64 65 66 69 6E 69 74
0A158  69 6F 6E FD 20 20 20 20 3C 54 3E 20 3D 20 54 65 78 74 20 6D 61 63 72 6F
0A170  20 64 65 66 69 6E 69 74 6F 6E FD 20 20 20 20 3C 45 73 63 3E 20 74 6F 20
0A188  65 78 69 74 20 63 72 65 61 74 65 20 66 75 6E 63 74 69 6F 6E 2E FD 54 68
0A1A0  65 20 64 69 66 66 65 72 65 6E 63 65 20 62 65 74 77 65 65 6E 20 74 65 78
0A1B8  74 20 61 6E 64 20 63 6F 6D 6D 61 6E 64 20 6D 61 63 72 6F 73 20 69 73 3A
0A1D0  20 54 45 58 54 20 6D 61 63 72 6F 73 20 6D 61 79 20 63 6F 6E 74 61 69 6E
0A1E8  20 6F 6E 6C 79 20 63 68 61 72 61 63 74 65 72 73 20 74 68 61 74 20 77 6F
0A200  75 6C 64 20 6E 6F 72 6D 61 6C 6C 79 20 62 65 20 61 73 73 6F 63 69 61 74
0A218  65 64 20 77 69 74 68 20 61 20 27 74 79 70 65 77 72 69 74 65 72 27 20 73
0A230  75 63 68 20 61 73 20 6C 65 74 74 65 72 73 2C 20 6E 75 6D 62 65 72 73 2C
0A248  20 61 6E 64 20 70 75 6E 63 74 75 61 74 69 6F 6E 20 73 79 6D 62 6F 6C 73
0A260  2E 20 43 4F 4D 4D 41 4E 44 20 6D 61 63 72 6F 73 20 6D 61 79 2C 20 69 6E
0A278  20 61 64 64 69 74 69 6F 6E 20 74 6F 20 74 65 78 74 2C 20 63 6F 6E 74 61
0A290  69 6E 20 74 68 65 20 73 70 65 63 69 61 6C 20 27 61 63 74 69 6F 6E 27 20
0A2A8  63 68 61 72 61 63 74 65 72 73 20 75 73 65 64 20 62 79 20 61 20 63 6F 6D
0A2C0  70 75 74 65 72 20 73 75 63 68 20 61 73 20 66 75 6E 63 74 69 6F 6E 20 6B
0A2D8  65 79 73 2C 20 27 65 6E 74 65 72 27 2C 20 65 74 63 2E FF 02 01 10 6E 4E
0A2F0  08 3F 4D 41 49 4E 54 45 4E 41 4E 43 45 20 4D 45 4E 55 3A FD 42 79 20 73
0A308  65 6C 65 63 74 69 6E 67 20 66 72 6F 6D 20 74 68 65 20 6D 65 6E 75 2C 20
0A320  79 6F 75 20 63 61 6E 3A FD 20 20 20 20 45 73 63 61 70 65 20 74 6F 20 70
0A338  72 69 6D 61 72 79 20 6D 65 6E 75 FD 20 20 20 20 4C 69 73 74 20 63 68 6F
0A350  72 64 73 20 61 6E 64 20 64 65 66 69 6E 69 74 69 6F 6E 73 FD 20 20 20 20
0A368  41 64 64 20 61 20 6E 65 77 20 63 68 6F 72 64 FD 20 20 20 20 52 65 6D 6F
```

```
0A380   76 65 20 61 20 63 68 6F 72 64 FD 20 20 20 20 50 72 69 6E 74 20 74 68 65
0A398   20 64 69 63 74 69 6F 6E 61 72 79 FF 02 01 10 6E 4E 08 3F 44 49 43 54 49
0A3B0   4F 4E 41 52 59 20 43 48 41 4E 47 45 3A FD 44 69 63 74 69 6F 6E 61 72 79
0A3C8   20 6E 61 6D 65 20 63 61 6E 20 62 65 20 75 70 20 74 6F 20 65 69 67 68 74
0A3E0   20 61 6C 70 68 61 2D 6E 75 6D 65 72 69 63 20 63 68 61 72 61 63 74 65 72
0A3F8   73 20 70 72 65 63 65 65 64 65 64 20 62 79 20 61 6E 20 6F 70 74 69 6F 6E
0A410   61 6C 20 3C 44 72 69 76 65 4C 65 74 74 65 72 3A 3E 2E 20 42 61 63 6B 20
0A428   73 70 61 63 65 20 74 6F 20 63 6F 72 72 65 63 74 20 65 72 72 6F 72 73 2E
0A440   20 53 79 73 74 65 6D 20 77 69 6C 6C 20 61 75 74 6F 6D 61 74 69 63 61 6C
0A458   6C 79 20 61 70 70 65 6E 64 20 3C 2E 64 69 63 3E 20 73 75 66 66 69 78 20
0A470   74 6F 20 64 69 63 74 69 6F 6E 61 72 79 20 6E 61 6D 65 2E 20 3C 52 65 74
0A488   75 72 6E 3E 20 6C 6F 61 64 73 20 74 68 65 20 73 70 65 63 69 66 69 65 64
0A4A0   20 64 69 63 74 69 6F 6E 61 72 79 2E 20 3C 45 73 63 3E 20 64 6F 65 73 20
0A4B8   6E 6F 74 20 6C 6F 61 64 20 61 20 64 69 63 74 69 6F 6E 61 72 79 20 61 6E
0A4D0   64 20 73 75 70 70 72 65 73 73 65 73 20 74 68 65 20 63 68 6F 72 64 69 6E
0A4E8   67 20 66 65 61 74 75 72 65 2E FF 02 01 10 6E 4E 08 3F 43 52 45 41 54 45
0A500   20 41 20 43 48 4F 52 44 3A FD 41 20 73 70 65 63 69 61 6C 20 47 65 6E 57
0A518   6F 72 64 20 73 63 72 65 65 6E 20 77 69 6C 6C 20 61 70 70 65 61 72 2E 20
0A530   55 73 65 20 69 6E 74 65 6E 64 65 64 20 61 69 6D 65 64 20 77 61 72 64 73
0A548   68 65 20 47 65 6E 57 6F 72 64 20 65 64 69 74 6F 72 2C 20 68 6F 77 65 76
0A560   65 72 2C 20 79 6F 75 20 63 61 6E 6E 6F 74 20 63 68 6F 72 64 20 74 65 78
0A578   74 20 77 68 69 6C 65 20 69 6E 20 74 68 69 73 20 63 72 65 61 74 65 20 63
0A590   68 6F 72 64 20 6D 6F 64 65 2E 20 52 65 67 69 6F 6E 73 20 6F 72 20 3C 43
0A5A8   74 72 6C 2D 41 6C 74 2D 43 3E 20 70 65 72 6D 69 74 20 79 6F 75 20 74 6F
0A5C0   20 63 72 65 61 74 65 20 61 20 63 68 6F 72 64 20 61 6E 64 20 61 64 64 20
0A5D8   69 74 20 74 6F 20 74 68 65 20 64 69 63 74 69 6F 6E 61 72 79 2E 20 3C 45
0A5F0   73 63 3E 20 72 65 74 75 72 6E 73 20 79 6F 75 20 74 6F 20 74 68 65 20 70
0A608   72 69 6D 61 72 79 20 6D 65 6E 75 2E FF 02 01 10 6E 4E 08 3F 52 45 4D 4F
0A620   56 45 20 41 20 43 48 4F 52 44 3A FD 45 6E 74 65 72 20 74 68 65 20 6C 65
0A638   74 74 65 72 73 20 6F 66 20 74 68 65 20 63 68 6F 72 64 20 61 6E 64 20 70
0A650   72 65 73 73 20 3C 52 65 74 75 72 6E 3E 20 2E 20 54 68 65 20 63 68 6F 72
0A668   64 20 73 70 65 63 69 66 69 65 64 20 77 69 6C 6C 20 62 65 20 72 65 6D 6F
0A680   76 65 64 20 66 72 6F 6D 20 74 68 65 20 64 69 63 74 69 6F 6E 61 72 79 2E
0A698   20 49 66 20 74 68 65 20 63 68 6F 72 64 20 69 73 20 6E 6F 74 20 69 6E 20
0A6B0   74 68 65 20 64 69 63 74 69 6F 6E 61 72 79 2C 20 74 68 65 20 6D 65 73 73
0A6C8   61 67 65 20 27 43 48 4F 52 44 20 4E 4F 54 20 46 4F 55 4E 44 20 49 4E 20
0A6E0   44 49 43 54 49 4F 4E 41 52 59 27 20 77 69 6C 6C 20 61 70 70 65 61 72 2E
0A6F8   FF 00 6B 83 6E CD 71 F6 72 79 73 4E 75 80 75 00 00 00 00 00 00 00 00 00
0A710   00 00 00 00 00 00 00 00 00 00 00 00 00 00 85 76 0C 78 00 00 00
0A728   00 00 00 00 00 00 00 00 00 00 00 44 78 D5 79 8D 7E 1F 81 0C 83 C5
0A740   83 14 85 36 86 00 00 00 00 00 00 00 00 00 00 00 00 00 00 00 00 00
.......ALL ZERO'S
0B730   00 00 00 00 00 00 00 00 00 00 00 00 90 87 30 97 00 00 00 00 00 00
0B748   00 00 00 00 00 00 00 FF 4F 01 00 00 00 00 00 00 00 00 00 00 00 00
0B760   00 00 00 00 00 00 00 00 00 00 00 00 00 00 00 00 00 00 00 00
0B778   00 00 00 00 00 00 00 00 00 73 97 BE 01 00 00 00 00 00 00 00 07
0B790   00 00 00 00 00 00 00 00 00 00
```

COPYRIGHT 1986, QUIXOTE CORPORATION (UNPUBLISHED)

APPENDIX D

```
00000   5A 59 00 A3 00 FF 08 60 02 01 00 FF FF 4C 0D 00 01 49 00 29 00 36 0B 1E
00018   00 00 00 01 00 0B 00 00 00 18 00 00 00 28 00 00 00 38 00 00 00 49 00 00
00030   00 59 00 00 00 69 00 00 00 72 00 00 00 7B 00 00 00 80 00 00 00 89 00 00
00048   00 97 00 00 00 9C 00 00 00 A5 00 00 00 B4 00 00 00 BD 00 00 00 C6 00 00
00060   00 D9 00 00 00 E7 00 00 00 0B 01 00 00 18 01 00 00 21 01 00 00 3C 01 00
00078   00 45 01 00 00 57 01 00 00 64 01 00 00 6D 01 00 00 7B 01 00 00 8A 01 00
00090   00 93 01 00 00 98 01 00 00 A1 01 00 00 B3 01 00 00 BC 01 00 00 C1 01 00
000A8   00 CA 01 00 00 D7 01 00 00 E4 01 00 00 00 02 00 00 0A 02 00 00 13 02 00
000C0   00 29 02 00 00 35 02 00 00 3E 02 00 00 5A 02 00 00 5F 02 00 00 68 02 00
000D8   00 81 02 00 00 8A 02 00 00 9D 02 00 00 AA 02 00 00 BB 02 00 00 C4 02 00
000F0   00 C9 02 00 00 D2 02 00 00 DE 02 00 00 E7 02 00 00 EC 02 00 00 F5 02 00
00108   00 08 03 00 00 15 03 00 00 26 03 00 00 2F 03 00 00 3D 03 00 00 46 03 00
00120   00 A7 03 00 00 BF 03 00 00 D2 03 00 00 D7 03 00 00 1B 00 3F 00 24 00 3F
00138   00 2D 00 3F 00 32 00 3F 00 3E 00 3F 00 4D 00 3F 00 52 00 3F 00 64 00 3F
00150   00 79 00 3F 00 82 00 3F 00 91 00 3F 00 A2 00 3F 00 B3 00 3F 00 C4 00 3F
00168   00 D5 00 3F 00 E6 00 3F 00 F7 00 3F 00 08 01 3F 00 19 01 3F 00 2A 01 3F
```

```
00180  00 3B 01 3F  00 4C 01 3F  00 5D 01 3F  00 6E 01 3F  00 7F 01 3F  00 90 01 3F
00198  00 A1 01 3F  00 B2 01 3F  00 C3 01 3F  00 D4 01 3F  00 E5 01 3F  00 F6 01 3F
001B0  00 07 02 3F  00 16 02 3F  00 A2 03 3F  00 A7 03 3F  00 BF 03 3F  00 C8 03 3F
001C8  00 D1 03 3F  00 D6 03 3F  00 E6 03 3F  00 EB 03 3F  00 03 04 3F  00 0C 04 3F
001E0  00 15 04 3F  00 28 04 3F  00 35 04 3F  00 4C 04 3F  00 5D 04 3F  00 66 04 3F
001F8  00 76 04 3F  00 8E 04 3F  00 A5 04 3F  00 B4 04 3F  00 BE 04 3F  00 C9 04 3F
00210  00 CE 04 3F  00 D7 04 3F  00 E0 04 3F  00 F3 04 3F  00 00 05 3F  00 1A 05 3F
00228  00 31 05 3F  00 3F 05 3F  00 4A 05 3F  00 61 05 3F  00 6A 05 3F  00 87 05 3F
00240  00 8C 05 3F  00 95 05 3F  00 A8 05 3F  00 AD 05 3F  00 C5 05 3F  00 CA 05 3F
00258  00 13 00 9C  00 1C 00 9C  00 25 00 9C  00 2E 00 9C  00 3D 00 9C  00 42 00 9C
00270  00 4B 00 9C  00 50 00 9C  00 59 00 9C  00 6B 00 9C  00 70 00 9C  00 7C 00 9C
00288  00 81 00 9C  00 8D 00 9C  00 92 00 9C  00 9E 00 9C  00 A3 00 9C  00 AF 00 9C
002A0  00 B4 00 9C  00 C0 00 9C  00 C5 00 9C  00 D1 00 9C  00 D6 00 9C  00 E2 00 9C
002B8  00 EE 00 9C  00 F9 00 9C  00 08 01 9C  00 24 01 9C  00 29 01 9C  00 35 01 9C
002D0  00 3A 01 9C  00 46 01 9C  00 4B 01 9C  00 57 01 9C  00 5C 01 9C  00 68 01 9C
002E8  00 6D 01 9C  00 79 01 9C  00 7E 01 9C  00 8A 01 9C  00 8F 01 9C  00 9B 01 9C
00300  00 A0 01 9C  00 AC 01 9C  00 BD 01 9C  00 C9 01 9C  00 CE 01 9C  00 DA 01 9C
00318  00 DF 01 9C  00 EB 01 9C  00 F0 01 9C  00 FC 01 9C  00 01 02 9C  00 0D 02 9C
00330  00 12 02 9C  00 1E 02 9C  00 27 02 9C  00 3A 02 9C  00 47 02 9C  00 58 02 9C
00348  00 61 02 9C  00 70 02 9C  00 7E 02 9C  00 8A 02 9C  00 9F 02 9C  00 A4 02 9C
00360  00 AD 02 9C  00 BF 02 9C  00 C8 02 9C  00 D5 02 9C  00 DE 02 9C  00 EA 02 9C
00378  00 FF 02 9C  00 08 03 9C  00 70 04 9C  00 7F 04 9C  00 8B 04 9C  00 98 04 9C
00390  00 A5 04 9C  00 AE 04 9C  00 BA 04 9C  00 C3 04 9C  00 C8 04 9C  00 D1 04 9C
003A8  00 DA 04 9C  00 E3 04 9C  00 F2 04 9C  00 F7 04 9C  00 0F 05 9C  00 14 05 9C
003C0  00 1D 00 ED  00 26 00 ED  00 2F 00 ED  00 4C 00 ED  00 55 00 ED  00 5E 00 ED
003D8  00 80 00 ED  00 9D 00 ED  00 BF 00 ED  00 DC 00 ED  00 E5 00 ED  00 08 01 ED
003F0  00 2A 01 ED  00 3F 01 ED  00 6A 01 ED  00 90 01 ED  00 B4 01 ED  00 D6 01 ED
00408  00 DF 01 ED  00 F8 01 ED  00 25 02 ED  00 3B 02 ED  00 49 02 ED  00 52 02 ED
00420  00 5B 02 ED  00 6F 02 ED  00 74 02 ED  00 8C 02 ED  00 95 02 ED  00 9E 02 ED
00438  00 A3 02 ED  00 AC 02 ED  00 CD 02 ED  00 F7 02 ED  00 18 03 ED  00 1D 03 ED
00450  00 35 03 ED  00 3A 03 ED  00 22 00 21  01 45 00 21  01 51 00 21  01 79 00 21
00468  01 A8 00 21  01 AD 00 21  01 BA 00 21  01 1F 00 2E  01 28 00 2E  01 31 00 2E
00480  01 45 00 2E  01 6D 00 2E  01 7C 00 2E  01 93 00 2E  01 9C 00 2E  01 AF 00 2E
00498  01 B8 00 2E  01 C1 00 2E  01 D2 00 2E  01 DB 00 2E  01 E4 00 2E  01 E9 00 2E
004B0  01 F2 00 2E  01 05 01 2E  01 14 01 2E  01 19 01 2E  01 22 01 2E  01 2D 01 2E
004C8  01 3F 01 2E  01 4E 01 2E  01 5A 01 2E  01 67 01 2E  01 7F 01 2E  01 88 01 2E
004E0  01 98 01 2E  01 AD 01 2E  01 BD 01 2E  01 D5 01 2E  01 EA 01 2E  01 F6 01 2E
004F8  01 40 02 2E  01 5A 02 2E  01 63 02 2E  01 76 02 2E  01 7F 02 2E  01 B9 02 2E
00510  01 C4 02 2E  01 CD 02 2E  01 E4 02 2E  01 ED 02 2E  01 00 03 2E  01 09 03 2E
00528  01 21 03 2E  01 3F 03 2E  01 48 03 2E  01 4D 03 2E  01 67 03 2E  01 70 03 2E
00540  01 79 03 2E  01 89 03 2E  01 92 03 2E  01 B3 03 2E  01 BC 03 2E  01 CA 03 2E
00558  01 FE 03 2E  01 0F 04 2E  01 24 04 2E  01 41 04 2E  01 52 04 2E  01 5B 04 2E
00570  01 76 04 2E  01 7F 04 2E  01 94 04 2E  01 AC 04 2E  01 B9 04 2E  01 C2 04 2E
00588  01 D9 04 2E  01 E6 04 2E  01 EF 04 2E  01 03 05 2E  01 18 05 2E  01 21 05 2E
005A0  01 2E 05 2E  01 3B 05 2E  01 5F 05 2E  01 73 05 2E  01 8C 05 2E  01 95 05 2E
005B8  01 9E 05 2E  01 B9 05 2E  01 C8 05 2E  01 D7 05 2E  01 E0 05 2E  01 FB 05 2E
005D0  01 07 06 2E  01 10 06 2E  01 27 06 2E  01 34 06 2E  01 3D 06 2E  01 58 06 2E
005E8  01 61 06 2E  01 6A 06 2E  01 6F 06 2E  01 78 06 2E  01 8A 06 2E  01 93 06 2E
00600  01 9C 06 2E  01 A5 06 2E  01 B3 06 2E  01 C1 06 2E  01 CF 06 2E  01 DD 06 2E
00618  01 EB 06 2E  01 F4 06 2E  01 FD 06 2E  01 06 07 2E  01 14 07 2E  01 21 07 2E
00630  01 2A 07 2E  01 6D 07 2E  01 84 07 2E  01 8D 07 2E  01 96 07 2E  01 CC 07 2E
00648  01 E0 07 2E  01 EE 07 2E  01 06 08 2E  01 1E 08 2E  01 2B 08 2E  01 40 08 2E
00660  01 49 08 2E  01 56 08 2E  01 6B 08 2E  01 74 08 2E  01 83 08 2E  01 92 08 2E
00678  01 9B 08 2E  01 C1 08 2E  01 D0 08 2E  01 DF 08 2E  01 E8 08 2E  01 0E 09 2E
00690  01 33 09 2E  01 56 09 2E  01 6B 09 2E  01 7A 09 2E  01 89 09 2E  01 92 09 2E
006A8  01 C2 09 2E  01 D1 09 2E  01 E0 09 2E  01 E9 09 2E  01 19 0A 2E  01 33 0A 2E
006C0  01 55 0A 2E  01 6B 0A 2E  01 82 0A 2E  01 8B 0A 2E  01 94 0A 2E  01 9D 0A 2E
006D8  01 B9 0A 2E  01 DF 0A 2E  01 04 0B 2E  01 1D 0B 2E  01 34 0B 2E  01 39 0B 2E
006F0  01 51 0B 2E  01 5A 0B 2E  01 63 0B 2E  01 76 0B 2E  01 89 0B 2E  01 AD 0B 2E
00708  01 DC 0B 2E  01 E1 0B 2E  01 EE 0B 2E  01 05 0C 2E  01 0E 0C 2E  01 23 0C 2E
00720  01 3F 0C 2E  01 4D 0C 2E  01 68 0C 2E  01 8E 0C 2E  01 9C 0C 2E  01 AA 0C 2E
00738  01 B8 0C 2E  01 CD 0C 2E  01 DE 0C 2E  01 E7 0C 2E  01 EC 0C 2E  01 F5 0C 2E
00750  01 07 0D 2E  01 10 0D 2E  01 19 0D 2E  01 1E 0D 2E  01 2B 0D 2E  01 62 0D 2E
00768  01 79 0D 2E  01 82 0D 2E  01 8D 0D 2E  01 92 0D 2E  01 9B 0D 2E  01 A0 0D 2E
00780  01 A9 0D 2E  01 AE 0D 2E  01 C6 0D 2E  01 CB 0D 2E  01 15 00 0B  02 1E 00 0B
00798  02 27 00 0B  02 35 00 0B  02 48 00 0B  02 5E 00 0B  02 7A 00 0B  02 8F 00 0B
007B0  02 98 00 0B  02 A5 00 0B  02 B3 00 0B  02 C9 00 0B  02 DC 00 0B  02 F0 00 0B
007C8  02 03 01 0B  02 12 01 0B  02 25 01 0B  02 3B 01 0B  02 48 01 0B  02 59 01 0B
```

```
007E0  02 73 01 0B 02 85 01 0B 02 8A 01 0B 02 A2 01 0B 02 AB 01 0B 02 B4 01 0B
007F8  02 C9 01 0B 02 E0 01 0B 02 FA 01 0B 02 03 02 0B 02 11 02 0B 02 24 02 0B
00810  02 2D 02 0B 02 3C 02 0B 02 4A 02 0B 02 6D 02 0B 02 80 02 0B 02 A7 02 0B
00828  02 B0 02 0B 02 BD 02 0B 02 DD 02 0B 02 EC 02 0B 02 F5 02 0B 02 04 03 0B
00840  02 12 03 0B 02 35 03 0B 02 48 03 0B 02 6F 03 0B 02 8B 03 0B 02 9E 03 0B
00858  02 AD 03 0B 02 C9 03 0B 02 D7 03 0B 02 FB 03 0B 02 04 04 0B 02 14 04 0B
00870  02 22 04 0B 02 2F 04 0B 02 57 04 0B 02 60 04 0B 02 70 04 0B 02 7E 04 0B
00888  02 98 04 0B 02 C7 04 0B 02 D3 04 0B 02 D8 04 0B 02 F0 04 0B 02 F5 04 0B
008A0  02 1F 00 5A 02 28 00 5A 02 31 00 5A 02 3A 00 5A 02 4C 00 5A 02 55 00 5A
008B8  02 5E 00 5A 02 74 00 5A 02 83 00 5A 02 9C 00 5A 02 A9 00 5A 02 B6 00 5A
008D0  02 BF 00 5A 02 D2 00 5A 02 DB 00 5A 02 EF 00 5A 02 F8 00 5A 02 12 01 5A
008E8  02 1B 01 5A 02 2D 01 5A 02 47 01 5A 02 5D 01 5A 02 6B 01 5A 02 87 01 5A
00900  02 99 01 5A 02 A2 01 5A 02 AB 01 5A 02 C3 01 5A 02 D3 01 5A 02 DC 01 5A
00918  02 EC 01 5A 02 F5 01 5A 02 0C 02 5A 02 2D 02 5A 02 3F 02 5A 02 50 02 5A
00930  02 5D 02 5A 02 6F 02 5A 02 7A 02 5A 02 8C 02 5A 02 95 02 5A 02 C4 02 5A
00948  02 D5 02 5A 02 EE 02 5A 02 03 03 5A 02 0F 03 5A 02 18 03 5A 02 21 03 5A
00960  02 2F 03 5A 02 3E 03 5A 02 4A 03 5A 02 64 03 5A 02 7A 03 5A 02 85 03 5A
00978  02 91 03 5A 02 9A 03 5A 02 A3 03 5A 02 B7 03 5A 02 C0 03 5A 02 DA 03 5A
00990  02 E3 03 5A 02 EF 03 5A 02 F8 03 5A 02 FD 03 5A 02 15 04 5A 02 1E 04 5A
009A8  02 27 04 5A 02 30 04 5A 02 42 04 5A 02 4B 04 5A 02 54 04 5A 02 6A 04 5A
009C0  02 79 04 5A 02 92 04 5A 02 A3 04 5A 02 AC 04 5A 02 BF 04 5A 02 C8 04 5A
009D8  02 DC 04 5A 02 E5 04 5A 02 FF 04 5A 02 08 05 5A 02 1A 05 5A 02 34 05 5A
009F0  02 4A 05 5A 02 58 05 5A 02 74 05 5A 02 86 05 5A 02 8F 05 5A 02 98 05 5A
00A08  02 B0 05 5A 02 C0 05 5A 02 C9 05 5A 02 D9 05 5A 02 E2 05 5A 02 F9 05 5A
00A20  02 1A 06 5A 02 2C 06 5A 02 40 06 5A 02 4D 06 5A 02 56 06 5A 02 67 06 5A
00A38  02 74 06 5A 02 86 06 5A 02 91 06 5A 02 A3 06 5A 02 AC 06 5A 02 DB 06 5A
00A50  02 EC 06 5A 02 05 07 5A 02 1A 07 5A 02 26 07 5A 02 2F 07 5A 02 38 07 5A
00A68  02 46 07 5A 02 55 07 5A 02 61 07 5A 02 7B 07 5A 02 91 07 5A 02 9D 07 5A
00A80  02 A6 07 5A 02 AF 07 5A 02 C3 07 5A 02 CC 07 5A 02 E6 07 5A 02 EF 07 5A
00A98  02 FB 07 5A 02 04 08 5A 02 09 08 5A 02 21 08 5A 02 2A 08 5A 02 33 08 5A
00AB0  02 48 08 5A 02 5D 08 5A 02 6A 08 5A 02 77 08 5A 02 86 08 5A 02 90 08 5A
00AC8  02 99 08 5A 02 AE 08 5A 02 C3 08 5A 02 D8 08 5A 02 E1 08 5A 02 F7 08 5A
00AE0  02 12 09 5A 02 1B 09 5A 02 34 09 5A 02 3D 09 5A 02 58 09 5A 02 61 09 5A
00AF8  02 7D 09 5A 02 86 09 5A 02 A1 09 5A 02 AA 09 5A 02 C3 09 5A 02 CC 09 5A
00B10  02 E4 09 5A 02 ED 09 5A 02 04 0A 5A 02 11 0A 5A 02 1A 0A 5A 02 35 0A 5A
00B28  02 3E 0A 5A 02 59 0A 5A 02 62 0A 5A 02 6B 0A 5A 02 84 0A 5A 02 95 0A 5A
00B40  02 9E 0A 5A 02 B7 0A 5A 02 C8 0A 5A 02 D1 0A 5A 02 EA 0A 5A 02 FB 0A 5A
00B58  02 04 0B 5A 02 1D 0B 5A 02 2E 0B 5A 02 37 0B 5A 02 50 0B 5A 02 59 0B 5A
00B70  02 5E 0B 5A 02 67 0B 5A 02 79 0B 5A 02 82 0B 5A 02 9B 0B 5A 02 B2 0B 5A
00B88  02 C1 0B 5A 02 CA 0B 5A 02 E3 0B 5A 02 E8 0B 5A 02 F1 0B 5A 02 0E 0C 5A
00BA0  02 17 0C 5A 02 30 0C 5A 02 35 0C 5A 02 3E 0C 5A 02 5B 0C 5A 02 64 0C 5A
00BB8  02 7C 0C 5A 02 85 0C 5A 02 99 0C 5A 02 AD 0C 5A 02 B6 0C 5A 02 D2 0C 5A
00BD0  02 DF 0C 5A 02 EE 0C 5A 02 00 0D 5A 02 12 0D 5A 02 24 0D 5A 02 4A 0D 5A
00BE8  02 56 0D 5A 02 5F 0D 5A 02 78 0D 5A 02 81 0D 5A 02 91 0D 5A 02 A0 0D 5A
00C00  02 B6 0D 5A 02 C1 0D 5A 02 CE 0D 5A 02 0A 0E 5A 02 16 0E 5A 02 1B 0E 5A
00C18  02 33 0E 5A 02 38 0E 5A 02 19 00 3D 03 2F 00 3D 03 70 00 3D 03 7B 00 3D
00C30  03 B2 00 3D 03 E7 00 3D 03 0A 01 3D 03 17 01 3D 03 35 01 3D 03 4F 01 3D
00C48  03 72 01 3D 03 7B 01 3D 03 A6 01 3D 03 C6 01 3D 03 DE 01 3D 03 FA 01 3D
00C60  03 05 02 3D 03 2B 02 3D 03 3F 02 3D 03 45 02 3D 03 52 02 3D 03 9D 02 3D
00C78  03 C1 02 3D 03 CE 02 3D 03 73 03 3D 03 78 03 3D 03 8E 03 3D 03 C1 03 3D
00C90  03 DC 03 3D 03 F7 03 3D 03 09 04 3D 03 16 04 3D 03 31 04 3D 03 50 04 3D
00CA8  03 58 04 3D 03 74 04 3D 03 9C 04 3D 03 A1 04 3D 03 B9 04 3D 03 E0 04 3D
00CC0  03 01 05 3D 03 0B 05 3D 03 35 05 3D 03 50 05 3D 03 55 05 3D 03 97 05 3D
00CD8  03 36 07 3D 03 AD 07 3D 03 B2 07 3D 03 CE 07 3D 03 D3 07 3D 03 EE 07 3D
00CF0  03 0C 08 3D 03 15 08 3D 03 2C 08 3D 03 31 08 3D 03 3C 08 3D 03 95 08 3D
00D08  03 B0 08 3D 03 D3 08 3D 03 F1 08 3D 03 05 09 3D 03 1D 09 3D 03 40 09 3D
00D20  03 49 09 3D 03 60 09 3D 03 65 09 3D 03 71 09 3D 03 88 09 3D 03 91 09 3D
00D38  03 A8 09 3D 03 B1 09 3D 03 B6 09 3D 03 D7 09 3D 03 E0 09 3D 03 03 0A 3D
00D50  03 0C 0A 3D 03 23 0A 3D 03 2C 0A 3D 03 43 0A 3D 03 4C 0A 3D 03 63 0A 3D
00D68  03 6D 0A 3D 03 A3 0A 3D 03 BA 0A 3D 03 C3 0A 3D 03 DA 0A 3D 03 E3 0A 3D
00D80  03 FA 0A 3D 03 FF 0A 3D 03 1F 0B 3D 03 27 0B 3D 03 3E 0B 3D 03 47 0B 3D
00D98  03 50 0B 3D 03 59 0B 3D 03 70 0B 3D 03 79 0B 3D 03 82 0B 3D 03 8C 0B 3D
00DB0  03 A1 0B 3D 03 DD 0B 3D 03 E6 0B 3D 03 FD 0B 3D 03 06 0C 3D 03 1D 0C 3D
00DC8  03 22 0C 3D 03 2B 0C 3D 03 4B 0C 3D 03 5E 0C 3D 03 67 0C 3D 03 82 0C 3D
00DE0  03 9D 0C 3D 03 A2 0C 3D 03 E2 0C 3D 03 FD 0C 3D 03 18 0D 3D 03 34 0D 3D
00DF8  03 4F 0D 3D 03 6B 0D 3D 03 87 0D 3D 03 A3 0D 3D 03 BB 0D 3D 03 D6 0D 3D
00E10  03 F1 0D 3D 03 03 0E 3D 03 10 0E 3D 03 15 0E 3D 03 39 0E 3D 03 4E 0E 3D
```

```
00E28   03 56 0E 3D 03 75 0E 3D 03 1E 00 31 04 28 00 31 04 32 00 31 04 62 00 31
00E40   04 6C 00 31 04 88 00 31 04 8D 00 31 04 AE 00 31 04 CF 00 31 04 D8 00 31
00E58   04 EF 00 31 04 F8 00 31 04 0F 01 31 04 18 01 31 04 2F 01 31 04 34 01 31
00E70   04 9D 01 31 04 AC 01 31 04 C0 01 31 04 E1 01 31 04 FF 01 31 04 16 02 31
00E88   04 1B 02 31 04 44 02 31 04 61 02 31 04 12 00 58 04 1F 00 58 04 6A 00 58
00EA0   04 7F 00 58 04 AF 00 58 04 B8 00 58 04 EB 00 58 04 02 01 58 04 47 01 58
00EB8   04 50 01 58 04 83 01 58 04 9A 01 58 04 C5 01 58 04 87 06 58 04 B2 06 58
00ED0   04 E0 06 58 04 02 07 58 04 54 07 58 04 6E 07 58 04 90 07 58 04 FD 08 58
00EE8   04 8E 09 58 04 89 0B 58 04 A1 0B 58 04 AA 0B 58 04 BF 0B 58 04 CA 0B 58
00F00   04 E2 0B 58 04 EF 0B 58 04 00 0C 58 04 0D 0C 58 04 38 0C 58 04 5F 0C 58
00F18   04 6A 0C 58 04 B6 0C 58 04 D1 0C 58 04 FB 0C 58 04 16 0D 58 04 57 0D 58
00F30   04 72 0D 58 04 9C 0D 58 04 B7 0D 58 04 E7 0D 58 04 F4 0D 58 04 04 0E 58
00F48   04 4B 0E 58 04 74 0E 58 04 9D 0E 58 04 B8 0E 58 04 D4 0E 58 04 F0 0E 58
00F60   04 0B 0F 58 04 24 0F 58 04 40 0F 58 04 5B 0F 58 04 94 0F 58 04 99 0F 58
00F78   04 C1 0F 58 04 E9 0F 58 04 12 10 58 04 37 10 58 04 9B 10 58 04 AB 10 58
00F90   04 C4 10 58 04 D4 10 58 04 13 11 58 04 23 11 58 04 3C 11 58 04 4C 11 58
00FA8   04 51 11 58 04 6C 11 58 04 88 11 58 04 B2 11 58 04 D5 11 58 04 F1 11 58
00FC0   04 1B 12 58 04 44 12 58 04 60 12 58 04 83 12 58 04 9F 12 58 04 1F 00 87
00FD8   05 28 00 87 05 31 00 87 05 5A 00 87 05 72 00 87 05 8A 00 87 05 A2 00 87
00FF0   05 A7 00 87 05 C1 00 87 05 CA 00 87 05 D3 00 87 05 DB 00 87 05 E4 00 87
01008   05 FB 00 87 05 08 01 87 05 0D 01 87 05 27 01 87 05 30 01 87 05 39 01 87
01020   05 49 01 87 05 60 01 87 05 69 01 87 05 6E 01 87 05 86 01 87 05 8F 01 87
01038   05 98 01 87 05 A7 01 87 05 B6 01 87 05 C5 01 87 05 D4 01 87 05 E3 01 87
01050   05 F2 01 87 05 01 02 87 05 10 02 87 05 1F 02 87 05 34 02 87 05 49 02 87
01068   05 5E 02 87 05 67 02 87 05 70 02 87 05 75 02 87 05 7E 02 87 05 8E 02 87
01080   05 97 02 87 05 A5 02 87 05 BC 02 87 05 D3 02 87 05 DC 02 87 05 E5 02 87
01098   05 EA 02 87 05 02 03 87 05 0B 03 87 05 14 03 87 05 1D 03 87 05 3C 03 87
010B0   05 4F 03 87 05 63 03 87 05 72 03 87 05 86 03 87 05 94 03 87 05 9D 03 87
010C8   05 A2 03 87 05 AE 03 87 05 C2 03 87 05 C7 03 87 05 DA 03 87 05 E3 03 87
010E0   05 F0 03 87 05 00 04 87 05 14 04 87 05 28 04 87 05 36 04 87 05 3F 04 87
010F8   05 5A 04 87 05 69 04 87 05 78 04 87 05 81 04 87 05 9D 04 87 05 A6 04 87
01110   05 C2 04 87 05 CB 04 87 05 D0 04 87 05 DC 04 87 05 E5 04 87 05 00 05 87
01128   05 09 05 87 05 21 05 87 05 2E 05 87 05 37 05 87 05 53 05 87 05 5C 05 87
01140   05 65 05 87 05 6A 05 87 05 73 05 87 05 84 05 87 05 8D 05 87 05 96 05 87
01158   05 9F 05 87 05 A4 05 87 05 B2 05 87 05 BF 05 87 05 C8 05 87 05 05 06 87
01170   05 1C 06 87 05 25 06 87 05 2E 06 87 05 64 06 87 05 69 06 87 05 81 06 87
01188   05 8A 06 87 05 93 06 87 05 A3 06 87 05 AC 06 87 05 C3 06 87 05 C8 06 87
011A0   05 E0 06 87 05 E9 06 87 05 F2 06 87 05 01 07 87 05 10 07 87 05 1E 07 87
011B8   05 29 07 87 05 38 07 87 05 5E 07 87 05 7B 07 87 05 9E 07 87 05 A6 07 87
011D0   05 AF 07 87 05 CA 07 87 05 DE 07 87 05 F1 07 87 05 07 08 87 05 13 08 87
011E8   05 2C 08 87 05 3C 08 87 05 45 08 87 05 4E 08 87 05 6D 08 87 05 8C 08 87
01200   05 95 08 87 05 AC 08 87 05 C5 08 87 05 CA 08 87 05 E4 08 87 05 ED 08 87
01218   05 F6 08 87 05 09 09 87 05 1C 09 87 05 2B 09 87 05 38 09 87 05 47 09 87
01230   05 56 09 87 05 65 09 87 05 73 09 87 05 86 09 87 05 96 09 87 05 9F 09 87
01248   05 A8 09 87 05 BF 09 87 05 CE 09 87 05 DE 09 87 05 E7 09 87 05 FE 09 87
01260   05 09 0A 87 05 18 0A 87 05 21 0A 87 05 31 0A 87 05 41 0A 87 05 4A 0A 87
01278   05 58 0A 87 05 6F 0A 87 05 86 0A 87 05 8F 0A 87 05 98 0A 87 05 A1 0A 87
01290   05 AA 0A 87 05 AF 0A 87 05 C7 0A 87 05 D0 0A 87 05 D9 0A 87 05 E9 0A 87
012A8   05 F4 0A 87 05 03 0B 87 05 29 0B 87 05 46 0B 87 05 5A 0B 87 05 63 0B 87
012C0   05 7B 0B 87 05 96 0B 87 05 B5 0B 87 05 BE 0B 87 05 D7 0B 87 05 DC 0B 87
012D8   05 F6 0B 87 05 FB 0B 87 05 15 00 47 06 1E 00 47 06 27 00 47 06 4D 00 47
012F0   06 69 00 47 06 77 00 47 06 95 00 47 06 C5 00 47 06 CA 00 47 06 E4 00 47
01308   06 ED 00 47 06 F6 00 47 06 11 01 47 06 2C 01 47 06 5B 01 47 06 60 01 47
01320   06 7A 01 47 06 83 01 47 06 8C 01 47 06 A5 01 47 06 BA 01 47 06 BF 01 47
01338   06 D7 01 47 06 E0 01 47 06 E9 01 47 06 0F 02 47 06 2B 02 47 06 39 02 47
01350   06 57 02 47 06 87 02 47 06 8C 02 47 06 A6 02 47 06 AF 02 47 06 B8 02 47
01368   06 D3 02 47 06 EF 02 47 06 06 03 47 06 2A 03 47 06 2F 03 47 06 49 03 47
01380   06 52 03 47 06 5B 03 47 06 6C 03 47 06 75 03 47 06 86 03 47 06 8F 03 47
01398   06 A0 03 47 06 A9 03 47 06 BA 03 47 06 C3 03 47 06 D6 03 47 06 E5 03 47
013B0   06 14 04 47 06 21 04 47 06 2A 04 47 06 37 04 47 06 40 04 47 06 4F 04 47
013C8   06 74 04 47 06 7F 04 47 06 88 04 47 06 93 04 47 06 A9 04 47 06 CC 04 47
013E0   06 E1 04 47 06 F7 04 47 06 06 05 47 06 35 05 47 06 5E 05 47 06 74 05 47
013F8   06 79 05 47 06 93 05 47 06 9C 05 47 06 A5 05 47 06 B8 05 47 06 CB 05 47
01410   06 DC 05 47 06 E5 05 47 06 FF 05 47 06 08 06 47 06 23 06 47 06 2C 06 47
01428   06 47 06 47 06 50 06 47 06 68 06 47 06 75 06 47 06 7E 06 47 06 96 06 47
01440   06 A3 06 47 06 AC 06 47 06 B1 06 47 06 C9 06 47 06 D2 06 47 06 DB 06 47
01458   06 EE 06 47 06 01 07 47 06 12 07 47 06 1B 07 47 06 32 07 47 06 3F 07 47
```

| | | | | | | | | | | | | | | | | |
|---|---|---|---|---|---|---|---|---|---|---|---|---|---|---|---|---|
| 01470 | 06 | 48 | 07 | 47 | 06 | 5F | 07 | 47 | 06 | 6C | 07 | 47 | 06 | 75 | 07 | 47 | 06 | 90 | 07 | 47 | 06 | 99 | 07 | 47 |
| 01488 | 06 | B4 | 07 | 47 | 06 | BD | 07 | 47 | 06 | D9 | 07 | 47 | 06 | E2 | 07 | 47 | 06 | FB | 07 | 47 | 06 | 04 | 08 | 47 |
| 014A0 | 06 | 1C | 08 | 47 | 06 | 29 | 08 | 47 | 06 | 32 | 08 | 47 | 06 | 4E | 08 | 47 | 06 | 57 | 08 | 47 | 06 | 6E | 08 | 47 |
| 014B8 | 06 | 7B | 08 | 47 | 06 | 84 | 08 | 47 | 06 | 9C | 08 | 47 | 06 | A9 | 08 | 47 | 06 | B2 | 08 | 47 | 06 | CD | 08 | 47 |
| 014D0 | 06 | D6 | 08 | 47 | 06 | E8 | 08 | 47 | 06 | F5 | 08 | 47 | 06 | FE | 08 | 47 | 06 | 03 | 09 | 47 | 06 | 1B | 09 | 47 |
| 014E8 | 06 | 24 | 09 | 47 | 06 | 2D | 09 | 47 | 06 | 32 | 09 | 47 | 06 | 3B | 09 | 47 | 06 | 4F | 09 | 47 | 06 | 58 | 09 | 47 |
| 01500 | 06 | 6A | 09 | 47 | 06 | 73 | 09 | 47 | 06 | 84 | 09 | 47 | 06 | 8D | 09 | 47 | 06 | 9F | 09 | 47 | 06 | A8 | 09 | 47 |
| 01518 | 06 | B9 | 09 | 47 | 06 | C2 | 09 | 47 | 06 | D4 | 09 | 47 | 06 | DD | 09 | 47 | 06 | EE | 09 | 47 | 06 | F7 | 09 | 47 |
| 01530 | 06 | 0F | 0A | 47 | 06 | 18 | 0A | 47 | 06 | 31 | 0A | 47 | 06 | 41 | 0A | 47 | 06 | 4A | 0A | 47 | 06 | 5C | 0A | 47 |
| 01548 | 06 | 65 | 0A | 47 | 06 | 7E | 0A | 47 | 06 | 8E | 0A | 47 | 06 | 97 | 0A | 47 | 06 | A7 | 0A | 47 | 06 | C1 | 0A | 47 |
| 01560 | 06 | D6 | 0A | 47 | 06 | E6 | 0A | 47 | 06 | 00 | 0B | 47 | 06 | 15 | 0B | 47 | 06 | 2F | 0B | 47 | 06 | 38 | 0B | 47 |
| 01578 | 06 | 53 | 0B | 47 | 06 | 5C | 0B | 47 | 06 | 77 | 0B | 47 | 06 | 80 | 0B | 47 | 06 | 9B | 0B | 47 | 06 | A4 | 0B | 47 |
| 01590 | 06 | BE | 0B | 47 | 06 | C7 | 0B | 47 | 06 | E0 | 0B | 47 | 06 | E9 | 0B | 47 | 06 | 02 | 0C | 47 | 06 | 0B | 0C | 47 |
| 015A8 | 06 | 1D | 0C | 47 | 06 | 2A | 0C | 47 | 06 | 33 | 0C | 47 | 06 | 43 | 0C | 47 | 06 | 5F | 0C | 47 | 06 | 68 | 0C | 47 |
| 015C0 | 06 | 7D | 0C | 47 | 06 | 89 | 0C | 47 | 06 | 9C | 0C | 47 | 06 | B3 | 0C | 47 | 06 | C1 | 0C | 47 | 06 | E4 | 0C | 47 |
| 015D8 | 06 | F9 | 0C | 47 | 06 | 10 | 0D | 47 | 06 | 19 | 0D | 47 | 06 | 26 | 0D | 47 | 06 | 2F | 0D | 47 | 06 | 44 | 0D | 47 |
| 015F0 | 06 | 4F | 0D | 47 | 06 | 58 | 0D | 47 | 06 | 74 | 0D | 47 | 06 | 7D | 0D | 47 | 06 | 92 | 0D | 47 | 06 | 9B | 0D | 47 |
| 01608 | 06 | B0 | 0D | 47 | 06 | B9 | 0D | 47 | 06 | CE | 0D | 47 | 06 | D7 | 0D | 47 | 06 | EC | 0D | 47 | 06 | F5 | 0D | 47 |
| 01620 | 06 | FA | 0D | 47 | 06 | 12 | 0E | 47 | 06 | 17 | 0E | 47 | 06 | 21 | 00 | 28 | 07 | 2A | 00 | 28 | 07 | 33 | 00 | 28 |
| 01638 | 07 | 41 | 00 | 28 | 07 | 50 | 00 | 28 | 07 | 5F | 00 | 28 | 07 | 70 | 00 | 28 | 07 | 79 | 00 | 28 | 07 | 7E | 00 | 28 |
| 01650 | 07 | 96 | 00 | 28 | 07 | 9F | 00 | 28 | 07 | A8 | 00 | 28 | 07 | BD | 00 | 28 | 07 | D4 | 00 | 28 | 07 | EE | 00 | 28 |
| 01668 | 07 | FB | 00 | 28 | 07 | 04 | 01 | 28 | 07 | 18 | 01 | 28 | 07 | 2A | 01 | 28 | 07 | 4B | 01 | 28 | 07 | 54 | 01 | 28 |
| 01680 | 07 | 64 | 01 | 28 | 07 | 7B | 01 | 28 | 07 | 8C | 01 | 28 | 07 | A8 | 01 | 28 | 07 | B3 | 01 | 28 | 07 | D8 | 01 | 28 |
| 01698 | 07 | EE | 01 | 28 | 07 | F7 | 01 | 28 | 07 | 02 | 02 | 28 | 07 | 0B | 02 | 28 | 07 | 2C | 02 | 28 | 07 | 35 | 02 | 28 |
| 016B0 | 07 | 45 | 02 | 28 | 07 | 4A | 02 | 28 | 07 | 62 | 02 | 28 | 07 | 6B | 02 | 28 | 07 | 74 | 02 | 28 | 07 | 89 | 02 | 28 |
| 016C8 | 07 | A4 | 02 | 28 | 07 | B5 | 02 | 28 | 07 | D2 | 02 | 28 | 07 | EF | 02 | 28 | 07 | FF | 02 | 28 | 07 | 14 | 03 | 28 |
| 016E0 | 07 | 23 | 03 | 28 | 07 | 36 | 03 | 28 | 07 | 45 | 03 | 28 | 07 | 5C | 03 | 28 | 07 | 70 | 03 | 28 | 07 | 79 | 03 | 28 |
| 016F8 | 07 | 84 | 03 | 28 | 07 | 89 | 03 | 28 | 07 | 94 | 03 | 28 | 07 | 9D | 03 | 28 | 07 | B0 | 03 | 28 | 07 | C7 | 03 | 28 |
| 01710 | 07 | DA | 03 | 28 | 07 | E3 | 03 | 28 | 07 | EC | 03 | 28 | 07 | F1 | 03 | 28 | 07 | 09 | 04 | 28 | 07 | 12 | 04 | 28 |
| 01728 | 07 | 1B | 04 | 28 | 07 | 30 | 04 | 28 | 07 | 3F | 04 | 28 | 07 | 4D | 04 | 28 | 07 | 58 | 04 | 28 | 07 | 64 | 04 | 28 |
| 01740 | 07 | 6D | 04 | 28 | 07 | 7D | 04 | 28 | 07 | 97 | 04 | 28 | 07 | B1 | 04 | 28 | 07 | BE | 04 | 28 | 07 | C7 | 04 | 28 |
| 01758 | 07 | E0 | 04 | 28 | 07 | E9 | 04 | 28 | 07 | 04 | 05 | 28 | 07 | 0D | 05 | 28 | 07 | 12 | 05 | 28 | 07 | 2A | 05 | 28 |
| 01770 | 07 | 33 | 05 | 28 | 07 | 3C | 05 | 28 | 07 | 51 | 05 | 28 | 07 | 5C | 05 | 28 | 07 | 67 | 05 | 28 | 07 | 70 | 05 | 28 |
| 01788 | 07 | 80 | 05 | 28 | 07 | 97 | 05 | 28 | 07 | AD | 05 | 28 | 07 | B6 | 05 | 28 | 07 | D1 | 05 | 28 | 07 | DA | 05 | 28 |
| 017A0 | 07 | E3 | 05 | 28 | 07 | E8 | 05 | 28 | 07 | 00 | 06 | 28 | 07 | 09 | 06 | 28 | 07 | 12 | 06 | 28 | 07 | 2C | 06 | 28 |
| 017B8 | 07 | 3B | 06 | 28 | 07 | 40 | 06 | 28 | 07 | 58 | 06 | 28 | 07 | 61 | 06 | 28 | 07 | 6A | 06 | 28 | 07 | 79 | 06 | 28 |
| 017D0 | 07 | 8E | 06 | 28 | 07 | A9 | 06 | 28 | 07 | B8 | 06 | 28 | 07 | C9 | 06 | 28 | 07 | DE | 06 | 28 | 07 | F5 | 06 | 28 |
| 017E8 | 07 | 04 | 07 | 28 | 07 | 12 | 07 | 28 | 07 | 21 | 07 | 28 | 07 | 26 | 07 | 28 | 07 | 41 | 07 | 28 | 07 | 4A | 07 | 28 |
| 01800 | 07 | 53 | 07 | 28 | 07 | 62 | 07 | 28 | 07 | 77 | 07 | 28 | 07 | 86 | 07 | 28 | 07 | 97 | 07 | 28 | 07 | AC | 07 | 28 |
| 01818 | 07 | C3 | 07 | 28 | 07 | D2 | 07 | 28 | 07 | E0 | 07 | 28 | 07 | EF | 07 | 28 | 07 | F4 | 07 | 28 | 07 | 0F | 08 | 28 |
| 01830 | 07 | 18 | 08 | 28 | 07 | 1D | 08 | 28 | 07 | 22 | 08 | 28 | 07 | 27 | 08 | 28 | 07 | 2C | 08 | 28 | 07 | 44 | 08 | 28 |
| 01848 | 07 | 4D | 08 | 28 | 07 | 52 | 08 | 28 | 07 | 57 | 08 | 28 | 07 | 5C | 08 | 28 | 07 | 61 | 08 | 28 | 07 | 79 | 08 | 28 |
| 01860 | 07 | 82 | 08 | 28 | 07 | 8B | 08 | 28 | 07 | 9A | 08 | 28 | 07 | 9F | 08 | 28 | 07 | A8 | 08 | 28 | 07 | AD | 08 | 28 |
| 01878 | 07 | D2 | 08 | 28 | 07 | D7 | 08 | 28 | 07 | EF | 08 | 28 | 07 | F8 | 08 | 28 | 07 | 01 | 09 | 28 | 07 | 10 | 09 | 28 |
| 01890 | 07 | 15 | 09 | 28 | 07 | 1E | 09 | 28 | 07 | 23 | 09 | 28 | 07 | 48 | 09 | 28 | 07 | 4D | 09 | 28 | 07 | 65 | 09 | 28 |
| 018A8 | 07 | 6A | 09 | 28 | 07 | 13 | 00 | BF | 07 | 1C | 00 | BF | 07 | 25 | 00 | BF | 07 | 32 | 00 | BF | 07 | 3F | 00 | BF |
| 018C0 | 07 | 48 | 00 | BF | 07 | 68 | 00 | BF | 07 | 7D | 00 | BF | 07 | 9F | 00 | BF | 07 | A8 | 00 | BF | 07 | CF | 00 | BF |
| 018D8 | 07 | 06 | 01 | BF | 07 | 21 | 01 | BF | 07 | 2A | 01 | BF | 07 | 39 | 01 | BF | 07 | 4E | 01 | BF | 07 | 5D | 01 | BF |
| 018F0 | 07 | 6E | 01 | BF | 07 | 83 | 01 | BF | 07 | 93 | 01 | BF | 07 | 9C | 01 | BF | 07 | A1 | 01 | BF | 07 | BB | 01 | BF |
| 01908 | 07 | C4 | 01 | BF | 07 | CD | 01 | BF | 07 | E2 | 01 | BF | 07 | EF | 01 | BF | 07 | FC | 01 | BF | 07 | 05 | 02 | BF |
| 01920 | 07 | 26 | 02 | BF | 07 | 50 | 02 | BF | 07 | 59 | 02 | BF | 07 | 85 | 02 | BF | 07 | B1 | 02 | BF | 07 | C9 | 02 | BF |
| 01938 | 07 | DB | 02 | BF | 07 | E9 | 02 | BF | 07 | F8 | 02 | BF | 07 | 0F | 03 | BF | 07 | 20 | 03 | BF | 07 | 2C | 03 | BF |
| 01950 | 07 | 38 | 03 | BF | 07 | 46 | 03 | BF | 07 | 51 | 03 | BF | 07 | 68 | 03 | BF | 07 | 7F | 03 | BF | 07 | 88 | 03 | BF |
| 01968 | 07 | 9C | 03 | BF | 07 | AB | 03 | BF | 07 | BC | 03 | BF | 07 | CC | 03 | BF | 07 | D9 | 03 | BF | 07 | E2 | 03 | BF |
| 01980 | 07 | E7 | 03 | BF | 07 | 01 | 04 | BF | 07 | 0A | 04 | BF | 07 | 13 | 04 | BF | 07 | 18 | 04 | BF | 07 | 30 | 04 | BF |
| 01998 | 07 | 39 | 04 | BF | 07 | 42 | 04 | BF | 07 | 47 | 04 | BF | 07 | 5F | 04 | BF | 07 | 68 | 04 | BF | 07 | 71 | 04 | BF |
| 019B0 | 07 | 76 | 04 | BF | 07 | 8E | 04 | BF | 07 | 97 | 04 | BF | 07 | A0 | 04 | BF | 07 | A5 | 04 | BF | 07 | BD | 04 | BF |
| 019C8 | 07 | C2 | 04 | BF | 07 | 1B | 00 | 0B | 08 | 24 | 00 | 0B | 08 | 2D | 00 | 0B | 08 | 44 | 00 | 0B | 08 | 49 | 00 | 0B |
| 019E0 | 08 | 52 | 00 | 0B | 08 | 64 | 00 | 0B | 08 | 7F | 00 | 0B | 08 | A3 | 00 | 0B | 08 | C4 | 00 | 0B | 08 | D9 | 00 | 0B |
| 019F8 | 08 | E7 | 00 | 0B | 08 | F0 | 00 | 0B | 08 | 0F | 01 | 0B | 08 | 1E | 01 | 0B | 08 | 32 | 01 | 0B | 08 | 46 | 01 | 0B |
| 01A10 | 08 | 55 | 01 | 0B | 08 | 6F | 01 | 0B | 08 | 78 | 01 | 0B | 08 | 88 | 01 | 0B | 08 | 91 | 01 | 0B | 08 | A8 | 01 | 0B |
| 01A28 | 08 | BF | 01 | 0B | 08 | CF | 01 | 0B | 08 | E6 | 01 | 0B | 08 | EF | 01 | 0B | 08 | F8 | 01 | 0B | 08 | 09 | 02 | 0B |
| 01A40 | 08 | 16 | 02 | 0B | 08 | 20 | 02 | 0B | 08 | 2C | 02 | 0B | 08 | 3C | 02 | 0B | 08 | 4A | 02 | 0B | 08 | 53 | 02 | 0B |
| 01A58 | 08 | 6D | 02 | 0B | 08 | 7E | 02 | 0B | 08 | 92 | 02 | 0B | 08 | A3 | 02 | 0B | 08 | AD | 02 | 0B | 08 | B6 | 02 | 0B |
| 01A70 | 08 | BB | 02 | 0B | 08 | D5 | 02 | 0B | 08 | DE | 02 | 0B | 08 | E7 | 02 | 0B | 08 | FE | 02 | 0B | 08 | 15 | 03 | 0B |
| 01A88 | 08 | 2A | 03 | 0B | 08 | 43 | 03 | 0B | 08 | 59 | 03 | 0B | 08 | 62 | 03 | 0B | 08 | 78 | 03 | 0B | 08 | 87 | 03 | 0B |
| 01AA0 | 08 | 97 | 03 | 0B | 08 | A3 | 03 | 0B | 08 | AC | 03 | 0B | 08 | BB | 03 | 0B | 08 | D0 | 03 | 0B | 08 | FB | 03 | 0B |

```
01AB8  08 10 04 0B  08 25 04 0B  08 48 04 0B  08 76 04 0B  08 8B 04 0B  08 B4 04 0B
01AD0  08 CE 04 0B  08 D3 04 0B  08 ED 04 0B  08 F6 04 0B  08 FF 04 0B  08 0F 05 0B
01AE8  08 21 05 0B  08 26 05 0B  08 32 05 0B  08 37 05 0B  08 40 05 0B  08 55 05 0B
01B00  08 76 05 0B  08 89 05 0B  08 8E 05 0B  08 93 05 0B  08 9F 05 0B  08 AC 05 0B
01B18  08 B9 05 0B  08 C8 05 0B  08 DB 05 0B  08 E4 05 0B  08 E9 05 0B  08 01 06 0B
01B30  08 0A 06 0B  08 13 06 0B  08 18 06 0B  08 24 06 0B  08 39 06 0B  08 54 06 0B
01B48  08 67 06 0B  08 7F 06 0B  08 92 06 0B  08 9B 06 0B  08 A0 06 0B  08 B8 06 0B
01B60  08 BD 06 0B  08 17 00 77  08 20 00 77  08 29 00 77  08 43 00 77  08 5C 00 77
01B78  08 65 00 77  08 72 00 77  08 87 00 77  08 90 00 77  08 A5 00 77  08 AE 00 77
01B90  08 CC 00 77  08 E1 00 77  08 E6 00 77  08 FE 00 77  08 07 01 77  08 10 01 77
01BA8  08 25 01 77  08 2E 01 77  08 3E 01 77  08 47 01 77  08 5E 01 77  08 6F 01 77
01BC0  08 85 01 77  08 8E 01 77  08 9D 01 77  08 B0 01 77  08 C2 01 77  08 E8 01 77
01BD8  08 08 02 77  08 25 02 77  08 40 02 77  08 54 02 77  08 6A 02 77  08 84 02 77
01BF0  08 8D 02 77  08 A4 02 77  08 AD 02 77  08 B2 02 77  08 BB 02 77  08 D6 02 77
01C08  08 E5 02 77  08 F7 02 77  08 12 03 77  08 26 03 77  08 3A 03 77  08 3F 03 77
01C20  08 57 03 77  08 60 03 77  08 69 03 77  08 72 03 77  08 77 03 77  08 83 03 77
01C38  08 91 03 77  08 96 03 77  08 A3 03 77  08 B0 03 77  08 D1 03 77  08 D6 03 77
01C50  08 EE 03 77  08 F7 03 77  08 00 04 77  08 13 04 77  08 23 04 77  08 3C 04 77
01C68  08 45 04 77  08 5A 04 77  08 63 04 77  08 7B 04 77  08 8A 04 77  08 97 04 77
01C80  08 A4 04 77  08 AD 04 77  08 BD 04 77  08 C6 04 77  08 CF 04 77  08 E2 04 77
01C98  08 F5 04 77  08 06 05 77  08 0F 05 77  08 1D 05 77  08 51 05 77  08 62 05 77
01CB0  08 77 05 77  08 85 05 77  08 99 05 77  08 AE 05 77  08 C9 05 77  08 D2 05 77
01CC8  08 ED 05 77  08 F6 05 77  08 12 06 77  08 1B 06 77  08 36 06 77  08 3F 06 77
01CE0  08 5B 06 77  08 64 06 77  08 69 06 77  08 72 06 77  08 84 06 77  08 89 06 77
01CF8  08 98 06 77  08 A1 06 77  08 BA 06 77  08 D3 06 77  08 DC 06 77  08 F1 06 77
01D10  08 FA 06 77  08 0F 07 77  08 1E 07 77  08 27 07 77  08 3C 07 77  08 45 07 77
01D28  08 61 07 77  08 6A 07 77  08 BE 07 77  08 C7 07 77  08 DC 07 77  08 F1 07 77
01D40  08 FF 07 77  08 18 08 77  08 21 08 77  08 36 08 77  08 3F 08 77  08 54 08 77
01D58  08 5D 08 77  08 75 08 77  08 84 08 77  08 8D 08 77  08 92 08 77  08 AA 08 77
01D70  08 AF 08 77  08 1F 00 04  09 26 00 04  09 5C 00 04  09 2C 00 20  09 61 00 20
01D88  09 69 00 20  09 79 00 20  09 81 00 20  09 CA 00 20  09 E8 00 20  09 42 01 20
01DA0  09 78 01 20  09 8F 01 20  09 D0 01 20  09 E8 01 20  09 11 02 20  09 31 02 20
01DB8  09 36 02 20  09 A4 02 20  09 DF 02 20  09 F0 02 20  09 40 03 20  09 54 03 20
01DD0  09 91 03 20  09 C3 03 20  09 D1 03 20  09 E5 03 20  09 15 04 20  09 33 04 20
01DE8  09 4A 04 20  09 56 04 20  09 74 04 20  09 8E 04 20  09 93 04 20  09 A7 04 20
01E00  09 EA 04 20  09 FC 04 20  09 04 05 20  09 09 05 20  09 1D 05 20  09 3B 05 20
01E18  09 64 05 20  09 81 05 20  09 86 05 20  09 9A 05 20  09 A9 05 20  09 BD 05 20
01E30  09 CE 05 20  09 E2 05 20  09 FF 05 20  09 0F 06 20  09 14 06 20  09 2B 06 20
01E48  09 36 06 20  09 42 06 20  09 50 06 20  09 67 06 20  09 E2 06 20  09 08 07 20
01E60  09 23 07 20  09 28 07 20  09 3C 07 20  09 73 07 20  09 78 07 20  09 8C 07 20
01E78  09 A6 07 20  09 B8 07 20  09 C8 07 20  09 FE 07 20  09 20 08 20  09 2E 08 20
01E90  09 3D 08 20  09 59 08 20  09 6D 08 20  09 C9 08 20  09 DE 08 20  09 EA 08 20
01EA8  09 14 09 20  09 19 09 20  09 2D 09 20  09 75 09 20  09 7D 09 20  09 82 09 20
01EC0  09 96 09 20  09 BB 09 20  09 C0 09 20  09 D4 09 20  09 DF 09 20  09 04 0A 20
01ED8  09 14 0A 20  09 19 0A 20  09 74 0A 20  09 84 0A 20  09 A3 0A 20  09 B1 0A 20
01EF0  09 C5 0A 20  09 D6 0A 20  09 EA 0A 20  09 FD 0A 20  09 11 0B 20  09 1D 0B 20
01F08  09 40 0B 20  09 50 0B 20  09 60 0B 20  09 8D 0B 20  09 92 0B 20  09 A6 0B 20
01F20  09 B2 0B 20  09 C7 0B 20  09 E1 0B 20  09 F4 0B 20  09 FC 0B 20  09 01 0C 20
01F38  09 15 0C 20  09 31 0C 20  09 42 0C 20  09 54 0C 20  09 66 0C 20  09 6F 0C 20
01F50  09 78 0C 20  09 7D 0C 20  09 8F 0C 20  09 A0 0C 20  09 B1 0C 20  09 B6 0C 20
01F68  09 D3 0C 20  09 DC 01 EE  09 E6 01 EE  09 F0 01 EE  09 FA 01 EE  09 04 02 EE
01F80  09 1D 02 EE  09 26 02 EE  09 2F 02 EE  09 38 02 EE  09 41 02 EE  09 4A 02 EE
01F98  09 53 02 EE  09 EF 02 EE  09 19 00 23  0A 7D 00 23  0A 94 00 23  0A A3 00 23
01FB0  0A AD 00 23  0A C4 00 23  0A 55 01 23  0A 6C 01 23  0A 7B 01 23  0A 85 01 23
01FC8  0A 9C 01 23  0A EF 01 23  0A 06 02 23  0A 11 02 23  0A 1B 02 23  0A 32 02 23
01FE0  0A 9C 02 23  0A B3 02 23  0A BE 02 23  0A C8 02 23  0A DF 02 23  0A F4 02 23
01FF8  0A 0E 03 23  0A 21 03 23  0A 35 03 23  0A 4E 03 23  0A 89 03 23  0A 8E 03 23
02010  0A A2 03 23  0A C2 03 23  0A EF 03 23  0A 04 04 23  0A 17 04 23  0A 2B 04 23
02028  0A 38 04 23  0A 77 04 23  0A 8B 04 23  0A 98 04 23  0A A9 04 23  0A DE 04 23
02040  0A F2 04 23  0A 73 05 23  0A 8A 05 23  0A E0 05 23  0A F7 05 23  0A 10 06 23
02058  0A 18 06 23  0A 2F 06 23  0A 49 06 23  0A 51 06 23  0A 68 06 23  0A 6D 06 23
02070  0A 8A 06 23  0A 0F 00 8C  0A A4 00 8C  0A 27 00 96  0A 50 00 96  0A 71 00 96
02088  0A B5 01 96  0A 1B 00 B1  0A 26 00 B1  0A 62 00 B1  0A 9F 00 B1  0A BD 00 B1
020A0  0A C2 00 B1  0A D9 00 B1  0A E4 00 B1  0A 4C 01 B1  0A 51 01 B1  0A 65 01 B1
020B8  0A 75 01 B1  0A AC 01 B1  0A C0 01 B1  0A D9 01 B1  0A E4 01 B1  0A F8 01 B1
020D0  0A 04 02 B1  0A 32 02 B1  0A 9F 02 B1  0A C2 02 B1  0A D7 02 B1  0A DF 02 B1
020E8  0A E4 02 B1  0A F8 02 B1  0A 14 03 B1  0A 19 03 B1  0A 2D 03 B1  0A 44 03 B1
```

```
02100  0A 49 03 B1 0A 5D 03 B1 0A 62 03 B1 0A 7F 03 B1 0A 15 00 E9 0A 47 00 E9
02118  0A 5E 00 E9 0A 79 00 E9 0A 90 00 E9 0A 05 01 E9 0A 1C 01 E9 0A 93 01 E9
02130  0A AA 01 E9 0A CF 01 E9 0A 02 02 E9 0A 19 02 E9 0A 28 02 E9 0A D1 02 E9
02148  0A E8 02 E9 0A F7 02 E9 0A 69 03 E9 0A 80 03 E9 0A 95 03 E9 0A AD 03 E9
02160  0A BA 03 E9 0A D1 03 E9 0A F0 03 E9 0A 04 04 E9 0A 10 04 E9 0A 30 04 E9
02178  0A 44 04 E9 0A 54 04 E9 0A 7B 04 E9 0A 8D 04 E9 0A A1 04 E9 0A A6 04 E9
02190  0A C3 04 E9 0A 37 00 36 0B 72 00 36 0B 81 00 36 0B 8A 00 36 0B EC 00 36
021A8  0B F0 00 36 0B 28 01 36 0B 2D 01 36 0B 32 01 36 0B 37 01 36 0B 3C 01 36
021C0  0B 41 01 36 0B 8D 01 36 0B C0 00 4F 0B EB 00 4F 0B 9A 01 4F 0B B0 01 4F
021D8  0B 50 03 4F 0B 69 03 4F 0B A1 03 4F 0B 17 00 89 0B 2B 00 89 0B 30 00 89
021F0  0B 42 00 89 0B 56 00 89 0B 5B 00 89 0B 6D 00 89 0B 81 00 89 0B 86 00 89
02208  0B 98 00 89 0B AC 00 89 0B B1 00 89 0B C3 00 89 0B D7 00 89 0B DC 00 89
02220  0B EE 00 89 0B 02 01 89 0B 07 01 89 0B 19 01 89 0B 3D 01 89 0B 42 01 89
02238  0B 59 01 89 0B 7D 01 89 0B 82 01 89 0B 99 01 89 0B B4 01 89 0B BF 01 89
02250  0B D6 01 89 0B FA 01 89 0B 05 02 89 0B 1C 02 89 0B 3A 02 89 0B 54 02 89
02268  0B 82 02 89 0B A6 02 89 0B AB 02 89 0B C2 02 89 0B CA 02 89 0B ED 02 89
02280  0B F2 02 89 0B 06 03 89 0B 4E 03 89 0B 69 03 89 0B 83 03 89 0B 90 03 89
02298  0B F7 03 89 0B 0E 04 89 0B 13 04 89 0B 30 04 89 0B 71 02 CD 0B 5C 00 F4
022B0  0B 80 00 F4 0B 99 00 F4 0B BF 00 F4 0B CB 00 F4 0B 28 02 F4 0B 45 02 F4
022C8  0B 5F 02 F4 0B 7C 02 F4 0B 9E 02 F4 0B B5 02 F4 0B CB 02 F4 0B F6 02 F4
022E0  0B 1C 03 F4 0B 34 03 F4 0B 45 03 F4 0B 83 03 F4 0B A9 03 F4 0B CC 03 F4
022F8  0B F6 03 F4 0B 15 04 F4 0B 2E 04 F4 0B 3A 04 F4 0B 5B 04 F4 0B 6A 04 F4
02310  0B 76 04 F4 0B B4 04 F4 0B D0 04 F4 0B 5F 05 F4 0B B9 06 F4 0B 27 07 F4
02328  0B 3B 07 F4 0B 61 07 F4 0B BB 07 F4 0B 70 08 F4 0B C4 08 F4 0B E2 08 F4
02340  0B 08 09 F4 0B 31 09 F4 0B 8B 09 F4 0B FE 09 F4 0B 2B 0A F4 0B 47 0A F4
02358  0B BD 0A F4 0B 1F 0B F4 0B 68 00 A6 0C 82 00 A6 0C 99 00 A6 0C C1 00 A6
02370  0C F6 00 B2 0C 0E 01 B2 0C 41 01 B2 0C 49 01 B2 0C 5D 01 B2 0C 64 01 B2
02388  0C 69 01 B2 0C 80 01 B2 0C 85 01 B2 0C A2 01 B2 0C 1C 00 CC 0C B1 00 CC
023A0  0C B6 00 CC 0C D6 00 CC 0C 13 01 CC 0C 8B 01 CC 0C 0C 02 CC 0C 11 02 CC
023B8  0C 16 02 CC 0C 2C 02 CC 0C 31 02 CC 0C 18 00 EF 0C 29 00 EF 0C 2E 00 EF
023D0  0C 5F 00 EF 0C F5 00 EF 0C 06 01 EF 0C 3F 01 EF 0C 65 01 EF 0C 41 00 05
023E8  0D 2E 00 09 0D 5D 00 09 0D 6C 00 09 0D 77 00 09 0D CD 00 09 0D D6 33 5C
02400  0D 02 00 17 0D B1 00 17 0D 71 01 25 0D 7B 01 25 0D B0 01 25 0D A6 00 41
02418  0D 00 00 00 00 00 00 00 00 00 00 00 00 00 00 00 00 00 00 00 00 00 00 00
025F8  00 00 00 00 00 00 00 00 55 8B EC 81 EC 04 00 9A 09 0C 20 09 B8 74 B7 50
02610  B8 72 EB 50 9A 03 00 8C 0A B8 98 CE 50 B8 01 00 50 33 C0 50 9A 30 07 20
02628  09 B8 24 C7 50 B8 01 00 50 33 C0 50 9A 30 07 20 09 B8 1C CC 50 B8 50 00
02640  50 B8 01 00 50 9A 30 07 20 09 B8 A0 C9 50 B8 01 00 50 33 C0 50 9A 30 07
02658  20 09 B8 50 C4 50 B8 5A 00 50 33 C0 50 9A 30 07 20 09 B8 1D 00 50 9A 73
02670  00 8C 0A B8 1F 00 50 9A 73 00 8C 0A 9A 3F 0B 2E 01 B8 20 00 50 9A 73 00
02688  8C 0A C6 06 1C D1 00 B8 21 00 50 9A 73 00 8C 0A 9A B7 06 47 06 B8 22 00
026A0  50 9A 73 00 8C 0A C4 1E 1E C4 BF 4E D1 B9 A0 0F 9A C3 02 EE 09 B8 23 00
026B8  50 9A 73 00 8C 0A B8 24 00 50 9A 73 00 8C 0A F6 06 26 D1 01 75 03 E9 BA
026D0  00 B8 25 00 50 9A 73 00 8C 0A C6 06 84 B7 2D B8 26 00 50 9A 73 00 8C 0A
026E8  C7 06 EE E0 01 00 8B 36 EE E0 C6 84 84 B7 CD A1 EE E0 40 A3 EE E0 3D 2E
02700  00 75 EB B8 27 00 50 9A 73 00 8C 0A B8 0E 00 50 B8 01 00 50 9A 94 02 47
02718  06 B8 28 00 50 9A 73 00 8C 0A BF 84 B7 BE 7A EB B9 0B 00 1E 07 FC F3 A5
02730  B8 0E 00 50 B8 0C 00 50 9A 94 02 47 06 B8 29 00 50 9A 73 00 8C 0A C4 1E
02748  3C C4 83 C3 1E BF 84 B7 B9 0F 00 9A C3 02 EE 09 B8 0E 00 50 B8 21 00 50
02760  9A 94 02 47 06 B8 2A 00 50 9A 73 00 8C 0A C6 06 26 D1 00 B8 2B 00 50 9A
02778  73 00 8C 0A C4 1E 1E C4 BF 4E D1 B9 A0 0F 9A C3 02 EE 09 B8 2C 00 50 9A
02790  73 00 8C 0A 9A AD 03 3F 00 B8 2D 00 50 9A 73 00 8C 0A 8B 1E 80 B7 32 FF
027A8  E9 9E 01 B8 2E 00 50 9A 73 00 8C 0A B8 2F 00 50 9A 73 00 8C 0A 9A 01 00
027C0  21 01 B8 30 00 50 9A 73 00 8C 0A B8 40 C4 50 B8 90 EB 50 9A FA 01 23 0A
027D8  D1 E8 73 45 B8 31 00 50 9A 73 00 8C 0A C4 1E 3C C4 26 8B 47 36 A3 4C D1
027F0  83 C3 36 26 C7 07 01 00 B8 32 00 50 9A 73 00 8C 0A C6 06 82 B7 00 9A 01
02808  00 9C 00 B8 33 00 50 9A 73 00 8C 0A C4 1E 3C C4 83 C3 36 A1 4C D1 26 89
02820  07 B8 34 00 50 9A 73 00 8C 0A E9 72 01 B8 35 00 50 9A 73 00 8C 0A B8 36
02838  00 50 9A 73 00 8C 0A C4 1E 3C C4 26 8B 47 36 A3 4C D1 83 C3 36 26 C7 07
02850  22 00 B8 37 00 50 9A 73 00 8C 0A 9A 36 0C 3D 03 B8 38 00 50 9A 73 00 8C
02868  0A C4 1E 3C C4 83 C3 36 A1 4C D1 26 89 07 E9 26 01 B8 39 00 50 9A 73 00
02880  8C 0A B8 3A 00 50 9A 73 00 8C 0A C4 1E 3C C4 83 C3 1E 06 53 B8 90 EB 1E
02898  50 9A 88 00 23 0A D1 E8 73 1A B8 3B 00 50 9A 73 00 8C 0A C4 1E 3C C4 26
028B0  8B 47 33 3C 01 75 05 9A 7A 02 ED 00 B8 3C 00 50 9A 73 00 8C 0A 9A 55 03
028C8  2E 01 B8 3D 00 50 9A 73 00 8C 0A E9 C9 00 B8 3E 00 50 9A 73 00 8C 0A B8
028E0  3F 00 50 9A 73 00 8C 0A 9A 35 00 3D 03 B8 40 00 50 9A 73 00 8C 0A C4 1E
028F8  3C C4 83 C3 1E 06 53 B8 90 EB 1E 50 9A 88 00 23 0A D1 E8 73 1A B8 41 00
```

```
02910  50 9A 73 00 8C 0A C4 1E 3C C4 26 8B 47 33 3C 01 75 05 9A 0B 00 ED 00 B8
02928  42 00 50 9A 73 00 8C 0A E9 A0 00 EB 6A B8 43 00 50 9A 73 00 8C 0A B8 44
02940  00 50 9A 73 00 8C 0A EB 56 81 FB EC 00 77 E6 83 FB 1A 76 E1 83 FB 1B 77
02958  03 E9 7A FF 83 FB 4C 76 D4 83 FB 4D 77 03 E9 C4 FE 83 FB 53 76 C7 83 FB
02970  54 77 03 E9 35 FE 83 FB 6C 76 BA 83 FB 6D 77 03 E9 AA FE 83 FB 73 76 AD
02988  83 FB 74 77 03 E9 1B FE 81 FB EB 00 76 9F 81 FB EC 00 77 03 E9 DA FE B8
029A0  45 00 50 9A 73 00 8C 0A C4 1E 1E C4 BE 4E D1 B9 D0 07 8B FB FC F3 A5 B8
029B8  46 00 50 9A 73 00 8C 0A F6 06 1C D1 01 75 03 E9 F4 FC B8 47 00 50 9A 73
029D0  00 8C 0A 9A 47 00 8C 0A 8B E5 5D CB 00 00 00 55 1E B0 B6 E6 43 B8 97 0A
029E8  E6 42 8A C4 E6 42 E4 61 0C 03 E6 61 1F 5D CB 00 55 8B EC 81 EC 02 00 B8
02A00  F4 E0 50 B8 94 EB 50 9A 03 00 8C 0A B8 13 00 50 9A 73 00 8C 0A B8 14 00
02A18  50 9A 73 00 8C 0A 9A 00 00 03 09 89 46 FE B8 15 00 50 9A 73 00 8C 0A 83
02A30  7E FE 00 74 35 B8 16 00 50 9A 73 00 8C 0A 9A 00 00 E5 11 89 46 FE 8B 46
02A48  FE A2 80 B7 B8 17 00 50 9A 73 00 8C 0A C4 1E 22 C4 26 8B 07 32 E4 A3 84
02A60  B8 B8 18 00 50 9A 73 00 8C 0A B8 19 00 50 9A 73 00 8C 0A 8B 5E FE E9 91
02A78  01 B8 1D 00 50 9A 73 00 8C 0A C6 06 80 B7 ED E9 00 03 B8 1E 00 50 9A 73
02A90  00 8C 0A C6 06 80 B7 EC E9 EF 02 B8 1F 00 50 9A 73 00 8C 0A C6 06 80 B7
02AA8  EA E9 DE 02 B8 20 00 50 9A 73 00 8C 0A C6 06 80 B7 FE E9 CD 02 B8 21 00
02AC0  50 9A 73 00 8C 0A C6 06 80 B7 E0 E9 BC 02 B8 22 00 50 9A 73 00 8C 0A C6
02AD8  06 80 B7 15 E9 AB 02 B8 23 00 50 9A 73 00 8C 0A C6 06 80 B7 1E E9 9A 02
02AF0  B8 24 00 50 9A 73 00 8C 0A C6 06 80 B7 E5 E9 89 02 B8 25 00 50 9A 73 00
02B08  8C 0A C6 06 80 B7 F1 E9 78 02 B8 26 00 50 9A 73 00 8C 0A C6 06 80 B7 84
02B20  E9 67 02 B8 27 00 50 9A 73 00 8C 0A C6 06 80 B7 FC E9 56 02 B8 28 00 50
02B38  9A 73 00 8C 0A C6 06 80 B7 E7 E9 45 02 B8 29 00 50 9A 73 00 8C 0A C6 06
02B50  80 B7 E8 E9 34 02 B8 2A 00 50 9A 73 00 8C 0A C6 06 80 B7 E3 E9 23 02 B8
02B68  2B 00 50 9A 73 00 8C 0A C6 06 80 B7 06 E9 12 02 B8 2C 00 50 9A 73 00 8C
02B80  0A C6 06 80 B7 E6 E9 01 02 B8 2D 00 50 9A 73 00 8C 0A C6 06 80 B7 F2 E9
02B98  F0 01 B8 2E 00 50 9A 73 00 8C 0A C6 06 80 B7 FB E9 DF 01 B8 2F 00 50 9A
02BB0  73 00 8C 0A C6 06 80 B7 10 E9 CE 01 B8 30 00 50 9A 73 00 8C 0A C6 06 80
02BC8  B7 E2 E9 BD 01 B8 31 00 50 9A 73 00 8C 0A C6 06 80 B7 EB E9 AC 01 B8 32
02BE0  00 50 9A 73 00 8C 0A C6 06 80 B7 FD E9 9B 01 B8 34 00 50 9A 73 00 8C 0A
02BF8  8B 46 FE A2 80 B7 B8 35 00 50 9A 73 00 8C 0A E9 80 01 81 FB 00 5B 77 DF
02C10  81 FB FF 3E 76 D9 81 FB 00 3F 77 03 E9 5A FE 81 FB FF 3F 76 CA 81 FB 00
02C28  40 77 03 E9 5C FE 81 FB FF 40 76 BB 81 FB 00 41 77 03 E9 5E FE 81 FB FF
02C40  41 76 AC 81 FB 00 42 77 03 E9 60 FE 81 FB FF 43 76 9D 81 FB 00 44 77 03
02C58  E9 62 FE 81 FB FF 46 76 8E 81 FB 00 47 77 03 E9 64 FE 81 FB FF 47 77 03
02C70  E9 7C FF 81 FB 00 48 77 03 E9 63 FE 81 FB 37 48 77 03 E9 6A FF 81 FB 38
02C88  48 77 03 E9 62 FE 81 FB FF 48 77 03 E9 58 FF 81 FB 00 49 77 03 E9 61 FE
02CA0  81 FB 38 49 77 03 E9 46 FF 81 FB 39 49 77 03 E9 60 FE 81 FB FF 4A 77 03
02CB8  E9 34 FF 81 FB 00 4B 77 03 E9 5F FE 81 FB 33 4B 77 03 E9 22 FF 81 FB 34
02CD0  4B 77 03 E9 5E FE 81 FB FF 4C 77 03 E9 10 FF 81 FB 00 4D 77 03 E9 5D FE
02CE8  81 FB 35 4D 77 03 E9 FE FE 81 FB 36 4D 77 03 E9 5C FE 81 FB FF 4F 77 03
02D00  E9 EC FE 81 FB 00 50 77 03 E9 5B FE 81 FB 31 50 77 03 E9 DA FE 81 FB 32
02D18  50 77 03 E9 5A FE 81 FB FF 50 77 03 E9 C8 FE 81 FB 00 51 77 03 E9 59 FE
02D30  81 FB 32 51 77 03 E9 B6 FE 81 FB 33 51 77 03 E9 58 FE 81 FB FF 52 77 03
02D48  E9 A4 FE 81 FB 00 53 77 03 E9 57 FE 81 FB 2D 53 77 03 E9 92 FE 81 FB 2E
02D60  53 77 03 E9 56 FE 81 FB FF 59 77 03 E9 80 FE 81 FB 00 5A 77 03 E9 55 FE
02D78  81 FB FF 5A 77 03 E9 6E FE 81 FB 00 5B 77 03 E9 54 FE B8 37 00 50 9A 73
02D90  00 8C 0A 9A 47 00 8C 0A 8B E5 5D CB 55 8B EC 81 EC 00 00 B8 F4 E0 50 B8
02DA8  A4 EB 50 9A 03 00 8C 0A B8 3A 00 50 9A 73 00 8C 0A B8 3B 00 50 9A 73 00
02DC0  8C 0A 9A 09 00 3F 00 80 3E 80 B7 00 74 F4 B8 3C 00 50 9A 73 00 8C 0A 9A
02DD8  47 00 8C 0A 8B E5 5D CB 55 8B EC 81 EC 00 00 B8 F4 E0 50 B8 B4 EB 50 9A
02DF0  03 00 8C 0A B8 45 00 50 9A 73 00 8C 0A B8 46 00 50 9A 73 00 8C 0A A1 82
02E08  B7 32 E4 50 B8 1F 00 50 B8 C8 EB 50 9A F1 02 EE 09 D1 E8 73 28 B8 47 00
02E20  50 9A 73 00 8C 0A B8 FF 00 50 B8 0E C3 1E 50 B8 01 00 50 B8 82 B7 1E 50
02E38  9A D3 02 23 0A C6 06 82 B7 00 E9 4B 01 B8 48 00 50 9A 73 00 8C 0A B8 49
02E50  00 50 9A 73 00 8C 0A F6 06 18 D1 01 74 53 B8 4A 00 50 9A 73 00 8C 0A C4
02E68  1E 32 C4 8B 36 3A C4 26 8B 00 3C FF 74 26 B8 4B 00 50 9A 73 00 8C 0A C4
02E80  1E 32 C4 8B 36 3A C4 26 8B 00 A2 80 B7 B8 4C 00 50 9A 73 00 8C 0A FF 06
02E98  3A C4 EB 13 B8 4D 00 50 9A 73 00 8C 0A C6 06 18 D1 00 9A AD 03 3F 00 EB
02EB0  0E B8 4E 00 50 9A 73 00 8C 0A 9A AD 03 3F 00 B8 4F 00 50 9A 73 00 8C 0A
02EC8  B8 50 00 50 9A 73 00 8C 0A A1 80 B7 32 E4 50 B8 1F 00 50 B8 C8 EB 50 9A
02EE0  F1 02 EE 09 D1 E8 73 4A B8 51 00 50 9A 73 00 8C 0A A1 0E C3 32 E4 0B C0
02EF8  7E 08 A1 80 B7 A2 82 B7 EB 25 B8 52 00 50 9A 73 00 8C 0A B8 FF 00 50 B8
02F10  0E C3 1E 50 B8 01 00 50 B8 80 B7 1E 50 9A D3 02 23 0A C6 06 82 B7 00 B8
02F28  53 00 50 9A 73 00 8C 0A EB 67 B8 54 00 50 9A 73 00 8C 0A B8 FF 00 50 B8
02F40  0E C3 1E 50 B8 01 00 50 B8 80 B7 1E 50 9A D3 02 23 0A B8 55 00 50 9A 73
```

```
02F58  00 8C 0A A1 18 C4 2B 06 16 C4 8B D0 A1 0E C3 32 E4 3B D0 75 02 EB 2A B8
02F70  56 00 50 9A 73 00 8C 0A 9A 09 00 3F 00 B8 57 00 50 9A 73 00 8C 0A 80 3E
02F88  80 B7 00 74 03 E9 38 FF B8 58 00 50 9A 73 00 8C 0A 9A 47 00 8C 0A 8B E5
02FA0  5D CB 55 8B EC 81 EC 04 00 B8 F4 E0 50 B8 E8 EB 50 9A 03 00 8C 0A 9A 47
02FB8  00 8C 0A 8B E5 5D CB 00 55 8B EC 81 EC 02 00 B8 08 E1 50 B8 F6 EB 50 9A
02FD0  03 00 8C 0A B8 32 00 50 9A 73 00 8C 0A B8 33 00 50 9A 73 00 8C 0A B8 34
02FE8  00 50 9A 73 00 8C 0A A1 06 EC A2 0E C3 B8 35 00 50 9A 73 00 8C 0A 9A 0F
03000  00 28 07 B8 36 00 50 9A 73 00 8C 0A 9A F1 03 3F 00 B8 37 00 50 9A 73 00
03018  8C 0A 8B 1E 0F C3 32 FF E9 7B 03 B8 38 00 50 9A 73 00 8C 0A 9A DC 03 77
03030  08 E9 F4 03 B8 39 00 50 9A 73 00 8C 0A 9A 84 00 28 07 E9 E3 03 B8 3A 00
03048  50 9A 73 00 8C 0A 9A 50 02 28 07 E9 D2 03 B8 3B 00 50 9A 73 00 8C 0A 9A
03060  DD 08 28 07 E9 C1 03 B8 3C 00 50 9A 73 00 8C 0A 9A 67 08 28 07 E9 B0 03
03078  B8 3D 00 50 9A 73 00 8C 0A 9A 18 05 28 07 E9 9F 03 B8 3E 00 50 9A 73 00
03090  8C 0A 9A F7 03 28 07 E9 8E 03 B8 3F 00 50 9A 73 00 8C 0A F6 06 1A D1 01
030A8  74 07 9A DC 03 77 08 EB 0C B8 40 00 50 9A 73 00 8C 0A E9 86 03 E9 68 03
030C0  B8 41 00 50 9A 73 00 8C 0A 80 3E 1A D1 00 74 03 E9 C8 02 8B 1E 0F C3 32
030D8  FF E9 F0 01 B8 42 00 50 9A 73 00 8C 0A 9A D5 0D 58 04 E9 AE 02 B8 43 00
030F0  50 9A 73 00 8C 0A 9A 0F 08 5A 02 E9 9D 02 B8 44 00 50 9A 73 00 8C 0A 9A
03108  EE 05 28 07 E9 8C 02 B8 45 00 50 9A 73 00 8C 0A 9A 1E 04 BF 07 E9 7B 02
03120  B8 46 00 50 9A 73 00 8C 0A 9A EF 03 BF 07 E9 6A 02 B8 47 00 50 9A 73 00
03138  8C 0A 9A 7C 04 BF 07 E9 59 02 B8 48 00 50 9A 73 00 8C 0A 9A 4D 04 BF 07
03150  E9 48 02 B8 49 00 50 9A 73 00 8C 0A 9A DB 04 0B 08 E9 37 02 B8 4A 00 50
03168  9A 73 00 8C 0A FF 36 9C B9 FF 36 9E B9 B8 01 00 50 9A C3 02 0B 08 E9 1A
03180  02 B8 4C 00 50 9A 73 00 8C 0A 9A EF 05 0B 08 E9 09 02 B8 4D 00 50 9A 73
03198  00 8C 0A 9A FD 07 28 07 E9 F8 01 B8 4E 00 50 9A 73 00 8C 0A 9A 32 08 28
031B0  07 E9 E7 01 B8 4F 00 50 9A 73 00 8C 0A 9A 6B 0B 58 04 E9 D6 01 B8 50 00
031C8  50 9A 73 00 8C 0A 9A D0 0B 58 04 E9 C5 01 B8 51 00 50 9A 73 00 8C 0A B8
031E0  52 00 50 9A 73 00 8C 0A C4 1E 3C C4 83 C3 1E 06 53 B8 06 EC 1E 50 9A 88
031F8  00 23 0A D1 E8 73 1A B8 53 00 50 9A 73 00 8C 0A C4 1E 3C C4 26 8B 47 33
03210  3C 01 75 05 9A 7A 02 ED 00 B8 54 00 50 9A 73 00 8C 0A A1 08 EC A3 84 B7
03228  B8 55 00 50 9A 73 00 8C 0A C7 46 FE 19 00 B8 56 00 50 9A 73 00 8C 0A B8
03240  18 00 50 FF 76 FE 9A 94 02 47 06 8B 46 FE 40 89 46 FE 3D 28 00 75 DF B8
03258  57 00 50 9A 73 00 8C 0A 9A 55 03 2E 01 B8 58 00 50 9A 73 00 8C 0A C4 1E
03270  3C C4 83 C3 1E BF 84 B7 B9 0F 00 9A C3 02 EE 09 B8 59 00 50 9A 73 00 8C
03288  0A B8 18 00 50 B8 19 00 50 9A 94 02 47 06 B8 5A 00 50 9A 73 00 8C 0A E9
032A0  F9 00 B8 5C 00 50 9A 73 00 8C 0A FF 36 9C B9 FF 36 9E B9 B8 FF 00 50 B8
032B8  0E C3 50 9A CD 01 58 04 B8 5E 00 50 9A 73 00 8C 0A E9 CF 00 81 FB FE 00
032D0  77 D0 83 FB 07 76 CB 83 FB 08 77 03 E9 74 FE 83 FB 0F 76 BE 83 FB 10 77
032E8  03 E9 78 FE 83 FB 14 76 B1 83 FB 15 77 03 E9 05 FE 81 FB 83 00 76 A3 81
03300  FB 84 00 77 03 E9 07 FE 81 FB E1 00 76 94 81 FB E2 00 77 03 E9 6A FE 81
03318  FB E4 00 76 85 81 FB E5 00 77 03 E9 7D FE 81 FB E6 00 77 03 E9 63 FE 81
03330  FB E9 00 77 03 E9 6A FF 81 FB EA 00 77 03 E9 73 FE 81 FB EB 00 77 03 E9
03348  7B FE 81 FB EC 00 77 03 E9 83 FE 81 FB ED 00 77 03 E9 80 FD 81 FB F0 00
03360  77 03 E9 3D FF 81 FB F1 00 77 03 E9 C3 FD 81 FB F2 00 77 03 E9 CB FD 81
03378  FB FA 00 77 03 E9 22 FF 81 FB FB 00 77 03 E9 97 FD 81 FB FD 00 77 03 E9
03390  10 FF 81 FB FE 00 77 03 E9 52 FD E9 8A 00 81 FB FC 00 76 03 E9 19 FD 83
033A8  FB 05 77 03 E9 11 FD 83 FB 06 77 03 E9 C1 FC 83 FB 1A 77 03 E9 01 FD 83
033C0  FB 1B 77 03 E9 D3 FC 83 FB 1D 77 03 E9 F1 FC 83 FB 1E 77 03 E9 B2 FC 81
033D8  FB DF 00 77 03 E9 E0 FC 81 FB E0 00 77 03 E9 3A FC 81 FB E2 00 77 03 E9
033F0  CE FC 81 FB E3 00 77 03 E9 5B FC 81 FB E6 00 77 03 E9 BC FC 81 FB E7 00
03408  77 03 E9 5A FC 81 FB E8 00 77 03 E9 2F FC 81 FB FB 00 77 03 E9 A1 FC 81
03420  FB FC 00 77 03 E9 0C FC B8 5F 00 50 9A 73 00 8C 0A A1 06 EC A2 0E C3 B8
03438  60 00 50 9A 73 00 8C 0A E9 A3 FB B8 61 00 50 9A 73 00 8C 0A B8 03 00 50
03450  B8 14 00 50 9A 03 00 47 06 B8 03 00 50 B8 15 00 50 9A B5 0A 87 05 B8 62
03468  00 50 9A 73 00 8C 0A F6 06 1A D1 01 74 05 9A 36 02 31 04 B8 63 00 50 9A
03480  73 00 8C 0A 9A 15 01 87 05 B8 64 00 50 9A 73 00 8C 0A B8 50 C4 50 9A B1
03498  05 20 09 B8 65 00 50 9A 73 00 8C 0A A1 06 EC A2 40 C4 B8 66 00 50 9A 73
034B0  00 8C 0A 9A 47 00 8C 0A 8B E5 5D CB 55 8B EC 81 EC 04 00 B8 08 E1 50 B8
034C8  0A EC 50 9A 03 00 8C 0A 9A 47 00 8C 0A 8B E5 5D CB 00 55 8B EC 81 EC 06
034E0  00 B8 1C E1 50 B8 1C EC 50 9A 03 00 8C 0A B8 0F 00 50 9A 73 00 8C 0A B8
034F8  10 00 50 9A 73 00 8C 0A B8 98 CE 50 C4 1E 3C C4 26 8B 47 1E 32 E4 50 C4
03510  1E 3C C4 83 C3 1F 06 53 9A 9B 04 20 09 B8 98 CE 50 9A 8A 09 20 09 B8 11
03528  00 50 9A 73 00 8C 0A C4 1E 3C C4 26 8B 47 1C B9 08 00 D1 F8 79 03 15 00
03540  00 E2 F7 32 E4 A2 12 D1 B8 98 CE 50 9A 61 08 20 09 C4 1E 3C C4 26 8B 47
03558  1C B9 00 01 99 F7 F9 32 F6 92 A2 12 D1 B8 98 CE 50 9A 61 08 20 09 C4 1E
03570  3C C4 26 8B 47 30 B9 08 00 D1 F8 79 03 15 00 00 E2 F7 32 E4 A2 12 D1 B8
03588  98 CE 50 9A 61 08 20 09 C4 1E 3C C4 26 8B 47 30 B9 00 01 99 F7 F9 32 F6
```

```
035A0  92 A2 12 D1 B8 98 CE 50 9A 61 08 20 09 B8 14 00 50 9A 73 00 8C 0A C4 1E
035B8  3C C4 26 8B 47 1C 48 89 46 FA 83 7E FA 00 7D 03 E9 F5 00 C7 46 FE 00 00
035D0  B8 15 00 50 9A 73 00 8C 0A C7 46 FC 00 00 B8 0E 00 F7 66 FE 96 03 76 FC
035E8  C4 1E 2E C4 26 8B 00 A2 12 D1 B8 98 CE 50 9A 61 08 20 09 8B 46 FC 40 89
03600  46 FC 3D 0A 00 75 D7 B8 16 00 50 9A 73 00 8C 0A B8 0E 00 F7 66 FE 96 83
03618  C6 0A C4 1E 2E C4 26 8B 00 B9 08 00 D1 F8 79 03 15 00 00 E2 F7 32 E4 A2
03630  12 D1 B8 98 CE 50 9A 61 08 20 09 B8 0E 00 F7 66 FE 96 83 C6 0A C4 1E 2E
03648  C4 26 8B 00 B9 00 01 99 F7 F9 32 F6 92 A2 12 D1 B8 98 CE 50 9A 61 08 20
03660  09 B8 0E 00 F7 66 FE 96 83 C6 0C C4 1E 2E C4 26 8B 00 B9 08 00 D3 E8 32
03678  E4 A2 12 D1 B8 98 CE 50 9A 61 08 20 09 B8 0E 00 F7 66 FE 96 83 C6 0C C4
03690  1E 2E C4 26 8B 00 25 FF 00 32 E4 A2 12 D1 B8 98 CE 50 9A 61 08 20 09 B8
036A8  19 00 50 9A 73 00 8C 0A 8B 46 FE 40 89 46 FE 48 3B 46 FA 74 03 E9 10 FF
036C0  B8 1A 00 50 9A 73 00 8C 0A C4 1E 3C C4 26 8B 47 30 48 89 46 FA 83 7E FA
036D8  00 7C 28 C7 46 FE 00 00 C4 1E 32 C4 8B 76 FE 26 8B 00 A2 12 D1 B8 98 CE
036F0  50 9A 61 08 20 09 8B 46 FE 40 89 46 FE 48 3B 46 FA 75 DD B8 1B 00 50 9A
03708  73 00 8C 0A C6 06 98 CE 01 B8 1C 00 50 9A 73 00 8C 0A B8 98 CE 50 9A B1
03720  05 20 09 B8 1D 00 50 9A 73 00 8C 0A C4 1E 3C C4 83 C3 33 26 C6 07 00 B8
03738  1E 00 50 9A 73 00 8C 0A 9A 47 00 8C 0A 8B E5 5D CB 55 8B EC 81 EC 02 00
03750  B8 1C E1 50 B8 2C EC 50 9A 03 00 8C 0A B8 23 00 50 9A 73 00 8C 0A B8 24
03768  00 50 9A 73 00 8C 0A 9A 0B 00 ED 00 B8 25 00 50 9A 73 00 8C 0A C4 1E 3C
03780  C4 83 C3 30 26 C7 07 00 00 C4 1E 3C C4 83 C3 1C 26 C7 07 00 00 B8 26 00
03798  50 9A 73 00 8C 0A C7 46 FE 01 00 8B 46 FE 05 1E 00 C4 1E 3C C4 03 D8 26
037B0  C6 07 20 8B 46 FE 40 89 46 FE 3D 0F 00 75 E4 B8 27 00 50 9A 73 00 8C 0A
037C8  C4 1E 3C C4 83 C3 1E A1 3C EC 26 88 07 C4 1E 3C C4 83 C3 34 26 C6 07 01
037E0  B8 28 00 50 9A 73 00 8C 0A 9A 47 00 8C 0A 8B E5 5D CB 55 8B EC 81 EC 04
037F8  00 B8 1C E1 50 B8 3E EC 50 9A 03 00 8C 0A 9A 47 00 8C 0A 8B E5 5D CB 00
03810  55 8B EC 81 EC 04 00 C4 1E 3C C4 26 8B 47 36 89 46 FC C4 1E 3C C4 83 C3
03828  36 26 C7 07 02 00 9A F0 02 87 05 C4 1E 3C C4 83 C3 36 8B 46 FC 26 89 07
03840  A1 16 D1 0A 06 14 D1 75 14 B8 40 C4 50 B8 50 EC 50 9A 90 01 23 0A D1 E8
03858  73 03 E9 7F 00 9A 6F 06 87 05 A1 A6 B9 A3 16 C4 A1 A8 B9 A3 18 C4 A1 16
03870  C4 A3 1A C4 A1 18 C4 A3 1C C4 A1 18 C4 2B 06 16 C4 40 A3 86 B8 9A 09 09
03888  47 06 C7 46 FE 03 00 B8 0A 00 F7 66 FE 96 C7 84 0A C2 00 00 8B 46 FE 40
038A0  89 46 FE 3D 15 00 75 E7 B8 03 00 50 B8 15 00 50 FF 36 9A B9 9A CE 06 87
038B8  05 9A 68 01 47 06 B8 03 00 50 B8 14 00 50 9A C5 01 47 06 C7 06 0E C4 00
038D0  00 C7 06 10 C4 00 00 C6 06 1A D1 00 8B E5 5D CB 55 8B EC 81 EC 04 00 8B
038E8  E5 5D CB 00 55 8B EC 81 EC 0E 00 B8 44 E1 50 B8 54 EC 50 9A 03 00 8C 0A
03900  B8 22 00 50 9A 73 00 8C 0A B8 23 00 50 9A 73 00 8C 0A C7 46 FE 00 00 8B
03918  46 0A 89 46 FC B8 24 00 50 9A 73 00 8C 0A C7 46 FA 00 00 8B 76 FA 03 76
03930  06 8B 04 8B 7E FA 88 43 F4 8B 46 FA 40 89 46 FA 3D 05 00 75 E6 B8 25 00
03948  50 9A 73 00 8C 0A 8B 76 06 C6 04 00 B8 26 00 50 9A 73 00 8C 0A BF 84 B7
03960  8D 76 F4 1E 07 FC A5 A5 A4 FF 76 0C FF 76 0A 9A 94 02 47 06 B8 27 00 50
03978  9A 73 00 8C 0A FF 76 0C FF 76 0A B8 04 00 50 B8 07 00 50 9A D2 00 47 06
03990  B8 28 00 50 9A 73 00 8C 0A B8 29 00 50 9A 73 00 8C 0A 8D 46 FE 50 8D 46
039A8  0C 50 8D 46 FC 50 9A 00 00 11 09 B8 2A 00 50 9A 73 00 8C 0A B8 2B 00 50
039C0  9A 73 00 8C 0A 9A AD 03 3F 00 B8 2C 00 50 9A 73 00 8C 0A A1 80 B7 32 E4
039D8  50 B8 1F 00 50 B8 64 EC 50 9A F1 02 EE 09 D1 E8 73 02 EB 19 B8 2D 00 50
039F0  9A 73 00 8C 0A 9A 0F 00 3D 03 B8 2E 00 50 9A 73 00 8C 0A EB B7 B8 32 00
03A08  50 9A 73 00 8C 0A 8B 1E 80 B7 32 FF E9 C2 00 B8 33 00 50 9A 73 00 8C 0A
03A20  E9 D6 01 E9 F2 00 B8 34 00 50 9A 73 00 8C 0A FF 76 06 B8 84 EC 50 9A FA
03A38  01 23 0A D1 E8 73 2E B8 35 00 50 9A 73 00 8C 0A FF 76 08 1E FF 76 06 8B
03A50  76 06 8B 04 32 E4 50 B8 01 00 50 9A 29 03 23 0A B8 36 00 50 9A 73 00 8C
03A68  0A 83 46 FC FF E9 A8 00 B8 37 00 50 9A 73 00 8C 0A 8B 76 06 C6 04 00 E9
03A80  A7 01 E9 93 00 B8 39 00 50 9A 73 00 8C 0A 80 3E 80 B7 3A 75 18 B8 3A 00
03A98  50 9A 73 00 8C 0A 8B 76 06 8B 04 32 E4 3D 01 00 74 03 E9 3D 01 B8 3B 00
03AB0  50 9A 73 00 8C 0A FF 76 08 1E FF 76 06 B8 01 00 50 B8 80 B7 1E 50 9A D3
03AC8  02 23 0A FF 46 FC B8 3C 00 50 9A 73 00 8C 0A EB 3F 81 FB FC 00 77 A6 83
03AE0  FB 07 76 A1 83 FB 08 77 03 E9 3A FF 83 FB 0C 76 94 83 FB 0D 77 03 E9 1E
03AF8  FF 83 FB 1A 76 87 83 FB 1B 77 03 E9 6A FF 81 FB FB 00 77 03 E9 76 FF 81
03B10  FB FC 00 77 03 E9 0E FF B8 3D 00 50 9A 73 00 8C 0A BF 84 B7 BE 86 EC B9
03B28  07 00 1E 07 FC F3 A5 A4 FF 76 0C FF 76 0A 9A 94 02 47 06 B8 3E 00 50 9A
03B40  73 00 8C 0A FF 76 0C FF 76 0A B8 0A 00 50 B8 0F 00 50 9A D2 00 47 06 B8
03B58  3F 00 50 9A 73 00 8C 0A 8B 76 06 8B 04 32 E4 89 46 F2 83 7E F2 00 7C 21
03B70  C7 46 FA 00 00 8B 76 FA 03 76 06 8B 04 8B 7E FA 88 85 84 B7 8B 46 FA 40
03B88  89 46 FA 48 3B 46 F2 75 E4 B8 40 00 50 9A 73 00 8C 0A FF 76 0C FF 76 0A
03BA0  9A 94 02 47 06 B8 41 00 50 9A 73 00 8C 0A BF 84 B7 8D 76 F4 1E 07 FC A5
03BB8  A5 A4 FF 76 0C FF 76 FC 9A 94 02 47 06 B8 42 00 50 9A 73 00 8C 0A FF 76
03BD0  0C FF 76 FC B8 04 00 50 B8 07 00 50 9A D2 00 47 06 B8 43 00 50 9A 73 00
```

| | | | | | | | | | | | | | | | | | |
|---|---|---|---|---|---|---|---|---|---|---|---|---|---|---|---|---|---|
| 03BE8 | 8C | 0A | 8B | 76 | 06 | 8B | 04 | 32 | E4 | 3D | 0A | 00 | 7D | 03 | E9 | A0 | FD | B8 | 44 | 00 | 50 | 9A | 73 | 00 |
| 03C00 | 8C | 0A | 8B | 76 | 06 | 80 | 3C | 00 | 74 | 16 | FF | 76 | 08 | 96 | 1E | 50 | 8B | 46 | F4 | 32 | E4 | 50 | 8D | 46 |
| 03C18 | F5 | 1E | 50 | 9A | D3 | 02 | 23 | 0A | B8 | 45 | 00 | 50 | 9A | 73 | 00 | 8C | 0A | 9A | 47 | 00 | 8C | 0A | 8B | E5 |
| 03C30 | 5D | CA | 08 | 00 | 55 | 8B | EC | 81 | EC | CA | 0F | B8 | 44 | E1 | 50 | B8 | 96 | EC | 50 | 9A | 03 | 00 | 8C | 0A |
| 03C48 | B8 | 54 | 00 | 50 | 9A | 73 | 00 | 8C | 0A | B8 | 55 | 00 | 50 | 9A | 73 | 00 | 8C | 0A | C4 | 1E | 1E | C4 | 8D | BE |
| 03C60 | 3E | F0 | B9 | A0 | 0F | 9A | C3 | 02 | EE | 09 | B8 | 56 | 00 | 50 | 9A | 73 | 00 | 8C | 0A | C4 | 1E | 3C | C4 | 26 |
| 03C78 | 8B | 47 | 36 | 89 | 86 | 38 | F0 | C4 | 1E | 3C | C4 | 83 | C3 | 36 | 26 | C7 | 07 | 23 | 00 | B8 | 57 | 00 | 50 | 9A |
| 03C90 | 73 | 00 | 8C | 0A | B8 | 58 | 00 | 50 | 9A | 73 | 00 | 8C | 0A | C6 | 06 | 84 | B7 | 44 | B8 | 59 | 00 | 50 | 9A | 73 |
| 03CA8 | 00 | 8C | 0A | A1 | 84 | B7 | 32 | E4 | 89 | 86 | 36 | F0 | 83 | BE | 36 | F0 | 01 | 7C | 1B | C7 | 46 | FE | 01 | 00 |
| 03CC0 | 8B | 76 | FE | C6 | 84 | 84 | B7 | 20 | 8B | 46 | FE | 40 | 89 | 46 | FE | 48 | 3B | 86 | 36 | F0 | 75 | EA | B8 | 5A |
| 03CD8 | 00 | 50 | 9A | 73 | 00 | 8C | 0A | C7 | 46 | FE | 05 | 00 | FF | 76 | FE | B8 | 05 | 00 | 50 | 9A | 94 | 02 | 47 | 06 |
| 03CF0 | 8B | 46 | FE | 40 | 89 | 46 | FE | 3D | 0E | 00 | 75 | E8 | B8 | 5B | 00 | 50 | 9A | 73 | 00 | 8C | 0A | C7 | 46 | E2 |
| 03D08 | 05 | 00 | C7 | 46 | E4 | 05 | 00 | C7 | 46 | DE | 0D | 00 | C7 | 46 | E0 | 48 | 00 | B8 | 5C | 00 | 50 | 9A | 73 | 00 |
| 03D20 | 8C | 0A | FF | 76 | E4 | FF | 76 | E2 | FF | 76 | E0 | FF | 76 | DE | 9A | 37 | 03 | 47 | 06 | B8 | 5D | 00 | 50 | 9A |
| 03D38 | 73 | 00 | 8C | 0A | BF | 84 | B7 | BE | A6 | EC | B9 | 0A | 00 | 1E | 07 | FC | F3 | A5 | B8 | 08 | 00 | 50 | B8 | 1F |
| 03D50 | 00 | 50 | 9A | 94 | 02 | 47 | 06 | B8 | 5E | 00 | 50 | 9A | 73 | 00 | 8C | 0A | 8D | 7E | E6 | BE | BA | EC | 1E | 07 |
| 03D68 | FC | A5 | A5 | A4 | B8 | 5F | 00 | 50 | 9A | 73 | 00 | 8C | 0A | BF | 84 | B7 | BE | C0 | EC | B9 | 17 | 00 | 1E | 07 |
| 03D80 | FC | F3 | A5 | A4 | B8 | 60 | 00 | 50 | 9A | 73 | 00 | 8C | 0A | B8 | 0A | 00 | 50 | B8 | 08 | 00 | 50 | 9A | 94 | 02 |
| 03D98 | 47 | 06 | B8 | 61 | 00 | 50 | 9A | 73 | 00 | 8C | 0A | BF | 84 | B7 | BE | F0 | EC | B9 | 19 | 00 | 1E | 07 | FC | F3 |
| 03DB0 | A5 | B8 | 62 | 00 | 50 | 9A | 73 | 00 | 8C | 0A | B8 | 0B | 00 | 50 | B8 | 08 | 00 | 50 | 9A | 94 | 02 | 47 | 06 | B8 |
| 03DC8 | 63 | 00 | 50 | 9A | 73 | 00 | 8C | 0A | C4 | 1E | 3C | C4 | 83 | C3 | 34 | 26 | C6 | 07 | 01 | B8 | 64 | 00 | 50 | 9A |
| 03DE0 | 73 | 00 | 8C | 0A | B8 | 0A | 00 | 50 | B8 | 37 | 00 | 50 | B8 | 0E | 00 | 50 | 8D | 46 | E6 | 50 | 9A | 0D | 00 | 2E |
| 03DF8 | 01 | B8 | 65 | 00 | 50 | 9A | 73 | 00 | 8C | 0A | 8D | 46 | E6 | 50 | B8 | 84 | EC | 50 | 9A | 90 | 01 | 23 | 0A | D1 |
| 03E10 | E8 | 73 | 24 | B8 | 66 | 00 | 50 | 9A | 73 | 00 | 8C | 0A | C4 | 1E | 3C | C4 | 83 | C3 | 30 | 26 | C7 | 07 | 00 | 00 |
| 03E28 | C4 | 1E | 3C | C4 | 83 | C3 | 1C | 26 | C7 | 07 | 00 | 00 | E9 | 6D | 02 | B8 | 67 | 00 | 50 | 9A | 73 | 00 | 8C | 0A |
| 03E40 | C4 | 1E | 3C | C4 | 83 | C3 | 34 | 26 | C6 | 07 | 00 | B8 | 68 | 00 | 50 | 9A | 73 | 00 | 8C | 0A | C6 | 06 | 98 | CE |
| 03E58 | 01 | B8 | 98 | CE | 50 | 8B | 46 | E6 | 32 | E4 | 50 | 8D | 46 | E7 | 1E | 50 | 9A | 9B | 04 | 20 | 09 | B8 | 98 | CE |
| 03E70 | 50 | 9A | 21 | 09 | 20 | 09 | B8 | 69 | 00 | 50 | 9A | 73 | 00 | 8C | 0A | A1 | 99 | CE | 32 | E4 | 89 | 46 | F6 | C6 |
| 03E88 | 06 | 99 | CE | 00 | C6 | 06 | 98 | CE | 00 | B8 | 6A | 00 | 50 | 9A | 73 | 00 | 8C | 0A | 8B | 5E | F6 | E9 | D9 | 01 |
| 03EA0 | B8 | 6B | 00 | 50 | 9A | 73 | 00 | 8C | 0A | E9 | F8 | 01 | E9 | F2 | 01 | B8 | 6C | 00 | 50 | 9A | 73 | 00 | 8C | 0A |
| 03EB8 | B8 | 6D | 00 | 50 | 9A | 73 | 00 | 8C | 0A | BF | 84 | B7 | BE | 22 | ED | B9 | 09 | 00 | 1E | 07 | FC | F3 | A5 | B8 |
| 03ED0 | 0B | 00 | 50 | B8 | 08 | 00 | 50 | 9A | 94 | 02 | 47 | 06 | E9 | C2 | 01 | B8 | 6E | 00 | 50 | 9A | 73 | 00 | 8C | 0A |
| 03EE8 | B8 | 6F | 00 | 50 | 9A | 73 | 00 | 8C | 0A | BF | 84 | B7 | BE | 34 | ED | B9 | 19 | 00 | 1E | 07 | FC | F3 | A5 | B8 |
| 03F00 | 70 | 00 | 50 | 9A | 73 | 00 | 8C | 0A | B8 | 0B | 00 | 50 | B8 | 08 | 00 | 50 | 9A | 94 | 02 | 47 | 06 | B8 | 71 | 00 |
| 03F18 | 50 | 9A | 73 | 00 | 8C | 0A | BF | 84 | B7 | BE | 66 | ED | B9 | 09 | 00 | 1E | 07 | FC | F3 | A5 | B8 | 0C | 00 | 50 |
| 03F30 | B8 | 08 | 00 | 50 | 9A | 94 | 02 | 47 | 06 | B8 | 72 | 00 | 50 | 9A | 73 | 00 | 8C | 0A | B8 | 73 | 00 | 50 | 9A | 73 |
| 03F48 | 00 | 8C | 0A | 9A | AD | 03 | 3F | 00 | B8 | 74 | 00 | 50 | 9A | 73 | 00 | 8C | 0A | 8B | 1E | 80 | B7 | 32 | FF | E9 |
| 03F60 | AB | 00 | B8 | 75 | 00 | 50 | 9A | 73 | 00 | 8C | 0A | B8 | 76 | 00 | 50 | 9A | 73 | 00 | 8C | 0A | B8 | 98 | CE |
| 03F78 | 9A | 8A | 09 | 20 | 09 | B8 | 77 | 00 | 50 | 9A | 73 | 00 | 8C | 0A | C6 | 06 | 12 | D1 | 00 | B8 | 98 | CE | 50 | 9A |
| 03F90 | 61 | 08 | 20 | 09 | C6 | 06 | 12 | D1 | 00 | B8 | 98 | CE | 50 | 9A | 61 | 08 | 20 | 09 | C6 | 06 | 12 | D1 | 00 | B8 |
| 03FA8 | 98 | CE | 50 | 9A | 61 | 08 | 20 | 09 | C6 | 06 | 12 | D1 | 00 | B8 | 98 | CE | 50 | 9A | 61 | 08 | 20 | 09 | C6 | 06 |
| 03FC0 | 12 | D1 | FF | B8 | 98 | CE | 50 | 9A | 61 | 08 | 20 | 09 | B8 | 79 | 00 | 50 | 9A | 73 | 00 | 8C | 0A | B8 | 98 | CE |
| 03FD8 | 50 | 9A | 21 | 09 | 20 | 09 | B8 | 7A | 00 | 50 | 9A | 73 | 00 | 8C | 0A | E9 | BA | 00 | EB | 54 | B8 | 7B | 00 | 50 |
| 03FF0 | 9A | 73 | 00 | 8C | 0A | EB | 4C | EB | 47 | B8 | 7C | 00 | 50 | 9A | 73 | 00 | 8C | 0A | B8 | 7D | 00 | 50 | 9A | 73 |
| 04008 | 00 | 8C | 0A | EB | 33 | 83 | FB | 79 | 77 | E7 | 83 | FB | 4D | 76 | E2 | 83 | FB | 4E | 76 | D0 | 83 | FB | 58 | 76 |
| 04020 | D8 | 83 | FB | 59 | 77 | 03 | E9 | 39 | FF | 83 | FB | 6D | 76 | CB | 83 | FB | 6E | 76 | B9 | 83 | FB | 78 | 76 | C1 |
| 04038 | 83 | FB | 79 | 77 | 03 | E9 | 22 | FF | E9 | FF | FE | EB | 5C | B8 | 7E | 00 | 50 | 9A | 73 | 00 | 8C | 0A | B8 | C0 |
| 04050 | E4 | 50 | B8 | 0A | 00 | 50 | B8 | 79 | ED | 1E | 50 | B8 | FF | 7F | 50 | 50 | 9A | EC | 01 | B1 | 0A | B8 | C0 | E4 |
| 04068 | 50 | 9A | 05 | 0B | 20 | 09 | B8 | 7F | 00 | 50 | 9A | 73 | 00 | 8C | 0A | EB | 28 | 83 | FB | 0A | 77 | C7 | 83 | EB |
| 04080 | 01 | 73 | 03 | E9 | 1A | FE | D1 | E3 | 2E | FF | A7 | AE | 07 | 66 | 07 | 66 | 07 | 66 | 07 | 66 | 07 | 66 | 07 | 66 |
| 04098 | 07 | D0 | 05 | 66 | 07 | 66 | 07 | 00 | 06 | E9 | F0 | FB | B8 | 80 | 00 | 50 | 9A | 73 | 00 | 8C | 0A | C4 | 1E | 3C |
| 040B0 | C4 | 83 | C3 | 33 | 26 | C6 | 07 | 00 | B8 | 81 | 00 | 50 | 9A | 73 | 00 | 8C | 0A | C6 | 06 | 26 | D1 | 01 | B8 | 82 |
| 040C8 | 00 | 50 | 9A | 73 | 00 | 8C | 0A | C4 | 1E | 3C | C4 | 26 | 8B | 47 | 34 | 22 | C0 | 74 | 03 | E9 | 97 | 02 | B8 | 83 |
| 040E0 | 00 | 50 | 9A | 73 | 00 | 8C | 0A | BF | 84 | B7 | BE | 84 | ED | B9 | 09 | 00 | 1E | 07 | FC | F3 | A5 | A4 | B8 | 84 |
| 040F8 | 00 | 50 | 9A | 73 | 00 | 8C | 0A | B8 | 0D | 00 | 50 | B8 | 1E | 00 | 50 | 9A | 94 | 02 | 47 | 06 | B8 | 0D | 00 | 50 |
| 04110 | B8 | 1D | 00 | 50 | B8 | 14 | 00 | 50 | B8 | 87 | 00 | 50 | 9A | D2 | 00 | 47 | 06 | B8 | 85 | 00 | 50 | 9A | 73 | 00 |
| 04128 | 8C | 0A | B8 | 05 | 00 | 50 | B8 | 1E | 00 | 50 | 9A | 94 | 02 | 47 | 06 | B8 | 05 | 00 | 50 | B8 | 1D | 00 | 50 | B8 |
| 04140 | 14 | 00 | 50 | B8 | 87 | 00 | 50 | 9A | D2 | 00 | 47 | 06 | B8 | 86 | 00 | 50 | 9A | 73 | 00 | 8C | 0A | A1 | 12 | D1 |
| 04158 | 88 | 46 | FA | B8 | 98 | CE | 50 | 9A | 5B | 06 | 20 | 09 | A1 | 12 | D1 | 88 | 46 | F8 | B8 | 98 | CE | 50 | 9A | 5B |
| 04170 | 06 | 20 | 09 | B8 | 87 | 00 | 50 | 9A | 73 | 00 | 8C | 0A | 8B | 46 | FA | 32 | E4 | B9 | 08 | 00 | D3 | E0 | 8B | D0 |
| 04188 | 8B | 46 | F8 | 32 | E4 | 03 | D0 | C4 | 1E | 3C | C4 | 83 | C3 | 1C | 26 | 89 | 17 | B8 | 88 | 00 | 50 | 9A | 73 | 00 |
| 041A0 | 8C | 0A | A1 | 12 | D1 | 88 | 46 | FA | B8 | 98 | CE | 50 | 9A | 5B | 06 | 20 | 09 | A1 | 12 | D1 | 88 | 46 | F8 | B8 |
| 041B8 | 98 | CE | 50 | 9A | 5B | 06 | 20 | 09 | B8 | 89 | 00 | 50 | 9A | 73 | 00 | 8C | 0A | 8B | 46 | FA | 32 | E4 | B9 | 08 |
| 041D0 | 00 | D3 | E0 | 8B | D0 | 8B | 46 | F8 | 32 | E4 | 03 | D0 | C4 | 1E | 3C | C4 | 83 | C3 | 30 | 26 | 89 | 17 | B8 | 8A |
| 041E8 | 00 | 50 | 9A | 73 | 00 | 8C | 0A | C4 | 1E | 3C | C4 | 26 | 8B | 47 | 1C | 48 | 89 | 86 | 36 | F0 | 83 | BE | 36 | F0 |
| 04200 | 00 | 7D | 03 | E9 | 05 | 01 | C7 | 46 | FE | 00 | 00 | B8 | 8B | 00 | 50 | 9A | 73 | 00 | 8C | 0A | C7 | 46 | FC | 00 |

101 102

```
04218  00 B8 0E 00 F7 66 FE 03 46 FC C4 1E 2E C4 03 D8 A1 12 D1 26 88 07 B8 98
04230  CE 50 9A 5B 06 20 09 8B 46 FC 40 89 46 FC 3D 0A 00 75 D6 B8 8C 00 50 9A
04248  73 00 8C 0A A1 12 D1 88 46 FA B8 98 CE 50 9A 5B 06 20 09 A1 12 D1 88 46
04260  F8 B8 98 CE 50 9A 5B 06 20 09 B8 8D 00 50 9A 73 00 8C 0A 8B 46 FA 32 E4
04278  B9 08 00 D3 E0 8B D0 8B 46 F8 32 E4 03 D0 B8 0E 00 8B CA F7 66 FE 05 0A
04290  00 C4 1E 2E C4 03 D8 26 89 0F B8 8E 00 50 9A 73 00 8C 0A A1 12 D1 88 46
042A8  FA B8 98 CE 50 9A 5B 06 20 09 A1 12 D1 88 46 F8 B8 98 CE 50 9A 5B 06 20
042C0  09 B8 8F 00 50 9A 73 00 8C 0A 8B 46 FA 32 E4 B9 08 00 D3 E0 8B D0 8B 46
042D8  F8 32 E4 03 D0 B8 0E 00 8B CA F7 66 FE 05 0C 00 C4 1E 2E C4 03 D8 26 89
042F0  0F B8 90 00 50 9A 73 00 8C 0A 8B 46 FE 40 89 46 FE 48 3B 86 36 F0 74 03
04308  E9 00 FF B8 91 00 50 9A 73 00 8C 0A C4 1E 3C C4 26 8B 47 30 48 89 86 36
04320  F0 83 BE 36 F0 00 7C 32 C7 46 FE 00 00 B8 92 00 50 9A 73 00 8C 0A C4 1E
04338  32 C4 03 5E FE A1 12 D1 26 88 07 B8 98 CE 50 9A 5B 06 20 09 8B 46 FE 40
04350  89 46 FE 48 3B 86 36 F0 75 D3 B8 93 00 50 9A 73 00 8C 0A B8 98 CE 50 9A
04368  B1 05 20 09 B8 94 00 50 9A 73 00 8C 0A B8 95 00 50 9A 73 00 8C 0A C4 1E
04380  3C C4 83 C3 1E 8D 76 E6 B9 07 00 8B FB FC F3 A5 A4 B8 96 00 50 9A 73 00
04398  8C 0A C4 1E 3C C4 26 8B 47 1E 32 E4 40 89 86 36 F0 83 BE 36 F0 0E 7F 2C
043B0  8B 86 36 F0 89 46 FE B8 97 00 50 9A 73 00 8C 0A 8B 46 FE 05 1E 00 C4 1E
043C8  3C C4 03 D8 26 C6 07 20 8B 46 FE 40 89 46 FE 3D 0F 00 75 DB B8 98 00 50
043E0  9A 73 00 8C 0A C4 1E 1E C4 8D B6 3E F0 B9 D0 07 8B FB FC F3 A5 B8 99 00
043F8  50 9A 73 00 8C 0A C4 1E 3C C4 83 C3 36 8B 86 38 F0 26 89 07 B8 9A 00 50
04410  9A 73 00 8C 0A 9A 47 00 8C 0A 8B E5 5D CB 55 8B EC 81 EC 28 00 B8 44 E1
04428  50 B8 98 ED 50 9A 03 00 8C 0A B8 A6 00 50 9A 73 00 8C 0A B8 A7 00 50 9A
04440  73 00 8C 0A C7 46 EA 00 00 C7 46 E8 58 00 B8 A8 00 50 9A 73 00 8C 0A C7
04458  46 E6 00 00 C7 46 E4 24 00 B8 A9 00 50 9A 73 00 8C 0A C7 46 EE 40 00 C7
04470  46 EC F8 00 C4 5E EC 26 8B 07 26 8B 57 02 A3 3C C4 89 16 3E C4 B8 AA 00
04488  50 9A 73 00 8C 0A C4 1E 3C C4 26 8B 47 10 26 8B 57 12 A3 2E C4 89 16 30
044A0  C4 C4 1E 3C C4 26 8B 47 18 26 8B 57 1A A3 32 C4 89 16 34 C4 B8 AB 00 50
044B8  9A 73 00 8C 0A 9A 00 00 0E 09 D1 E8 73 17 B8 AC 00 50 9A 73 00 8C 0A C7
044D0  06 20 C4 00 B0 C7 06 1E C4 00 00 EB 1E B8 AD 00 50 9A 73 00 8C 0A B8 AE
044E8  00 50 9A 73 00 8C 0A C7 06 20 C4 00 B8 C7 06 1E C4 00 00 B8 AF 00 50 9A
04500  73 00 8C 0A A1 20 C4 A3 28 C4 BB EA B9 1E 07 89 1E 2A C4 8C 06 2C C4 B8
04518  B0 00 50 9A 73 00 8C 0A C7 46 DC 00 00 B8 B1 00 50 9A 73 00 8C 0A 8B 76
04530  DC D1 E6 B8 A0 00 F7 6E DC 89 84 2C B9 B8 B2 00 50 89 76 D8 9A 73 00 8C
04548  0A 8B 76 D8 B8 50 00 F7 6E DC 03 06 2A C4 89 84 5E B9 8B 46 DC 40 89 46
04560  DC 3D 19 00 75 BF B8 B3 00 50 9A 73 00 8C 0A C6 06 14 D1 00 B8 B4 00 50
04578  9A 73 00 8C 0A C6 06 16 D1 00 B8 B5 00 50 9A 73 00 8C 0A C6 06 18 D1 00
04590  B8 B6 00 50 9A 73 00 8C 0A C7 06 24 C4 40 00 C7 06 22 C4 17 00 B8 B7 00
045A8  50 9A 73 00 8C 0A C4 1E 3C C4 26 8B 47 33 D1 E8 73 05 9A 7A 02 ED 00 B8
045C0  B8 00 50 9A 73 00 8C 0A 9A 35 00 3D 03 B8 B9 00 50 9A 73 00 8C 0A B8 24
045D8  C7 50 B8 04 00 50 B8 A9 ED 1E 50 9A 9B 04 20 09 B8 24 C7 50 9A 21 09 20
045F0  09 B8 BA 00 50 9A 73 00 8C 0A 9A 40 00 04 09 D1 E8 73 37 B8 BB 00 50 9A
04608  73 00 8C 0A C4 1E 3C C4 26 8B 47 0C 26 8B 57 0E C4 5E E4 26 89 07 26 89
04620  57 02 C4 1E 3C C4 26 8B 47 04 26 8B 57 06 C4 5E E8 26 89 07 26 89 57 02
04638  EB 2B B8 BC 00 50 9A 73 00 8C 0A B8 C0 E4 50 B8 0F 00 50 B8 AF ED 1E 50
04650  B8 FF 7F 50 50 9A EC 01 B1 0A B8 C0 E4 50 9A 05 0B 20 09 EB DE B8 BD 00
04668  50 9A 73 00 8C 0A 9A 55 03 2E 01 B8 BE 00 50 9A 73 00 8C 0A 9A 35 00 3D
04680  03 B8 BF 00 50 9A 73 00 8C 0A 9A 47 00 8C 0A 8B E5 5D CB 55 8B EC 81 EC
04698  04 00 B8 44 E1 50 B8 BE ED 50 9A 03 00 8C 0A 9A 47 00 8C 0A 8B E5 5D CB
046B0  00 00 55 8B EC 81 EC 08 00 B8 5C E1 50 B8 D0 ED 50 9A 03 00 8C 0A B8 11
046C8  00 50 9A 73 00 8C 0A B8 12 00 50 9A 73 00 8C 0A C7 46 FC 00 00 B8 13 00
046E0  50 9A 73 00 8C 0A 8B 76 FC 8B 84 32 D1 88 46 FE B8 14 00 50 9A 73 00 8C
046F8  0A 8B 46 FE 32 E4 50 B9 0F 00 51 B9 E0 ED 51 89 46 F8 9A F1 02 EE 09 D1
04710  E8 73 0F 8B 76 FC 8B 46 F8 05 E0 FF 32 E4 88 84 32 D1 B8 15 00 50 9A 73
04728  00 8C 0A 8B 46 FC 40 89 46 FC 3D 0A 00 75 A6 B8 16 00 50 9A 73 00 8C 0A
04740  B8 17 00 50 9A 73 00 8C 0A C6 46 FA 01 B8 18 00 50 9A 73 00 8C 0A C7 46
04758  FC 00 00 B8 19 00 50 9A 73 00 8C 0A 8B 76 FC 8B 84 32 D1 3A 84 33 D1 76
04770  49 B8 1A 00 50 9A 73 00 8C 0A 8B 76 FC 8B 84 32 D1 88 46 FE B8 1B 00 50
04788  9A 73 00 8C 0A 8B 76 FC 8B 84 33 D1 88 84 32 D1 B8 1C 00 50 9A 73 00 8C
047A0  0A 8B 76 FC 8B 46 FE 88 84 33 D1 B8 1D 00 50 9A 73 00 8C 0A C6 46 FA 00
047B8  EB 52 B8 1E 00 50 9A 73 00 8C 0A 8B 76 FC 80 BC 32 D1 20 74 3F B8 1F 00
047D0  50 9A 73 00 8C 0A 8B 76 FC 8B 84 32 D1 3A 84 33 D1 75 29 B8 20 00 50 9A
047E8  73 00 8C 0A C6 46 FA 00 B8 21 00 50 9A 73 00 8C 0A 8B 76 FC C6 84 32 D1
04800  20 B8 22 00 50 9A 73 00 8C 0A EB 0F 8B 46 FC 40 89 46 FC 3D 09 00 74 03
04818  E9 40 FF B8 23 00 50 9A 73 00 8C 0A 80 7E FA 01 74 03 E9 13 FF B8 24 00
04830  50 9A 73 00 8C 0A 9A 47 00 8C 0A 8B E5 5D CB 55 8B EC 81 EC 06 00 B8 5C
```

| | |
|---|---|
| 04848 | E1 50 B8 F0 ED 50 9A 03 00 8C 0A B8 2B 00 50 9A 73 00 8C 0A B8 2C 00 50 |
| 04860 | 9A 73 00 8C 0A C4 1E 3C C4 26 8B 47 1C 23 C0 75 17 B8 2D 00 50 9A 73 00 |
| 04878 | 8C 0A C7 06 36 C4 00 00 C6 06 20 D1 00 E9 FC 02 B8 2E 00 50 9A 73 00 8C |
| 04890 | 0A C7 46 FE 00 00 C4 1E 3C C4 26 8B 47 1C 48 89 46 FC B8 2F 00 50 9A 73 |
| 048A8 | 00 8C 0A B8 30 00 50 9A 73 00 8C 0A C6 06 20 D1 01 B8 31 00 50 9A 73 00 |
| 048C0 | 8C 0A 8B 46 FC 2B 46 FE 93 E9 88 02 B8 33 00 50 9A 73 00 8C 0A B8 34 00 |
| 048D8 | 50 9A 73 00 8C 0A 8B 46 FE A3 36 C4 B8 35 00 50 9A 73 00 8C 0A C7 46 FA |
| 048F0 | 00 00 B8 36 00 50 9A 73 00 8C 0A B8 0E 00 F7 66 FE 96 03 76 FA C4 1E 2E |
| 04908 | C4 26 8B 00 8B 76 FA 3A 84 32 D1 76 13 B8 37 00 50 9A 73 00 8C 0A C6 06 |
| 04920 | 20 D1 00 E9 5E 02 EB 4E B8 38 00 50 9A 73 00 8C 0A 8B 76 FA 8B 84 32 D1 |
| 04938 | 8B D0 B8 0E 00 8B CA F7 66 FE 03 F0 C4 1E 2E C4 26 8B 00 3A C8 76 27 B8 |
| 04950 | 39 00 50 9A 73 00 8C 0A B8 3A 00 50 9A 73 00 8C 0A FF 06 36 C4 B8 3B 00 |
| 04968 | 50 9A 73 00 8C 0A C6 06 20 D1 00 E9 0E 02 8B 46 FA 40 89 46 FA 3D 0A 00 |
| 04980 | 74 03 E9 6D FF B8 3C 00 50 9A 73 00 8C 0A E9 F3 01 E9 DB 01 B8 3D 00 50 |
| 04998 | 9A 73 00 8C 0A B8 3E 00 50 9A 73 00 8C 0A 8B 46 FE A3 36 C4 B8 3F 00 50 |
| 049B0 | 9A 73 00 8C 0A C7 46 FA 00 00 B8 40 00 50 9A 73 00 8C 0A B8 0E 00 F7 66 |
| 049C8 | FE 96 03 76 FA C4 1E 2E C4 26 8B 00 8B 76 FA 3A 84 32 D1 76 13 B8 41 00 |
| 049E0 | 50 9A 73 00 8C 0A C6 06 20 D1 00 E9 96 01 EB 37 B8 42 00 50 9A 73 00 8C |
| 049F8 | 0A 8B 76 FA 8B 84 32 D1 8B D0 B8 0E 00 8B CA F7 66 FE 03 F0 C4 1E 2E C4 |
| 04A10 | 26 8B 00 3A C8 76 10 B8 43 00 50 9A 73 00 8C 0A C6 06 20 D1 00 EB 0C 8B |
| 04A28 | 46 FA 40 89 46 FA 3D 0A 00 75 87 B8 44 00 50 9A 73 00 8C 0A F6 06 20 D1 |
| 04A40 | 01 74 03 E9 3E 01 B8 45 00 50 9A 73 00 8C 0A FF 46 FE E9 1A 01 B8 47 00 |
| 04A58 | 50 9A 73 00 8C 0A 8B 46 FC 2B 46 FE D1 F8 79 03 15 00 00 03 46 FE A3 36 |
| 04A70 | C4 B8 49 00 50 9A 73 00 8C 0A C7 46 FA 00 00 B8 4A 00 50 9A 73 00 8C 0A |
| 04A88 | B8 0E 00 F7 26 36 C4 96 03 76 FA C4 1E 2E C4 26 8B 00 8B 76 FA 3A 84 32 |
| 04AA0 | D1 76 34 B8 4B 00 50 9A 73 00 8C 0A B8 4C 00 50 9A 73 00 8C 0A A1 36 C4 |
| 04AB8 | 48 89 46 FC B8 4D 00 50 9A 73 00 8C 0A C6 06 20 D1 00 B8 4E 00 50 9A 73 |
| 04AD0 | 00 8C 0A EB 6B EB 5A B8 4F 00 50 9A 73 00 8C 0A 8B 76 FA 8B 84 32 D1 8B |
| 04AE8 | D0 B8 0E 00 8B CA F7 26 36 C4 03 F0 C4 1E 2E C4 26 8B 00 3A C8 76 32 B8 |
| 04B00 | 50 00 50 9A 73 00 8C 0A B8 51 00 50 9A 73 00 8C 0A A1 36 C4 40 89 46 FE |
| 04B18 | B8 52 00 50 9A 73 00 8C 0A C6 06 20 D1 00 B8 53 00 50 9A 73 00 8C 0A EB |
| 04B30 | 0F 8B 46 FA 40 89 46 FA 3D 0A 00 74 03 E9 3F FF B8 54 00 50 9A 73 00 8C |
| 04B48 | 0A F6 06 20 D1 01 74 02 EB 32 EB 1B 83 FB 01 7E 03 E9 F9 FE 83 EB 00 7D |
| 04B60 | 03 E9 F1 FE D1 E3 2E FF A7 BC 04 1D 02 E5 02 B8 56 00 50 9A 73 00 8C 0A |
| 04B78 | E9 30 FD B8 57 00 50 9A 73 00 8C 0A 9A 47 00 8C 0A 8B E5 5D CB 55 8B EC |
| 04B90 | 81 EC 04 00 B8 5C E1 50 B8 00 EE 50 9A 03 00 8C 0A 9A 47 00 8C 0A 8B E5 |
| 04BA8 | 5D CB 00 00 55 8B EC 81 EC 62 00 B8 70 E1 50 B8 0E EE 50 9A 03 00 8C 0A |
| 04BC0 | B8 19 00 50 9A 73 00 8C 0A B8 1A 00 50 9A 73 00 8C 0A B8 1B 00 50 9A 73 |
| 04BD8 | 00 8C 0A B8 1C CC 50 B8 03 00 50 B8 1F EE 1E 50 9A 9B 04 20 09 B8 1C CC |
| 04BF0 | 50 9A 8A 09 20 09 B8 1C 00 50 9A 73 00 8C 0A A1 1D CC 32 E4 23 C0 75 02 |
| 04C08 | EB 02 EB C6 B8 1E 00 50 9A 73 00 8C 0A A1 28 C2 89 46 A4 B8 1F 00 50 9A |
| 04C20 | 73 00 8C 0A B8 FF 00 50 B8 84 B7 50 FF 36 92 B9 B8 04 00 50 B8 FF 7F 50 |
| 04C38 | 9A 35 00 96 0A D1 E8 73 16 B8 20 00 50 9A 73 00 8C 0A B8 18 00 50 B8 05 |
| 04C50 | 00 50 9A 94 02 47 06 B8 21 00 50 9A 73 00 8C 0A A1 22 EE A3 84 B7 B8 18 |
| 04C68 | 00 50 B8 04 00 50 9A 94 02 47 06 B8 22 00 50 9A 73 00 8C 0A B8 18 00 50 |
| 04C80 | 33 C0 50 B8 09 00 50 B8 F7 00 50 9A D2 00 47 06 B8 24 00 50 9A 73 00 8C |
| 04C98 | 0A BF 84 B7 BE 24 EE B9 07 00 1E 07 FC F3 A5 B8 17 00 50 33 C0 50 9A 94 |
| 04CB0 | 02 47 06 B8 25 00 50 9A 73 00 8C 0A 83 7E A4 00 75 03 E9 64 02 B8 26 00 |
| 04CC8 | 50 9A 73 00 8C 0A A1 AC B9 89 46 9E 83 7E 9E 01 7C 1B C7 46 A2 01 00 B8 |
| 04CE0 | 1C CC 50 9A 05 0B 20 09 8B 46 A2 40 89 46 A2 48 3B 46 9E 75 EA B8 27 00 |
| 04CF8 | 50 9A 73 00 8C 0A C7 46 A2 01 00 B8 28 00 50 9A 73 00 8C 0A A1 AA B9 2B |
| 04D10 | 06 AC B9 2B 06 AE B9 3B 46 A2 7D 03 E9 C3 01 B8 29 00 50 9A 73 00 8C 0A |
| 04D28 | 83 7E A4 00 75 03 E9 B1 01 B8 2A 00 50 9A 73 00 8C 0A B8 1C CC 50 9A 05 |
| 04D40 | 0B 20 09 B8 2C 00 50 9A 73 00 8C 0A B8 FF 00 50 B8 84 B7 50 FF 76 A4 B8 |
| 04D58 | 04 00 50 B8 FF 7F 50 9A 35 00 96 0A D1 E8 73 0C B8 18 00 50 33 C0 50 9A |
| 04D70 | 94 02 47 06 B8 2D 00 50 9A 73 00 8C 0A B8 50 C4 50 33 D2 8B 46 A4 52 50 |
| 04D88 | 9A DE 0A 20 09 B8 50 C4 50 9A 5B 06 20 09 8D 7E A6 BE CA C6 B9 2D 00 1E |
| 04DA0 | 07 FC F3 A5 B8 2E 00 50 9A 73 00 8C 0A A1 16 C4 03 46 AC 48 89 46 9E 83 |
| 04DB8 | 7E 9E 00 7D 03 E9 9C 00 C7 46 A0 00 00 B8 2F 00 50 9A 73 00 8C 0A 8B 76 |
| 04DD0 | A0 8B 42 B0 A2 80 B7 B8 30 00 50 9A 73 00 8C 0A 8B 1E 80 B7 32 FF EB 50 |
| 04DE8 | B8 31 00 50 9A 73 00 8C 0A EB 69 EB 57 B8 32 00 50 9A 73 00 8C 0A B8 1C |
| 04E00 | CC 50 B8 20 00 50 B8 FF 7F 50 50 9A 21 03 B1 0A EB 3A B8 33 00 50 9A 73 |
| 04E18 | 00 8C 0A B8 1C CC 50 FF 36 80 B7 B8 FF 7F 50 50 9A 21 03 B1 0A B8 34 00 |
| 04E30 | 50 9A 73 00 8C 0A EB 14 83 FB 0D 77 D5 83 FB 00 76 B3 83 FB 0C 76 CB 83 |
| 04E48 | FB 0D 76 9C 8B 46 A0 40 89 46 A0 48 3B 46 9E 74 03 E9 69 FF B8 35 00 50 |

```
04E60   9A 73 00 8C 0A FF 46 A2 C7 46 A0 01 00 B8 36 00 50 9A 73 00 8C 0A A1 AA
04E78   B9 2B 06 AC B9 2B 06 AE B9 3B 46 A2 7C 41 B8 37 00 50 9A 73 00 8C 0A A1
04E90   B0 B9 3B 46 A0 7F 04 EB 2E EB 0C B8 38 00 50 9A 73 00 8C 0A FF 46 A0 B8
04EA8   39 00 50 9A 73 00 8C 0A B8 1C CC 50 9A 05 0B 20 09 B8 3A 00 50 9A 73 00
04EC0   8C 0A FF 46 A2 EB AF B8 3B 00 50 9A 73 00 8C 0A 8B 46 A8 89 46 A4 B8 3C
04ED8   00 50 9A 73 00 8C 0A E9 2A FE B8 3D 00 50 9A 73 00 8C 0A A1 AE B9 89 46
04EF0   9E 83 7E 9E 01 7C 1B C7 46 A2 01 00 B8 1C CC 50 9A 05 0B 20 09 8B 46 A2
04F08   40 89 46 A2 48 3B 46 9E 75 EA B8 3E 00 50 9A 73 00 8C 0A EB 0C B8 3F 00
04F20   50 9A 73 00 8C 0A E9 93 FD B8 40 00 50 9A 73 00 8C 0A B8 1C CC 50 9A B1
04F38   05 20 09 B8 41 00 50 9A 73 00 8C 0A B8 18 00 50 33 C0 50 B8 09 00 50 B8
04F50   70 00 50 9A D2 00 47 06 B8 42 00 50 9A 73 00 8C 0A BF 84 B7 BE 32 EE B9
04F68   07 00 1E 07 FC F3 A5 B8 17 00 50 33 C0 50 9A 94 02 47 06 B8 43 00 50 9A
04F80   73 00 8C 0A B8 18 00 50 33 C0 50 9A 94 02 47 06 B8 44 00 50 9A 73 00 8C
04F98   0A 9A 47 00 8C 0A 8B E5 5D CB 55 8B EC 81 EC 62 00 B8 70 E1 50 B8 40 EE
04FB0   50 9A 03 00 8C 0A B8 4B 00 50 9A 73 00 8C 0A B8 4C 00 50 9A 73 00 8C 0A
04FC8   B8 4D 00 50 9A 73 00 8C 0A B8 1C CC 50 B8 03 00 50 B8 51 EE 1E 50 9A 9B
04FE0   04 20 09 B8 1C CC 50 9A 8A 09 20 09 B8 4E 00 50 9A 73 00 8C 0A A1 1D CC
04FF8   32 E4 23 C0 75 02 EB 02 EB C6 B8 50 00 50 9A 73 00 8C 0A A1 90 B9 89 46
05010   A4 B8 51 00 50 9A 73 00 8C 0A B8 FF 00 50 B8 84 B7 50 FF 36 92 B9 B8 04
05028   00 50 B8 FF 7F 50 9A 35 00 96 0A D1 E8 73 0D B8 18 00 50 B8 05 00 50 9A
05040   94 02 47 06 B8 52 00 50 9A 73 00 8C 0A A1 54 EE A3 84 B7 B8 18 00 50 B8
05058   04 00 50 9A 94 02 47 06 B8 53 00 50 9A 73 00 8C 0A B8 18 00 50 33 C0 50
05070   B8 09 00 50 B8 F7 00 50 9A D2 00 47 06 B8 55 00 50 9A 73 00 8C 0A BF 84
05088   B7 BE 56 EE B9 07 00 1E 07 FC F3 A5 B8 17 00 50 33 C0 50 9A 94 02 47 06
050A0   B8 56 00 50 9A 73 00 8C 0A 83 7E A4 00 75 03 E9 83 02 B8 57 00 50 9A 73
050B8   00 8C 0A A1 AC B9 89 46 9E 83 7E 9E 01 7C 1B C7 46 A2 01 00 B8 1C CC 50
050D0   9A 05 0B 20 09 8B 46 A2 40 89 46 A2 48 3B 46 9E 75 EA B8 58 00 50 9A 73
050E8   00 8C 0A C7 46 A2 01 00 B8 59 00 50 9A 73 00 8C 0A A1 AA B9 2B 06 AC B9
05100   2B 06 AE B9 3B 46 A2 7D 03 E9 ED 01 B8 5A 00 50 9A 73 00 8C 0A 83 7E A4
05118   00 75 03 E9 DB 01 B8 5B 00 50 9A 73 00 8C 0A B8 1C CC 50 9A 05 0B 20 09
05130   B8 5D 00 50 9A 73 00 8C 0A B8 FF 00 50 B8 84 B7 50 FF 76 A4 B8 04 00 50
05148   B8 FF 7F 50 9A 35 00 96 0A D1 E8 73 0C B8 18 00 50 33 C0 50 9A 94 02 47
05160   06 B8 5E 00 50 9A 73 00 8C 0A B8 50 C4 50 33 D2 8B 46 A4 52 50 9A DE 0A
05178   20 09 B8 50 C4 50 9A 5B 06 20 09 8D 7E A6 BE CA C6 B9 2D 00 1E 07 FC F3
05190   A5 B8 5F 00 50 9A 73 00 8C 0A A1 16 C4 03 46 AC 48 89 46 9E 83 7E 9E 00
051A8   7D 03 E9 C6 00 C7 46 A0 00 00 B8 60 00 50 9A 73 00 8C 0A 8B 76 A0 8B 42
051C0   B0 A2 80 B7 B8 61 00 50 9A 73 00 8C 0A C6 06 84 B7 01 A1 80 B7 A2 85 B7
051D8   B8 62 00 50 9A 73 00 8C 0A B8 18 00 50 B8 04 00 50 9A 94 02 47 06 B8 63
051F0   00 50 9A 73 00 8C 0A 8B 1E 80 B7 32 FF EB 50 B8 64 00 50 9A 73 00 8C 0A
05208   EB 69 EB 57 B8 65 00 50 9A 73 00 8C 0A B8 1C CC 50 B8 20 00 50 B8 FF 7F
05220   50 50 9A 21 03 B1 0A EB 3A B8 66 00 50 9A 73 00 8C 0A B8 1C CC 50 FF 36
05238   80 B7 B8 FF 7F 50 50 9A 21 03 B1 0A B8 67 00 50 9A 73 00 8C 0A EB 14 83
05250   FB 0D 77 D5 83 FB 00 76 B3 83 FB 0C 76 CB 83 FB 0D 76 9C 8B 46 A0 40 89
05268   46 A0 48 3B 46 9E 74 03 E9 3F FF B8 68 00 50 9A 73 00 8C 0A FF 46 A2 C7
05280   46 A0 01 00 B8 69 00 50 9A 73 00 8C 0A A1 AA B9 2B 06 AC B9 2B 06 AE B9
05298   3B 46 A2 7C 41 B8 6A 00 50 9A 73 00 8C 0A A1 B0 B9 3B 46 A0 7F 04 EB 2E
052B0   EB 0C B8 6B 00 50 9A 73 00 8C 0A FF 46 A0 B8 6C 00 50 9A 73 00 8C 0A B8
052C8   1C CC 50 9A 05 0B 20 09 B8 6D 00 50 9A 73 00 8C 0A FF 46 A2 EB AF B8 6E
052E0   00 50 9A 73 00 8C 0A 8B 46 A8 89 46 A4 B8 6F 00 50 9A 73 00 8C 0A E9 00
052F8   FE B8 70 00 50 9A 73 00 8C 0A A1 AE B9 89 46 9E 83 7E 9E 01 7C 1B C7 46
05310   A2 01 00 B8 1C CC 50 9A 05 0B 20 09 8B 46 A2 40 89 46 A2 48 3B 46 9E 75
05328   EA B8 71 00 50 9A 73 00 8C 0A E9 74 FD B8 72 00 50 9A 73 00 8C 0A B8 1C
05340   CC 50 9A B1 05 20 09 B8 73 00 50 9A 73 00 8C 0A B8 18 00 50 33 C0 50 B8
05358   09 00 50 B8 70 00 50 9A D2 00 47 06 B8 74 00 50 9A 73 00 8C 0A BF 84 B7
05370   BE 64 EE B9 07 00 1E 07 FC F3 A5 B8 17 00 50 33 C0 50 9A 94 02 47 06 B8
05388   75 00 50 9A 73 00 8C 0A B8 18 00 50 33 C0 50 9A 94 02 47 06 B8 76 00 50
053A0   9A 73 00 8C 0A 9A 47 00 8C 0A 8B E5 5D CB 55 8B EC 81 EC BA 0F B8 70 E1
053B8   50 B8 72 EE 50 9A 03 00 8C 0A B8 84 00 50 9A 73 00 8C 0A B8 85 00 50 9A
053D0   73 00 8C 0A C4 1E 3C C4 26 8B 47 36 89 86 46 F0 B8 86 00 50 9A 73 00 8C
053E8   0A C4 1E 3C C4 83 C3 36 26 C7 07 06 00 B8 87 00 50 9A 73 00 8C 0A B8 03
05400   00 50 B8 14 00 50 9A 03 00 47 06 B8 03 00 50 B8 15 00 50 9A B5 0A 87 05
05418   B8 88 00 50 9A 73 00 8C 0A C4 1E 1E C4 8D BE 60 F0 B9 A0 0F 9A C3 02 EE
05430   09 B8 89 00 50 9A 73 00 8C 0A C7 86 5C F0 05 00 C7 86 5E F0 06 00 B8 8A
05448   00 50 9A 73 00 8C 0A C7 86 58 F0 12 00 C7 86 5A F0 49 00 B8 8B 00 50 9A
05460   73 00 8C 0A FF B6 5E F0 FF B6 5C F0 FF B6 5A F0 FF B6 58 F0 9A 37 03 47
05478   06 B8 8C 00 50 9A 73 00 8C 0A C7 86 52 F0 01 00 A1 82 EE 88 86 48 F0 B8
05490   8D 00 50 9A 73 00 8C 0A BF 84 B7 BE 84 EE B9 0B 00 1E 07 FC F3 A5 B8 06
```

```
054A8  00 50 B8 1E 00 50 9A 94 02 47 06 B8 8E 00 50 9A 73 00 8C 0A BF 84 B7 BE
054C0  9A EE B9 07 00 1E 07 FC F3 A5 A4 B8 08 00 50 50 9A 94 02 47 06 B8 8F 00
054D8  50 9A 73 00 8C 0A BF 84 B7 BE AA EE B9 07 00 1E 07 FC F3 A5 B8 09 00 50
054F0  B8 08 00 50 9A 94 02 47 06 B8 90 00 50 9A 73 00 8C 0A BF 84 B7 BE B8 EE
05508  B9 08 00 1E 07 FC F3 A5 A4 B8 08 00 50 B8 08 00 50 9A 94 02 47 06 B8 91
05520  00 50 9A 73 00 8C 0A BF 84 B7 BE CA EE B9 08 00 1E 07 FC F3 A5 B8 0B 00
05538  50 B8 08 00 50 9A 94 02 47 06 B8 92 00 50 9A 73 00 8C 0A BF 84 B7 BE DA
05550  EE 1E 07 FC A5 A5 A5 B8 0C 00 50 B8 08 00 50 9A 94 02 47 06 B8 93 00 50
05568  9A 73 00 8C 0A BF 84 B7 BE E0 EE B9 10 00 1E 07 FC F3 A5 B8 0D 00 50 50
05580  9A 94 02 47 06 B8 94 00 50 9A 73 00 8C 0A BF 84 B7 BE 00 EF B9 14 00 1E
05598  07 FC F3 A5 B8 95 00 50 9A 73 00 8C 0A B8 0E 00 50 B8 0D 00 50 9A 94 02
055B0  47 06 B8 96 00 50 9A 73 00 8C 0A BF 84 B7 BE 28 EF B9 0F 00 1E 07 FC F3
055C8  A5 B8 0F 00 50 B8 0D 00 50 9A 94 02 47 06 B8 97 00 50 9A 73 00 8C 0A BF
055E0  84 B7 BE 46 EF B9 10 00 1E 07 FC F3 A5 B8 10 00 50 B8 0D 00 50 9A 94 02
055F8  47 06 B8 98 00 50 9A 73 00 8C 0A B8 99 00 50 9A 73 00 8C 0A B8 FF 00 50
05610  B8 84 B7 50 FF 36 AA B9 B8 02 00 50 B8 FF 7F 50 9A 0D 00 96 0A D1 E8 73
05628  0D B8 08 00 50 B8 18 00 50 9A 94 02 47 06 B8 9A 00 50 9A 73 00 8C 0A B8
05640  FF 00 50 B8 84 B7 50 FF 36 AC B9 B8 02 00 50 B8 FF 7F 50 9A 0D 00 96 0A
05658  D1 E8 73 0D B8 09 00 50 B8 18 00 50 9A 94 02 47 06 B8 9B 00 50 9A 73 00
05670  8C 0A B8 FF 00 50 B8 84 B7 50 FF 36 AE B9 B8 02 00 50 B8 FF 7F 50 9A 0D
05688  00 96 0A D1 E8 73 0D B8 0A 00 50 B8 18 00 50 9A 94 02 47 06 B8 9C 00 50
056A0  9A 73 00 8C 0A B8 FF 00 50 B8 84 B7 50 FF 36 B0 B9 B8 02 00 50 B8 FF 7F
056B8  50 9A 0D 00 96 0A D1 E8 73 0D B8 0B 00 50 B8 18 00 50 9A 94 02 47 06 B8
056D0  9D 00 50 9A 73 00 8C 0A 8B 86 52 F0 05 07 00 50 B8 18 00 50 B8 02 00 50
056E8  B8 70 00 50 9A D2 00 47 06 B8 9E 00 50 9A 73 00 8C 0A 9A AD 03 3F 00 B8
05700  9F 00 50 9A 73 00 8C 0A 8B 1E 80 B7 32 FF E9 67 02 B8 A0 00 50 9A 73 00
05718  8C 0A B8 A1 00 50 9A 73 00 8C 0A C4 1E 1E C4 8D B6 60 F0 B9 D0 07 8B FB
05730  FC F3 A5 B8 A2 00 50 9A 73 00 8C 0A C4 1E 3C C4 83 C3 36 8B 86 46 F0 26
05748  89 07 B8 A3 00 50 9A 73 00 8C 0A E9 61 02 E9 49 02 B8 A4 00 50 9A 73 00
05760  8C 0A B8 A5 00 50 9A 73 00 8C 0A C4 1E 1E C4 8D B6 60 F0 B9 D0 07 8B FB
05778  FC F3 A5 B8 A6 00 50 9A 73 00 8C 0A 9A 0D 00 5A 02 B8 A7 00 50 9A 73 00
05790  8C 0A C4 1E 3C C4 83 C3 36 8B 86 46 F0 26 89 07 E9 14 02 E9 FC 01 B8 A8
057A8  00 50 9A 73 00 8C 0A B8 A9 00 50 9A 73 00 8C 0A C4 1E 1E C4 8D B6 60 F0
057C0  B9 D0 07 8B FB FC F3 A5 B8 AA 00 50 9A 73 00 8C 0A 9A 03 04 5A 02 B8 AB
057D8  00 50 9A 73 00 8C 0A C4 1E 3C C4 83 C3 36 8B 86 46 F0 26 89 07 E9 C7 01
057F0  E9 AF 01 B8 AC 00 50 9A 73 00 8C 0A B8 AD 00 50 9A 73 00 8C 0A B8 03 00
05808  50 8D 86 48 F0 1E 50 B8 01 00 50 B8 80 B7 1E 50 9A D3 02 23 0A B8 AE 00
05820  50 9A 73 00 8C 0A 8B 86 48 F0 32 E4 3D 03 00 75 1D B8 AF 00 50 9A 73 00
05838  8C 0A B8 03 00 50 8D 86 48 F0 1E 50 B8 01 00 50 50 9A 29 03 23 0A B8 B0
05850  00 50 9A 73 00 8C 0A B8 03 00 50 8D 86 48 F0 50 8D 86 50 F0 1E 50 B8 01
05868  80 50 B8 FF 7F 50 9A C3 00 96 0A D1 E8 73 00 B8 B1 00 50 9A 73 00 8C 0A
05880  8B 9E 52 F0 EB 48 B8 B2 00 50 9A 73 00 8C 0A 8B 86 50 F0 A3 AA B9 EB 4A
05898  B8 B3 00 50 9A 73 00 8C 0A 8B 86 50 F0 A3 AC B9 EB 38 B8 B4 00 50 9A 73
058B0  00 8C 0A 8B 86 50 F0 A3 AE B9 EB 26 B8 B5 00 50 9A 73 00 8C 0A 8B 86 50
058C8  F0 A3 B0 B9 EB 14 83 EB 01 7E B3 D1 E3 2E FF A7 3B 0D E7 0C F9 0C 0B 0D
058E0  1D 0D B8 B7 00 50 9A 73 00 8C 0A E9 B4 00 B8 B8 00 50 9A 73 00 8C 0A B8
058F8  B9 00 50 9A 73 00 8C 0A 8B 86 52 F0 05 07 00 50 B8 18 00 50 B8 02 00 50
05910  B8 0F 00 50 9A D2 00 47 06 B8 BA 00 50 9A 73 00 8C 0A 83 BE 52 F0 04 75
05928  30 B8 BB 00 50 9A 73 00 8C 0A C7 86 52 F0 01 00 B8 BC 00 50 9A 73 00 8C
05940  0A 83 3E B0 B9 00 75 06 C7 06 B0 B9 01 00 B8 BD 00 50 9A 73 00 8C 0A EB
05958  0D B8 BE 00 50 9A 73 00 8C 0A FF 86 52 F0 B8 BF 00 50 9A 73 00 8C 0A A1
05970  82 EE 88 86 48 F0 EB 2A 83 FB 0D 77 03 E9 6E FF 83 FB 1B 77 03 E9 89 FD
05988  83 FB 39 77 03 E9 63 FE 81 FB FD 00 77 03 E9 0D FE 81 FB FE 00 77 03 E9
059A0  B7 FD B8 C1 00 50 9A 73 00 8C 0A E9 55 FC B8 C2 00 50 9A 73 00 8C 0A 9A
059B8  47 00 8C 0A 8B E5 5D CB 55 8B EC 81 EC 04 00 B8 70 E1 50 B8 66 EF 50 9A
059D0  03 00 8C 0A 9A 47 00 8C 0A 8B E5 5D CB 00 55 8B EC 81 EC 02 00 9A 00 00
059E8  3E 00 C7 46 FE 01 00 8B 46 FE 40 89 46 FE 3D 99 3A 75 F4 9A 00 00 10 09
05A00  8B E5 5D CB 55 8B EC 81 EC 02 00 C7 46 FE 01 00 8B 76 FE C6 84 84 B7 20
05A18  8B 46 FE 40 89 46 FE 3D 51 00 75 EC C6 06 84 B7 50 C7 46 FE 00 00 FF 76
05A30  FE 33 C0 50 B8 50 00 50 B8 0F 00 50 9A D2 00 47 06 FF 76 FE 33 C0 50 9A
05A48  94 02 47 06 8B 46 FE 40 89 46 FE 3D 19 00 75 D6 8B E5 5D CB 55 8B EC 81
05A60  EC 08 00 C7 46 FC 00 00 C7 46 F8 13 00 C7 46 FA 23 00 8D 46 FC 50 8D 46
05A78  F8 50 8D 46 FA 50 9A 00 00 11 09 BF 84 B7 BE 78 EF 1E 07 FC A5 A5 A5 A4
05A90  C7 46 FE 00 00 8B 76 FE 80 BC 32 D1 20 74 19 B8 FF 00 50 B8 84 B7 1E 50
05AA8  B8 01 00 50 81 C6 32 D1 96 1E 50 9A D3 02 23 0A 8B 46 FE 40 89 46 FE 3D
05AC0  0A 00 75 D1 B8 FF 00 50 B8 84 B7 1E 50 B8 01 00 50 B8 81 EF 1E 50 9A D3
05AD8  02 23 0A B8 06 00 50 B8 0F 00 50 9A 94 02 47 06 F6 06 22 D1 01 74 5D B8
```

```
05AF0  1C CC 50 B8 0A 00 50 B8 83 EF 1E 50 B8 FF 7F 50 50 9A EC 01 B1 0A C7 46
05B08  FE 00 00 B8 1C CC 50 8B 76 FE FF B4 32 D1 B8 FF 7F 50 50 9A 21 03 B1 0A
05B20  8B 46 FE 40 89 46 FE 3D 0A 00 75 DF B8 1C CC 50 B8 02 00 50 B8 8F EF 1E
05B38  50 B8 FF 7F 50 50 9A EC 01 B1 0A B8 1C CC 50 9A 05 0B 20 09 8B E5 5D CB
05B50  55 8B EC 81 EC 4A 00 C7 46 FA 00 00 C7 46 F8 13 00 C7 46 F6 1E 00 8D 46
05B68  FA 50 8D 46 F8 50 8D 46 F6 50 9A 00 00 11 09 C7 46 FE 01 00 BF 84 B7 BE
05B80  92 EF B9 11 00 1E 07 FC F3 A5 B8 10 00 50 B8 1B 00 50 9A 94 02 47 06 BF
05B98  84 B7 BE B4 EF 1E 07 FC A5 A4 B8 11 00 50 B8 21 00 50 9A 94 02 47 06 BF
05BB0  84 B7 BE B8 EF B9 19 00 1E 07 FC F3 A5 A4 B8 12 00 50 B8 1B 00 50 9A 94
05BC8  02 47 06 A1 EC EF A2 84 B7 9A AD 03 3F 00 A1 80 B7 32 E4 50 B8 1F 00 50
05BE0  50 B9 0B 00 51 B9 EE EF 1E 51 B9 0F 00 51 B9 FA EF 1E 51 8D 4E D6 51 9A
05BF8  84 00 E9 0A 1E 50 B8 1F 00 50 B8 0A F0 1E 50 8D 46 B6 50 9A 84 00 E9 0A
05C10  50 9A F1 02 EE 09 D1 E8 73 04 EB 09 EB 05 9A 0F 00 3D 03 EB AC 8B 1E 80
05C28  B7 32 FF EB 74 A1 84 B7 32 E4 3D 02 00 7D 05 E9 25 01 EB 03 E9 A8 00 E9
05C40  98 00 C7 46 FE 02 00 E9 15 01 E9 8D 00 A1 84 B7 32 E4 0B C0 7E 23 A1 84
05C58  B7 32 E4 96 C6 84 84 B7 00 B8 13 00 50 B8 23 00 50 9A 94 02 47 06 A1 84
05C70  B7 32 E4 48 32 E4 A2 84 B7 EB 5F B8 FF 00 50 B8 84 B7 1E 50 B8 01 00 50
05C88  B8 80 B7 1E 50 9A D3 02 23 0A B8 13 00 50 B8 23 00 50 9A 94 02 47 06 EB
05CA0  39 81 FB FC 00 77 D4 83 FB 07 76 CF 83 FB 08 76 9C 83 FB 0C 76 C5 83 FB
05CB8  0D 77 03 E9 6F FF 83 FB 1A 76 B8 83 FB 1B 77 03 E9 77 FF 81 FB FB 00 76
05CD0  AA 81 FB FC 00 77 03 E9 73 FF A1 84 B7 32 E4 3D 0A 00 74 03 E9 EA FE C7
05CE8  46 FE 00 00 A1 84 B7 32 E4 89 46 F4 83 7E F4 01 7C 1D C7 46 FC 01 00 8B
05D00  76 FC 8B 84 B7 88 84 31 D1 8B 46 FC 40 89 46 FC 48 3B 46 F4 75 E8 A1
05D18  84 B7 32 E4 89 46 F4 83 7E F4 09 7F 1A 8B 46 F4 89 46 FC 8B 76 FC C6 84
05D30  32 D1 20 8B 46 FC 40 89 46 FC 3D 0A 00 75 EC 9A 03 00 0B 02 9A 8D 00 3D
05D48  03 C7 46 F8 14 00 8D 46 FA 50 8D 46 F8 50 8D 46 F6 50 9A 00 00 11 09 8B
05D60  46 FE 8B E5 5D CB 55 8B EC 81 EC 0A 00 C7 46 FC 0B 00 C7 46 FE 19 00 C7
05D78  46 F8 15 00 C7 46 FA 4F 00 FF 76 FE FF 76 FC FF 76 FA FF 76 F8 9A 37 03
05D90  47 06 BF 84 B7 BE 2A F0 B9 0A 00 1E 07 FC F3 A5 B8 0D 00 50 B8 2D 00 50
05DA8  9A 94 02 47 06 BF 84 B7 BE 3E F0 B9 0B 00 1E 07 FC F3 A5 B8 15 00 50 B8
05DC0  26 00 50 9A 94 02 47 06 C4 1E 3C C4 83 C3 1E BF 84 B7 B9 0F 00 9A C3 02
05DD8  EE 09 B8 15 00 50 B8 3B 00 50 9A 94 02 47 06 8B E5 5D CB 55 8B EC 81 EC
05DF0  A8 0F C4 1E 1E C4 8D BE 5C F0 B9 A0 0F 9A C3 02 EE 09 C7 46 FE 02 00 F6
05E08  06 16 D1 01 74 16 BF 32 D1 BE 28 D1 B9 05 00 1E 07 FC F3 A5 9A 03 00 0B
05E20  02 E9 88 00 9A 97 03 3D 03 BF 84 B7 BE 54 F0 B9 06 00 1E 07 FC F3 A5 A4
05E38  B8 0E 00 50 B8 30 00 50 9A 94 02 47 06 C4 1E 3C C4 26 8B 47 30 3D FF 3F
05E50  7C 33 BF 84 B7 BE 62 F0 B9 1D 00 1E 07 FC F3 A5 A4 B8 17 00 50 33 C0 50
05E68  9A 94 02 47 06 9A AD 03 3F 00 C4 1E 1E C4 8D B6 5C F0 B9 D0 07 8B FB FC
05E80  F3 A5 E9 74 01 9A 81 01 3D 03 89 46 FC 83 7E FC 00 74 19 8B 46 FC 89 46
05E98  FE C4 1E 1E C4 8D B6 5C F0 B9 D0 07 8B FB FC F3 A5 E9 4D 01 9A 90 01 0B
05EB0  02 F6 06 20 D1 01 74 27 BF 84 B7 BE 9E F0 B9 1A 00 1E 07 FC F3 A5 B8 17
05EC8  00 50 33 C0 50 9A 94 02 47 06 C7 46 FE 01 00 9A AD 03 3F 00 E9 0A 01 C4
05EE0  1E 3C C4 26 8B 47 1C 3D FA 00 75 3D BF 84 B7 BE D2 F0 B9 0B 00 1E 07 FC
05EF8  F3 A5 B8 16 00 50 33 C0 50 9A 94 02 47 06 BF 84 B7 BE E8 F0 B9 1E 00 1E
05F10  07 FC F3 A5 A4 B8 17 00 50 33 C0 50 9A 94 02 47 06 9A AD 03 3F 00 E9 C0
05F28  00 C4 1E 3C C4 26 8B 47 1C 89 86 5A F0 A1 36 C4 89 86 58 F0 8B 86 5A F0
05F40  3B 86 58 F0 7C 30 89 46 FC B8 0E 00 F7 66 FC C4 1E 2E C4 03 D8 53 06 05
05F58  0E 00 C4 1E 2E C4 03 D8 B9 0E 00 9A A5 02 EE 09 8B 46 FC 48 89 46 FC 40
05F70  3B 86 58 F0 75 D3 C4 1E 3C C4 83 C3 1C 26 83 07 01 B8 0E 00 F7 26 36 C4
05F88  C4 1E 2E C4 03 D8 BE 32 D1 B9 05 00 8B FB FC F3 A5 C4 1E 3C C4 26 8B 47
05FA0  30 8B D0 B8 0E 00 8B CA F7 26 36 C4 05 0A 00 C4 1E 2E C4 03 D8 26 89 0F
05FB8  B8 0E 00 F7 26 36 C4 96 83 C6 0C C4 1E 2E C4 26 8B 00 25 FE FF 8B D0 B8
05FD0  0E 00 8B CA F7 26 36 C4 05 0C 00 C4 1E 2E C4 03 D8 26 89 0F C7 46 FE 00
05FE8  00 C4 1E 1E C4 8D B6 5C F0 B9 D0 07 8B FB FC F3 A5 8B 46 FE 8B E5 5D CB
06000  55 8B EC 81 EC 10 00 C4 1E 3C C4 83 C3 33 26 C6 07 01 B8 0E 00 F7 66 06
06018  96 83 C6 0A C4 1E 2E C4 26 8B 00 89 46 FA 8B 46 FE C4 1E 32 C4
06030  8B 76 FE 26 8B 00 3C FF 74 05 FF 46 FE EB ED B8 0E 00 F7 66 06 96 83 C6
06048  0C C4 1E 2E C4 26 8B 00 3D 01 00 75 12 8B 76 FE 46 C4 1E 32 C4 26 8B 00
06060  3C FF 75 03 FF 46 FE 8B 46 FE 2B 46 FA 40 89 46 F6 C4 1E 3C C4 83 C3 1C
06078  26 83 2F 01 C4 1E 3C C4 26 8B 47 1C 89 46 F2 83 7E F2 00 7C 3A C7 46 F4
06090  00 00 B8 0E 00 F7 66 F4 96 83 C6 0A C4 1E 2E C4 26 8B 00 89 46 F8 8B 46
060A8  F8 3B 46 FA 7E 0C 2B 46 F6 C4 1E 2E C4 03 DE 26 89 07 8B 46 F4 40 89 46
060C0  F4 48 3B 46 F2 75 CB 8B 46 06 89 46 F2 C4 1E 3C C4 26 8B 47 1C 89 46 F0
060D8  8B 46 F0 3B 46 F2 7C 34 8B 46 F2 89 46 F4 B8 0E 00 F7 66 F4 8B D0 05 0E
060F0  00 C4 1E 2E C4 03 D8 53 06 C4 1E 2E C4 03 DA B9 0E 00 9A A5 02 EE 09 8B
06108  46 F4 40 89 46 F4 48 3B 46 F0 75 D2 C4 1E 3C C4 26 8B 47 30 3B 46 FE 74
06120  32 FF 46 FE 8B 46 FA 89 46 FC C4 1E 3C C4 26 8B 47 30 3B 46 FE 7C 1C C4
```

```
06138  1E 32 C4 8B 76 FE 26 8B 00 C4 1E 32 C4 03 5E FC 26 88 07 FF 46 FC FF 46
06150  FE EB D7 8B 46 FC 48 C4 1E 3C C4 83 C3 30 26 89 07 8B E5 5D CA 02 00 55
06168  8B EC 81 EC A0 0F C4 1E 1E C4 8D BE 60 F0 B9 A0 0F 9A C3 02 EE 09 9A 97
06180  03 3D 03 BF 84 B7 BE 26 F1 B9 0E 00 1E 07 FC F3 A5 A4 B8 0E 00 50 B8 28
06198  00 50 9A 94 02 47 06 9A 81 01 3D 03 23 C0 74 12 C4 1E 1E C4 8D B6 60 F0
061B0  B9 D0 07 8B FB FC F3 A5 EB 63 9A 90 01 0B 02 F6 06 20 D1 01 75 3E B8 C0
061C8  E4 50 B8 1C 00 50 B8 45 F1 1E 50 B8 FF 7F 50 50 9A EC 01 B1 0A B8 C0 E4
061E0  50 9A 05 0B 20 09 B8 C0 E4 50 B8 29 00 50 B8 63 F1 1E 50 B8 FF 7F 50 50
061F8  9A EC 01 B1 0A 9A AD 03 3F 00 EB 09 FF 36 36 C4 9A 31 06 3D 03 C4 1E 1E
06210  C4 8D B6 60 F0 B9 D0 07 8B FB FC F3 A5 8B E5 5D CB 55 8B EC 81 EC 04 00
06228  C7 46 FC 00 00 B8 0E 00 F7 66 06 96 83 C6 0A C4 1E 2E C4 26 8B 00 89 46
06240  FE C4 1E 32 C4 8B 76 FE 26 8B 00 3C FF 75 03 E9 8A 00 C4 1E 32 C4 26 8B
06258  00 3C 0D 75 0B B8 C0 E4 50 9A 05 0B 20 09 EB 19 B8 C0 E4 50 C4 1E 32 C4
06270  8B 76 FE 26 8B 00 50 B8 FF 7F 50 50 9A 21 03 B1 0A F6 06 22 D1 01 74 4E
06288  C4 1E 32 C4 8B 76 FE 26 8B 00 3C 0D 75 10 C7 46 FC 00 00 B8 1C CC 50 9A
062A0  05 0B 20 09 EB 30 FF 46 FC B8 1C CC 50 C4 1E 32 C4 8B 76 FE 26 8B 00 50
062B8  B8 FF 7F 50 50 9A 21 03 B1 0A 83 7E FC 50 75 0E C7 46 FC 00 00 B8 1C CC
062D0  50 9A 05 0B 20 09 FF 46 FE E9 65 FF 8B E5 5D CA 02 00 55 8B EC 81 EC 0E
062E8  00 9A 35 00 3D 03 C4 1E 3C C4 26 8B 47 1C 23 C0 75 3F B8 C0 E4 50 B8 17
06300  00 50 B8 8D F1 1E 50 B8 FF 7F 50 50 9A EC 01 B1 0A B8 C0 E4 50 9A 05 0B
06318  20 09 B8 C0 E4 50 B8 29 00 50 B8 A5 F1 1E 50 B8 FF 7F 50 50 9A EC 01 B1
06330  0A 9A AD 03 3F 00 E9 C8 02 B8 C0 E4 50 9A 05 0B 20 09 B8 C0 E4 50 B8 2D
06348  00 50 B8 CF F1 1E 50 B8 FF 7F 50 50 9A EC 01 B1 0A B8 C0 E4 50 9A 05 0B
06360  20 09 B8 C0 E4 50 B8 21 00 50 B8 93 EF 1E 50 B8 FF 7F 50 50 9A EC 01 B1
06378  0A B8 C0 E4 50 9A 05 0B 20 09 9A AD 03 3F 00 80 3E 80 B7 1B 75 03 E9 70
06390  02 C6 06 1C CC 01 B8 1C CC 50 B8 03 00 50 B8 FD F1 1E 50 9A 9B 04 20 09
063A8  B8 1C CC 50 9A 8A 09 20 09 A1 1D CC 32 E4 23 C0 75 03 E9 8E 00 B8 C0 E4
063C0  50 B8 0D 00 50 B8 01 F2 1E 50 B8 FF 7F 50 50 9A EC 01 B1 0A B8 C0 E4 50
063D8  9A 05 0B 20 09 B8 C0 E4 50 B8 21 00 50 B8 93 EF 1E 50 B8 FF 7F 50 50 9A
063F0  EC 01 B1 0A B8 C0 E4 50 9A 05 0B 20 09 B8 C0 E4 50 B8 05 00 50 B8 0F F2
06408  1E 50 B8 FF 7F 50 50 9A EC 01 B1 0A B8 C0 E4 50 9A 05 0B 20 09 B8 C0 E4
06420  50 B8 26 00 50 B8 15 F2 1E 50 B8 FF 7F 50 50 9A EC 01 B1 0A C6 06 1D CC
06438  00 9A AD 03 3F 00 80 3E 80 B7 1B 75 03 E9 B9 01 E9 4B FF C6 06 1C CC 00
06450  C6 06 22 D1 01 C4 1E 3C C4 26 8B 47 1C 48 89 46 F2 83 7E F2 00 7D 03 E9
06468  2D 01 C7 46 FC 00 00 9A 35 00 3D 03 B8 C0 E4 50 B8 2D 00 50 B8 3D F2 1E
06480  50 B8 FF 7F 50 50 9A EC 01 B1 0A B8 C0 E4 50 9A 05 0B 20 09 B8 C0 E4 50
06498  B8 21 00 50 B8 93 EF 1E 50 B8 FF 7F 50 50 9A EC 01 B1 0A B8 C0 E4 50 9A
064B0  05 0B 20 09 B8 0E 00 F7 66 FC C4 1E 2E C4 03 D8 BF 32 D1 B9 0A 00 9A C3
064C8  02 EE 09 9A 8D 00 3D 03 C7 46 F8 00 00 C7 46 F4 09 00 C7 46 F6 00 00 8D
064E0  46 F8 50 8D 46 F4 50 8D 46 F6 50 9A 00 00 11 09 FF 76 FC 9A 52 08 3D 03
064F8  B8 C0 E4 50 B8 11 00 50 B8 6B F2 1E 50 B8 FF 7F 50 50 9A EC 01 B1 0A B8
06510  C0 E4 50 9A 05 0B 20 09 B8 C0 E4 50 9A 05 0B 20 09 B8 C0 E4 50 9A 05 0B
06528  20 09 B8 1C CC 50 B8 11 00 50 B8 7D F2 1E 50 B8 FF 7F 50 50 9A EC 01 B1
06540  0A B8 1C CC 50 9A 05 0B 20 09 B8 1C CC 50 9A 05 0B 20 09 C7 46 FA 00 00
06558  9A 09 00 3F 00 80 3E 80 B7 00 74 17 80 3E 80 B7 1B 75 02 EB 2A 9A AD 03
06570  3F 00 80 3E 80 B7 1B 75 02 EB 1C 8B 46 FA 40 89 46 FA 3D 97 00 75 D1 8B
06588  46 FC 40 89 46 FC 48 3B 46 F2 74 03 E9 D8 FE B8 C0 E4 50 B8 25 00 50 B8
065A0  8F F2 1E 50 B8 FF 7F 50 50 9A EC 01 B1 0A B8 C0 E4 50 9A 05 0B 20 09 B8
065B8  1C CC 50 B8 25 00 50 B8 B5 F2 1E 50 B8 FF 7F 50 50 9A EC 01 B1 0A B8 1C
065D0  CC 50 9A 05 0B 20 09 B8 C0 E4 50 B8 29 00 50 B8 DB F2 1E 50 B8 FF 7F 50
065E8  50 9A EC 01 B1 0A 9A AD 03 3F 00 B8 1C CC 50 9A B1 05 20 09 C6 06 22 D1
06600  00 8B E5 5D CB 55 8B EC 81 EC AC 0F C4 1E 1E C4 8D BE 5E F0 B9 A0 0F 9A
06618  C3 02 EE 09 C4 1E 3C C4 83 C3 1E 06 53 B8 EC EF 1E 50 9A 0D 00 23 0A D1
06630  E8 73 43 9A 35 00 3D 03 BF 84 B7 BE 04 F3 B9 0B 00 1E 07 FC F3 A5 B8 0A
06648  00 50 B8 1E 00 50 9A 94 02 47 06 BF 84 B7 BE 1A F3 B9 0D 00 1E 07 FC F3
06660  A5 B8 0C 00 50 B8 1C 00 50 9A 94 02 47 06 9A AD 03 3F 00 E9 82 02 C4 1E
06678  3C C4 83 C3 34 26 C6 07 01 C6 06 22 D1 00 C7 86 5A F0 07 00 C7 86 5C F0
06690  0C 00 C7 86 56 F0 14 00 C7 86 58 F0 39 00 FF B6 5C F0 FF B6 5A F0 FF B6
066A8  58 F0 FF B6 56 F0 9A 37 03 47 06 BF 84 B7 BE 34 F3 B9 0A 00 1E 07 FC F3
066C0  A5 B8 09 00 50 B8 1A 00 50 9A 94 02 47 06 BF 84 B7 BE 48 F3 B9 06 00 1E
066D8  07 FC F3 A5 B8 0A 00 50 B8 1D 00 50 9A 94 02 47 06 BF 84 B7 BE 54 F3 B9
066F0  0F 00 1E 07 FC F3 A5 A4 B8 0C 00 50 B8 0E 00 50 9A 94 02 47 06 BF 84 B7
06708  BE 74 F3 B9 13 00 1E 07 FC F3 A5 B8 0D 00 50 B8 11 00 50 9A 94 02 47 06
06720  BF 84 B7 BE 9A F3 B9 13 00 1E 07 FC F3 A5 A4 B8 0E 00 50 B8 11 00 50 9A
06738  94 02 47 06 BF 84 B7 BE C2 F3 B9 13 00 1E 07 FC F3 A5 A4 B8 0F 00 50 B8
06750  11 00 50 9A 94 02 47 06 BF 84 B7 BE EA F3 B9 0E 00 1E 07 FC F3 A5 A4 B8
06768  10 00 50 B8 11 00 50 9A 94 02 47 06 BF 84 B7 BE 08 F4 B9 0F 00 1E 07 FC
```

```
06780  F3 A5 B8 11 00 50 50 9A 94 02 47 06 BF 84 B7 BE 26 F4 B9 0F 00 1E 07 FC
06798  F3 A5 B8 12 00 50 B8 11 00 50 9A 94 02 47 06 BF 84 B7 BE 44 F4 B9 0B 00
067B0  1E 07 FC F3 A5 B8 14 00 50 B8 15 00 50 9A 94 02 47 06 C4 1E 3C C4 83 C3
067C8  1E BF 84 B7 B9 0F 00 9A C3 02 EE 09 B8 14 00 50 B8 29 00 50 9A 94 02 47
067E0  06 9A AD 03 3F 00 8B 1E 80 B7 32 FF EB 71 C4 1E 3C C4 26 8B 47 36 89 46
067F8  FE C4 1E 3C C4 83 C3 36 26 C7 07 24 00 9A 09 00 31 04 C4 1E 3C C4 83 C3
06810  36 8B 46 FE 26 89 07 E9 D0 00 9A 4D 00 31 04 E9 C8 00 9A 13 09 3D 03 E9
06828  C0 00 C4 1E 3C C4 26 8B 47 36 89 46 FE C4 1E 3C C4 83 C3 36 26 C7 07 25
06840  00 9A 98 07 3D 03 C4 1E 3C C4 83 C3 36 8B 46 FE 26 89 07 E9 94 00 E9 94
06858  00 E9 8E 00 E9 8B 00 81 FB EE 00 77 F7 83 FB 0F 76 F2 83 FB 10 76 BB 83
06870  FB 1A 76 E8 83 FB 1B 76 DD 83 FB 42 76 DE 83 FB 43 77 03 E9 68 FF 83 FB
06888  4C 76 D1 83 FB 4D 76 8A 83 FB 4F 76 C7 83 FB 50 76 88 83 FB 51 76 BD 83
068A0  FB 52 76 86 83 FB 62 76 B3 83 FB 63 77 03 E9 3D FF 83 FB 6C 76 A6 83 FB
068B8  6D 77 03 E9 5C FF 83 FB 6F 76 99 83 FB 70 77 03 E9 57 FF 83 FB 71 76 8C
068D0  83 FB 72 77 03 E9 52 FF 81 FB ED 00 77 03 E9 7B FF 81 FB EE 00 77 03 E9
068E8  04 FF E9 F4 FE C4 1E 3C C4 83 C3 34 26 C6 07 00 C4 1E 1E C4 8D B6 5E F0
06900  B9 D0 07 8B FB FC F3 A5 8B E5 5D CB 55 8B EC 81 EC 04 00 8B E5 5D CB 00
06918  55 8B EC 81 EC A0 0F C4 1E 1E C4 8D BE 60 F0 B9 A0 0F 9A C3 02 EE 09 C6
06930  06 14 D1 01 9A 01 00 21 01 C6 06 82 B7 00 9A 01 00 9C 00 C6 06 14 D1 00
06948  C4 1E 1E C4 8D B6 60 F0 B9 D0 07 8B FB FC F3 A5 8B E5 5D CB 55 8B EC 81
06960  EC A2 0F C4 1E 1E C4 8D BE 5E F0 B9 A0 0F 9A C3 02 EE 09 C6 06 16 D1 01
06978  9A 97 03 3D 03 BF 84 B7 BE 5C F4 B9 06 00 1E 07 FC F3 A5 A4 B8 0E 00 50
06990  B8 31 00 50 9A 94 02 47 06 9A 81 01 3D 03 23 C0 74 18 C6 06 16 D1 00 C4
069A8  1E 1E C4 8D B6 5E F0 B9 D0 07 8B FB FC F3 A5 E9 87 01 9A 90 01 0B 02 F6
069C0  06 20 D1 01 74 03 E9 7E 00 B8 C0 E4 50 B8 1C 00 50 B8 6B F4 1E 50 B8 FF
069D8  7F 50 50 9A EC 01 B1 0A B8 C0 E4 50 9A 05 0B 20 09 B8 C0 E4 50 B8 21 00
069F0  50 B8 89 F4 1E 50 B8 FF 7F 50 50 9A EC 01 B1 0A B8 C0 E4 50 9A 05 0B 20
06A08  09 B8 C0 E4 50 B8 05 00 50 B8 AB F4 1E 50 B8 FF 7F 50 50 9A EC 01 B1 0A
06A20  B8 C0 E4 50 9A 05 0B 20 09 B8 C0 E4 50 B8 30 00 50 B8 B1 F4 1E 50 B8 FF
06A38  7F 50 50 9A EC 01 B1 0A 9A AD 03 3F 00 EB 4B BF 28 D1 BE 32 D1 B9 05 00
06A50  1E 07 FC F3 A5 B8 0E 00 F7 26 36 C4 96 83 C6 0A C4 1E 2E C4 26 8B 00 A3
06A68  3A C4 B8 0E 00 F7 26 36 C4 96 83 C6 0C C4 1E 2E C4 26 8B 00 25 01 00 3D
06A80  01 00 75 07 C6 06 24 D1 00 EB 05 C6 06 24 D1 01 EB 0A 80 3E 80 B7 1B 74
06A98  03 E9 DC FE A1 36 C4 A3 38 C4 F6 06 24 D1 01 74 16 9A 01 00 21 01 C6 06
06AB0  82 B7 00 C6 06 18 D1 01 9A 01 00 9C 00 EB 6D B8 C0 E4 50 B8 AE 00 50 B8
06AC8  FF 7F 50 50 9A 21 03 B1 0A C7 46 FE 00 00 8B 76 FE 80 BC 28 D1 20 74 12
06AE0  B8 C0 E4 50 FF B4 28 D1 B8 FF 7F 50 50 9A 21 03 B1 0A 8B 46 FE 40 89 46
06AF8  FE 3D 0A 00 75 D8 B8 C0 E4 50 B8 AF 00 50 B8 FF 7F 50 50 9A 21 03 B1 0A
06B10  B8 C0 E4 50 B8 13 00 50 B8 E3 F4 1E 50 B8 FF 7F 50 50 9A EC 01 B1 0A 9A
06B28  AD 03 3F 00 C6 06 16 D1 00 C4 1E 1E C4 8D B6 5E F0 B9 D0 07 8B FB FC F3
06B40  A5 8B E5 5D CB 55 8B EC 81 EC 00 00 FF 36 38 C4 9A 31 06 3D 03 A1 90 B9
06B58  A3 0E C4 A1 A6 B9 A3 14 C4 A1 92 B9 A3 10 C4 A1 A8 B9 A3 12 C4 9A 45 03
06B70  77 08 8B E5 5D CB 55 8B EC 81 EC 04 00 8B E5 5D CB 00 55 8B EC 81 EC 5E
06B88  00 B8 14 00 50 50 9A 03 00 47 06 B8 14 00 50 B8 15 00 50 9A B5 0A 87 05
06BA0  8B 46 06 89 46 A2 83 7E A2 13 7F 4C C7 46 A4 13 00 B8 0A 00 F7 66 A4 96
06BB8  8B D6 81 C6 0A C2 8B FA 81 C7 14 C2 B9 05 00 1E 07 FC F3 A5 B8 A0 00 F7
06BD0  66 A4 C4 1E 1E C4 03 D8 53 06 05 A0 00 C4 1E 1E C4 03 D8 B9 A0 00 9A A5
06BE8  02 EE 09 8B 46 A4 48 89 46 A4 40 3B 46 A2 75 B9 FF 76 06 9A 0D 00 87 05
06C00  B8 0A 00 F7 66 06 96 A1 A2 B9 89 84 0A C2 FF 06 A2 B9 83 7E 06 03 75 6F
06C18  83 BC 18 C2 00 74 66 B8 50 C4 50 33 D2 8B 84 18 C2 52 50 9A DE 0A 20 09
06C30  B8 50 C4 50 9A 5B 06 20 09 8D 7E A6 BE CA C6 B9 2D 00 1E 07 FC F3 A5 B8
06C48  0A 00 F7 66 06 96 8B 46 A6 89 84 0E C2 8B 84 0A C2 89 46 A8 B8 50 C4 50
06C60  33 D2 8B 46 A6 52 50 9A DE 0A 20 09 BF CA C6 8D 76 A6 B9 2D 00 1E 07 FC
06C78  F3 A5 B8 50 C4 50 9A 61 08 20 09 EB 00 EB 1C B8 0A 00 F7 66 06 96 8B 84
06C90  00 C2 89 84 0E C2 8B 84 0A C2 89 84 02 C2 C6 84 08 C2 01 83 7E 06 14 75
06CA8  76 B8 0A 00 F7 66 06 96 83 BC 02 C2 00 74 66 B8 50 C4 50 33 D2 8B 84 02
06CC0  C2 52 50 9A DE 0A 20 09 B8 50 C4 50 9A 5B 06 20 09 8D 7E A6 BE CA C6 B9
06CD8  2D 00 1E 07 FC F3 A5 B8 0A 00 F7 66 06 96 8B 46 A6 89 84 0C C2 8B 84 0A
06CF0  C2 89 46 AA B8 50 C4 50 33 D2 8B 46 A6 52 50 9A DE 0A 20 09 BF CA C6 8D
06D08  76 A6 B9 2D 00 1E 07 FC F3 A5 B8 50 C4 50 9A 61 08 20 09 EB 00 EB 1C B8
06D20  0A 00 F7 66 06 96 8B 84 14 C2 89 84 0C C2 8B 84 0A C2 89 84 18 C2 C6 84
06D38  1C C2 01 FF 76 06 FF 76 06 9A C5 01 47 06 8B E5 5D CA 02 00 55 8B EC 81
06D50  EC F6 01 B8 0A 00 F7 66 0C 96 8B 84 10 C2 89 86 0E FE 8B 76 06 8B 04 32
06D68  E4 89 86 5C FF C6 86 5E FF 00 A1 16 C4 03 86 0E FE 3B 46 0A 7D 33 83 BE
06D80  0E FE 00 7E 21 B8 50 00 F7 6E 0C 96 03 36 16 C4 03 B6 0E FE D1 E6 4E 4E
06D98  C4 1E 1E C4 26 8B 00 3C 0D 75 03 E9 9F 05 8B 46 0A 2B 06 16 C4 89 86 0E
06DB0  FE B8 0A 00 F7 66 0C 96 C6 84 12 C2 01 8B 86 0E FE 89 86 50 FF A1 16 C4
```

```
06DC8  89 86 0C FE 8B 46 0A 48 89 86 0A FE 8B 86 0A FE 3B 86 0C FE 7C 3E 8B 86
06DE0  0C FE 89 86 56 FF B8 50 00 F7 6E 0C 96 03 B6 56 FF D1 E6 C4 1E 1E C4 26
06DF8  8B 00 8B B6 56 FF 2B 36 16 C4 D1 E6 8D 8E 10 FE 03 F1 89 04 8B 86 56 FF
06E10  40 89 86 56 FF 48 3B 86 0A FE 75 CA C7 86 5A FF 01 00 8B 46 0A 2B 06 16
06E28  C4 89 86 52 FF 8B 86 5C FF 3B 86 5A FF 7D 03 E9 5D 01 8B B6 5A FF 03 76
06E40  06 8B 04 A2 80 B7 8B 1E 80 B7 32 FF E9 20 01 8B B6 52 FF D1 E6 C6 82 11
06E58  FE 0F C6 82 10 FE 0D 8B 86 52 FF 40 89 86 0E FE C7 86 56 FF 00 00 8B 86
06E70  52 FF 3B 86 56 FF 7C 09 A1 86 B8 01 86 56 FF EB ED 8B 86 56 FF 89 86 52
06E88  FF E9 04 01 A1 16 C4 3B 46 0A 75 3C C7 86 56 FF 00 00 8B B6 56 FF D1 E6
06EA0  C6 82 10 FE 00 C6 82 11 FE 0F 8B 86 56 FF 40 89 86 56 FF 3D 05 00 75 E2
06EB8  C6 86 1B FE 0F C6 86 1A FE 14 83 86 0E FE 05 C7 86 52 FF 06 00 E9 81 00
06ED0  C7 86 58 FF 00 00 8B 86 52 FF 3B 86 58 FF 7E 09 A1 86 B8 01 86 58 FF EB
06EE8  ED 8B 86 52 FF 89 86 0C FE 8B 86 58 FF 05 04 00 89 86 0A FE 8B 86 0A FE
06F00  3B 86 0C FE 7C 28 8B 86 0C FE 89 86 56 FF 8B B6 56 FF D1 E6 C6 82 11 FE
06F18  0F C6 82 10 FE 00 8B 86 56 FF 40 89 86 56 FF 48 3B 86 0A FE 75 E0 8B B6
06F30  58 FF D1 E6 C6 82 1B FE 0F C6 82 1A FE 14 8B 86 52 FF 89 86 0E FE 8B 86
06F48  58 FF 05 06 00 89 86 52 FF EB 3D 8B B6 52 FF D1 E6 C6 82 11 FE 0F A1 80
06F60  B7 88 82 10 FE FF 86 0E FE FF 86 52 FF EB 21 83 FB 14 77 DF 83 EB 0D 72
06F78  DA D1 E3 2E FF A7 01 04 D0 02 D4 03 D4 03 D4 03 D4 03 D4 03 D4 03 0D 03
06F90  FF 86 5A FF E9 96 FE 8B 46 0A 89 86 0C FE A1 16 C4 03 86 50 FF 48 89 86
06FA8  0A FE 8B 86 0A FE 3B 86 0C FE 7C 41 8B 86 0C FE 89 86 56 FF B8 50 00 F7
06FC0  6E 0C 96 03 B6 56 FF D1 E6 C4 1E 1E C4 26 8B 00 8B B6 56 FF 2B 76 0A 03
06FD8  B6 52 FF D1 E6 8D 8E 10 FE 03 F1 89 04 8B 86 56 FF 40 89 86 56 FF 48 3B
06FF0  86 0A FE 75 C7 8B 86 52 FF 03 86 50 FF 2B 46 0A 03 06 16 C4 89 86 50 FF
07008  A1 86 B8 48 3B 86 0E FE 7C 03 E9 AB 00 A1 86 B8 48 89 86 0C FE 83 BE 0C
07020  FE 00 7C 2D 8B 86 0C FE 89 86 56 FF 8B B6 56 FF D1 E6 80 BA 10 FE 20 75
07038  0A 8B 86 56 FF 89 86 54 FF EB 0E 8B 86 56 FF 48 89 86 56 FF 3D FF FF 75
07050  DB 8B 86 50 FF 48 89 86 0C FE 8B 86 54 FF 40 89 86 0A FE 8B 86 0C FE 3B
07068  86 0A FE 7C 38 89 86 56 FF 8B B6 56 FF D1 E6 8D 86 10 FE 03 F0 8B 3E 86
07080  B8 2B BE 54 FF 03 BE 56 FF D1 E7 8D 86 0E FE 03 F8 1E 07 FC A5 8B 86 56
07098  FF 48 89 86 56 FF 40 3B 86 0A FE 75 CC A1 86 B8 03 86 50 FF 2B 86 54 FF
070B0  48 89 86 50 FF 8B 86 54 FF 40 89 86 0E FE EB 07 A1 86 B8 89 86 54 FF A1
070C8  86 B8 3B 86 50 FF 7C 03 E9 B8 00 8B 86 50 FF 2B 06 86 B8 32 E4 88 86 5E
070E0  FF A1 86 B8 89 86 0C FE 8B 86 50 FF 48 89 86 0A FE 8B 86 0A FE 3B 86 0C
070F8  FE 7C 2E 8B 86 0C FE 89 86 56 FF 8B B6 56 FF 2B 36 86 B8 8B BE 56 FF D1
07110  E7 8B 83 10 FE 88 82 5F FF 8B 86 56 FF 40 89 86 56 FF 48 3B 86 0A FE 75
07128  DA 8B 86 52 FF 3B 86 54 FF 7E 0D 03 06 86 B8 2B 86 54 FF 48 89 86 52 FF
07140  A1 16 C4 03 86 0E FE 89 86 0C FE A1 18 C4 48 89 86 0A FE 8B 86 0A FE 3B
07158  86 0C FE 7C 2E 8B 86 0C FE 89 86 56 FF B8 50 00 F7 6E 0C 03 86 56 FF D1
07170  E0 C4 1E 1E C4 03 D8 26 C6 07 20 8B 86 56 FF 40 89 86 56 FF 48 3B 86 0A
07188  FE 75 DA A1 16 C4 89 86 0C FE A1 16 C4 03 86 0E FE 48 89 86 0A FE 8B 86
071A0  0A FE 3B 86 0C FE 7C 3E 8B 86 0C FE 89 86 56 FF 8B B6 56 FF 2B 36 16 C4
071B8  D1 E6 8D 86 10 FE 03 F0 B8 50 00 F7 6E 0C 03 86 56 FF D1 E0 C4 1E 1E C4
071D0  03 D8 8B FB FC A5 8B 86 56 FF 40 89 86 56 FF 48 3B 86 0A FE 75 CA B8 0A
071E8  00 F7 66 0C 96 8B 86 0E FE 89 84 10 C2 83 7E 0C 11 7C 13 A1 9C B9 3B 46
07200  0C 75 0B 9A EF 03 BF 07 A1 9C B9 89 46 0C 8B 86 5E FF 32 E4 0B C0 7F 03
07218  E9 F8 00 83 7E 0C 11 7D 65 96 80 BA 5E FF 0D 75 0C 8B 46 0C 40 50 9A 03
07230  00 58 04 EB 2C B8 0A 00 F7 66 0C 96 8B 84 1A C2 8B D0 8B 86 5E FF 32 E4
07248  03 D0 3B 16 86 B8 7E 11 83 BC 1A C2 00 7E 0A 8B 46 0C 40 50 9A 03 00 58
07260  04 8B 46 0C 40 A3 9C B9 8B D0 A1 16 C4 A3 9E B9 52 FF 36 16 C4 B8 A0 00
07278  50 8D 86 5E FF 50 9A CD 01 58 04 E9 8B 00 83 7E 0C 14 75 4B 8B 86 5E FF
07290  32 E4 89 86 0C FE 83 BE 0C FE 01 7C 2A C7 86 56 FF 01 00 A1 16 C4 03 86
072A8  56 FF 96 8B BE 56 FF 8B 83 5E FF 88 84 79 C0 8B 86 56 FF 40 89 86 56 FF
072C0  48 3B 86 0C FE 75 DC 8B 86 5E FF 32 E4 A3 E2 C2 9A D2 08 87 05 EB 3A 8B
072D8  86 5E FF 32 E4 96 80 BA 5E FF 0D 75 0A 8B 46 0C 40 50 9A 03 00 58 04 8B
072F0  46 0C 40 A3 9C B9 8B D0 A1 16 C4 A3 9E B9 52 FF 36 16 C4 B8 A0 00 50 8D
07308  86 5E FF 50 9A CD 01 58 04 EB 32 8B 86 54 FF 3B 86 52 FF 7E 12 8B 46 0C
07320  A3 9C B9 A1 16 C4 03 86 52 FF A3 9E B9 EB 16 8B 46 0C 40 A3 9C B9 8B 86
07338  52 FF 2B 06 86 B8 03 06 16 C4 A3 9E B9 8B E5 5D CA 08 00 55 8B EC 81 EC
07350  12 00 A1 8A B8 32 E4 89 46 FE 8B 46 06 89 46 F2 83 7E F2 14 7E 03 E9 E2
07368  00 8B 46 F2 89 46 F8 A1 1C C4 2B 06 1A C4 40 3B 46 FE 7F 03 E9 BD 00 B8
07380  0A 00 F7 66 F8 96 8B 84 10 C2 89 46 FC A1 9C B9 3B 46 F8 75 31 A1 16 C4
07398  03 46 FC 3B 06 9E B9 7D 0B 8B 46 FC 03 46 FE A3 88 B8 EB 0E A1 9E B9 03
073B0  46 FE 2B 06 16 C4 40 A3 88 B8 C7 06 9E B9 FF 00 C7 06 9C B9 FF 00 A1 16
```

| | | | | | | | | | | | | | | | | | |
|---|---|---|---|---|---|---|---|---|---|---|---|---|---|---|---|---|---|
| 073C8 | C4 | 89 | 46 | F0 | A1 | 16 | C4 | 03 | 46 | FC | 48 | 89 | 46 | EE | 8B | 46 | EE | 3B | 46 | F0 | 7C | 3A | 8B | 46 |
| 073E0 | F0 | 89 | 46 | F6 | FF | 46 | FE | 8B | 76 | FE | B8 | 50 | 00 | F7 | 6E | F8 | 97 | 03 | 7E | F6 | D1 | E7 | C4 | 1E |
| 073F8 | 1E | C4 | 26 | 8B | 01 | 88 | 84 | 8A | B8 | C4 | 1E | 1E | C4 | 03 | DF | 26 | C6 | 07 | 00 | 8B | 46 | F6 | 40 | 89 |
| 07410 | 46 | F6 | 48 | 3B | 46 | EE | 75 | CC | B8 | 0A | 00 | F7 | 66 | F8 | 96 | C6 | 84 | 12 | C2 | 01 | C7 | 84 | 10 | C2 |
| 07428 | 00 | 00 | 83 | 7E | FE | 00 | 7E | 0C | 8B | 76 | FE | 80 | BC | 8A | B8 | 0D | 75 | 02 | EB | 0F | 8B | 46 | F8 | 40 |
| 07440 | 89 | 46 | F8 | 3D | 15 | 00 | 74 | 03 | E9 | 24 | FF | A1 | 1C | C4 | 2B | 06 | 1A | C4 | 40 | 3B | 46 | FE | 7F | 03 |
| 07458 | E9 | 98 | 00 | 83 | 7E | FE | 00 | 7E | 0D | 8B | 76 | FE | 80 | BC | 8A | B8 | 0D | 75 | 03 | E9 | 85 | 00 | 83 | 3E |
| 07470 | D4 | C2 | 00 | 74 | 19 | B8 | 14 | 00 | 50 | 9A | 09 | 00 | 0B | 08 | A1 | D8 | C2 | 89 | 46 | FC | 83 | 7E | FC | 00 |
| 07488 | 7E | 02 | EB | 02 | EB | E0 | 83 | 7E | FC | 00 | 75 | 02 | EB | 5D | A1 | 16 | C4 | 89 | 46 | F2 | A1 | 16 | C4 | 03 |
| 074A0 | 46 | FC | 48 | 89 | 46 | F0 | 8B | 46 | F0 | 3B | 46 | F2 | 7C | 37 | 8B | 46 | F2 | 89 | 46 | F6 | FF | 46 | FE | 8B |
| 074B8 | 76 | FE | 8B | 7E | F6 | D1 | E7 | 81 | C7 | 80 | 0C | C4 | 1E | 1E | C4 | 26 | 8B | 01 | 88 | 84 | 8A | B8 | C4 | 1E |
| 074D0 | 1E | C4 | 03 | DF | 26 | C6 | 07 | 00 | 8B | 46 | F6 | 40 | 89 | 46 | F6 | 48 | 3B | 46 | F0 | 75 | CF | C6 | 06 | DA |
| 074E8 | C2 | 01 | C7 | 06 | D8 | C2 | 00 | 00 | E9 | 58 | FF | A1 | 1A | C4 | 89 | 46 | F6 | B8 | 0A | 00 | F7 | 66 | 06 | 96 |
| 07500 | 83 | BC | 10 | C2 | 00 | 7E | 08 | FF | 76 | 06 | 9A | 03 | 00 | 58 | 04 | 83 | 7E | FE | 00 | 7F | 03 | E9 | C6 | 01 |
| 07518 | B8 | 0A | 00 | F7 | 66 | 06 | 96 | C6 | 84 | 12 | C2 | 01 | A1 | 8B | B8 | A2 | 80 | B7 | B8 | 50 | 00 | F7 | 6E | 06 |
| 07530 | 03 | 46 | F6 | D1 | E0 | C4 | 1E | 1E | C4 | 03 | D8 | A1 | 80 | B7 | 26 | 88 | 07 | B8 | 50 | 00 | F7 | 6E | 06 | 03 |
| 07548 | 46 | F6 | D1 | E0 | 40 | C4 | 1E | 1E | C4 | 03 | D8 | 26 | C6 | 07 | 0F | B8 | 0A | 00 | F7 | 66 | 06 | 96 | FF | 84 |
| 07560 | 10 | C2 | FF | 4E | FE | 8B | 46 | FE | 89 | 46 | F2 | 83 | 7E | F2 | 01 | 7C | 1D | C7 | 46 | F4 | 01 | 00 | 8B | 76 |
| 07578 | F4 | 8B | 84 | 8B | B8 | 88 | 84 | 8A | B8 | 8B | 46 | F4 | 40 | 89 | 46 | F4 | 48 | 3B | 46 | F2 | 75 | E8 | 8B | 1E |
| 07590 | 88 | B8 | EB | 1C | EB | 2F | 8B | 46 | 06 | A3 | 9C | B9 | 8B | 46 | F6 | A3 | 9E | B9 | C7 | 06 | 88 | B8 | 00 | 00 |
| 075A8 | EB | 1B | FF | 0E | 88 | B8 | EB | 15 | 83 | FB | 01 | 7F | F5 | 83 | EB | 00 | 7C | F0 | D1 | E3 | 2E | FF | A7 | 42 |
| 075C0 | 0A | 15 | 0A | 17 | 0A | 8B | 1E | 80 | B7 | 32 | FF | E9 | F1 | 00 | E9 | 0D | 01 | E9 | 04 | 01 | A1 | 1C | C4 | 3B |
| 075D8 | 46 | F6 | 74 | 03 | E9 | DE | 00 | 80 | 3E | 80 | B7 | 20 | 75 | 03 | E9 | D2 | 00 | FF | 4E | F6 | A1 | 1A | C4 | 3B |
| 075F0 | 46 | F6 | 75 | 03 | E9 | E7 | 00 | B8 | 50 | 00 | F7 | 6E | 06 | 96 | 03 | 76 | F6 | D1 | E6 | C4 | 1E | 1E | C4 | 26 |
| 07608 | 8B | 00 | 3C | 20 | 75 | DB | A1 | 1C | C4 | 2B | 46 | F6 | 89 | 46 | FA | 8B | 46 | FE | 89 | 46 | F2 | 83 | 7E | F2 |
| 07620 | 01 | 7C | 20 | 8B | 46 | F2 | 89 | 46 | F4 | 8B | 76 | FA | 03 | 76 | F4 | 8B | 7E | F4 | 8B | 85 | 8A | B8 | 88 | 84 |
| 07638 | 8A | B8 | 8B | 46 | F4 | 48 | 89 | 46 | F4 | 75 | E6 | 8B | 46 | FA | 01 | 46 | FE | B8 | 0A | 00 | F7 | 66 | 06 | 96 |
| 07650 | 8B | 46 | FA | 29 | 84 | 10 | C2 | 89 | 46 | F2 | 83 | 7E | F2 | 01 | 7C | 3A | C7 | 46 | F4 | 01 | 00 | 8B | 76 | F4 |
| 07668 | B8 | 50 | 00 | F7 | 6E | 06 | 03 | F0 | 03 | 76 | F6 | D1 | E6 | C4 | 1E | 1E | C4 | 26 | 8B | 00 | 8B | 7E | F4 | 88 |
| 07680 | 85 | 8A | B8 | C4 | 1E | 1E | C4 | 03 | DE | 26 | C6 | 07 | 00 | 8B | 46 | F4 | 40 | 89 | 46 | F4 | 48 | 3B | 46 | F2 |
| 07698 | 75 | CB | 83 | 3E | 88 | B8 | 00 | 7E | 09 | 8B | 46 | FA | 01 | 06 | 88 | B8 | EB | 11 | A1 | 9E | B9 | 3B | 46 | F6 |
| 076B0 | 7C | 09 | A1 | 9E | B9 | 2B | 46 | F6 | A3 | 88 | B8 | EB | 21 | EB | 19 | 83 | FB | 0D | 76 | 03 | E9 | 0D | FF | 83 |
| 076C8 | EB | 0D | 73 | 03 | E9 | 05 | FF | D1 | E3 | 2E | FF | A7 | 57 | 0B | 4F | 0A | FF | 46 | F6 | E9 | 31 | FE | 8B | 46 |
| 076E0 | FE | A2 | 8A | B8 | 8B | E5 | 5D | CA | 02 | 00 | 55 | 8B | EC | 81 | EC | 02 | 00 | C7 | 06 | 88 | B8 | 00 | 00 | A1 |
| 076F8 | F8 | F4 | A2 | 8A | B8 | C7 | 46 | FE | 03 | 00 | FF | 76 | FE | 9A | CC | 07 | 58 | 04 | 8B | 46 | FE | 40 | 89 | 46 |
| 07710 | FE | 3D | 15 | 00 | 75 | EC | 80 | 3E | 8A | B8 | 00 | 76 | 2E | 9A | EF | 03 | BF | 07 | B8 | 07 | 00 | 50 | 9A | 03 |
| 07728 | 00 | 58 | 04 | B8 | 07 | 00 | 50 | FF | 36 | 16 | C4 | B8 | A0 | 00 | 50 | B8 | 8A | B8 | 50 | 9A | CD | 01 | 58 | 04 |
| 07740 | A1 | F8 | F4 | A2 | 8A | B8 | 9A | 1E | 04 | BF | 07 | 8B | E5 | 5D | CB | 55 | 8B | EC | 81 | EC | 06 | 00 | B8 | 03 |
| 07758 | 00 | 50 | B8 | 14 | 00 | 50 | 9A | 03 | 00 | 47 | 06 | B8 | 03 | 00 | 50 | B8 | 15 | 00 | 50 | 9A | B5 | 0A | 87 | 05 |
| 07770 | B8 | 03 | 00 | 50 | B8 | 14 | 00 | 50 | FF | 36 | 90 | B9 | 9A | CE | 06 | 87 | 05 | B8 | 03 | 00 | 50 | B8 | 14 | 00 |
| 07788 | 50 | 9A | C5 | 01 | 47 | 06 | A1 | F8 | F4 | A2 | 8A | B8 | C7 | 46 | FC | 03 | 00 | C7 | 06 | 88 | B8 | 00 | 00 | 8B |
| 077A0 | 46 | FC | 89 | 46 | FA | 83 | 7E | FA | 13 | 7F | 1A | 8B | 46 | FA | 89 | 46 | FE | FF | 76 | FE | 9A | CC | 07 | 58 |
| 077B8 | 04 | 8B | 46 | FE | 40 | 89 | 46 | FE | 3D | 14 | 00 | 75 | EC | 83 | 3E | D4 | C2 | 00 | 75 | 1A | 83 | 3E | D8 | C2 |
| 077D0 | 00 | 75 | 13 | B8 | 8A | B8 | 50 | B8 | F8 | F4 | 50 | 9A | 90 | 01 | 23 | 0A | D1 | E8 | 73 | 02 | EB | 0C | 9A | EF |
| 077E8 | 03 | BF | 07 | C7 | 46 | FC | 06 | 00 | EB | AD | 81 | 3E | 9C | B9 | FF | 00 | 75 | 06 | C7 | 06 | 9C | B9 | 03 | 00 |
| 07800 | 81 | 3E | 9E | B9 | FF | 00 | 75 | 06 | A1 | 1A | C4 | A3 | 9E | B9 | 8B | E5 | 5D | CB | 55 | 8B | EC | 81 | EC | 04 |
| 07818 | 00 | C7 | 46 | FC | 01 | 00 | 83 | 7E | 06 | 50 | 7D | 13 | FF | 76 | FC | FF | 76 | 06 | B8 | 01 | 00 | 50 | B8 | 07 |
| 07830 | 00 | 50 | 9A | D2 | 00 | 47 | 06 | 83 | 7E | 06 | 00 | 7E | 15 | FF | 76 | FC | 8B | 46 | 06 | 48 | 50 | B8 | 01 | 00 |
| 07848 | 50 | B8 | 70 | 00 | 50 | 9A | D2 | 00 | 47 | 06 | 8B | 46 | FC | 40 | 89 | 46 | FC | 3D | 03 | 00 | 75 | C0 | C7 | 46 |
| 07860 | FC | 03 | 00 | 83 | 7E | 06 | 50 | 7D | 13 | FF | 76 | FC | FF | 76 | 06 | B8 | 01 | 00 | 50 | B8 | 0F | 00 | 50 | 9A |
| 07878 | D2 | 00 | 47 | 06 | 83 | 7E | 06 | 00 | 7E | 15 | FF | 76 | FC | 8B | 46 | 06 | 48 | 50 | B8 | 01 | 00 | 50 | B8 | 70 |
| 07890 | 00 | 50 | 9A | D2 | 00 | 47 | 06 | 8B | 46 | FC | 40 | 89 | 46 | FC | 3D | 15 | 00 | 75 | C0 | 8B | 46 | 06 | 48 | 89 |
| 078A8 | 46 | FE | 8B | 46 | FE | 8B | E5 | 5D | CA | 02 | 00 | 55 | 8B | EC | 81 | EC | 04 | 00 | C7 | 46 | FC | 01 | 00 | 83 |
| 078C0 | 7E | 06 | 00 | 7C | 13 | FF | 76 | FC | FF | 76 | 06 | B8 | 01 | 00 | 50 | B8 | 07 | 00 | 50 | 9A | D2 | 00 | 47 | 06 |
| 078D8 | 83 | 7E | 06 | 4F | 7D | 15 | FF | 76 | FC | 8B | 46 | 06 | 40 | 50 | B8 | 01 | 00 | 50 | B8 | 70 | 00 | 50 | 9A | D2 |
| 078F0 | 00 | 47 | 06 | 8B | 46 | FC | 40 | 89 | 46 | FC | 3D | 03 | 00 | 75 | C0 | C7 | 46 | FC | 03 | 00 | 83 | 7E | 06 | 00 |
| 07908 | 7C | 13 | FF | 76 | FC | FF | 76 | 06 | B8 | 01 | 00 | 50 | B8 | 0F | 00 | 50 | 9A | D2 | 00 | 47 | 06 | 83 | 7E | 06 |
| 07920 | 4F | 7D | 15 | FF | 76 | FC | 8B | 46 | 06 | 40 | 50 | B8 | 01 | 00 | 50 | B8 | 70 | 00 | 50 | 9A | D2 | 00 | 47 | 06 |
| 07938 | 8B | 46 | FC | 40 | 89 | 46 | FC | 3D | 15 | 00 | 75 | C0 | 8B | 46 | 06 | 40 | 89 | 46 | FE | 8B | 46 | FE | 8B | E5 |
| 07950 | 5D | CA | 02 | 00 | 55 | 8B | EC | 81 | EC | AC | 0F | B8 | 03 | 00 | 50 | B8 | 14 | 00 | 50 | 9A | 03 | 00 | 47 | 06 |
| 07968 | B8 | 03 | 00 | 50 | B8 | 13 | 00 | 50 | 9A | B5 | 0A | 87 | 05 | C4 | 1E | 1E | C4 | 8D | BE | 60 | F0 | B9 | A0 | 0F |
| 07980 | 9A | C3 | 02 | EE | 09 | C6 | 06 | 84 | B7 | 44 | A1 | 84 | B7 | 32 | E4 | 89 | 86 | 54 | F0 | 83 | BE | 54 | F0 | 01 |
| 07998 | 7C | 1F | C7 | 86 | 56 | F0 | 01 | 00 | 8B | B6 | 56 | F0 | C6 | 84 | B7 | 20 | 8B | 86 | 56 | F0 | 40 | 89 | 86 |
| 079B0 | 56 | F0 | 48 | 3B | 86 | 54 | F0 | 75 | E7 | C7 | 86 | 56 | F0 | 06 | 00 | FF | B6 | 56 | F0 | B8 | 06 | 00 | 50 | 9A |
| 079C8 | 94 | 02 | 47 | 06 | 8B | 86 | 56 | F0 | 40 | 89 | 86 | 56 | F0 | 3D | 12 | 00 | 75 | E5 | C7 | 86 | 56 | F0 | 07 | 00 |
| 079E0 | FF | B6 | 56 | F0 | B8 | 07 | 00 | 50 | B8 | 42 | 00 | 50 | B8 | 0F | 00 | 50 | 9A | D2 | 00 | 47 | 06 | 8B | 86 | 56 |
| 079F8 | F0 | 40 | 89 | 86 | 56 | F0 | 3D | 11 | 00 | 75 | DD | BF | 84 | B7 | BE | FA | F4 | B9 | 09 | 00 | 1E | 07 | FC | F3 |

```
07A10  A5 B8 07 00 50 B8 1E 00 50 9A 94 02 47 06 BF 84 B7 BE 0C F5 B9 06 00 1E
07A28  07 FC F3 A5 B8 09 00 50 B8 08 00 50 9A 94 02 47 06 BF 84 B7 BE 18 F5 B9
07A40  12 00 1E 07 FC F3 A5 A4 B8 0A 00 50 B8 0D 00 50 9A 94 02 47 06 BF 84 B7
07A58  BE 3E F5 B9 13 00 1E 07 FC F3 A5 A4 B8 0B 00 50 B8 0D 00 50 9A 94 02 47
07A70  06 BF 84 B7 BE 66 F5 1E 07 FC A5 A5 A5 A4 B8 0C 00 50 B8 08 00 50 9A
07A88  94 02 47 06 BF 84 B7 BE 70 F5 B9 14 00 1E 07 FC F3 A5 A4 B8 0D 00 50 50
07AA0  9A 94 02 47 06 BF 84 B7 BE 9A F5 B9 15 00 1E 07 FC F3 A5 A4 B8 0E 00 50
07AB8  B8 0D 00 50 9A 94 02 47 06 BF 84 B7 BE C6 F5 B9 0F 00 1E 07 FC F3 A5 B8
07AD0  0F 00 50 B8 0D 00 50 9A 94 02 47 06 C7 86 5C F0 06 00 C7 86 5E F0 06 00
07AE8  C7 86 58 F0 11 00 C7 86 5A F0 49 00 A1 16 C4 A3 1A C4 A1 18 C4 A3 1C C4
07B00  FF B6 5E F0 FF B6 5C F0 FF B6 5A F0 FF B6 58 F0 9A 37 03 47 06 9A AD 03
07B18  3F 00 8B 1E 80 B7 32 FF E9 B2 00 C4 1E 22 C4 26 8B 07 32 E4 25 01 00 76
07B30  17 83 3E 1C C4 4F 7D 0E A1 1C C4 40 50 9A 34 0D 58 04 48 A3 1C C4 EB 26
07B48  C4 1E 22 C4 26 8B 07 32 E4 25 02 00 76 18 A1 1C C4 48 3B 06 1A C4 7E 0E
07B60  A1 1A C4 48 50 9A 34 0D 58 04 40 A3 1A C4 E9 92 00 C4 1E 22 C4 26 8B 07
07B78  32 E4 25 01 00 76 1A A1 1A C4 40 3B 06 1C C4 7D 0E A1 1C C4 40 50 9A 93
07B90  0C 58 04 48 A3 1C C4 EB 23 C4 1E 22 C4 26 8B 07 32 E4 25 02 00 76 15 83
07BA8  3E 1A C4 00 7E 0E A1 1A C4 48 50 9A 93 0C 58 04 40 A3 1A C4 EB 45 C4 1E
07BC0  1E C4 8D B6 60 F0 B9 D0 07 8B FB FC F3 A5 E9 87 00 EB 30 EB 2E 81 FB E7
07BD8  00 77 F8 83 FB 1A 76 F3 83 FB 1B 76 D9 81 FB E2 00 76 E8 81 FB E3 00 77
07BF0  03 E9 2F FF 81 FB E6 00 76 D9 81 FB E7 00 77 03 E9 6E FF B8 FF 00 50 B8
07C08  84 B7 50 FF 36 1A C4 B8 02 00 50 B8 FF 7F 50 9A 0D 00 96 0A D1 E8 73 0C
07C20  33 C0 50 B8 0D 00 50 9A 94 02 47 06 B8 FF 00 50 B8 84 B7 50 FF 36 1C C4
07C38  B8 02 00 50 B8 FF 7F 50 9A 0D 00 96 0A D1 E8 73 0C 33 C0 50 B8 10 00 50
07C50  9A 94 02 47 06 E9 A8 FE A1 1A C4 3B 06 16 C4 B9 00 00 74 01 41 A1 1C C4
07C68  3B 06 18 C4 BA 00 00 74 01 42 0A CA D1 E9 72 03 E9 D6 01 B8 FF 00 50 B8
07C80  84 B7 50 FF 36 1A C4 B8 02 00 50 B8 FF 7F 50 9A 0D 00 96 0A D1 E8 73 0C
07C98  33 C0 50 B8 0D 00 50 9A 94 02 47 06 B8 FF 00 50 B8 84 B7 50 FF 36 1C C4
07CB0  B8 02 00 50 B8 FF 7F 50 9A 0D 00 96 0A D1 E8 73 0C 33 C0 50 B8 10 00 50
07CC8  9A 94 02 47 06 9A D0 0B 58 04 A1 E4 F5 A3 84 B7 83 3E 16 C4 00 7E 62 B8
07CE0  01 00 50 A1 16 C4 48 50 9A 94 02 47 06 C7 86 56 F0 01 00 FF B6 56 F0 A1
07CF8  16 C4 48 50 B8 01 00 50 B8 07 00 50 9A D2 00 47 06 8B 86 56 F0 40 89 86
07D10  56 F0 3D 03 00 75 DC C7 86 56 F0 03 00 FF B6 56 F0 A1 16 C4 48 50 B8 01
07D28  00 50 B8 0F 00 50 9A D2 00 47 06 8B 86 56 F0 40 89 86 56 F0 3D 15 00 75
07D40  DC 83 3E 18 C4 4F 7D 62 B8 01 00 50 03 06 18 C4 50 9A 94 02 47 06 C7 86
07D58  56 F0 01 00 FF B6 56 F0 A1 18 C4 40 50 B8 01 00 50 B8 07 00 50 9A D2 00
07D70  47 06 8B 86 56 F0 40 89 86 56 F0 3D 03 00 75 DC C7 86 56 F0 03 00 FF B6
07D88  56 F0 A1 18 C4 40 50 B8 01 00 50 B8 0F 00 50 9A D2 00 47 06 8B 86 56 F0
07DA0  40 89 86 56 F0 3D 15 00 75 DC A1 E6 F5 A3 84 B7 83 3E 1A C4 00 7E 38 B8
07DB8  01 00 50 A1 1A C4 48 50 9A 94 02 47 06 C7 86 56 F0 01 00 FF B6 56 F0 A1
07DD0  1A C4 48 50 B8 01 00 50 B8 70 00 50 9A D2 00 47 06 8B 86 56 F0 40 89 86
07DE8  56 F0 3D 15 00 75 DC 83 3E 1C C4 4F 7D 38 B8 01 00 50 03 06 1C C4 50 9A
07E00  94 02 47 06 C7 86 56 F0 01 00 FF B6 56 F0 A1 1C C4 40 50 B8 01 00 50 B8
07E18  70 00 50 9A D2 00 47 06 8B 86 56 F0 40 89 86 56 F0 3D 15 00 75 DC A1 1A
07E30  C4 A3 16 C4 A1 1C C4 A3 18 C4 A1 18 C4 2B 06 16 C4 A3 86 B8 A1 16 C4
07E48  A3 A6 B9 A1 18 C4 A3 A8 B9 8B E5 5D CB 55 8B EC 81 EC 02 00 8B E5 5D C2
07E60  02 00 55 8B EC 81 EC 00 01 8B E5 5D CA 08 00 55 8B EC 81 EC 04 00 8B E5
07E78  5D CB 00 00 55 8B EC 81 EC 04 00 B8 C8 E1 50 B8 EA F5 50 9A 03 00 8C 0A
07E90  B8 15 00 50 9A 73 00 8C 0A B8 16 00 50 9A 73 00 8C 0A C7 46 FE 00 00 B8
07EA8  50 00 F7 6E 06 96 03 76 FE C6 84 EA B9 00 8B 46 FE 40 89 46 FE 3D 50 00
07EC0  75 E5 B8 17 00 50 9A 73 00 8C 0A B8 0A 00 F7 66 06 96 C6 84 12 C2 01 B8
07ED8  18 00 50 89 76 FC 9A 73 00 8C 0A 8B 76 FC C7 84 10 C2 00 00 C7 84 0A C2
07EF0  00 00 B8 19 00 50 9A 73 00 8C 0A 8B 76 FC C7 84 0C C2 00 00 C7 84 0E C2
07F08  00 00 B8 1A 00 50 9A 73 00 8C 0A 9A 47 00 8C 0A 8B E5 5D CA 02 00 55 8B
07F20  EC 81 EC 00 00 B8 C8 E1 50 B8 FE F5 50 9A 03 00 8C 0A B8 1D 00 50 9A 73
07F38  00 8C 0A B8 1E 00 50 9A 73 00 8C 0A FF 76 06 9A 0D 00 87 05 B8 1F 00 50
07F50  9A 73 00 8C 0A B8 0A 00 F7 66 06 96 A1 A2 B9 89 84 0A C2 B8 20 00 50 9A
07F68  73 00 8C 0A FF 06 A2 B9 B8 21 00 50 9A 73 00 8C 0A 9A 47 00 8C 0A 8B E5
07F80  5D CA 02 00 55 8B EC 81 EC 00 00 B8 C8 E1 50 B8 0E F6 50 9A 03 00 8C 0A
07F98  B8 24 00 50 9A 73 00 8C 0A B8 25 00 50 9A 73 00 8C 0A B8 50 C4 50 B8 01
07FB0  00 33 D2 52 50 9A DE 0A 20 09 BF CA C6 BE 90 B9 B9 2D 00 1E 07 FC F3 A5
07FC8  B8 50 C4 50 9A 61 08 20 09 B8 26 00 50 9A 73 00 8C 0A 9A 47 00 8C 0A 8B
07FE0  E5 5D CB 55 8B EC 81 EC 00 00 B8 C8 E1 50 B8 22 F6 50 9A 03 00 8C 0A B8
07FF8  29 00 50 9A 73 00 8C 0A B8 2A 00 50 9A 73 00 8C 0A C7 06 90 B9 02 00 B8
08010  2B 00 50 9A 73 00 8C 0A C7 06 92 B9 02 00 B8 2C 00 50 9A 73 00 8C 0A C7
08028  06 94 B9 02 00 B8 2D 00 50 9A 73 00 8C 0A C7 06 98 B9 00 00 B8 2E 00 50
08040  9A 73 00 8C 0A C7 06 9A B9 02 00 B8 2F 00 50 9A 73 00 8C 0A C7 06 9C B9
08058  03 00 B8 30 00 50 9A 73 00 8C 0A C7 06 A2 B9 02 00 B8 31 00 50 9A 73 00
```

| | | | | | | | | | | | | | | | | | | | | | | | | |
|---|---|---|---|---|---|---|---|---|---|---|---|---|---|---|---|---|---|---|---|---|---|---|---|---|
|08070|8C|0A|C7|06|9E|B9|09|00|B8|32|00|50|9A|73|00|8C|0A|C7|06|96|B9|09|00|B8|
|08088|33|00|50|9A|73|00|8C|0A|C7|06|A6|B9|09|00|C7|06|A8|B9|4B|00|B8|34|00|50|
|080A0|9A|73|00|8C|0A|C7|06|AA|B9|42|00|C7|06|B0|B9|01|00|B8|35|00|50|9A|73|00|
|080B8|8C|0A|C7|06|AC|B9|06|00|C7|06|AE|B9|06|00|B8|36|00|50|9A|73|00|8C|0A|B8|
|080D0|03|00|50|9A|AF|00|87|05|B8|37|00|50|9A|73|00|8C|0A|9A|15|01|87|05|B8|38|
|080E8|00|50|9A|73|00|8C|0A|B8|50|C4|50|33|D2|A1|28|C2|52|50|9A|DE|0A|20|09|B8|
|08100|39|00|50|9A|73|00|8C|0A|C6|06|30|C2|00|B8|3A|00|50|9A|73|00|8C|0A|BF|CA|
|08118|C6|BE|28|C2|B9|05|00|1E|07|FC|F3|A5|B8|3B|00|50|9A|73|00|8C|0A|BF|D4|C6|
|08130|BE|DA|BA|B9|28|00|1E|07|FC|F3|A5|B8|3C|00|50|9A|73|00|8C|0A|B8|50|C4|50|
|08148|9A|61|08|20|09|B8|3D|00|50|9A|73|00|8C|0A|9A|47|00|8C|0A|8B|E5|5D|CB|55|
|08160|8B|EC|81|EC|06|00|B8|C8|E1|50|B8|32|F6|50|9A|03|00|8C|0A|B8|42|00|50|9A|
|08178|73|00|8C|0A|B8|43|00|50|9A|73|00|8C|0A|B8|44|00|50|9A|73|00|8C|0A|C6|06|
|08190|50|C4|01|C6|06|1C|D1|00|BF|40|C4|BE|42|F6|1E|07|FC|A5|A5|A4|B8|45|00|50|
|081A8|9A|73|00|8C|0A|C7|46|FC|0E|00|C7|46|FA|2F|00|B8|46|00|50|9A|73|00|8C|0A|
|081C0|A1|16|D1|0A|06|14|D1|D1|E8|73|4B|B8|47|00|50|9A|73|00|8C|0A|A1|48|F6|A3|
|081D8|40|C4|B8|48|00|50|9A|73|00|8C|0A|B8|50|C4|50|A1|40|C4|32|E4|50|B8|41|C4|
|081F0|1E|50|9A|9B|04|20|09|C6|06|52|C4|02|B8|50|C4|50|9A|8A|09|20|09|B8|49|00|
|08208|50|9A|73|00|8C|0A|9A|74|01|87|05|E9|BF|02|B8|4A|00|50|9A|73|00|8C|0A|C4|
|08220|1E|3C|C4|83|C3|34|26|C6|07|01|B8|4B|00|50|9A|73|00|8C|0A|9A|81|05|47|06|
|08238|FF|76|FC|FF|76|FA|B8|0E|00|50|B8|40|C4|50|9A|0D|00|2E|01|B8|4C|00|50|9A|
|08250|73|00|8C|0A|B8|40|C4|50|B8|4A|F6|50|9A|90|01|23|0A|D1|E8|73|03|E9|6D|02|
|08268|B8|4D|00|50|9A|73|00|8C|0A|C4|1E|3C|C4|83|C3|34|26|C6|07|00|B8|4E|00|50|
|08280|9A|73|00|8C|0A|B8|50|C4|50|A1|40|C4|32|E4|50|B8|41|C4|1E|50|9A|9B|04|20|
|08298|09|C6|06|52|C4|02|B8|50|C4|50|9A|21|09|20|09|B8|4F|00|50|9A|73|00|8C|0A|
|082B0|A1|51|C4|32|E4|89|46|FE|C6|06|51|C4|00|C6|06|50|C4|00|B8|50|00|50|9A|73|
|082C8|00|8C|0A|8B|5E|FE|E9|D0|01|B8|51|00|50|9A|73|00|8C|0A|E9|EF|01|E9|E9|01|
|082E0|B8|52|00|50|9A|73|00|8C|0A|B8|53|00|50|9A|73|00|8C|0A|BF|84|B7|BE|4C|F6|
|082F8|B9|09|00|1E|07|FC|F3|A5|A4|B8|10|00|50|B8|08|00|50|9A|94|02|47|06|B8|54|
|08310|00|50|9A|73|00|8C|0A|BF|84|B7|BE|60|F6|B9|0B|00|1E|07|FC|F3|A5|A4|B8|11|
|08328|00|50|B8|08|00|50|9A|94|02|47|06|B8|55|00|50|9A|73|00|8C|0A|9A|AD|03|3F|
|08340|00|E9|85|01|B8|56|00|50|9A|73|00|8C|0A|B8|57|00|50|9A|73|00|8C|0A|BF|84|
|08358|B7|BE|78|F6|B9|0A|00|1E|07|FC|F3|A5|B8|0F|00|50|B8|04|00|50|9A|94|02|47|
|08370|06|B8|58|00|50|9A|73|00|8C|0A|BF|84|B7|BE|8C|F6|B9|18|00|1E|07|FC|F3|A5|
|08388|A4|B8|59|00|50|9A|73|00|8C|0A|B8|0F|00|50|B8|17|00|50|9A|94|02|47|06|B8|
|083A0|5A|00|50|9A|73|00|8C|0A|BF|84|B7|BE|BE|F6|B9|08|00|1E|07|FC|F3|A5|A4|B8|
|083B8|10|00|50|B8|04|00|50|9A|94|02|47|06|B8|5B|00|50|9A|73|00|8C|0A|B8|5C|00|
|083D0|50|9A|73|00|8C|0A|9A|AD|03|3F|00|B8|5D|00|50|9A|73|00|8C|0A|8B|1E|80|B7|
|083E8|32|FF|EB|4F|B8|5E|00|50|9A|73|00|8C|0A|B8|5F|00|50|9A|73|00|8C|0A|B8|50|
|08400|C4|50|9A|8A|09|20|09|B8|60|00|50|9A|73|00|8C|0A|9A|74|01|87|05|E9|BD|00|
|08418|EB|4E|B8|61|00|50|9A|73|00|8C|0A|EB|46|EB|41|B8|62|00|50|9A|73|00|8C|0A|
|08430|B8|63|00|50|9A|73|00|8C|0A|EB|2D|83|FB|79|77|E7|83|FB|4D|76|E2|83|FB|4E|
|08448|76|D0|83|FB|58|76|D8|83|FB|59|76|98|83|FB|6D|76|CE|83|FB|6E|76|BC|83|FB|
|08460|78|76|C4|83|FB|79|76|84|E9|62|FF|EB|5C|B8|64|00|50|9A|73|00|8C|0A|B8|C0|
|08478|E4|50|B8|0A|00|50|B8|D1|F6|1E|50|B8|FF|7F|50|50|9A|EC|01|B1|0A|B8|C0|E4|
|08490|50|9A|05|0B|20|09|B8|65|00|50|9A|73|00|8C|0A|EB|28|83|FB|0A|77|C7|83|EB|
|084A8|01|73|03|E9|23|FE|D1|E3|2E|FF|A7|46|06|FE|05|FE|05|FE|05|FE|05|FE|05|FE|
|084C0|05|71|04|FE|05|FE|05|D5|04|E9|B9|FC|B8|66|00|50|9A|73|00|8C|0A|9A|47|00|
|084D8|8C|0A|8B|E5|5D|CB|55|8B|EC|81|EC|00|00|B8|C8|E1|50|B8|DC|F6|50|9A|03|00|
|084F0|8C|0A|B8|69|00|50|9A|73|00|8C|0A|B8|6A|00|50|9A|73|00|8C|0A|B8|50|C4|50|
|08508|B8|01|00|33|D2|52|50|9A|DE|0A|20|09|B8|50|C4|50|9A|5B|06|20|09|BF|90|B9|
|08520|BE|CA|C6|B9|2D|00|1E|07|FC|F3|A5|B8|6B|00|50|9A|73|00|8C|0A|9A|47|00|8C|
|08538|0A|8B|E5|5D|CB|55|8B|EC|81|EC|12|00|B8|C8|E1|50|B8|F0|F6|50|9A|03|00|8C|
|08550|0A|B8|73|00|50|9A|73|00|8C|0A|B8|74|00|50|9A|73|00|8C|0A|8B|46|06|89|46|
|08568|FE|B8|75|00|50|9A|73|00|8C|0A|83|7E|08|14|7E|19|B8|76|00|50|9A|73|00|8C|
|08580|0A|C7|46|F8|14|00|B8|15|00|50|9A|0D|00|87|05|EB|0F|B8|77|00|50|9A|73|00|
|08598|8C|0A|8B|46|08|89|46|F8|B8|78|00|50|9A|73|00|8C|0A|8B|46|0A|89|46|F6|8B|
|085B0|46|F8|89|46|F4|8B|46|F4|3B|46|F6|7D|03|E9|6D|01|8B|46|F6|89|46|FC|B8|79|
|085C8|00|50|9A|73|00|8C|0A|83|7E|FE|00|74|03|E9|A3|00|8B|46|F8|3B|46|FC|7D|03|
|085E0|E9|98|00|B9|7A|00|51|9A|73|00|8C|0A|8B|46|FC|89|46|F2|8B|46|F8|89|46|F0|
|085F8|8B|46|F0|3B|46|F2|7C|6F|8B|46|F2|89|46|FA|B8|7B|00|50|9A|73|00|8C|0A|FF|
|08610|76|FA|9A|AF|00|87|05|B8|7C|00|50|9A|73|00|8C|0A|B8|0A|00|F7|66|FA|96|8B|
|08628|84|0A|C2|89|84|02|C2|B8|7D|00|50|89|76|EE|9A|73|00|8C|0A|8B|76|EE|8B|84|
|08640|00|C2|89|84|0E|C2|B8|7E|00|50|9A|73|00|8C|0A|8B|76|EE|8B|84|0A|C2|A3|92|
|08658|B9|B8|7F|00|50|9A|73|00|8C|0A|8B|46|FA|40|89|46|FA|48|3B|46|F0|75|97|B8|
|08670|80|00|50|9A|73|00|8C|0A|E9|BB|00|B8|81|00|50|9A|73|00|8C|0A|B8|0A|00|F7|
|08688|66|FC|96|8B|84|0A|C2|3B|46|FE|74|69|B8|82|00|50|9A|73|00|8C|0A|B8|50|C4|
|086A0|50|33|D2|2B|46|FE|52|50|9A|DE|0A|20|09|B8|50|C4|50|9A|5B|06|20|09|B8|83|

```
086B8   00 50 9A 73 00 8C 0A B8 0A 00 F7 66 FC 97 81 C7 0A C2 BE CA C6 B9 05 00
086D0   1E 07 FC F3 A5 B8 84 00 50 9A 73 00 8C 0A B8 50 00 F7 66 FC 97 81 C7 EA
086E8   B9 BE D4 C6 B9 28 00 1E 07 FC F3 A5 B8 85 00 50 9A 73 00 8C 0A B8 86 00
08700   50 9A 73 00 8C 0A B8 0A 00 F7 66 FC 96 8B 46 F4 74 03 E9 99 FE B8 88 00
08718   9A 73 00 8C 0A 8B 46 FC 40 89 46 FC 48 3B 46 5D CA 06 00 55 8B EC 81 EC 5A 00
08730   50 9A 73 00 8C 0A 9A 47 00 8C 0A 8B E5 5D CA 06 00 55 8B EC 81 EC 5A 00
08748   B8 C8 E1 50 B8 04 F7 50 9A 03 00 8C 0A B8 8F 00 50 9A 73 00 8C 0A B8 90
08760   00 50 9A 73 00 8C 0A 83 3E E2 C2 00 7F 03 E9 18 01 B8 91 00 50 9A 73 00
08778   8C 0A 83 3E DC C2 00 74 03 E9 05 01 B8 92 00 50 9A 73 00 8C 0A A1 A2 B9
08790   A3 DC C2 B8 93 00 50 9A 73 00 50 9A 73 00 8C 0A A1 D2 C2 A3 E0 C2 B8 96
087A8   0A A1 D4 C2 A3 DE C2 B8 95 00 50 9A 73 00 8C 0A 83 3E DC C2 00 75 03 E9 83 00 B8 99
087C0   00 50 9A 73 00 8C 0A A1 DC C2 B8 97 00 50 9A 73 00 8C 0A C6 06
087D8   DA C2 01 B8 98 00 50 9A 73 00 8C 0A B8 50 C4 50 33 D2 A1 DE C2 52 50 9A DE 0A 20 09 B8
087F0   00 50 9A 73 00 8C 0A B8 6D 20 09 B8 9A 00 50 9A 73 00 8C 0A 8D 7E A6 BE CA C6 B9
08808   50 C4 50 9A 5B 06 20 09 B8 9A 00 50 9A 73 00 8C 0A A1 DC C2 89 46 AA B8 9C
08820   2D 00 1E 07 FC F3 A5 B8 9B 00 50 9A 73 00 8C 0A A1 DC C2 89 46 AA B8 9C
08838   00 50 9A 73 00 8C 0A B8 50 C4 50 33 D2 A1 DE C2 52 50 9A DE 0A 20 09 B8
08850   9D 00 50 9A 73 00 8C 0A BF CA C6 8D 76 A6 B9 2D 00 1E 07 FC F3 A5 B8 50
08868   C4 50 9A 61 08 20 09 EB 0F B8 9E 00 50 9A 73 00 8C 0A A1 DC C2 A3 92 B9
08880   B8 9F 00 50 9A 73 00 8C 0A B8 A0 00 50 9A 73 00 8C 0A 83 3E DC C2 00 74
08898   79 B8 A1 00 50 9A 73 00 8C 0A B8 50 C4 50 33 D2 A1 DC C2 52 50 9A DE 0A
088B0   20 09 B8 A2 00 50 9A 73 00 8C 0A C6 06 E4 C2 00 B8 A3 00 50 9A 73 00 8C
088C8   0A BF CA C6 BE DC C2 B9 05 00 1E 07 FC F3 A5 B8 A4 00 50 9A 73 00 8C 0A
088E0   BF D4 C6 BE 7A C0 B9 28 00 1E 07 FC F3 A5 B8 A5 00 50 9A 73 00 8C 0A B8
088F8   50 C4 50 9A 61 08 20 09 B8 A6 00 50 9A 73 00 8C 0A B8 15 00 50 9A 0D 00
08910   87 05 B8 A7 00 50 9A 73 00 8C 0A 9A 47 00 8C 0A 8B E5 5D CB 55 8B EC 81
08928   EC 0C 00 B8 C8 E1 50 B8 1C F7 50 9A 03 00 8C 0A B8 AD 00 50 9A 73 00 8C
08940   0A B8 AE 00 50 9A 73 00 8C 0A 83 7E 06 14 7E 0C C7 46 FE 14 00 9A D2 08
08958   87 05 EB 0F B8 AF 00 50 9A 73 00 8C 0A 8B 46 06 89 46 FE B8 B0 00 50 9A
08970   73 00 8C 0A 8B 46 08 89 46 FA 8B 46 FE 89 46 F8 8B 46 F8 3B 46 FA 7D 03
08988   E9 B4 00 8B 46 FA 89 46 FC B8 B1 00 50 9A 73 00 8C 0A B8 0A 00 F7 66 FC
089A0   96 80 BC 12 C2 01 74 03 E9 84 00 B8 B2 00 50 89 76 F6 9A 73 00 8C 0A B8
089B8   50 C4 50 8B 76 F6 33 D2 8B 84 0A C2 52 50 9A DE 0A 20 09 B8 B3 00 50 9A
089D0   73 00 8C 0A B8 0A 00 F7 66 FC 96 C6 84 12 C2 00 B8 B4 00 50 89 76 F4 9A
089E8   73 00 8C 0A 8B 76 F4 81 C6 0A C2 BF CA C6 B9 05 00 1E 07 FC F3 A5 B8 B5
08A00   00 50 9A 73 00 8C 0A B8 50 00 F7 66 FC 96 81 C6 EA B9 BF D4 C6 B9 28 00
08A18   1E 07 FC F3 A5 B8 B6 00 50 9A 73 00 8C 0A B8 50 C4 50 9A 61 08 20 09 8B
08A30   46 FC 40 89 46 FC 48 3B 46 F8 74 03 E9 52 FF B8 B7 00 50 9A 73 00 8C 0A
08A48   9A 47 00 8C 0A 8B E5 5D CA 04 00 55 8B EC 81 EC 04 00 B8 C8 E1 50 B8 30
08A60   F7 50 9A 03 00 8C 0A 9A 47 00 8C 0A 8B E5 5D CB 00 00 55 8B EC 81 EC 0C
08A78   00 B8 E0 E1 50 B8 42 F7 50 9A 03 00 8C 0A B8 12 00 50 9A 73 00 8C 0A B8 46 F4 3B
08A90   13 00 50 9A 73 00 8C 0A 8B 46 08 89 46 F6 8B 46 06 89 46 F4 8B 46 F4 3B
08AA8   46 F6 7D 03 E9 7E 00 8B 46 F6 89 46 FC B8 14 00 50 9A 73 00 8C 0A 8B 76
08AC0   FC D1 E6 8B 84 2C B9 89 46 FA 8B 84 5E B9 89 46 F8 B8 15 00 50 9A 73 00
08AD8   8C 0A C7 46 FE 00 00 B8 16 00 50 9A 73 00 8C 0A 8B 46 FA 03 46 FE 03 46
08AF0   FE A3 26 C4 8B 46 FE 03 46 F8 A3 2A C4 B8 17 00 50 9A 73 00 8C 0A C4 1E
08B08   26 C4 26 8B 07 C4 1E 2A C4 26 88 07 8B 46 FE 40 89 46 FE 3D 50 00 75 BF
08B20   8B 46 FC 40 89 46 FC 48 3B 46 F4 75 88 B8 18 00 50 9A 73 00 8C 0A 9A 47
08B38   00 8C 0A 8B E5 5D CA 04 00 55 8B EC 81 EC 06 00 B8 E0 E1 50 B8 56 F7 50
08B50   9A 03 00 8C 0A B8 1E 00 50 9A 73 00 8C 0A B8 1F 00 50 9A 73 00 8C 0A 8B
08B68   76 0C D1 E6 8B 84 2C B9 03 46 0A 03 46 0A 89 46 FC B8 20 00 50 9A 73 00
08B80   8C 0A 8B 46 08 48 89 46 FA 83 7E FA 00 7C 34 C7 46 FE 00 00 B8 21 00 50
08B98   9A 73 00 8C 0A 8B 46 FC 03 46 FE 03 46 FE 48 3B 46 FA 75 D1 B8 22 00 50 9A
08BB0   8B 46 06 26 88 07 8B 46 FE 40 89 46 FE 3D 50 00 75 BF 8B 46 FC 40 89 46
08BC8   73 00 8C 0A 9A 47 00 8C 0A 8B E5 5D CA 08 00 55 8B EC 81 EC 02 00 B8 E0
08BE0   E1 50 B8 62 F7 50 9A 03 00 8C 0A B8 27 00 50 9A 73 00 8C 0A B8 28 00 50
08BF8   9A 73 00 8C 0A C7 46 FE 03 00 FF 76 FE FF 36 16 C4 FF 36 86 B8 B8 0F 00
08C10   50 9A D2 00 47 06 8B 46 FE 40 89 46 FE 3D 15 00 75 E0 B8 29 00 50 9A 73
08C28   00 8C 0A 9A 47 00 8C 0A 8B E5 5D CB 55 8B EC 81 EC 0C 00 B8 E0 E1 50 B8
08C40   76 F7 50 9A 03 00 8C 0A B8 2F 00 50 9A 73 00 8C 0A B8 30 00 50 9A 73 00
08C58   8C 0A 8B 46 08 89 46 F6 8B 46 06 89 46 F4 8B 46 F4 3B 46 F6 7D 03 E9 7E
08C70   00 8B 46 F6 89 46 FC B8 31 00 50 9A 73 00 8C 0A 8B 76 FC D1 E6 8B 84 2C
08C88   B9 89 46 FA 8B 84 5E B9 89 46 F8 B8 32 00 50 9A 73 00 8C 0A C7 46 FE 00
08CA0   00 B8 33 00 50 9A 73 00 8C 0A 8B 46 FA 03 46 FE 03 46 FE A3 26 C4 8B 46
08CB8   FE 03 46 F8 A3 2A C4 B8 34 00 50 9A 73 00 8C 0A C4 1E 2A C4 26 8B 07 C4
08CD0   1E 26 C4 26 88 07 8B 46 FE 40 89 46 FE 3D 50 00 75 BF 8B 46 FC 40 89 46
08CE8   FC 48 3B 46 F4 75 88 B8 35 00 50 9A 73 00 8C 0A 9A 47 00 8C 0A 8B E5 5D
```

```
08D00  CA 04 00 55 8B EC 81 EC 06 00 B8 E0 E1 50 B8 8A F7 50 9A 03 00 8C 0A B8
08D18  3B 00 50 9A 73 00 8C 0A B8 3C 00 50 9A 73 00 8C 0A 8B 76 08 D1 E6 8B 84
08D30  2C B9 03 46 06 03 46 06 89 46 FC B8 3D 00 50 9A 73 00 8C 0A A1 84 B7 32
08D48  E4 89 46 FA 83 7E FA 01 7C 40 C7 46 FE 01 00 B8 3E 00 50 9A 73 00 8C 0A
08D60  8B 46 FC 03 46 FE 03 46 FE 48 48 A3 26 C4 B8 3F 00 50 9A 73 00 8C 0A 8B
08D78  76 FE C4 1E 26 C4 8B 84 84 B7 26 88 07 8B 46 FE 40 89 46 FE 48 3B 46 FA
08D90  75 C5 B8 40 00 50 9A 73 00 8C 0A 8B E5 5D CA 04 00 55 8B
08DA8  EC 81 EC 08 00 B8 E0 E1 50 B8 96 F7 50 9A 03 00 8C 0A B8 46 00 50 9A 73
08DC0  00 8C 0A B8 47 00 50 9A 73 00 8C 0A A1 A6 F7 A3 84 B7 FF 76 0A FF 76 0C
08DD8  9A 94 02 47 06 B8 48 00 50 9A 73 00 8C 0A A1 A8 F7 A3 84 B7 FF 76 0A FF
08DF0  76 08 9A 94 02 47 06 B8 49 00 50 9A 73 00 8C 0A A1 AA F7 A3 84 B7 FF 76
08E08  06 FF 76 0C 9A 94 02 47 06 B8 4A 00 50 9A 73 00 8C 0A A1 AC F7 A3 84 B7
08E20  FF 76 06 FF 76 08 9A 94 02 47 06 B8 4B 00 50 9A 73 00 8C 0A 8B 46 08 2B
08E38  46 0C 48 89 46 FC B8 4C 00 50 9A 73 00 8C 0A 8B 46 FC A2 84 B7 B8 4D 00
08E50  50 9A 73 00 8C 0A 8B 46 FC 89 46 FA 83 7E FA 01 7C 1A C7 46 FE 01 00 8B
08E68  76 FE C6 84 84 B7 CD 8B 46 FE 40 89 46 FE 48 3B 46 FA 75 EB B8 4E 00 50
08E80  9A 73 00 8C 0A FF 76 0A 8B 46 0C 40 50 9A 94 02 47 06 B8 4F 00 50 9A 73
08E98  00 8C 0A FF 76 06 8B 46 0C 40 50 9A 94 02 47 06 B8 50 00 50 9A 73 00 8C
08EB0  0A A1 AE F7 A3 84 B7 B8 51 00 50 9A 73 00 8C 0A 8B 46 0A 40 89 46 FA 8B
08EC8  46 06 48 89 46 F8 8B 46 F8 3B 46 FA 7C 3B 8B 46 FA 89 46 FE B8 52 00 50
08EE0  9A 73 00 8C 0A FF 76 FE FF 76 0C 9A 94 02 47 06 B8 53 00 50 9A 73 00 8C
08EF8  0A FF 76 FE FF 76 08 9A 94 02 47 06 8B 46 FE 40 89 46 FE 48 3B 46 F8 75
08F10  CB B8 54 00 50 9A 73 00 8C 0A 8B 46 0A 89 46 FA 8B 46 06 89 46 F8 8B 46
08F28  F8 3B 46 FA 7C 31 8B 46 FA 89 46 FE B8 55 00 50 9A 73 00 8C 0A FF 76 FE
08F40  FF 76 0C 8B 46 FC 40 40 50 B8 0F 00 50 9A D2 00 47 06 8B 46 FE 40 89 46
08F58  FE 48 3B 46 F8 75 D5 B8 56 00 50 9A 73 00 8C 0A 8B 46 FC A2 84 B7 B8 57
08F70  00 50 9A 73 00 8C 0A 8B 46 FC 89 46 FA 83 7E FA 01 7C 1A C7 46 FE 01 00
08F88  8B 76 FE C6 84 84 B7 20 8B 46 FE 40 89 46 FE 48 3B 46 FA 75 EB B8 58 00
08FA0  50 9A 73 00 8C 0A 8B 46 0A 40 89 46 FA 8B 46 06 48 89 46 F8 8B 46 F8 3B
08FB8  46 FA 7C 20 8B 46 FA 89 46 FE FF 76 FE 8B 46 0C 40 50 9A 94 02 47 06 8B
08FD0  46 FE 40 89 46 FE 48 3B 46 F8 75 E6 B8 59 00 50 9A 73 00 8C 0A 9A 47 00
08FE8  8C 0A 8B E5 5D CA 08 00 55 8B EC 81 EC 08 00 B8 E0 E1 50 B8 B0 F7 50 9A
09000  03 00 8C 0A B8 5E 00 50 9A 73 00 8C 0A B8 5F 00 50 9A 73 00 8C 0A C7 46
09018  FC 08 00 C7 46 FE 02 00 B8 60 00 50 9A 73 00 8C 0A C7 46 F8 12 00 C7 46
09030  FA 4A 00 B8 61 00 50 9A 73 00 8C 0A FF 76 FE FF 76 FC FF 76 FA FF 76 F8
09048  9A 37 03 47 06 B8 62 00 50 9A 73 00 8C 0A BF 84 B7 BE C0 F7 1E 07 FC A5
09060  A5 A5 B8 0A 00 50 B8 23 00 50 9A 94 02 47 06 B8 63 00 50 9A 73 00 8C
09078  0A BF 84 B7 BE C8 F7 B9 10 00 1E 07 FC F3 A5 B8 0B 00 50 B8 17 00 50 9A
09090  94 02 47 06 B8 64 00 50 9A 73 00 8C 0A BF 84 B7 BE E8 F7 B9 0A 00 1E 07
090A8  FC F3 A5 B8 0C 00 50 B8 1D 00 50 9A 94 02 47 06 B8 65 00 50 9A 73 00 8C
090C0  0A BF 84 B7 BE FC F7 B9 14 00 1E 07 FC F3 A5 A4 B8 66 00 50 9A 73 00 8C
090D8  0A B8 0E 00 50 B8 04 00 50 9A 94 02 47 06 B8 67 00 50 9A 73 00 8C 0A BF
090F0  84 B7 BE 26 F8 B9 1E 00 1E 07 FC F3 A5 A4 B8 68 00 50 9A 73 00 8C 0A B8
09108  0F 00 50 B8 04 00 50 9A 94 02 47 06 B8 69 00 50 9A 73 00 8C 0A 9A 47 00
09120  8C 0A 8B E5 5D CB 55 8B EC 81 EC 08 00 B8 E0 E1 50 B8 64 F8 50 9A 03 00
09138  8C 0A B8 6E 00 50 9A 73 00 8C 0A B8 6F 00 50 9A 73 00 8C 0A C7 46 FC 00
09150  00 C7 46 FE 00 00 B8 70 00 50 9A 73 00 8C 0A C7 46 0E 00 C7 46 FA 3C
09168  00 B8 71 00 50 9A 73 00 8C 0A FF 76 FE FF 76 FC FF 76 FA FF 76 F8 9A 37
09180  03 47 06 B8 72 00 50 9A 73 00 8C 0A BF 84 B7 BE 74 F8 B9 14 00 1E 07 FC
09198  F3 A5 B8 73 00 50 9A 73 00 8C 0A B8 02 00 50 B8 14 00 50 9A 94 02 47 06
091B0  B8 74 00 50 9A 73 00 8C 0A BF 84 B7 BE 9C F8 B9 13 00 1E 07 FC F3 A5 B8
091C8  75 00 50 9A 73 00 8C 0A B8 03 00 50 B8 0B 00 50 9A 94 02 47 06 B8 76 00
091E0  50 9A 73 00 8C 0A BF 84 B7 BE C2 F8 B9 0A 00 1E 07 FC F3 A5 B8 04 00 50
091F8  B8 14 00 50 9A 94 02 47 06 B8 77 00 50 9A 73 00 8C 0A BF 84 B7 BE D6 F8
09210  B9 0A 00 1E 07 FC F3 A5 B8 05 00 50 B8 14 00 50 9A 94 02 47 06 B8 78 00
09228  50 9A 73 00 8C 0A BF 84 B7 BE EA F8 B9 06 00 1E 07 FC F3 A5 A4 B8 06 00
09240  50 B8 18 00 50 9A 94 02 47 06 B8 79 00 50 9A 73 00 8C 0A BF 84 B7 BE F8
09258  F8 1E 07 FC A5 A5 B8 08 00 50 B8 02 00 50 9A 94 02 47 06 B8 7A 00 50
09270  9A 73 00 8C 0A BF 84 B7 BE FE F8 B9 1B 00 1E 07 FC F3 A5 A4 B8 7B 00 50
09288  9A 73 00 8C 0A B8 09 00 50 B8 05 00 50 9A 94 02 47 06 B8 7C 00 50 9A 73
092A0  00 8C 0A BF 84 B7 BE 36 F9 B9 0E 00 1E 07 FC F3 A5 A4 B8 0A 00 50 B8 05
092B8  00 50 9A 94 02 47 06 B8 7D 00 50 9A 73 00 8C 0A BF 84 B7 BE 54 F9 B9 16
092D0  00 1E 07 FC F3 A5 B8 7E 00 50 9A 73 00 8C 0A B8 0B 00 50 B8 05 00 50 9A
092E8  94 02 47 06 B8 7F 00 50 9A 73 00 8C 0A BF 84 B7 BE 80 F9 B9 13 00 1E 07
09300  FC F3 A5 A4 B8 80 00 50 9A 73 00 8C 0A B8 0C 00 50 B8 05 00 50 9A 94 02
09318  47 06 B8 81 00 50 9A 73 00 8C 0A BF 84 B7 BE A8 F9 B9 0B 00 1E 07 FC F3
09330  A5 B8 0E 00 50 B8 0C 00 50 9A 94 02 47 06 B8 82 00 50 9A 73 00 8C 0A C4
```

| | | | | | | | | | | | | | | | | | | |
|---|---|---|---|---|---|---|---|---|---|---|---|---|---|---|---|---|---|---|
| 09348 | 1E | 3C | C4 | 83 | C3 | 1E | BF | 84 | B7 | B9 | 0F | 00 | 9A | C3 | 02 | EE | 09 | B8 | 0E | 00 | 50 | B8 | 21 | 00 |
| 09360 | 50 | 9A | 94 | 02 | 47 | 06 | B8 | 83 | 00 | 50 | 9A | 73 | 00 | 8C | 0A | 9A | 47 | 00 | 8C | 0A | 8B | E5 | 5D | CB |
| 09378 | 55 | 8B | EC | 81 | EC | 02 | 00 | B8 | E0 | E1 | 50 | B8 | BE | F9 | 50 | 9A | 03 | 00 | 8C | 0A | B8 | 88 | 00 | 50 |
| 09390 | 9A | 73 | 00 | 8C | 0A | B8 | 89 | 00 | 50 | 9A | 73 | 00 | 8C | 0A | 9A | 35 | 00 | 3D | 03 | B8 | 8A | 00 | 50 | 9A |
| 093A8 | 73 | 00 | 8C | 0A | B8 | 18 | 00 | 50 | 33 | C0 | 50 | B8 | 50 | 00 | 50 | B8 | 70 | 00 | 50 | 9A | D2 | 00 | 47 | 06 |
| 093C0 | B8 | 8C | 00 | 50 | 9A | 73 | 00 | 8C | 0A | B8 | 85 | B7 | 1E | 50 | B8 | 50 | 00 | 50 | B8 | CD | 00 | 50 | 9A | E1 |
| 093D8 | 00 | EE | 09 | B8 | 8D | 00 | 50 | 9A | 73 | 00 | 8C | 0A | C6 | 06 | 84 | B7 | 50 | B8 | 01 | 00 | 50 | 33 | C0 | 50 |
| 093F0 | 9A | 94 | 02 | 47 | 06 | B8 | 8F | 00 | 50 | 9A | 73 | 00 | 8C | 0A | B8 | 85 | B7 | 1E | 50 | B8 | 50 | 00 | 50 | B8 |
| 09408 | CF | 00 | 50 | 9A | E1 | 00 | EE | 09 | B8 | 90 | 00 | 50 | 9A | 73 | 00 | 8C | 0A | C6 | 06 | 84 | B7 | 50 | B8 | 02 |
| 09420 | 00 | 50 | 33 | C0 | 50 | 9A | 94 | 02 | 47 | 06 | B8 | 91 | 00 | 50 | 9A | 73 | 00 | 8C | 0A | B8 | 85 | B7 | 1E | 50 |
| 09438 | B8 | 50 | 00 | 50 | B8 | CD | 00 | 50 | 9A | E1 | 00 | EE | 09 | B8 | 92 | 00 | 50 | 9A | 73 | 00 | 8C | 0A | C6 | 06 |
| 09450 | 84 | B7 | 50 | B8 | 15 | 00 | 50 | 33 | C0 | 50 | 9A | 94 | 02 | 47 | 06 | B8 | 97 | 00 | 50 | 9A | 73 | 00 | 8C | 0A |
| 09468 | BF | 84 | B7 | BE | CA | F9 | B9 | 06 | 00 | 1E | 07 | FC | F3 | A5 | A4 | 33 | C0 | 50 | 50 | 9A | 94 | 02 | 47 | 06 |
| 09480 | B8 | 98 | 00 | 50 | 9A | 73 | 00 | 8C | 0A | B8 | FF | 00 | 50 | B8 | 84 | B7 | 50 | FF | 36 | 1A | C4 | B8 | 02 | 00 |
| 09498 | 50 | B8 | FF | 7F | 50 | 9A | 0D | 00 | 96 | 0A | D1 | E8 | 73 | 0C | 33 | C0 | 50 | B8 | 0D | 00 | 50 | 9A | 94 | 02 |
| 094B0 | 47 | 06 | B8 | 99 | 00 | 50 | 9A | 73 | 00 | 8C | 0A | A1 | D8 | F9 | A3 | 84 | B7 | 33 | C0 | 50 | B8 | 0F | 00 | 50 |
| 094C8 | 9A | 94 | 02 | 47 | 06 | B8 | 9A | 00 | 50 | 9A | 73 | 00 | 8C | 0A | B8 | FF | 00 | 50 | B8 | 84 | B7 | 50 | FF | 36 |
| 094E0 | 1C | C4 | B8 | 02 | 00 | 50 | B8 | FF | 7F | 50 | 9A | 0D | 00 | 96 | 0A | D1 | E8 | 73 | 0C | 33 | C0 | 50 | B8 | 10 |
| 094F8 | 00 | 50 | 9A | 94 | 02 | 47 | 06 | B8 | 9C | 00 | 50 | 9A | 73 | 00 | 8C | 0A | 83 | 3E | 16 | C4 | 00 | 7E | 2F | B8 |
| 09510 | 9E | 00 | 50 | 9A | 73 | 00 | 8C | 0A | C7 | 46 | FE | 01 | 00 | FF | 76 | FE | A1 | 16 | C4 | 48 | 50 | B8 | 01 | 00 |
| 09528 | 50 | B8 | 70 | 00 | 50 | 9A | D2 | 00 | 47 | 06 | 8B | 46 | FE | 40 | 89 | 46 | FE | 3D | 15 | 00 | 75 | DF | B8 | 9F |
| 09540 | 00 | 50 | 9A | 73 | 00 | 8C | 0A | 83 | 3E | 18 | C4 | 4F | 7D | 2F | B8 | A1 | 00 | 50 | 9A | 73 | 00 | 8C | 0A | C7 |
| 09558 | 46 | FE | 01 | 00 | FF | 76 | FE | A1 | 18 | C4 | 40 | 50 | B8 | 01 | 00 | 50 | B8 | 70 | 00 | 50 | 9A | D2 | 00 | 47 |
| 09570 | 06 | 8B | 46 | FE | 40 | 89 | 46 | FE | 3D | 15 | 00 | 75 | DF | B8 | A8 | 00 | 50 | 9A | 73 | 00 | 8C | 0A | BF | 84 |
| 09588 | B7 | BE | DA | F9 | 1E | 07 | FC | A5 | A5 | A5 | A4 | B8 | 17 | 00 | 50 | B8 | 39 | 00 | 50 | 9A | 94 | 02 | 47 | 06 |
| 095A0 | B8 | A9 | 00 | 50 | 9A | 73 | 00 | 8C | 0A | BF | 84 | B7 | BE | E2 | F9 | B9 | 07 | 00 | 1E | 07 | FC | F3 | A5 | B8 |
| 095B8 | 17 | 00 | 50 | B8 | 29 | 00 | 50 | 9A | 94 | 02 | 47 | 06 | B8 | AA | 00 | 50 | 9A | 73 | 00 | 8C | 0A | BF | 84 | B7 |
| 095D0 | BE | F0 | F9 | 1E | 07 | FC | A5 | A5 | A5 | A4 | B8 | 16 | 00 | 50 | B8 | 29 | 00 | 50 | 9A | 94 | 02 | 47 | 06 |
| 095E8 | B8 | AB | 00 | 50 | 9A | 73 | 00 | 8C | 0A | BF | 84 | B7 | BE | FA | F9 | B9 | 06 | 00 | 1E | 07 | FC | F3 | A5 | B8 |
| 09600 | 17 | 00 | 50 | B8 | 19 | 00 | 50 | 9A | 94 | 02 | 47 | 06 | B8 | AC | 00 | 50 | 9A | 73 | 00 | 8C | 0A | BF | 84 | B7 |
| 09618 | BE | 06 | FA | 1E | 07 | FC | A5 | A5 | A5 | B8 | 16 | 00 | 50 | B8 | 19 | 00 | 50 | 9A | 94 | 02 | 47 | 06 | B8 |
| 09630 | AD | 00 | 50 | 9A | 73 | 00 | 8C | 0A | BF | 84 | B7 | BE | 0E | FA | 1E | 07 | FC | A5 | A5 | A5 | A5 | B8 | 16 | 00 |
| 09648 | 50 | 33 | C0 | 50 | 9A | 94 | 02 | 47 | 06 | B8 | AE | 00 | 50 | 9A | 73 | 00 | 8C | 0A | BF | 84 | B7 | BE | 16 | FA |
| 09660 | 1E | 07 | FC | A5 | A5 | A5 | A5 | B8 | 17 | 00 | 50 | 33 | C0 | 50 | 9A | 94 | 02 | 47 | 06 | B8 | AF | 00 | 50 | 9A |
| 09678 | 73 | 00 | 8C | 0A | C4 | 1E | 3C | C4 | 83 | C3 | 1E | BF | 84 | B7 | B9 | 0F | 00 | 9A | C3 | 02 | EE | 09 | B8 | 18 |
| 09690 | 00 | 50 | B8 | 19 | 00 | 50 | 9A | 94 | 02 | 47 | 06 | B8 | B0 | 00 | 50 | 9A | 73 | 00 | 8C | 0A | F6 | 06 | 14 | D1 |
| 096A8 | 01 | 74 | 46 | B8 | B1 | 00 | 50 | 9A | 73 | 00 | 8C | 0A | BF | 84 | B7 | BE | 1E | FA | B9 | 07 | 00 | 1E | 07 | FC |
| 096C0 | F3 | A5 | A4 | B8 | 18 | 00 | 50 | B8 | 39 | 00 | 50 | 9A | 94 | 02 | 47 | 06 | B8 | B2 | 00 | 50 | 9A | 73 | 00 | 8C |
| 096D8 | 0A | B8 | 18 | 00 | 50 | B8 | 39 | 00 | 50 | B8 | 0E | 00 | 50 | B8 | 87 | 00 | 50 | 9A | D2 | 00 | 47 | 06 | E9 | F4 |
| 096F0 | 00 | B8 | B3 | 00 | 50 | 9A | 73 | 00 | 8C | 0A | F6 | 06 | 16 | D1 | 01 | 75 | 03 | E9 | B3 | 00 | B8 | B4 | 00 | 50 |
| 09708 | 9A | 73 | 00 | 8C | 0A | BF | 84 | B7 | BE | 2E | FA | 1E | 07 | FC | A5 | A5 | A5 | A5 | A4 | B8 | B5 | 00 | 50 | 9A |
| 09720 | 73 | 00 | 8C | 0A | C7 | 46 | FE | 00 | 00 | B8 | B6 | 00 | 50 | 9A | 73 | 00 | 8C | 0A | 8B | 76 | FE | 80 | BC | 28 |
| 09738 | D1 | 20 | 74 | 19 | B8 | FF | 00 | 50 | B8 | 84 | B7 | 1E | 50 | B8 | 01 | 00 | 50 | 81 | C6 | 28 | D1 | 96 | 1E | 50 |
| 09750 | 9A | D3 | 02 | 23 | 0A | 8B | 46 | FE | 40 | 89 | 46 | FE | 3D | 0A | 00 | 75 | C8 | B8 | B7 | 00 | 50 | 9A | 73 | 00 |
| 09768 | 8C | 0A | B8 | FF | 00 | 50 | B8 | 84 | B7 | 1E | 50 | B8 | 01 | 00 | 50 | B8 | 39 | FA | 1E | 50 | 9A | D3 | 02 | 23 |
| 09780 | 0A | B8 | B8 | 00 | 50 | 9A | 73 | 00 | 8C | 0A | B8 | 18 | 00 | 50 | B8 | 39 | 00 | 50 | 9A | 94 | 02 | 47 | 06 | B8 |
| 09798 | B9 | 00 | 50 | 9A | 73 | 00 | 8C | 0A | B8 | 18 | 00 | 50 | B8 | 39 | 00 | 50 | B8 | 13 | 00 | 50 | B8 | 87 | 00 | 50 |
| 097B0 | 9A | D2 | 00 | 47 | 06 | EB | 2E | B8 | BA | 00 | 50 | 9A | 73 | 00 | 8C | 0A | B8 | BB | 00 | 50 | 9A | 73 | 00 | 8C |
| 097C8 | 0A | BF | 84 | B7 | BE | 40 | C4 | B9 | 07 | 00 | 1E | 07 | FC | F3 | A5 | A4 | B8 | 18 | 00 | 50 | B8 | 39 | 00 | 50 |
| 097E0 | 9A | 94 | 02 | 47 | 06 | B8 | BD | 00 | 50 | 9A | 73 | 00 | 8C | 0A | B8 | 18 | 00 | 50 | B8 | 37 | 00 | 50 | B8 | 01 |
| 097F8 | 00 | 50 | B8 | 07 | 00 | 50 | 9A | D2 | 00 | 47 | 06 | B8 | BE | 00 | 50 | 9A | 73 | 00 | 8C | 0A | B8 | 18 | 00 | 50 |
| 09810 | B8 | 27 | 00 | 50 | B8 | 01 | 00 | 50 | B8 | 07 | 00 | 50 | 9A | D2 | 00 | 47 | 06 | B8 | BF | 00 | 50 | 9A | 73 | 00 |
| 09828 | 8C | 0A | B8 | 18 | 00 | 50 | B8 | 2F | 00 | 50 | B8 | 01 | 00 | 50 | B8 | 07 | 00 | 50 | 9A | D2 | 00 | 47 | 06 | B8 |
| 09840 | C0 | 00 | 50 | 9A | 73 | 00 | 8C | 0A | B8 | 18 | 00 | 50 | B8 | 17 | 00 | 50 | B8 | 01 | 00 | 50 | B8 | 07 | 00 | 50 |
| 09858 | 9A | D2 | 00 | 47 | 06 | B8 | C1 | 00 | 50 | 9A | 73 | 00 | 8C | 0A | 9A | 47 | 00 | 8C | 0A | 8B | E5 | 5D | CB | 55 |
| 09870 | 8B | EC | 81 | EC | 04 | 00 | B8 | E0 | E1 | 50 | B8 | 3A | FA | 50 | 9A | 03 | 00 | 8C | 0A | 9A | 47 | 00 | 8C | 0A |
| 09888 | 8B | E5 | 5D | CB | 00 | 00 | 55 | 8B | EC | 81 | EC | 06 | 00 | B8 | F4 | E1 | 50 | B8 | 4C | FA | 50 | 9A | 03 | 00 |
| 098A0 | 8C | 0A | B8 | 14 | 00 | 50 | 9A | 73 | 00 | 8C | 0A | B8 | 15 | 00 | 50 | 9A | 73 | 00 | 8C | 0A | C7 | 46 | FA | 00 |
| 098B8 | 00 | B8 | 16 | 00 | 50 | 9A | 73 | 00 | 8C | 0A | A1 | 9C | B9 | 89 | 46 | FE | B8 | 17 | 00 | 50 | 9A | 73 | 00 | 8C |
| 098D0 | 0A | A1 | 9E | B9 | 89 | 46 | FC | B8 | 18 | 00 | 50 | 9A | 73 | 00 | 8C | 0A | 8D | 46 | FA | 50 | 8D | 46 | FE | 50 |
| 098E8 | 8D | 46 | FC | 50 | 9A | 00 | 00 | 11 | 09 | B8 | 19 | 00 | 50 | 9A | 73 | 00 | 8C | 0A | 9A | 47 | 00 | 8C | 0A | 8B |
| 09900 | E5 | 5D | CB | 55 | 8B | EC | 81 | EC | 04 | 00 | B8 | F4 | E1 | 50 | B8 | 60 | FA | 50 | 9A | 03 | 00 | 8C | 0A | B8 |
| 09918 | 1E | 00 | 50 | 9A | 73 | 00 | 8C | 0A | B8 | 1F | 00 | 50 | 9A | 73 | 00 | 8C | 0A | A1 | 9C | B9 | 89 | 46 | FE | A1 |
| 09930 | 9E | B9 | 89 | 46 | FC | B8 | 20 | 00 | 50 | 9A | 73 | 00 | 8C | 0A | F6 | 06 | 1A | D1 | 01 | 74 | 37 | 83 | 3E | 10 |
| 09948 | C4 | 00 | 75 | 30 | B8 | 21 | 00 | 50 | 9A | 73 | 00 | 8C | 0A | B8 | 0A | 00 | F7 | 66 | FE | 96 | 8B | 84 | 0A | C2 |
| 09960 | 3B | 06 | 0E | C4 | 75 | 16 | B8 | 22 | 00 | 50 | 9A | 73 | 00 | 8C | 0A | A1 | 14 | C4 | 3B | 46 | FC | 75 | 05 | 9A |

```
09978  05 00 77 08 B8 23 00 50 9A 73 00 8C 0A A1 16 C4 3B 46 FC 74 03 E9 EA 00
09990  B8 24 00 50 9A 73 00 8C 0A 83 7E FE 03 7F 03 E9 89 00 B8 25 00 50 9A 73
099A8  00 8C 0A F6 06 1A D1 01 74 1A 83 3E 10 C4 00 75 13 FF 76 FE FF 76 FC B8
099C0  01 00 50 B8 0F 00 50 9A D2 00 47 06 B8 26 00 50 9A 73 00 8C 0A 8B 46 FE
099D8  48 A3 9C B9 B8 27 00 50 9A 73 00 8C 0A B8 0A 00 F7 66 FE 96 83 BC 06 C2
099F0  00 75 11 B8 28 00 50 9A 73 00 8C 0A A1 16 C4 A3 9E B9 EB 1C B8 29 00 50
09A08  9A 73 00 8C 0A B8 0A 00 F7 66 FE 96 8B 84 06 C2 03 06 16 C4 48 A3 9E B9
09A20  B8 2A 00 50 9A 73 00 8C 0A EB 44 B8 2B 00 50 9A 73 00 8C 0A 80 3E 1A D1
09A38  00 B8 00 00 75 01 40 83 3E 10 C4 00 B9 00 00 74 01 41 0A C1 D1 E8 73 1F
09A50  B8 2C 00 50 9A 73 00 8C 0A B8 0A 00 F7 66 FE 96 8B 84 0A C2 3B 06 90 B9
09A68  74 05 9A 1E 04 BF 07 B8 2D 00 50 9A 73 00 8C 0A EB 43 B8 2E 00 50 9A 73
09A80  00 8C 0A B8 2F 00 50 9A 73 00 8C 0A F6 06 1A D1 01 74 1A 83 3E 10 C4 00
09A98  75 13 FF 76 FE FF 76 FC B8 01 00 50 B8 0F 00 50 9A D2 00 47 06 B8 30 00
09AB0  50 9A 73 00 8C 0A 8B 46 FC 48 A3 9E B9 B8 31 00 50 9A 73 00 8C 0A 9A 47
09AC8  00 8C 0A 8B E5 5D CB 55 8B EC 81 EC 08 00 B8 F4 E1 50 B8 74 FA 50 9A 03
09AE0  00 8C 0A B8 37 00 50 9A 73 00 8C 0A B8 38 00 50 9A 73 00 8C 0A A1 9C B9
09AF8  89 46 FC A1 9E B9 89 46 FA B8 39 00 50 9A 73 00 8C 0A B8 0A 00 F7 66 FC
09B10  96 8B 84 10 C2 03 06 16 C4 89 46 FE B8 3A 00 50 9A 73 00 8C 0A A1 16 C4
09B28  3B 46 FE 7D 3A B8 3B 00 50 9A 73 00 8C 0A 8B 76 FC D1 E6 8B 84 2C B9 03
09B40  46 FE 03 46 FE 48 48 A3 26 C4 B8 3C 00 50 9A 73 00 8C 0A C4 1E 26 C4 26
09B58  8B 07 3C 0D 74 07 A1 18 C4 40 89 46 FE EB 10 B8 3D 00 50 9A 73 00 8C 0A
09B70  A1 18 C4 40 89 46 FE B8 3E 00 50 9A 73 00 8C 0A 8B 46 FE 48 3B 46 FA 7E
09B88  03 E9 80 00 B8 3F 00 50 9A 73 00 8C 0A 83 7E FC 14 7D 61 B8 40 00 50 9A
09BA0  73 00 8C 0A 8B 46 FC 40 A3 9C B9 B9 41 00 51 89 46 F8 9A 73 00 8C 0A A1
09BB8  16 C4 A3 9E B9 B8 42 00 50 9A 73 00 8C 0A F6 06 1A D1 01 74 24 83 3E 10
09BD0  C4 00 75 1D B8 43 00 50 9A 73 00 8C 0A FF 76 F8 FF 36 16 C4 B8 01 00 50
09BE8  B8 70 00 50 9A D2 00 47 06 B8 44 00 50 9A 73 00 8C 0A EB 0E B8 45 00 50
09C00  9A 73 00 8C 0A 9A EF 03 BF 07 EB 58 B8 46 00 50 9A 73 00 8C 0A B8 47 00
09C18  50 9A 73 00 8C 0A 8B 46 FA 40 A3 9E B9 B9 48 00 51 89 46 F8 9A 73 00 8C
09C30  0A F6 06 1A D1 01 74 23 83 3E 10 C4 00 75 1C B8 49 00 50 9A 73 00 8C 0A
09C48  FF 76 FC FF 76 F8 B8 01 00 50 B8 70 00 50 9A D2 00 47 06 B8 4A 00 50 9A
09C60  73 00 8C 0A B8 4B 00 50 9A 73 00 8C 0A 9A 47 00 8C 0A 8B E5 5D CB 55 8B
09C78  EC 81 EC 04 00 B8 F4 E1 50 B8 88 FA 50 9A 03 00 8C 0A B8 50 00 50 9A 73
09C90  00 8C 0A B8 51 00 50 9A 73 00 8C 0A A1 9C B9 89 46 FE A1 9E B9 89 46 FC
09CA8  B8 52 00 50 9A 73 00 8C 0A 83 7E FE 03 75 25 B8 53 00 50 9A 73 00 8C 0A
09CC0  A1 90 B9 3B 06 28 C2 74 07 9A 1E 04 BF 07 EB 09 B8 54 00 50 9A 73 00 8C
09CD8  0A E9 A9 00 B8 55 00 50 9A 73 00 8C 0A B8 56 00 50 9A 73 00 8C 0A 8B 46
09CF0  FE 48 A3 9C B9 B8 57 00 50 9A 73 00 8C 0A F6 06 1A D1 01 75 03 E9 7D 00
09D08  83 3E 10 C4 00 75 76 B8 58 00 50 9A 73 00 8C 0A B8 0A 00 F7 66 FE 96 8B
09D20  84 0A C2 3B 06 0E C4 75 16 B8 59 00 50 9A 73 00 8C 0A A1 14 C4 3B 46 FC
09D38  7C 05 9A 05 00 77 08 B8 5A 00 50 9A 73 00 8C 0A FF 76 FE FF 36 16 C4 8B
09D50  46 FC 2B 06 16 C4 40 50 B8 0F 00 50 9A D2 00 47 06 B8 5B 00 50 9A 73 00
09D68  8C 0A 8B 46 FE 48 50 8B 46 FC 40 50 A1 18 C4 2B 46 FC 40 50 B8 0F 00 50
09D80  9A D2 00 47 06 B8 5C 00 50 9A 73 00 8C 0A 9A 47 00 8C 0A 8B E5 5D CB 55
09D98  8B EC 81 EC 04 00 B8 F4 E1 50 B8 98 FA 50 9A 03 00 8C 0A B8 61 00 50 9A
09DB0  73 00 8C 0A B8 62 00 50 9A 73 00 8C 0A A1 9C B9 89 46 FE A1 9E B9 89 46
09DC8  FC B8 63 00 50 9A 73 00 8C 0A 83 7E FE 14 75 07 9A EF 03 BF 07 EB 7C B8
09DE0  64 00 50 9A 73 00 8C 0A B8 65 00 50 9A 73 00 8C 0A 8B 46 FE 40 A3 9C B9
09DF8  B8 66 00 50 9A 73 00 8C 0A F6 06 1A D1 01 74 4A 83 3E 10 C4 00 75 43 B8
09E10  67 00 50 9A 73 00 8C 0A FF 76 FE FF 76 FC A1 18 C4 2B 46 FC 50 B8 70 00
09E28  50 9A D2 00 47 06 B8 68 00 50 9A 73 00 8C 0A 8B 46 FE 40 50 FF 36 16 C4
09E40  8B 46 FC 2B 06 16 C4 40 50 B8 70 00 50 9A D2 00 47 06 B8 69 00 50 9A 73
09E58  00 8C 0A B8 6A 00 50 9A 73 00 8C 0A 9A 47 00 8C 0A 8B E5 5D CB 55 8B EC
09E70  81 EC 00 00 B8 F4 E1 50 B8 AC FA 50 9A 03 00 8C 0A B8 6D 00 50 9A 73 00
09E88  8C 0A B8 6E 00 50 9A 73 00 8C 0A A1 16 C4 3B 06 9E B9 75 08 C7 06 9C B9
09EA0  03 00 EB 0F B8 6F 00 50 9A 73 00 8C 0A A1 16 C4 A3 9E B9 B8 70 00 50 9A
09EB8  73 00 8C 0A 9A 47 00 8C 0A 8B E5 5D CB 55 8B EC 81 EC 0A 00 B8 F4 E1 50
09ED0  B8 C0 FA 50 9A 03 00 8C 0A B8 77 00 50 9A 73 00 8C 0A B8 78 00 50 9A 73
09EE8  00 8C 0A A1 9C B9 89 46 FA B8 79 00 50 9A 73 00 8C 0A 8B 76 FA D1 E6 8B
09F00  84 2C B9 89 46 FC B8 7A 00 50 9A 73 00 8C 0A B8 0A 00 F7 66 FA 96 8B 84
09F18  10 C2 03 06 16 C4 89 46 F6 B8 7B 00 50 9A 73 00 8C 0A A1 9E B9 89 46 F8
09F30  B8 7C 00 50 9A 73 00 8C 0A 8B 46 F6 3B 46 F8 7E 49 B8 7D 00 50 9A 73 00
```

```
09F48   8C 0A 8B 46 FC 03 46 F8 03 46 F8 A3 26 C4 B8 7E 00 50 9A 73 00 8C 0A C4
09F60   1E 26 C4 26 8B 07 32 E4 50 B8 0F 00 50 B8 D0 FA 50 9A F1 02 EE 09 D1 E8
09F78   73 02 EB 0E B8 7F 00 50 9A 73 00 8C 0A FF 46 F8 EB AF B8 80 00 50 9A 73
09F90   00 8C 0A 8B 46 F8 89 46 FE B8 81 00 50 9A 73 00 8C 0A 9A 47 00 8C 0A 8B
09FA8   46 FE 8B E5 5D CB 55 8B EC 81 EC 08 00 B8 F4 E1 50 B8 E0 FA 50 9A 03 00
09FC0   8C 0A B8 87 00 50 9A 73 00 8C 0A B8 88 00 50 9A 73 00 8C 0A A1 9C B9 89
09FD8   46 FA B8 89 00 50 9A 73 00 8C 0A 8B 76 FA D1 E6 8B 84 2C B9 89 46 FC B8
09FF0   8A 00 50 9A 73 00 8C 0A A1 9E B9 89 46 F8 B8 8B 00 50 9A 73 00 8C 0A A1
0A008   16 C4 3B 46 F8 7D 49 B8 8C 00 50 9A 73 00 8C 0A 8B 46 FC 03 46 F8 03 46
0A020   F8 A3 26 C4 B8 8D 00 50 9A 73 00 8C 0A C4 1E 26 C4 26 8B 07 32 E4 50 B8
0A038   15 00 50 B8 F0 FA 50 9A F1 02 EE 09 D1 E8 73 02 EB 0E B8 8E 00 50 9A 73
0A050   00 8C 0A FF 4E F8 EB AF B8 8F 00 50 9A 73 00 8C 0A 8B 46 F8 89 46 FE B8
0A068   90 00 50 9A 73 00 8C 0A 9A 47 00 8C 0A 8B 46 FE 8B E5 5D CB 55 8B EC 81
0A080   EC 00 00 B8 F4 E1 50 B8 06 FB 50 9A 03 00 8C 0A B8 93 00 50 9A 73 00 8C
0A098   0A 9A 18 05 28 07 9A 18 05 28 07 9A 18 05 28 07 9A 47 00 8C 0A 8B E5 5D
0A0B0   CB 55 8B EC 81 EC 00 00 B8 F4 E1 50 B8 1A FB 50 9A 03 00 8C 0A B8 96 00
0A0C8   50 9A 73 00 8C 0A 9A F7 03 28 07 9A F7 03 28 07 9A F7 03 28 07 9A 47 00
0A0E0   8C 0A 8B E5 5D CB 55 8B EC 81 EC 02 00 B8 F4 E1 50 B8 2E FB 50 9A 03 00
0A0F8   8C 0A B8 9B 00 50 9A 73 00 8C 0A B8 9C 00 50 9A 73 00 8C 0A A1 9C B9 89
0A110   46 FE B8 9D 00 50 9A 73 00 8C 0A 9A 84 00 28 07 B8 9E 00 50 9A 73 00 8C
0A128   0A 9A 2F 07 28 07 3B 06 9E B9 B9 00 00 7C 01 41 A1 9C B9 3B 46 FE BA 00
0A140   00 74 01 42 0A CA D1 E9 73 D1 B8 A0 00 50 9A 73 00 8C 0A 9A 47 00 8C 0A
0A158   8B E5 5D CB 55 8B EC 81 EC 02 00 B8 F4 E1 50 B8 42 FB 50 9A 03 00 8C 0A
0A170   B8 A5 00 50 9A 73 00 8C 0A B8 A6 00 50 9A 73 00 8C 0A A1 9C B9 89 46 FE
0A188   B8 A7 00 50 9A 73 00 8C 0A 9A 50 02 28 07 B8 A8 00 50 9A 73 00 8C 0A 9A
0A1A0   46 06 28 07 3B 06 9E B9 B9 00 00 7F 01 41 A1 9C B9 3B 46 FE BA 00 00 74
0A1B8   01 42 0A CA D1 E9 73 D1 B8 AA 00 50 9A 73 00 8C 0A 9A 47 00 8C 0A 8B E5
0A1D0   5D CB 55 8B EC 81 EC 04 00 B8 F4 E1 50 B8 56 FB 50 9A 03 00 8C 0A 9A 47
0A1E8   00 8C 0A 8B E5 5D CB 00 55 8B EC 81 EC 06 00 B8 08 E2 50 B8 68 FB 50 9A
0A200   03 00 8C 0A B8 15 00 50 9A 73 00 8C 0A B8 16 00 50 9A 73 00 8C 0A B8 03
0A218   00 50 B8 14 00 50 9A 03 00 47 06 B8 03 00 50 B8 15 00 50 9A B5 0A 87 05
0A230   B8 17 00 50 9A 73 00 8C 0A 8B 46 06 05 03 00 89 46 FA 83 7E FA 03 7D 03
0A248   E9 A3 00 C7 46 FE 03 00 B8 18 00 50 9A 73 00 8C 0A 8B 46 FE 2B 46 06 05
0A260   11 00 89 46 FC B8 19 00 50 9A 73 00 8C 0A B8 A0 00 F7 66 FC C4 1E 1E C4
0A278   03 D8 53 06 B8 A0 00 F7 66 FE C4 1E 1E C4 03 D8 B9 A0 00 9A A5 02 EE 09
0A290   B8 1A 00 50 9A 73 00 8C 0A B8 0A 00 F7 66 FC 96 81 C6 0A C2 B8 0A 00 F7
0A2A8   66 FE 97 81 C7 0A C2 B9 05 00 1E 07 FC F3 A5 B8 1B 00 50 9A 73 00 8C 0A
0A2C0   B8 50 00 F7 66 FC 96 81 C6 EA B9 B8 50 00 F7 66 FE 97 81 C7 EA B9 B9 28
0A2D8   00 1E 07 FC F3 A5 8B 46 FE 40 89 46 FE 48 3B 46 FA 74 03 E9 62 FF B8 1C
0A2F0   00 50 9A 73 00 8C 0A 8B 46 06 05 03 00 50 B8 15 00 50 B8 0A 00 F7 66 06
0A308   96 FF B4 28 C2 9A CE 06 87 05 B8 1D 00 50 9A 73 00 8C 0A A1 28 C2 A3 9A
0A320   B9 B8 1E 00 50 9A 73 00 8C 0A B8 14 00 2B 46 06 3B 06 9C B9 7E 20 B8 1F
0A338   00 50 9A 73 00 8C 0A C7 06 9C B9 03 00 B8 20 00 50 9A 73 00 8C 0A A1 1A
0A350   C4 A3 9E B9 EB 15 B8 21 00 50 9A 73 00 8C 0A A1 9C B9 03 46 06 05 EF FF
0A368   A3 9C B9 B8 23 00 50 9A 73 00 8C 0A 8B 46 06 05 04 00 50 B8 14 00 50 9A
0A380   C5 01 47 06 B8 24 00 50 9A 73 00 8C 0A 9A 47 00 8C 0A 8B E5 5D CA 02 00
0A398   55 8B EC 81 EC 08 00 B8 08 E2 50 B8 78 FB 50 9A 03 00 8C 0A B8 2B 00 50
0A3B0   9A 73 00 8C 0A B8 2C 00 50 9A 73 00 8C 0A A1 90 B9 3B 06 28 C2 75 03 E9
0A3C8   09 02 B8 2D 00 50 9A 73 00 8C 0A B8 03 00 50 B8 14 00 50 9A 03 00 47 06
0A3E0   B8 03 00 50 B8 15 00 50 9A B5 0A 87 05 B8 2E 00 50 9A 73 00 8C 0A 8B 46
0A3F8   06 05 03 00 89 46 F8 83 7E F8 03 7D 03 E9 A9 00 8B 46 F8 89 46 FE B8 2F
0A410   00 50 9A 73 00 8C 0A B8 A0 00 F7 66 FE C4 1E 1E C4 03 D8 53 06 8B 46 FE
0A428   2B 46 06 B9 A0 00 F7 E1 05 A0 0A C4 1E 1E C4 03 D8 B9 A0 00 9A A5 02 EE
0A440   09 B8 30 00 50 9A 73 00 8C 0A B8 0A 00 F7 66 FE 96 81 C6 0A C2 8B 46 FE
0A458   2B 46 06 BF 0A 00 F7 E7 97 81 C7 B4 C2 B9 05 00 1E 07 FC F3 A5 B8 31 00
0A470   50 9A 73 00 8C 0A B8 50 00 F7 66 FE 96 81 C6 EA B9 8B 46 FE 2B 46 06 BF
0A488   50 00 F7 E7 97 81 C7 3A BF B9 28 00 1E 07 FC F3 A5 B8 32 00 50 9A 73 00
0A4A0   8C 0A 8B 46 FE 48 89 46 FE 3D 02 00 74 03 E9 5D FF B8 33 00 50 9A 73 00
0A4B8   8C 0A B8 14 00 2B 46 06 89 46 FE B8 34 00 50 9A 73 00 8C 0A C7 46 FA 00
0A4D0   00 B8 35 00 50 9A 73 00 8C 0A 83 7E FE 03 7E 59 B8 36 00 50 9A 73 00 8C
0A4E8   0A B8 0A 00 F7 66 FE 96 8B 84 0E C2 89 46 FC B8 37 00 50 9A 73 00 8C 0A
0A500   83 7E FC 00 75 02 EB 31 B8 38 00 50 9A 73 00 8C 0A FF 46 FA B8 39 00 50
0A518   9A 73 00 8C 0A FF 4E FE B8 3A 00 50 9A 73 00 8C 0A FF 76 FE FF 76 FE FF
0A530   76 FC 9A CE 06 87 05 EB A1 B8 3B 00 50 9A 73 00 8C 0A B8 0A 00 F7 66 FE
0A548   96 8B 84 0A C2 A3 9A B9 B8 3C 00 50 9A 73 00 8C 0A 83 7E FE 03 74 11 B8
0A560   03 00 50 B8 15 00 50 FF 36 9A B9 9A CE 06 87 05 B8 3D 00 50 9A 73 00 8C
0A578   0A A1 9C B9 03 46 FA 3D 14 00 7E 20 B8 3E 00 50 9A 73 00 8C 0A C7 06 9C
```

```
0A590   B9 14 00 B8 3F 00 50 9A 73 00 8C 0A A1 1C C4 A3 9E B9 EB 10 B8 40 00 50
0A5A8   9A 73 00 8C 0A 8B 46 FA 01 06 9C B9 B8 42 00 50 9A 73 00 8C 0A B8 03 00
0A5C0   50 B8 14 00 50 9A C5 01 47 06 B8 43 00 50 9A 73 00 8C 0A 9A 47 00 8C 0A
0A5D8   8B E5 5D CA 02 00 55 8B EC 81 EC 00 00 B8 08 E2 50 B8 88 FB 50 9A 03 00
0A5F0   8C 0A B8 46 00 50 9A 73 00 8C 0A B8 03 00 50 9A 01 00 BF 07 9A 47 00 8C
0A608   0A 8B E5 5D CB 55 8B EC 81 EC 00 00 B8 08 E2 50 B8 98 FB 50 9A 03 00 8C
0A620   0A B8 49 00 50 9A 73 00 8C 0A B8 03 00 50 9A A9 01 BF 07 9A 47 00 8C 0A
0A638   8B E5 5D CB 55 8B EC 81 EC 00 00 B8 08 E2 50 B8 A8 FB 50 9A 03 00 8C 0A
0A650   B8 4C 00 50 9A 73 00 8C 0A B8 10 00 50 9A 01 00 BF 07 9A 47 00 8C 0A 8B
0A668   E5 5D CB 55 8B EC 81 EC 00 00 B8 08 E2 50 B8 BC FB 50 9A 03 00 8C 0A B8
0A680   4F 00 50 9A 73 00 8C 0A B8 10 00 50 9A A9 01 BF 07 9A 47 00 8C 0A 8B E5
0A698   5D CB 55 8B EC 81 EC 04 00 B8 08 E2 50 B8 CC FB 50 9A 03 00 8C 0A 9A 47
0A6B0   00 8C 0A 8B E5 5D CB 00 55 8B EC 81 EC 62 00 B8 1C E2 50 B8 DA FB 50 9A
0A6C8   03 00 8C 0A B8 18 00 50 9A 73 00 8C 0A B8 19 00 50 9A 73 00 8C 0A B8 0A
0A6E0   00 F7 66 06 96 8B 84 0E C2 89 46 FC B8 1A 00 50 9A 73 00 8C 0A 9A D2 08
0A6F8   87 05 B8 1B 00 50 9A 73 00 8C 0A 83 7E 06 14 7C 03 E9 C8 01 B8 1C 00 50
0A710   9A 73 00 8C 0A 8B 46 06 89 46 A0 83 7E A0 13 7F 60 8B 46 A0 89 46 FE B8
0A728   1D 00 50 9A 73 00 8C 0A B8 0A 00 F7 66 FE 96 8B D6 81 C6 14 C2 8B FA 81
0A740   C7 0A C2 B9 05 00 1E 07 FC F3 A5 B8 1E 00 50 9A 73 00 8C 0A B8 A0 00 F7
0A758   66 FE 8B D0 05 A0 00 C4 1E 1E C4 03 D8 53 06 C4 1E 1E C4 03 DA B9 A0 00
0A770   9A A5 02 EE 09 8B 46 FE 40 89 46 FE 3D 14 00 75 A6 B8 1F 00 50 9A 73 00
0A788   8C 0A B8 14 00 50 50 FF 36 CA C2 9A CE 06 87 05 B8 20 00 50 9A 73 00 8C
0A7A0   0A B8 0A 00 F7 66 06 96 8B 46 FC 89 84 0E C2 C6 84 12 C2 01 B8 21 00 50
0A7B8   89 76 9E 9A 73 00 8C 0A 83 7E 06 03 7E 28 B8 22 00 50 9A 73 00 8C 0A 8B
0A7D0   76 9E 8B 84 0A C2 89 84 02 C2 B8 23 00 50 9A 73 00 8C 0A 8B 76 9E C6 84
0A7E8   08 C2 01 E9 B2 00 B8 24 00 50 9A 73 00 8C 0A 83 7E FC 00 75 1A B8 25 00
0A800   50 9A 73 00 8C 0A B8 0A 00 F7 66 06 96 8B 84 0A C2 A3 90 B9 E9 89 00 B8
0A818   26 00 50 9A 73 00 8C 0A B8 27 00 50 9A 73 00 8C 0A B8 50 C4 50 33 D2 8B
0A830   46 FC 52 50 9A DE 0A 20 09 B8 50 C4 50 9A 5B 06 20 09 8D 7E A2 BE CA C6
0A848   B9 2D 00 1E 07 FC F3 A5 B8 28 00 50 9A 73 00 8C 0A B8 0A 00 F7 66 06 96
0A860   8B 84 0A C2 89 46 A4 B8 29 00 50 9A 73 00 8C 0A B8 50 C4 50 33 D2 8B 46
0A878   FC 52 50 9A DE 0A 20 09 BF CA C6 8D 76 A2 B9 2D 00 1E 07 FC F3 A5 B8 50
0A890   C4 50 9A 61 08 20 09 B8 2A 00 50 9A 73 00 8C 0A B8 2B 00 50 9A 73 00 8C
0A8A8   0A A1 9C B9 3B 46 06 7E 0D B8 2C 00 50 9A 73 00 8C 0A FF 0E 9C B9 B8 2D
0A8C0   00 50 9A 73 00 8C 0A B8 14 00 50 50 9A C5 01 47 06 E9 8A 00 B8 2E 00 50
0A8D8   9A 73 00 8C 0A 83 3E D4 C2 00 74 7A B8 2F 00 50 9A 73 00 8C 0A B8 14 00
0A8F0   50 50 FF 36 D4 C2 9A CE 06 87 05 B8 30 00 50 9A 73 00 8C 0A B8 0A 00 F7
0A908   66 06 96 8B 46 FC 89 84 0E C2 B8 31 00 50 89 76 9E 9A 73 00 8C 0A 8B 76
0A920   9E C6 84 12 C2 01 B8 32 00 50 9A 73 00 8C 0A 8B 76 9E 8B 84 0A C2 89 84
0A938   02 C2 B8 33 00 50 9A 73 00 8C 0A 8B 76 9E C6 84 08 C2 01 B8 34 00 50 9A
0A950   73 00 8C 0A B8 14 00 50 50 9A C5 01 47 06 B8 35 00 50 9A 73 00 8C 0A 9A
0A968   47 00 8C 0A 8B E5 5D CA 02 00 55 8B EC 81 EC 10 00 B8 1C E2 50 B8 EE FB
0A980   50 9A 03 00 8C 0A B8 3C 00 50 9A 73 00 8C 0A B8 3D 00 50 9A 73 00 8C 0A
0A998   B8 0A 00 F7 66 0A 96 8B 84 10 C2 89 46 FC B8 3E 00 50 9A 73 00 8C 0A A1
0A9B0   16 C4 03 46 FC 3B 46 08 7F 03 E9 C2 01 B8 3F 00 50 9A 73 00 8C 0A B8 0A
0A9C8   00 F7 66 0A 96 C6 84 12 C2 01 B8 40 00 50 9A 73 00 8C 0A A1 16 C4 03 46
0A9E0   FC 8B 4E 08 03 4E 06 3B C1 7E 16 B8 41 00 50 9A 73 00 8C 0A 8B 46 06 89
0A9F8   46 FE C7 46 06 00 00 EB 2E B8 42 00 50 9A 73 00 8C 0A B8 43 00 50 9A 73
0AA10   00 8C 0A 8B 46 FC 8B 46 2B 46 08 03 06 16 C4 89 46 FE B8 44 00 50 9A 73 00 8C
0AA28   0A 8B 46 FE 29 46 06 B8 45 00 50 9A 73 00 8C 0A 8B 46 FC 3B 46 FE 75 0B
0AA40   FF 76 0A 9A 09 00 0B 08 E9 34 01 B8 46 00 50 9A 73 00 8C 0A B8 47 00 50
0AA58   9A 73 00 8C 0A A1 28 C4 89 46 F8 B8 48 00 50 9A 73 00 8C 0A 8B 76 0A D1
0AA70   E6 8B 84 2C B9 89 46 F4 B8 49 00 50 9A 73 00 8C 0A 8B 46 08 89 46 F2 8B
0AA88   46 FC 2B 46 FE 03 06 16 C4 48 89 46 F0 8B 46 F0 3B 46 F2 7C 53 8B 46 F2
0AAA0   89 46 FA B8 4A 00 50 9A 73 00 8C 0A 8B 46 F4 03 46 FA 03 46 FA A3 26 C4
0AAB8   B8 4B 00 50 9A 73 00 8C 0A A1 26 C4 03 46 FE 03 46 FE 89 46 F6 B8 4C 00
0AAD0   50 9A 73 00 8C 0A C4 5E F6 26 8B 07 C4 1E 26 C4 26 89 07 8B 46 FA 40 89
0AAE8   46 FA 48 3B 46 F0 75 B3 B8 4D 00 50 9A 73 00 8C 0A 8B 46 FC 2B 46 FE 03
0AB00   06 16 C4 89 46 F2 A1 16 C4 03 46 FC 48 89 46 F0 8B 46 F0 3B 46 F2 7C 44
0AB18   8B 46 F2 89 46 FA B8 4E 00 50 9A 73 00 8C 0A 8B 46 F4 03 46 FA 03 46 FA
0AB30   A3 26 C4 B8 4F 00 50 9A 73 00 8C 0A C4 1E 26 C4 26 C6 07 00 C4 1E 26 C4
0AB48   83 C3 01 26 C6 07 0F 8B 46 FA 40 89 46 FA 48 3B 46 F0 75 C2 B8 50 00 50
0AB60   9A 73 00 8C 0A B8 0A 00 F7 66 0A 96 8B 46 FC 2B 46 FE 89 84 10 C2 B8 51
0AB78   00 50 9A 73 00 8C 0A 9A 47 00 8C 0A 8B E5 5D CA 06 00 55 8B EC 81 EC 0A
0AB90   00 B8 1C E2 50 B8 02 FC 50 9A 03 00 8C 0A B8 57 00 50 9A 73 00 8C 0A B8
0ABA8   58 00 50 9A 73 00 8C 0A 83 3E 9C B9 03 75 23 B8 59 00 50 9A 73 00 8C 0A
0ABC0   A1 16 C4 3B 06 9E B9 75 11 B8 5A 00 50 9A 73 00 8C 0A 9A 84 00 28 07 E9
0ABD8   BB 00 B8 5B 00 50 9A 73 00 8C 0A 9A 84 00 28 07 B8 5C 00 50 9A 73 00 8C
```

| | | | | | | | | | | | | | | | | | | |
|---|---|---|---|---|---|---|---|---|---|---|---|---|---|---|---|---|---|---|
| 0ABF0 | 0A | A1 | 9E | B9 | 89 | 46 | FC | A1 | 9C | B9 | 89 | 46 | FE | B8 | 5D | 00 | 50 | 9A | 73 | 00 | 8C | 0A | A1 | 28 |
| 0AC08 | C4 | 89 | 46 | F8 | 8B | 76 | FE | D1 | E6 | 8B | 84 | 2C | B9 | 03 | 46 | FC | 03 | 46 | FC | 89 | 46 | F6 | B8 | 5E |
| 0AC20 | 00 | 50 | 9A | 73 | 00 | 8C | 0A | C4 | 5E | F6 | 26 | 8B | 07 | 3C | AF | 75 | 30 | B8 | 5F | 00 | 50 | 9A | 73 | 00 |
| 0AC38 | 8C | 0A | 9A | 84 | 00 | 28 | 07 | 9A | 2F | 07 | 28 | 07 | 89 | 46 | FA | B8 | 60 | 00 | 50 | 9A | 73 | 00 | 8C | 0A |
| 0AC50 | A1 | 9E | B9 | 3B | 46 | FA | 7E | 07 | 9A | 84 | 00 | 28 | 07 | EB | F1 | EB | 0F | B8 | 61 | 00 | 50 | 9A | 73 | 00 |
| 0AC68 | 8C | 0A | 8B | 46 | FC | 89 | 46 | FA | B8 | 62 | 00 | 50 | 9A | 73 | 00 | 8C | 0A | FF | 76 | FE | FF | 76 | FA | 8B |
| 0AC80 | 46 | FC | 2B | 46 | FA | 40 | 50 | 9A | C3 | 02 | 0B | 08 | B8 | 63 | 00 | 50 | 9A | 73 | 00 | 8C | 0A | 9A | 47 | 00 |
| 0AC98 | 8C | 0A | 8B | E5 | 5D | CB | 55 | 8B | EC | 81 | EC | 08 | 00 | B8 | 1C | E2 | 50 | B8 | 16 | FC | 50 | 9A | 03 | 00 |
| 0ACB0 | 8C | 0A | B8 | 68 | 00 | 50 | 9A | 73 | 00 | 8C | 0A | B8 | 69 | 00 | 50 | 9A | 73 | 00 | 8C | 0A | 9A | 46 | 06 | 28 |
| 0ACC8 | 07 | 89 | 46 | FE | B8 | 6A | 00 | 50 | 9A | 73 | 00 | 8C | 0A | A1 | 9E | B9 | 89 | 46 | FC | A1 | 9C | B9 | 89 | 46 |
| 0ACE0 | FA | B8 | 6B | 00 | 50 | 9A | 73 | 00 | 8C | 0A | B8 | 0A | 00 | F7 | 66 | FA | 96 | 8B | 84 | 10 | C2 | 03 | 06 | 16 |
| 0ACF8 | C4 | 89 | 46 | F8 | B8 | 6C | 00 | 50 | 9A | 73 | 00 | 8C | 0A | 8B | 46 | FC | 3B | 46 | F8 | 7C | 02 | EB | 3D | B8 |
| 0AD10 | 6D | 00 | 50 | 9A | 73 | 00 | 8C | 0A | 8B | 46 | FE | 3B | 46 | F8 | 7E | 07 | 8B | 46 | F8 | 48 | 89 | 46 | FE | B8 |
| 0AD28 | 6E | 00 | 50 | 9A | 73 | 00 | 8C | 0A | FF | 76 | FA | FF | 76 | FC | 8B | 46 | FE | 2B | 46 | FC | 40 | 50 | 9A | C3 |
| 0AD40 | 02 | 0B | 08 | B8 | 6F | 00 | 50 | 9A | 73 | 00 | 8C | 0A | 9A | 47 | 00 | 8C | 0A | 8B | E5 | 5D | CB | 55 | 8B | EC |
| 0AD58 | 81 | EC | 04 | 00 | B8 | 1C | E2 | 50 | B8 | 2A | FC | 50 | 9A | 03 | 00 | 8C | 0A | 9A | 47 | 00 | 8C | 0A | 8B | E5 |
| 0AD70 | 5D | CB | 00 | 00 | 55 | 8B | EC | 81 | EC | 02 | 00 | B8 | 30 | E2 | 50 | B8 | 3C | FC | 50 | 9A | 03 | 00 | 8C | 0A |
| 0AD88 | B8 | 1B | 00 | 50 | 9A | 73 | 00 | 8C | 0A | B8 | 1C | 00 | 50 | 9A | 73 | 00 | 8C | 0A | C7 | 06 | 0E | C4 | 00 | 00 |
| 0ADA0 | C7 | 06 | 10 | C4 | 00 | 00 | C6 | 06 | 1A | D1 | 00 | B8 | 1D | 00 | 50 | 9A | 73 | 00 | 8C | 0A | BF | 84 | B7 | BE |
| 0ADB8 | 50 | FC | 1E | 07 | FC | A5 | A5 | A5 | B8 | 18 | 00 | 50 | B8 | 29 | 00 | 50 | 9A | 94 | 02 | 47 | 06 | B8 | 1E | 00 |
| 0ADD0 | 50 | 9A | 73 | 00 | 8C | 0A | B8 | 18 | 00 | 50 | B8 | 31 | 00 | 50 | 9A | 94 | 02 | 47 | 06 | B8 | 18 | 00 | 50 | B8 |
| 0ADE8 | 31 | 00 | 50 | B8 | 05 | 00 | 50 | B8 | 70 | 00 | 50 | 9A | D2 | 00 | 47 | 06 | B8 | 1F | 00 | 50 | 9A | 73 | 00 | 8C |
| 0AE00 | 0A | B8 | 18 | 00 | 50 | B8 | 29 | 00 | 50 | B8 | 05 | 00 | 50 | B8 | 70 | 00 | 50 | 9A | D2 | 00 | 47 | 06 | B8 | 20 |
| 0AE18 | 00 | 50 | 9A | 73 | 00 | 8C | 0A | C7 | 46 | FE | 03 | 00 | FF | 76 | FE | FF | 36 | 16 | C4 | A1 | 18 | C4 | 2B | 06 |
| 0AE30 | 16 | C4 | 40 | 50 | B8 | 0F | 00 | 50 | 9A | D2 | 00 | 47 | 06 | 8B | 46 | FE | 40 | 89 | 46 | FE | 3D | 15 | 00 | 75 |
| 0AE48 | DB | B8 | 21 | 00 | 50 | 9A | 73 | 00 | 8C | 0A | 9A | 47 | 00 | 8C | 0A | 8B | E5 | 5D | CB | 55 | 8B | EC | 81 | EC |
| 0AE60 | 66 | 00 | B8 | 30 | E2 | 50 | B8 | 56 | FC | 50 | 9A | 03 | 00 | 8C | 0A | B8 | 29 | 00 | 50 | 9A | 73 | 00 | 8C | 0A |
| 0AE78 | B8 | 2A | 00 | 50 | 9A | 73 | 00 | 8C | 0A | A1 | 0E | C4 | 89 | 46 | A4 | A1 | 14 | C4 | 89 | 46 | 9E | B8 | 2B | 00 |
| 0AE90 | 50 | 9A | 73 | 00 | 8C | 0A | B8 | 2C | 00 | 50 | 9A | 73 | 00 | 8C | 0A | B8 | 50 | C4 | 50 | 33 | D2 | 8B | 46 | A4 |
| 0AEA8 | 52 | 50 | 9A | DE | 0A | 20 | 09 | B8 | 50 | C4 | 50 | 9A | 5B | 06 | 20 | 09 | 8D | 7E | A6 | BE | CA | C6 | B9 | 2D |
| 0AEC0 | 00 | 1E | 07 | FC | F3 | A5 | B8 | 2D | 00 | 50 | 9A | 73 | 00 | 8C | 0A | A1 | 10 | C4 | 3B | 46 | A4 | 75 | 16 | B8 |
| 0AED8 | 2E | 00 | 50 | 9A | 73 | 00 | 8C | 0A | C7 | 46 | A4 | 00 | 00 | A1 | 12 | C4 | 89 | 46 | A0 | EB | 2B | B8 | 2F | 00 |
| 0AEF0 | 50 | 9A | 73 | 00 | 8C | 0A | B8 | 30 | 00 | 50 | 9A | 73 | 00 | 8C | 0A | 8B | 46 | A8 | 89 | 46 | A4 | B8 | 31 | 00 |
| 0AF08 | 50 | 9A | 73 | 00 | 8C | 0A | A1 | 16 | C4 | 03 | 46 | AC | 48 | 89 | 46 | A0 | B8 | 32 | 00 | 50 | 9A | 73 | 00 | 8C |
| 0AF20 | 0A | 83 | 7E | AC | 00 | 7F | 03 | E9 | 14 | 01 | B8 | 33 | 00 | 50 | 9A | 73 | 00 | 8C | 0A | 8B | 46 | 9E | 89 | 46 |
| 0AF38 | 9C | 8B | 46 | A0 | 89 | 46 | 9A | 8B | 46 | 9A | 3B | 46 | 9C | 7D | 03 | E9 | F4 | 00 | 8B | 46 | 9C | 89 | 46 | A2 |
| 0AF50 | B8 | 34 | 00 | 50 | 9A | 73 | 00 | 8C | 0A | 8B | 76 | A2 | C4 | 1E | 3C | C4 | 26 | 8B | 47 | 30 | C4 | 1E | 32 | C4 |
| 0AF68 | 03 | D8 | 8B | 42 | B0 | 26 | 88 | 07 | B8 | 35 | 00 | 50 | 9A | 73 | 00 | 8C | 0A | C4 | 1E | 3C | C4 | 26 | 8B | 47 |
| 0AF80 | 30 | C4 | 1E | 32 | C4 | 96 | 26 | 8B | 00 | 22 | C0 | 75 | 1B | B8 | 36 | 00 | 50 | 9A | 73 | 00 | 8C | 0A | C4 | 1E |
| 0AF98 | 3C | C4 | 26 | 8B | 47 | 30 | C4 | 1E | 32 | C4 | 03 | D8 | 26 | C6 | 07 | 20 | B8 | 37 | 00 | 50 | 9A | 73 | 00 | 8C |
| 0AFB0 | 0A | C4 | 1E | 3C | C4 | 83 | C3 | 30 | 26 | 83 | 07 | 01 | B8 | 38 | 00 | 50 | 9A | 73 | 00 | 8C | 0A | C4 | 1E | 3C |
| 0AFC8 | C4 | 26 | 8B | 47 | 30 | 3D | FF | 3F | 7C | 5C | B8 | 39 | 00 | 50 | 9A | 73 | 00 | 8C | 0A | BF | 84 | B7 | BE | 66 |
| 0AFE0 | FC | B9 | 08 | 00 | 1E | 07 | FC | F3 | A5 | B8 | 18 | 00 | 50 | 33 | C0 | 50 | 9A | 94 | 02 | 47 | 06 | B8 | 3A | 00 |
| 0AFF8 | 50 | 9A | 73 | 00 | 8C | 0A | B8 | C0 | E4 | 50 | B8 | 1B | 00 | 50 | B8 | 77 | FC | 1E | 50 | B8 | FF | 7F | 50 | 50 |
| 0B010 | 9A | EC | 01 | B1 | 0A | B8 | 3B | 00 | 50 | 9A | 73 | 00 | 8C | 0A | 9A | AD | 03 | 3F | 00 | B8 | 3C | 00 | 50 | 9A |
| 0B028 | 73 | 00 | 8C | 0A | EB | 31 | 8B | 46 | A2 | 40 | 89 | 46 | A2 | 48 | 3B | 46 | 9A | 74 | 03 | E9 | 12 | FF | B8 | 3D |
| 0B040 | 00 | 50 | 9A | 73 | 00 | 8C | 0A | A1 | 16 | C4 | 89 | 46 | 9E | B8 | 3E | 00 | 50 | 9A | 73 | 00 | 8C | 0A | 83 | 7E |
| 0B058 | A4 | 00 | 74 | 03 | E9 | 37 | FE | B8 | 3F | 00 | 50 | 9A | 73 | 00 | 8C | 0A | C4 | 1E | 3C | C4 | 26 | 8B | 47 | 30 |
| 0B070 | C4 | 1E | 32 | C4 | 03 | D8 | 26 | C6 | 07 | FF | B8 | 40 | 00 | 50 | 9A | 73 | 00 | 8C | 0A | C4 | 1E | 3C | C4 | 83 |
| 0B088 | C3 | 30 | 26 | 83 | 07 | 01 | B8 | 41 | 00 | 50 | 9A | 73 | 00 | 8C | 0A | C4 | 1E | 3C | C4 | 83 | C3 | 33 | 26 | C6 |
| 0B0A0 | 07 | 01 | B8 | 42 | 00 | 50 | 9A | 73 | 00 | 8C | 0A | 9A | 47 | 00 | 8C | 0A | 8B | E5 | 5D | CB | 55 | 8B | EC | 81 |
| 0B0B8 | EC | 02 | 00 | B8 | 30 | E2 | 50 | B8 | 92 | FC | 50 | 9A | 03 | 00 | 8C | 0A | B8 | 47 | 00 | 50 | 9A | 73 | 00 | 8C |
| 0B0D0 | 0A | B8 | 48 | 00 | 50 | 9A | 73 | 00 | 8C | 0A | B8 | 49 | 00 | 50 | 9A | 73 | 00 | 8C | 0A | 9A | 1C | 04 | 3D | 03 |
| 0B0E8 | 89 | 46 | FE | B8 | 4A | 00 | 50 | 9A | 73 | 00 | 8C | 0A | 8B | 5E | FE | EB | 2C | B8 | 4B | 00 | 50 | 9A | 73 | 00 |
| 0B100 | 8C | 0A | 9A | EC | 00 | 77 | 08 | EB | 30 | EB | 2C | B8 | 4C | 00 | 50 | 9A | 73 | 00 | 8C | 0A | EB | 23 | EB | 1F |
| 0B118 | B8 | 4D | 00 | 50 | 9A | 73 | 00 | 8C | 0A | EB | 16 | EB | 12 | 83 | EB | 00 | 7E | CF | D1 | E3 | 2E | FF | A7 | C2 |
| 0B130 | 03 | 8A | 03 | 9C | 03 | A9 | 03 | EB | A1 | B8 | 50 | 00 | 50 | 9A | 73 | 00 | 8C | 0A | 9A | 47 | 00 | 8C | 0A | 8B |
| 0B148 | E5 | 5D | CB | 55 | 8B | EC | 81 | EC | B0 | 0F | B8 | 30 | E2 | 50 | B8 | A6 | FC | 50 | 9A | 03 | 00 | 8C | 0A | B8 |
| 0B160 | 58 | 00 | 50 | 9A | 73 | 00 | 8C | 0A | B8 | 59 | 00 | 50 | 9A | 73 | 00 | 8C | 0A | F6 | 06 | 1A | D1 | 01 | 75 | 03 |
| 0B178 | E9 | AB | 03 | B8 | 5A | 00 | 50 | 9A | 73 | 00 | 8C | 0A | 83 | 3E | 10 | C4 | 00 | 75 | 67 | B8 | 5B | 00 | 50 | 9A |
| 0B190 | 73 | 00 | 8C | 0A | BF | 84 | B7 | BE | BA | FC | 1E | 07 | FC | A5 | A5 | A5 | B8 | 18 | 00 | 50 | B8 | 31 | 00 | 50 |
| 0B1A8 | 9A | 94 | 02 | 47 | 06 | B8 | 5C | 00 | 50 | 9A | 73 | 00 | 8C | 0A | B8 | 18 | 00 | 50 | B8 | 31 | 00 | 50 | B8 | 05 |
| 0B1C0 | 00 | 50 | B8 | 87 | 00 | 50 | 9A | D2 | 00 | 47 | 06 | B8 | 5D | 00 | 50 | 9A | 73 | 00 | 8C | 0A | B8 | 0A | 00 | F7 |
| 0B1D8 | 26 | 9C | B9 | 96 | 8B | 84 | 0A | C2 | A3 | 10 | C4 | B8 | 5E | 00 | 50 | 9A | 73 | 00 | 8C | 0A | A1 | 9E | B9 | A3 |
| 0B1F0 | 12 | C4 | B8 | 5F | 00 | 50 | 9A | 73 | 00 | 8C | 0A | B8 | 03 | 00 | 50 | B8 | 14 | 00 | 50 | 9A | 03 | 00 | 47 | 06 |
| 0B208 | B8 | 03 | 00 | 50 | B8 | 15 | 00 | 50 | 9A | B5 | 0A | 87 | 05 | B8 | 60 | 00 | 50 | 9A | 73 | 00 | 8C | 0A | C4 | 1E |
| 0B220 | 1E | C4 | 8D | BE | 54 | F0 | B9 | A0 | 0F | 9A | C3 | 02 | EE | 09 | B8 | 61 | 00 | 50 | 9A | 73 | 00 | 8C | 0A | B8 |

```
0B238  62 00 50 9A 73 00 8C 0A C7 46 FC 06 00 C7 46 FE 06 00 B8 63 00 50 9A 73
0B250  00 8C 0A C7 46 F8 11 00 C7 46 FA 49 00 B8 64 00 50 9A 73 00 8C 0A FF 76
0B268  FE FF 76 FC FF 76 FA FF 76 F8 9A 37 03 47 06 B8 65 00 50 9A 73 00 8C 0A
0B280  C6 06 84 B7 42 B8 66 00 50 9A 73 00 8C 0A A1 84 B7 32 E4 89 86 50 F0 83
0B298  BE 50 F0 01 7C 1B C7 46 F6 01 00 8B 76 F6 C6 84 84 B7 20 8B 46 F6 40 89
0B2B0  46 F6 48 3B 86 50 F0 75 EA B8 67 00 50 9A 73 00 8C 0A C7 F4 07 00 FF
0B2C8  76 F4 B8 07 00 50 9A 94 02 47 06 8B 46 F4 40 89 46 F4 3D 11 00 75 E8 B8
0B2E0  68 00 50 9A 73 00 8C 0A C7 46 F4 06 00 B8 69 00 50 9A 73 00 8C 0A FF 76
0B2F8  F4 B8 06 00 50 B8 44 00 50 B8 0F 00 50 9A D2 00 47 06 8B 46 F4 40 89 46
0B310  F4 3D 12 00 75 D7 B8 6A 00 50 9A 73 00 8C 0A BF 84 B7 BE C0 FC B9 06 00
0B328  1E 07 FC F3 A5 B8 07 00 50 B8 23 00 50 9A 94 02 47 06 B8 6B 00 50 9A 73
0B340  00 8C 0A BF 84 B7 BE CC FC B9 06 00 1E 07 FC F3 A5 B8 09 00 50 B8 08 00
0B358  50 9A 94 02 47 06 B8 6C 00 50 9A 73 00 8C 0A BF 84 B7 BE D8 FC B9 0B 00
0B370  1E 07 FC F3 A5 A4 B8 0A 00 50 B8 0D 00 50 9A 94 02 47 06 B8 6D 00 50 9A
0B388  73 00 8C 0A BF 84 B7 BE F0 FC B9 0D 00 1E 07 FC F3 A5 B8 0B 00 50 B8 0D
0B3A0  00 50 9A 94 02 47 06 B8 6E 00 50 9A 73 00 8C 0A BF 84 B7 BE 0A FD B9 0C
0B3B8  00 1E 07 FC F3 A5 A4 B8 0F 00 50 B8 0D 00 50 9A 94 02 47 06 B8 6F 00 50
0B3D0  9A 73 00 8C 0A 9A AD 03 3F 00 B8 70 00 50 9A 73 00 8C 0A 8B 1E 80 B7 32
0B3E8  FF E9 F1 00 B8 71 00 50 9A 73 00 8C 0A 9A 45 03 77 08 E9 3A FE E9 20 01
0B400  B8 72 00 50 9A 73 00 8C 0A B8 73 00 50 9A 73 00 8C 0A C4 1E 1E C4 8D B6
0B418  54 F0 B9 D0 07 8B FB FC F3 A5 B8 74 00 50 9A 73 00 8C 0A BF 84 B7 BE 24
0B430  FD 1E 07 FC A5 A5 A5 B8 18 00 50 B8 31 00 50 9A 94 02 47 06 B8 75 00 50
0B448  9A 73 00 8C 0A B8 18 00 50 B8 31 00 50 B8 05 00 50 B8 70 00 50 9A D2 00
0B460  47 06 B8 76 00 50 9A 73 00 8C 0A C7 06 10 C4 00 00 C7 06 12 C4 00 00 B8
0B478  77 00 50 9A 73 00 8C 0A E9 7B 01 E9 9A 00 B8 78 00 50 9A 73 00 8C 0A B8
0B490  79 00 50 9A 73 00 8C 0A C4 1E 1E C4 8D B6 54 F0 B9 D0 07 8B FB FC F3 A5
0B4A8  9A 05 00 77 08 B8 7A 00 50 9A 73 00 8C 0A C4 1E 3C C4 83 C3 36 8B 86 52
0B4C0  F0 26 89 07 E9 37 01 EB 57 B8 7B 00 50 9A 73 00 8C 0A B8 7C 00 50 9A 73
0B4D8  00 8C 0A EB 43 83 FB 72 77 E7 83 FB 1A 76 E2 83 FB 1B 76 9A 83 FB 42 76
0B4F0  D8 83 FB 43 77 03 E9 F3 FE 83 FB 51 76 CB 83 FB 52 77 03 E9 FA FE 83 FB
0B508  62 76 BE 83 FB 63 77 03 E9 D9 FE 83 FB 71 76 B1 83 FB 72 77 03 E9 E0 FE
0B520  E9 14 FD E9 CF 00 B8 7D 00 50 9A 73 00 8C 0A B8 7E 00 50 9A 73 00 8C 0A
0B538  C4 1E 3C C4 26 8B 47 36 89 86 52 F0 B8 7F 00 50 9A 73 00 8C 0A C4 1E 3C
0B550  C4 83 C3 36 26 C7 07 04 00 B8 80 00 50 9A 73 00 8C 0A C6 06 1A D1 01 B8
0B568  81 00 50 9A 73 00 8C 0A BF 84 B7 BE 2A FD 1E 07 FC A5 A5 A5 B8 18 00 50
0B580  B8 29 00 50 9A 94 02 47 06 B8 82 00 50 9A 73 00 8C 0A B8 18 00 50 B8 29
0B598  00 50 B8 05 00 50 B8 87 00 50 9A D2 00 47 06 B8 83 00 50 9A 73 00 8C 0A
0B5B0  FF 36 9C B9 FF 36 9E B9 B8 01 00 50 B8 70 00 50 9A D2 00 47 06 B8 85 00
0B5C8  50 9A 73 00 8C 0A B8 0A 00 F7 26 9C B9 96 8B 84 0A C2 A3 0E C4 B8 86 00
0B5E0  50 9A 73 00 8C 0A A1 9E B9 A3 14 C4 B8 87 00 50 9A 73 00 8C 0A B8 88 00
0B5F8  50 9A 73 00 8C 0A 9A 47 00 8C 0A 8B E5 5D CB 55 8B EC 81 EC 04 00 B8 30
0B610  E2 50 B8 30 FD 50 9A 03 00 8C 0A 9A 47 00 8C 0A 8B E5 5D CB 00 00 00 00
0B628  00 00 00 00 00 00 00 55 1E 8B EC B4 01 CD 16 75 03 B8 00 00 1F 5D CB 00
0B640  55 1E B8 40 00 8E D8 B0 0C E6 61 B9 56 29 E2 FE B0 CC E6 61 B0 4C E6 61
0B658  33 C0 A3 17 00 B8 04 09 8E D8 9A 00 00 0E 09 A2 00 00 F6 06 00 00 01 75
0B670  05 B0 03 EB 03 90 B0 07 B4 00 CD 10 1F 5D CB 55 1E 51 52 BA 06 00 4A 74
0B688  42 B0 0C E6 61 B9 E7 05 E2 FE B0 CC E6 61 B0 4C E6 61 B9 9B 10 8E D9 C6
0B6A0  06 00 00 FE 06 00 00 80 3E 00 00 08 79 D7 B9 FE FF 90 90 E2 FC B4 01
0B6B8  CD 16 74 E8 B4 00 CD 16 3D 00 61 75 C1 B8 01 00 EB 04 90 B8 00 00 5A 59
0B6D0  1F 5D CB 00 00 00 00 00 00 00 00 00 00 55 1E CD 11 2A E4 24 30 3C
0B6E8  30 74 06 B8 00 00 EB 04 90 B8 01 00 1F 5D CB 00 00 00 00 00 00 00 00 55
0B700  1E E4 61 24 FC E6 61 1F 5D CB 00 00 00 00 00 55 8B EC 8B 76 0A 8A 3C 8B
0B718  76 08 8A 34 8B 76 06 8A 14 B4 02 CD 10 5D CA 06 00 55 8B EC 8B 76 0E 8A
0B730  3C 55 B4 03 CD 10 5D 8B 76 0C 88 34 B6 00 46 88 34 8B 76 0A 88 14 46 88
0B748  34 8B 76 08 88 2C 46 88 34 8B 76 06 88 00 46 88 34 5D CA 0A 00 55 8B EC
0B760  8B 76 10 8A 04 8B 76 0E 8A 2C 8B 76 0C 8A 0C 8B 76 0A 8A 34 8B 76 08 8A
0B778  14 8B 76 06 8A 3C B4 06 CD 10 5D CA 0C 00 55 8B EC 8B 76 10 8A 04 8B 76
0B790  0E 8A 2C 8B 76 0C 8A 0C 8B 76 0A 8A 34 8B 76 08 8A 14 8B 76 06 8A 3C B4
0B7A8  07 CD 10 5D CA 0C 00 55 8B EC 8B 76 0A 8A 3C 55 B4 08 CD 10 5D 8B 76 08
0B7C0  88 04 B0 00 46 88 04 8B 76 06 88 24 46 88 04 5D CA 06 00 55 8B EC 8B 76
0B7D8  0C 8A 3C 8B 76 0A 8A 04 8B 76 08 8A 1C 8B 76 06 8B 0C B4 09 CD 10 5D CA
0B7F0  08 00 55 8B EC 8B 76 0A 8A 3C 8B 76 08 8A 04 8B 76 06 8B 0C B4 0A CD 10
0B808  5D CA 06 00 00 00 E8 AA 0C 02 00 8B 76 06 8B 44 1D D1 E8 72 03 E9 B5 00
0B820  F6 46 04 01 74 09 96 50 9A 50 04 F4 0B EB 53 8B 76 06 80 7C 01 00 75 42
0B838  8B 44 09 D1 E8 73 3B 8B 44 24 D1 E8 72 34 8B 44 0F D1 E8 72 2D 80 7C 08
0B850  02 75 0F 96 50 96 8B 44 0A 2B 44 14 50 9A 48 03 20 09 FF 76 06 9A 93 07
0B868  F4 0B 23 C0 75 0C FF 76 06 B8 20 00 50 9A DE 07 F4 0B FF 76 06 9A 78 03
```

```
0B880  F4 0B 8B 76 06 80 7C 02 01 75 04 C6 44 02 00 8B 76 06 C6 44 1D 00 56 E8
0B898  A3 01 89 46 FE A1 96 E8 3B 46 06 74 0E 8B 76 FE 8B 7E 06 8B 45 16 89 44
0B8B0  16 EB 09 8B 76 06 8B 44 16 A3 96 E8 8B 76 06 C7 44 16 00 00 96 50 9A 83
0B8C8  01 20 09 8B 76 06 C6 44 01 00 C6 04 00 8B E5 5D C2 04 00 E8 DD 0B 04 00
0B8E0  B8 06 00 50 9A 00 00 EE 09 8B 76 08 80 7C 08 02 75 08 8B 46 06 34 01 88
0B8F8  44 0F 8B 76 08 80 7C 01 00 75 61 F6 06 40 E8 01 75 5A 8B 44 1D D1 E8 72
0B910  0B C7 44 04 4E 04 C6 44 01 0D EB 48 8B 76 08 8B 44 0F 3A 46 06 75 0B C7
0B928  44 04 50 04 C6 44 01 03 EB 32 8B 76 08 8B 44 0F 8B CE 56 89 46 FC 9A D6
0B940  05 20 09 3A 46 FC 75 1C 8B 76 08 80 7C 08 02 75 07 8B 44 0F D1 E8 73 0C
0B958  8B 76 08 C7 44 04 4F 04 C6 44 01 03 8B 76 08 80 7C 01 00 B8 00 00 75 01
0B970  40 88 46 FE 9A 2D 00 EE 09 8B 46 FE 8B E5 5D CA 04 00 E8 36 0B 02 01 B8
0B988  04 00 50 9A 00 00 EE 09 8B 76 06 80 7C 01 00 75 03 E9 96 00 8B 04 D1 E8
0B9A0  73 03 E9 8D 00 8B 44 01 32 E4 96 D1 E6 D1 E6 D1 E6 D1 E6 8B 84 3C E7 32
0B9B8  E4 89 86 FE FE 81 C6 3D E7 96 50 8D 86 01 FF 50 FF B6 FE FE 9A 3F 00 EE
0B9D0  09 B8 3D E7 50 8D 86 01 FF 03 86 FE FE 50 A1 3C E7 32 E4 50 9A 3F 00 EE
0B9E8  09 A1 3C E7 32 E4 03 86 FE FE 40 89 86 FE FE FF 76 06 B8 FF 00 2B 86 FE
0BA00  FE 40 50 8D 86 00 FF 03 86 FE FE 1E 50 9A 47 09 F4 0B 03 86 FE FE 48 88
0BA18  86 00 FF B8 FF 00 50 8D 86 00 FF 50 8B 76 06 FF 74 04 FF 74 06 9A A3 00
0BA30  CC 0C 9A 2D 00 EE 09 8B E5 5D CA 02 00 E8 7B 0A 04 00 A1 96 E8 89 46 FC
0BA48  A1 96 E8 3B 46 04 74 10 8B 76 FC 8B 44 16 3B 46 04 74 05 89 46 FC EB F0
0BA60  8B 46 FC 89 46 FE 8B 46 FE 8B E5 5D C2 02 00 E8 49 0A 00 00 8B 76 04 8B
0BA78  44 02 88 44 08 C6 44 24 01 C7 44 04 00 00 C7 44 06 00 00 C7 44 10 01 00
0BA90  C7 44 12 00 00 C6 44 21 01 C7 44 14 00 00 96 50 9A FB 01 F4 0B 8B 76 04
0BAA8  8B 44 08 88 44 02 80 7C 01 00 B8 00 00 75 01 40 88 44 1D 8B 44 1D D1 E8
0BAC0  73 0A A1 96 E8 89 44 16 89 36 96 E8 8B E5 5D C2 02 00 E8 E6 09 00 00 B8
0BAD8  0A 00 50 9A 00 00 EE 09 FF 76 0C FF 76 0A FF 76 08 FF 76 06 9A DE 04 F4
0BAF0  0B 8B 76 0C 8B 44 24 D1 E8 72 07 8B 44 09 D1 E8 72 31 8B 76 0C C7 44 14
0BB08  00 00 8B 44 09 D1 E8 73 06 8B 74 18 C6 04 20 8B 76 0C 81 7C 10 FF FF 74
0BB20  05 FF 44 10 EB 0B 8B 76 0C C7 44 10 00 00 FF 44 12 EB 09 8B 76 0C 8B 44
0BB38  22 01 44 14 9A 2D 00 EE 09 8B E5 5D CA 08 00 E8 71 09 04 00 B8 06 00 50
0BB50  9A 00 00 EE 09 83 7E 06 00 76 72 C7 46 FE 01 00 8B 46 06 D1 E8 D1 E8 D1
0BB68  E8 D1 E8 89 46 FC 8B 46 FC 3B 46 FE 72 27 8B 76 08 80 7C 01 00 75 1E FF
0BB80  46 FE 96 50 B8 10 00 50 B8 43 FD 1E 50 9A CF 06 F4 0B 8B 76 08 8B 44 22
0BB98  01 44 14 EB D1 8B 46 06 25 0F 00 89 46 FE 83 7E FE 00 76 21 8B 76 08 80
0BBB0  7C 01 00 75 18 96 50 FF 76 FE B8 43 FD 1E 50 9A CF 06 F4 0B 8B 76 08 8B
0BBC8  44 22 01 44 14 9A 2D 00 EE 09 8B E5 5D CA 04 00 E8 E0 08 02 00 B8 0A 00
0BBE0  50 9A 00 00 EE 09 8B 76 0C 80 7C 08 02 75 16 8B 44 14 03 46 0A 3B 44 0A
0BBF8  76 0B C7 44 04 57 04 C6 44 01 0F EB 1A FF 76 0C FF 76 0A FF 76 08 FF 76
0BC10  06 9A CF 06 F4 0B 8B 46 0A 8B 76 0C 01 44 14 8B 76 0C 80 7C 01 00 B8 00
0BC28  00 75 01 40 88 46 FE 9A 2D 00 EE 09 8B 46 FE 8B E5 5D CA 08 00 E8 7B 08
0BC40  00 00 B8 0C 00 50 9A 00 00 EE 09 FF 76 0E B8 01 00 50 9A DC 00 20 09 D1
0BC58  E8 73 2C F6 46 08 01 74 16 FF 76 0E 8B 76 0A 8B 44 06 05 4C 04 89 44 04 C6 44 01 0E FF
0BC70  9A D9 03 20 09 EB 10 8B 76 0E 8B 46 06 05 4C 04 89 44 04 C6 44 01 0E FF
0BC88  76 0E 9A 83 01 20 09 9A 2D 00 EE 09 8B E5 5D CA 0A 00 E8 1E 08 00 00 B8
0BCA0  0A 00 50 9A 00 00 EE 09 8B 76 0C 8B 44 1D D1 E8 73 0B C7 44 04 4C 04 C6
0BCB8  44 01 03 EB 40 8B 76 0C 83 7E 0A 01 B8 00 00 75 01 40 C4 5E 06 26 8B 0F
0BCD0  0A C9 BA 00 00 75 01 42 22 C2 88 44 1A 8B 44 1A D1 E8 73 09 96 50 9A 4B
0BCE8  00 A6 0C EB 10 FF 76 0C FF 76 0A C4 5E 06 06 53 9A 9C 09 F4 0B FF 76 0C
0BD00  9A 83 01 20 09 9A 2D 00 EE 09 8B E5 5D CA 08 00 E8 A8 07 00 00 B8 04 00
0BD18  50 9A 00 00 EE 09 8B 76 06 80 7C 01 00 75 53 8B 44 1D D1 E8 73 40 8B 44
0BD30  21 D1 E8 72 07 96 50 9A 09 00 A6 0C 8B 76 06 8B 44 09 D1 E8 73 26 8B 44
0BD48  0F D1 E8 73 1F 8B 44 1B D1 E8 72 18 96 50 B9 01 00 51 96 8B 44 18 1E 50
0BD60  9A D3 02 20 09 8B 76 06 C6 44 1B 01 EB 0C 8B 76 06 C7 44 04 4D 04 C6 44
0BD78  01 03 FF 76 06 9A 83 01 20 09 9A 2D 00 EE 09 8B E5 5D CA 02 00 E8 2B 07
0BD90  00 00 B8 04 00 50 9A 00 00 EE 09 FF 76 06 B8 01 00 50 E8 69 FA 9A 2D 00
0BDA8  EE 09 8B E5 5D CA 02 00 E8 08 07 00 00 B8 04 00 50 9A 00 00 EE 09 FF 76
0BDC0  06 8B 76 06 FF 74 1A E8 44 FA 9A 2D 00 EE 09 8B E5 5D CA 02 00 E8 E3 06
0BDD8  02 00 B8 04 00 50 9A 00 00 EE 09 8B 76 06 8B 44 1D D1 E8 72 0B C7 44 04
0BDF0  51 04 C6 44 01 03 EB 08 FF 76 06 9A 11 05 20 09 8B 76 06 8B 44 25 88 46
0BE08  FE 96 50 9A 83 01 20 09 9A 2D 00 EE 09 8B 46 FE 8B E5 5D CA 02 00 E8 9A
0BE20  06 02 00 B8 04 00 50 9A 00 00 EE 09 FF 76 06 33 C0 50 9A DC 00 20 09 D1
0BE38  E8 72 08 FF 76 06 9A 83 01 20 09 8B 76 06 8B 44 24 88 46 FE 9A 2D 00 EE
0BE50  09 8B 46 FE 8B E5 5D CA 02 00 E8 5E 06 00 00 B8 04 00 50 9A 00 00 EE 09
0BE68  8B 76 06 80 7C 01 00 74 03 E9 A8 00 8B 44 1D D1 E8 72 0C C7 44 04 52 04
0BE80  C6 44 01 03 E9 95 00 8B 76 06 80 7C 08 02 75 0F 8B 44 0F D1 E8 72 08 C6
0BE98  44 0F 01 C6 44 25 00 8B 76 06 8B 44 0F D1 E8 72 0B C7 44 04 54 04 C6 44
0BEB0  01 03 EB 68 8B 76 06 8B 44 25 D1 E8 73 0B C7 44 04 53 04 C6 44 01 03 EB
```

| | | | | | | | | | | | | | | | | |
|---|---|---|---|---|---|---|---|---|---|---|---|---|---|---|---|---|
| 0BEC8 | 53 | 8B | 76 | 06 | 8B | 44 | 09 | D1 | E8 | 72 | 12 | 96 | 50 | 96 | FF | 74 | 0A | 8B | 44 | 18 | 1E | 50 | 9A | D3 |
| 0BEE0 | 02 | 20 | 09 | EB | 37 | 8B | 76 | 06 | 8B | 44 | 1B | D1 | E8 | 73 | 06 | C6 | 44 | 1B | 00 | EB | 27 | FF | 76 | 06 |
| 0BEF8 | B8 | 01 | 00 | 50 | 8B | 76 | 06 | 8B | 44 | 18 | 1E | 50 | 9A | D3 | 02 | 20 | 09 | 8B | 76 | 06 | 8B | 44 | 25 | D1 |
| 0BF10 | E8 | 73 | 09 | C7 | 44 | 04 | 53 | 04 | C6 | 44 | 01 | 03 | FF | 76 | 06 | 9A | 83 | 01 | 20 | 09 | 9A | 2D | 00 | EE |
| 0BF28 | 09 | 8B | E5 | 5D | CA | 02 | 00 | E8 | 89 | 05 | 00 | 00 | B8 | 08 | 00 | 50 | 9A | 00 | 00 | EE | 09 | 8B | 76 | 0A |
| 0BF40 | C7 | 44 | 04 | 00 | 00 | C6 | 44 | 01 | 00 | C7 | 44 | 06 | 00 | 00 | C6 | 44 | 02 | 00 | C6 | 44 | 08 | 00 | C6 | 44 |
| 0BF58 | 1D | 00 | 8B | 46 | 08 | 89 | 44 | 0A | C6 | 44 | 1A | 00 | C6 | 04 | 00 | 8B | 46 | 06 | 88 | 44 | 09 | 96 | 50 | 9A |
| 0BF70 | 1B | 00 | A6 | 0C | 9A | 2D | 00 | EE | 09 | 8B | E5 | 5D | CA | 06 | 00 | E8 | 39 | 05 | 00 | 00 | B8 | 02 | 00 | 50 |
| 0BF88 | 9A | 00 | 00 | EE | 09 | F6 | 06 | 40 | E8 | 01 | 74 | 09 | BE | 3C | E8 | 8B | 34 | 80 | 4C | FE | 01 | C6 | 06 | 40 |
| 0BFA0 | E8 | 00 | 9A | 2D | 00 | EE | 09 | 8B | E5 | 5D | CB | E8 | 0D | 05 | 00 | 00 | B8 | 06 | 00 | 50 | 9A | 00 | 00 | EE |
| 0BFB8 | 09 | F6 | 06 | 40 | E8 | 01 | 75 | 12 | B8 | 82 | 00 | 50 | 9A | 35 | 01 | B2 | 0C | A3 | 3C | E8 | C7 | 06 | 42 | E8 |
| 0BFD0 | 00 | 00 | C6 | 06 | 40 | E8 | 01 | 8B | 46 | 06 | A3 | 44 | E8 | 8B | 46 | 08 | A3 | 46 | E8 | A1 | 42 | E8 | 3B | 06 |
| 0BFE8 | 3E | E8 | 77 | 5B | FF | 76 | 08 | FF | 76 | 06 | B8 | 80 | 00 | 50 | FF | 36 | 3C | E8 | 9A | 5B | 0A | F4 | 0B | 23 |
| 0C000 | C0 | 75 | 12 | 8B | 36 | 3C | E8 | 80 | 3C | 00 | 74 | 09 | 8B | 04 | 32 | E4 | A3 | 42 | E8 | EB | 2C | FF | 76 | 08 |
| 0C018 | 1E | FF | 76 | 06 | 9A | C3 | 00 | EF | 0C | B8 | 02 | 00 | 50 | B8 | 55 | FD | 1E | 50 | 9A | C3 | 00 | EF | 0C | B8 |
| 0C030 | 7F | 00 | 50 | A1 | 3C | E8 | 40 | 1E | 50 | 9A | 3D | 00 | EF | 0C | A3 | 42 | E8 | C7 | 06 | 3E | E8 | 00 | 00 | 83 |
| 0C048 | 3E | 42 | E8 | 00 | B8 | 00 | 00 | 75 | 01 | 40 | A2 | 68 | E2 | 9A | 2D | 00 | EE | 09 | 8B | E5 | 5D | CA | 04 | 00 |
| 0C060 | E8 | 58 | 04 | 00 | 00 | B8 | 04 | 00 | 50 | 9A | 00 | 00 | EE | 09 | 8B | 76 | 06 | 80 | 7C | 01 | 00 | 74 | 03 | E9 |
| 0C078 | 93 | 00 | 8B | 44 | 1D | D1 | E8 | 72 | 0C | C7 | 44 | 04 | 55 | 04 | C6 | 44 | 01 | 03 | E9 | 80 | 00 | 8B | 76 | 06 |
| 0C090 | 80 | 7C | 08 | 02 | 75 | 04 | C6 | 44 | 0F | 00 | 8B | 76 | 06 | 8B | 44 | 0F | D1 | E8 | 73 | 0B | C7 | 44 | 04 | 56 |
| 0C0A8 | 04 | C6 | 44 | 01 | 03 | EB | 5E | 8B | 76 | 06 | 8B | 44 | 09 | D1 | E8 | 73 | 13 | 96 | 50 | B9 | 01 | 00 | 51 | 96 |
| 0C0C0 | 8B | 44 | 18 | 1E | 50 | 9A | D9 | 03 | 20 | 09 | EB | 41 | FF | 76 | 06 | 8B | 76 | 06 | FF | 74 | 0A | 8B | 44 | 18 |
| 0C0D8 | 1E | 50 | 9A | D9 | 03 | 20 | 09 | D1 | E8 | 73 | 2A | FF | 76 | 06 | 9A | 93 | 07 | F4 | 0B | 8B | 76 | 06 | 81 | 7C |
| 0C0F0 | 10 | FF | FF | 74 | 05 | FF | 44 | 10 | EB | 0B | 8B | 76 | 06 | C7 | 44 | 10 | 00 | 00 | FF | 44 | 12 | 8B | 76 | 06 |
| 0C108 | C7 | 44 | 14 | 00 | 00 | FF | 76 | 06 | 9A | 83 | 01 | 20 | 09 | 9A | 2D | 00 | EE | 09 | 8B | E5 | 5D | CA | 02 | 00 |
| 0C120 | E8 | 98 | 03 | 00 | 00 | B8 | 04 | 00 | 50 | 9A | 00 | 00 | EE | 09 | FF | 76 | 06 | 33 | C0 | 50 | E8 | D7 | F6 | 8B |
| 0C138 | 76 | 06 | C6 | 44 | 25 | 00 | C6 | 44 | 1B | 00 | C6 | 44 | 0F | 01 | C6 | 44 | 0E | 01 | 96 | 50 | E8 | 20 | F9 | 8B |
| 0C150 | 76 | 06 | 8B | 44 | 1D | D1 | E8 | 73 | 1D | 8B | 44 | 09 | D1 | E8 | 72 | 16 | 80 | 7C | 08 | 01 | 74 | 10 | 96 | 50 |
| 0C168 | 96 | FF | 74 | 0A | 8B | 44 | 18 | 1E | 50 | 9A | D3 | 02 | 20 | 09 | FF | 76 | 06 | 9A | 83 | 01 | 20 | 09 | 9A | 2D |
| 0C180 | 00 | EE | 09 | 8B | E5 | 5D | CA | 02 | 00 | E8 | 2F | 03 | 00 | 00 | B8 | 04 | 00 | 50 | 9A | 00 | 00 | EE | 09 | FF |
| 0C198 | 76 | 06 | 33 | C0 | 50 | E8 | 6E | F6 | 8B | 76 | 06 | C6 | 44 | 25 | 01 | C6 | 44 | 0F | 00 | C6 | 44 | 0E | 00 | 96 |
| 0C1B0 | 50 | E8 | BB | F8 | FF | 76 | 06 | 9A | 83 | 01 | 20 | 09 | 9A | 2D | 00 | EE | 09 | 8B | E5 | 5D | CA | 02 | 00 | E8 |
| 0C1C8 | F1 | 02 | 00 | 00 | B8 | 04 | 00 | 50 | 9A | 00 | 00 | EE | 09 | FF | 76 | 06 | 33 | C0 | 50 | 9A | DC | 00 | 20 | 09 |
| 0C1E0 | D1 | E8 | 73 | 23 | 8B | 76 | 06 | 8B | 44 | 24 | D1 | E8 | 72 | 19 | 80 | 7C | 01 | 00 | 75 | 13 | 96 | 50 | B9 | 01 |
| 0C1F8 | 00 | 51 | 96 | 8B | 44 | 18 | 1E | 50 | 9A | D3 | 02 | 20 | 09 | EB | DD | 8B | 76 | 06 | C6 | 44 | 1B | 00 | 96 | 50 |
| 0C210 | 9A | 83 | 01 | 20 | 09 | 9A | 2D | 00 | EE | 09 | 8B | E5 | 5D | CA | 02 | 00 | E8 | 98 | 02 | 00 | 00 | 8B | 76 | 08 |
| 0C228 | 8B | 44 | 1D | D1 | E8 | 72 | 0B | C7 | 44 | 04 | 60 | 04 | C6 | 44 | 01 | 0D | EB | 6A | 8B | 76 | 08 | 80 | 7C | 08 |
| 0C240 | 02 | 74 | 0B | C7 | 44 | 04 | 61 | 04 | C6 | 44 | 01 | 03 | EB | 56 | 8B | 76 | 08 | 8B | 44 | 0F | D1 | E8 | 72 | 2D |
| 0C258 | 8B | 44 | 24 | D1 | E8 | 72 | 26 | 8B | 44 | 09 | D1 | E8 | 73 | 0F | 96 | 50 | 96 | 8B | 44 | 0A | 2B | 44 | 14 | 50 |
| 0C270 | 9A | 48 | 03 | 20 | 09 | 8B | 76 | 08 | 80 | 7C | 01 | 00 | 75 | 07 | 96 | 50 | 9A | 93 | 07 | F4 | 0B | 8B | 76 | 08 |
| 0C288 | C7 | 44 | 14 | 00 | 00 | C6 | 44 | 24 | 01 | 80 | 7C | 01 | 00 | 75 | 0D | 96 | 50 | FF | 76 | 06 | FF | 76 | 04 | 9A |
| 0C2A0 | 89 | 08 | F4 | 0B | 8B | 76 | 08 | C6 | 44 | 1B | 00 | 96 | 50 | 9A | 83 | 01 | 20 | 09 | 8B | E5 | 5D | C2 | 06 | 00 |
| 0C2B8 | E8 | 00 | 02 | 00 | 00 | B8 | 06 | 00 | 50 | 9A | 00 | 00 | EE | 09 | FF | 76 | 08 | FF | 76 | 06 | 33 | C0 | 50 | E8 |
| 0C2D0 | 4E | FF | 9A | 2D | 00 | EE | 09 | 8B | E5 | 5D | CA | 04 | 00 | E8 | DB | 01 | 00 | 00 | B8 | 08 | 00 | 50 | 9A | 00 |
| 0C2E8 | 00 | EE | 09 | FF | 76 | 0A | 8B | 46 | 06 | 50 | 8B | 46 | 08 | 50 | E8 | 27 | FF | 9A | 2D | 00 | EE | 09 | 8B | E5 |
| 0C300 | 5D | CA | 06 | 00 | E8 | B4 | 01 | 00 | 00 | B8 | 04 | 00 | 50 | 9A | 00 | 00 | EE | 09 | FF | 76 | 06 | B8 | 01 | 00 |
| 0C318 | 50 | 9A | DC | 00 | 20 | 09 | D1 | E8 | 73 | 59 | 8B | 76 | 06 | 80 | 7C | 08 | 02 | 75 | 16 | 8B | 44 | 24 | D1 | E8 |
| 0C330 | 72 | 0F | 96 | 50 | 96 | 8B | 44 | 0A | 2B | 44 | 14 | 50 | 9A | 48 | 03 | 20 | 09 | 8B | 76 | 06 | 80 | 7C | 01 | 00 |
| 0C348 | 75 | 17 | 96 | 50 | 9A | 93 | 07 | F4 | 0B | 23 | C0 | 75 | 0C | FF | 76 | 06 | B8 | 20 | 00 | 50 | 9A | DE | 07 | F4 |
| 0C360 | 0B | 8B | 76 | 06 | 81 | 7C | 10 | FF | FF | 74 | 05 | FF | 44 | 10 | EB | 0B | 8B | 76 | 06 | C7 | 44 | 10 | 00 | 00 |
| 0C378 | FF | 44 | 12 | 8B | 76 | 06 | C6 | 44 | 24 | 01 | C7 | 44 | 14 | 00 | 00 | 96 | 50 | 9A | 83 | 01 | 20 | 09 | 9A | 2D |
| 0C390 | 00 | EE | 09 | 8B | E5 | 5D | CA | 02 | 00 | E8 | 1F | 01 | 00 | 00 | B8 | 04 | 00 | 50 | 9A | 00 | 00 | EE | 09 | FF |
| 0C3A8 | 76 | 06 | B8 | 01 | 00 | 50 | 9A | DC | 00 | 20 | 09 | D1 | E8 | 73 | 3E | 8B | 76 | 06 | 8B | 44 | 24 | D1 | E8 | 72 |
| 0C3C0 | 07 | 96 | 50 | 9A | 05 | 0B | 20 | 09 | 8B | 76 | 06 | 80 | 7C | 01 | 00 | 75 | 24 | 80 | 7C | 08 | 01 | 75 | 0D | 96 |
| 0C3D8 | 50 | B8 | 31 | 00 | 50 | 9A | DE | 07 | F4 | 0B | EB | 11 | FF | 76 | 06 | B8 | 01 | 00 | 50 | B8 | 59 | FD | 1E | 50 |
| 0C3F0 | 9A | D9 | 03 | 20 | 09 | FF | 76 | 06 | 9A | 83 | 01 | 20 | 09 | 9A | 2D | 00 | EE | 09 | 8B | E5 | 5D | CA | 02 | 00 |
| 0C408 | E8 | B0 | 00 | 00 | 00 | B8 | 02 | 00 | 50 | 9A | 00 | 00 | EE | 09 | C7 | 06 | 3E | E8 | 00 | 00 | C6 | 06 | 40 | E8 |
| 0C420 | 00 | B8 | 44 | E2 | 50 | B8 | FF | 00 | 50 | B8 | 01 | 00 | 50 | 9A | 30 | 07 | 20 | 09 | B8 | C0 | E4 | 50 | B8 | FF |
| 0C438 | 00 | 50 | B8 | 01 | 00 | 50 | 9A | 30 | 07 | 20 | 09 | B8 | 44 | E2 | 50 | B8 | 08 | 00 | 50 | B8 | 5A | EA | 1E | 50 |
| 0C450 | 9A | 9C | 09 | F4 | 0B | B8 | C0 | E4 | 50 | B8 | 08 | 00 | 50 | B8 | 62 | EA | 1E | 50 | 9A | 9C | 09 | F4 | 0B | B8 |
| 0C468 | C0 | E4 | 50 | 9A | 8A | 09 | 20 | 09 | B8 | 44 | E2 | 50 | 9A | 21 | 09 | 20 | 09 | 9A | 2D | 00 | EE | 09 | 8B | E5 |
| 0C480 | 5D | CB | E8 | 36 | 00 | 04 | 00 | B8 | 02 | 00 | 50 | 9A | 00 | 00 | EE | 09 | B8 | C0 | E4 | 50 | B8 | 50 | 00 | 50 |
| 0C498 | B8 | 01 | 00 | 50 | 9A | 30 | 07 | 20 | 09 | B8 | 44 | E2 | 50 | B8 | 00 | 00 | 50 | B8 | 01 | 00 | 50 | 9A | 30 | 07 |
| 0C4B0 | 20 | 09 | 9A | 2D | 00 | EE | 09 | 8B | E5 | 5D | CB | 5E | 2E | 8B | 0C | 46 | 46 | 55 | 8B | EC | 2B | E9 | 72 | 06 |
| 0C4C8 | 3B | 2E | AC | E8 | 77 | 06 | 56 | 9A | BC | 01 | EE | 09 | 8B | E5 | 03 | E9 | FF | E6 | 00 | 00 | 00 | 00 | 00 | 55 |
| 0C4E0 | 5D | 83 | 3E | 9A | E8 | 00 | 75 | 21 | 8B | DC | 8B | 5F | 04 | F7 | DB | 03 | DD | 8D | 46 | 02 | A3 | 9A | E8 | 8B |
| 0C4F8 | 47 | FE | A3 | 9C | E8 | 8B | 07 | 8B | 5F | 02 | A3 | 9E | E8 | 89 | 1E | A0 | E8 | CA | 02 | 00 | 55 | 5D | 8D | 46 |

| | | | | | | | | | | | | | | | | | | | | | | | | |
|---|---|---|---|---|---|---|---|---|---|---|---|---|---|---|---|---|---|---|---|---|---|---|---|---|
| 0C510 | 02 | 3B | 06 | 9A | E8 | 72 | 06 | C7 | 06 | 9A | E8 | 00 | 00 | CB | 55 | 8B | EC | 8C | D8 | 8E | C0 | 8B | 76 | 0A |
| 0C528 | 8B | 7E | 08 | 8B | 4E | 06 | FC | D1 | E9 | F3 | A5 | 73 | 01 | A4 | 5D | CA | 06 | 00 | 55 | 8B | EC | 8C | D8 | 8E |
| 0C540 | C0 | 8B | 76 | 0A | 8B | 7E | 08 | 8B | 4E | 06 | 03 | F1 | 4E | 03 | F9 | 4F | FD | F3 | A4 | FC | 5D | CA | 06 | 00 |
| 0C558 | 55 | 8B | EC | 8C | D8 | 8E | C0 | 8B | 7E | 0A | 8B | 4E | 08 | 8B | 46 | 06 | 8A | E0 | FC | D1 | E9 | F3 | AB | 73 |
| 0C570 | 01 | AA | 5D | CA | 06 | 00 | 55 | 8B | EC | 1E | 8B | 46 | 0E | 8E | D8 | 8B | 76 | 0C | 8B | 46 | 0A | 8E | C0 | 8B |
| 0C588 | 7E | 08 | 8B | 4E | 06 | FC | D1 | E9 | F3 | A5 | 73 | 01 | A4 | 1F | 5D | CA | 0A | 00 | 55 | 8B | EC | 1E | 8B | 46 |
| 0C5A0 | 0E | 8E | D8 | 8B | 76 | 0C | 8B | 46 | 0A | 8E | C0 | 8B | 7E | 08 | 8B | 4E | 06 | 03 | F1 | 4E | 03 | F9 | 4F | FD |
| 0C5B8 | F3 | A4 | FC | 1F | 5D | CA | 0A | 00 | 55 | 8B | EC | 8B | 46 | 0C | 8E | C0 | 8B | 7E | 0A | 8B | 4E | 08 | 8B | 46 |
| 0C5D0 | 06 | 8A | E0 | FC | D1 | E9 | F3 | AB | 73 | 01 | AA | 5D | CA | 08 | 00 | 55 | 8B | EC | 8B | 46 | 0A | 03 | 46 | 08 |
| 0C5E8 | 8B | 6E | 06 | 89 | 46 | 00 | B8 | 00 | 00 | 72 | 01 | 40 | 5D | CA | 06 | 00 | 55 | 8B | EC | 8B | 46 | 0A | F7 | 66 |
| 0C600 | 08 | 8B | 6E | 06 | 89 | 46 | 00 | B8 | 00 | 00 | 72 | 01 | 40 | 5D | CA | 06 | 00 | 55 | 8B | EC | 8B | 46 | 0A | 03 |
| 0C618 | 46 | 08 | 8B | 6E | 06 | 89 | 46 | 00 | B8 | 00 | 00 | 80 | 74 | 01 | 40 | 5D | CA | 06 | 00 | 55 | 8B | EC | 8B | 46 |
| 0C630 | 0A | F7 | 6E | 08 | 8B | 6E | 06 | 89 | 46 | 00 | B8 | 00 | 00 | 70 | 06 | 81 | 7E | 00 | 00 | 80 | 74 | 01 | 40 | 5D |
| 0C648 | CA | 06 | 00 | 55 | 8B | EC | 8B | 46 | 0A | F7 | 6E | 08 | 8B | 6E | 06 | 89 | 46 | 00 | B8 | 00 | 00 | 70 | 08 | 81 |
| 0C660 | 7E | 00 | 00 | 80 | 74 | 01 | 40 | 5D | CA | 06 | 00 | 55 | 8B | EC | 1E | 8E | 5E | 08 | 8B | 5E | 06 | B8 | 01 | 00 |
| 0C678 | F0 | 87 | 07 | 48 | F7 | D8 | 1F | 5D | CA | 04 | 00 | 55 | 8B | EC | 8E | 46 | 08 | 8B | 5E | 06 | 26 | C7 | 07 | 00 |
| 0C690 | 00 | 5D | CA | 04 | 00 | 3B | 3E | A8 | E8 | 73 | 09 | 8B | 45 | FE | 3B | C8 | 76 | 02 | 8B | C8 | 41 | D1 | E9 | 8C |
| 0C6A8 | D8 | 8E | C0 | FC | F3 | A5 | CB | 58 | 83 | 3E | 9A | E8 | 00 | 75 | 11 | 5B | 58 | 89 | 26 | 9A | E8 | 89 | 2E | 9C |
| 0C6C0 | E8 | A3 | 9E | E8 | 89 | 1E | A0 | E8 | 8B | 26 | AA | E8 | 9A | D6 | 01 | CD | 0B | 58 | 58 | 5B | 50 | 53 | EA | 21 |
| 0C6D8 | 01 | CD | 0B | 58 | 58 | 5B | 50 | 53 | EA | 2B | 01 | CD | 0B | 58 | 58 | 5B | 50 | 53 | EA | 03 | 01 | CD | 0B | 58 |
| 0C6F0 | 58 | 5B | 50 | 53 | EA | F9 | 00 | CD | 0B | 8B | 2E | A2 | E8 | 4D | 4D | 58 | 8B | E5 | 5D | 5B | 59 | 5A | 51 | 53 |
| 0C708 | FF | E0 | E8 | EC | FF | 9A | 0D | 01 | CD | 0B | CB | E8 | E3 | FF | 9A | 35 | 01 | CD | 0B | CB | E8 | DA | FF | 9A |
| 0C720 | 05 | 02 | CD | 0B | CB | E8 | D1 | FF | 9A | CC | 01 | CD | 0B | CB | E8 | C8 | FF | 9A | 15 | 02 | CD | 0B | CB | E8 |
| 0C738 | BF | FF | 9A | 1D | 02 | CD | 0B | CB | E8 | B6 | FF | 9A | 25 | 02 | CD | 0B | CB | 55 | 8B | EC | 8B | 76 | 06 | 8B |
| 0C750 | 6E | 08 | 8C | C7 | 33 | C0 | 8E | C6 | 26 | 8A | 56 | 00 | 45 | 8E | C7 | 26 | 38 | 17 | 75 | 06 | 43 | E2 | EF | B8 |
| 0C768 | 01 | 00 | 5D | CA | 04 | 00 | 55 | 8B | EC | 8B | 76 | 06 | 8B | 6E | 08 | 8C | C7 | 33 | C0 | 8E | C6 | 26 | 8A | 56 |
| 0C780 | 00 | 45 | 8E | C7 | 26 | 38 | 17 | 72 | 08 | 77 | 09 | 43 | E2 | ED | EB | 04 | 90 | B8 | 01 | 00 | 5D | CA | 04 | 00 |
| 0C798 | 55 | 8B | EC | 8B | 76 | 06 | 8B | 6E | 08 | 8C | C7 | 8E | C6 | 26 | 8A | 46 | 00 | 45 | 8E | C7 | 26 | 88 | 07 | 43 |
| 0C7B0 | E2 | F1 | 5D | CA | 04 | 00 | 26 | 8A | 07 | 43 | 88 | 05 | 47 | E2 | F7 | CB | 5A | 5E | 2B | E1 | 2B | E1 | 3B | 26 |
| 0C7C8 | AC | E8 | 72 | 10 | 8B | FC | 26 | 8B | 07 | 43 | 43 | 89 | 05 | 47 | 47 | E2 | F5 | 56 | 52 | CB | 52 | 56 | 50 | EA |
| 0C7E0 | BC | 01 | EE | 09 | 55 | 8B | EC | 8B | 76 | 0A | D1 | EE | D1 | EE | D1 | EE | 3B | 76 | 08 | 77 | 14 | 03 | 76 | 06 |
| 0C7F8 | 8B | 4E | 0A | 80 | E1 | 07 | FE | C1 | 8A | 2C | D2 | E5 | B8 | 01 | 00 | 72 | 02 | 33 | C0 | 5D | CA | 06 | 00 | 55 |
| 0C810 | 8B | EC | 8B | 5E | 06 | 8B | D3 | 8B | 0F | 8B | 5E | 08 | 8B | 7E | 0A | 8B | 76 | 0E | 8B | 6E | 0C | 8E | C6 | 26 |
| 0C828 | 8A | 46 | 00 | 45 | 3C | 0D | 74 | 11 | 3C | 1A | 74 | 0D | 8E | C7 | 26 | 88 | 07 | 43 | E2 | E9 | 33 | C0 | EB | 0B |
| 0C840 | 90 | 32 | E4 | 8B | DA | 8B | 17 | 2B | D1 | 89 | 17 | 5D | CA | 0A | 00 | 00 | E8 | 63 | 06 | 0A | 00 | B8 | 0A | 00 |
| 0C858 | 50 | 9A | 00 | 00 | EE | 09 | C4 | 5E | 0A | 26 | 8B | 07 | 89 | 5E | F6 | 8C | 46 | F8 | C4 | 5E | 06 | 26 | 8B | 0F |
| 0C870 | 3A | C1 | BA | 00 | 00 | 75 | 01 | 42 | 88 | 56 | FE | F6 | 46 | FE | 01 | 74 | 3C | C4 | 5E | F6 | 26 | 8B | 07 | 32 |
| 0C888 | E4 | 89 | 46 | FA | 83 | 7E | FA | 01 | 72 | 2B | C7 | 46 | FC | 01 | 00 | 8B | 76 | FC | C4 | 5E | 0A | 26 | 8B | 00 |
| 0C8A0 | C4 | 5E | 06 | 26 | 8B | 08 | 3A | C1 | 74 | 06 | C6 | 46 | FE | 00 | EB | 0D | 8B | 46 | FC | 40 | 89 | 46 | FC | 48 |
| 0C8B8 | 3B | 46 | FA | 75 | DA | 9A | 2D | 00 | EE | 09 | 8B | 46 | FE | 8B | E5 | 5D | CA | 08 | 00 | E8 | E8 | 05 | 02 | 00 |
| 0C8D0 | B8 | 0A | 00 | 50 | 9A | 00 | 00 | EE | 09 | C4 | 5E | 0A | 06 | 53 | C4 | 5E | 06 | 06 | 53 | 9A | 0D | 00 | 23 | 0A |
| 0C8E8 | 34 | 01 | 88 | 46 | FE | 9A | 2D | 00 | EE | 09 | 8B | 46 | FE | 8B | E5 | 5D | CA | 08 | 00 | E8 | B8 | 05 | 10 | 00 |
| 0C900 | B8 | 0A | 00 | 50 | 9A | 00 | 00 | EE | 09 | C4 | 5E | 0A | 26 | 8B | 07 | 89 | 5E | F4 | 8C | 46 | F6 | C4 | 5E | 06 |
| 0C918 | 26 | 8B | 0F | 3A | C1 | BA | 00 | 00 | 73 | 01 | 42 | 88 | 56 | FE | 26 | 8B | 07 | 32 | E4 | 89 | 46 | FA | F6 | 46 |
| 0C930 | FE | 01 | 74 | 0B | C4 | 5E | F4 | 26 | 8B | 07 | 32 | E4 | 89 | 46 | FA | 8B | 46 | FA | 89 | 46 | F8 | 83 | 7E | F8 |
| 0C948 | 01 | 72 | 4A | C7 | 46 | FC | 01 | 00 | 8B | 76 | FC | C4 | 5E | 0A | 26 | 8B | 00 | 89 | 5E | F4 | 8C | 46 | F6 | C4 |
| 0C960 | 5E | 0A | 26 | 8B | 00 | C4 | 5E | F0 | 26 | 8B | 08 | 3A | C1 | BA | 00 | 00 | 73 | 01 | 42 | 88 | 56 | FE | EB | 0D |
| 0C978 | 8B | 46 | FC | 40 | 89 | 46 | FC | 48 | 3B | 46 | F8 | 75 | BB | 9A | 2D | 00 | EE | 09 | 8B | 46 | FE | 8B | E5 | 5D |
| 0C990 | CA | 08 | 00 | E8 | 10 | 05 | 02 | 00 | B8 | 0A | 00 | 50 | 9A | 00 | 00 | EE | 09 | C4 | 5E | 06 | 06 | 53 | C4 | 5E |
| 0C9A8 | 0A | 06 | 53 | 9A | B8 | 00 | 23 | 0A | 34 | 01 | 88 | 46 | FE | 9A | 2D | 00 | EE | 09 | 8B | 46 | FE | 8B | E5 | 5D |
| 0C9C0 | CA | 08 | 00 | E8 | E0 | 04 | 06 | 00 | B8 | 06 | 00 | 50 | 9A | 00 | 00 | EE | 09 | 8B | 76 | 08 | 8B | 04 | 8B | 76 |
| 0C9D8 | 06 | 3A | 04 | B9 | 00 | 00 | 75 | 01 | 41 | 88 | 4E | FE | F6 | 46 | FE | 01 | 74 | 35 | 32 | E4 | 89 | 46 | FA | 83 |
| 0C9F0 | 7E | FA | 01 | 72 | 2A | C7 | 46 | FC | 01 | 00 | 8B | 76 | 08 | 03 | 76 | FC | 8B | 04 | 8B | 76 | FC | 03 | 76 | 06 |
| 0CA08 | 3A | 04 | 74 | 06 | C6 | 46 | FE | 00 | EB | 0D | 8B | 46 | FC | 40 | 89 | 46 | FC | 48 | 3B | 46 | FA | 75 | DB | 9A |
| 0CA20 | 2D | 00 | EE | 09 | 8B | 46 | FE | 8B | E5 | 5D | CA | 04 | 00 | E8 | 76 | 04 | 02 | 00 | B8 | 06 | 00 | 50 | 9A | 00 |
| 0CA38 | 00 | EE | 09 | FF | 76 | 08 | FF | 76 | 06 | 9A | 90 | 01 | 23 | 0A | 34 | 01 | 88 | 46 | FE | 9A | 2D | 00 | EE | 09 |
| 0CA50 | 8B | 46 | FE | 8B | E5 | 5D | CA | 04 | 00 | E8 | 4A | 04 | 08 | 00 | B8 | 06 | 00 | 50 | 9A | 00 | 00 | EE | 09 | 8B |
| 0CA68 | 76 | 08 | 8B | 04 | 8B | 76 | 06 | 3A | 04 | B9 | 00 | 00 | 73 | 01 | 41 | 88 | 4E | FE | 8B | D0 | 8B | 04 | 32 | E4 |
| 0CA80 | 89 | 46 | FA | F6 | 46 | FE | 01 | 74 | 06 | 92 | 32 | E4 | 89 | 46 | FA | 8B | 46 | FA | 89 | 46 | F8 | 83 | 7E | F8 |
| 0CA98 | 01 | 72 | 31 | C7 | 46 | FC | 01 | 00 | 8B | 76 | 08 | 03 | 76 | FC | 8B | 04 | 8B | 76 | FC | 03 | 76 | 06 | 3A | 04 |
| 0CAB0 | 74 | 0D | 3A | 04 | B9 | 00 | 00 | 73 | 01 | 41 | 88 | 4E | FE | EB | 0D | 8B | 46 | FC | 40 | 89 | 46 | FC | 48 | 3B |
| 0CAC8 | 46 | F8 | 75 | D4 | 9A | 2D | 00 | EE | 09 | 8B | 46 | FE | 8B | E5 | 5D | CA | 04 | 00 | E8 | C9 | 03 | 02 | 00 | B8 |
| 0CAE0 | 06 | 00 | 50 | 9A | 00 | 00 | EE | 09 | FF | 76 | 06 | FF | 76 | 08 | 9A | 26 | 02 | 23 | 0A | 34 | 01 | 88 | 46 | FE |
| 0CAF8 | 9A | 2D | 00 | EE | 09 | 8B | 46 | FE | 8B | E5 | 5D | CA | 04 | 00 | E8 | 9D | 03 | 00 | 00 | B8 | 0E | 00 | 50 | 9A |
| 0CB10 | 00 | 00 | EE | 09 | C4 | 5E | 0C | 26 | 8B | 07 | 32 | E4 | 03 | 46 | 0A | 3B | 46 | 10 | 7E | 05 | 9A | 61 | 00 | 89 |
| 0CB28 | 0B | C4 | 5E | 06 | 06 | 53 | C4 | 5E | 0C | 26 | 8B | 07 | 32 | E4 | 40 | 03 | D8 | 06 | 53 | FF | 76 | 0A | 9A | 97 |
| 0CB40 | 00 | EE | 09 | C4 | 5E | 0C | 26 | 8B | 07 | 32 | E4 | 03 | 46 | 0A | 26 | 88 | 07 | 9A | 2D | 00 | EE | 09 | 8B | E5 | 5D | CA | 0C | 00 |

| | 145 | | | | | | | | | | | | | | | | 146 | |
|---|---|---|---|---|---|---|---|---|---|---|---|---|---|---|---|---|---|---|
| 0CB58 | E8 | 47 | 03 | 04 | 00 | B8 | 0C | 00 | 50 | 9A | 00 | 00 | EE | 09 | 8B | 46 | 06 | 03 | 46 | 08 | 48 | C4 | 5E | 0A |
| 0CB70 | 26 | 8B | 0F | 91 | 32 | E4 | 3B | C8 | 76 | 05 | 9A | 61 | 00 | 89 | 0B | C4 | 5E | 0A | 26 | 8B | 07 | 32 | E4 | 2B |
| 0CB88 | 46 | 06 | 26 | 88 | 07 | 8B | 46 | 06 | 03 | 46 | 08 | C4 | 5E | 0A | 89 | 5E | FC | 8C | 46 | FE | 03 | D8 | 06 | 53 |
| 0CBA0 | C4 | 5E | FC | 03 | 5E | 08 | 06 | 53 | C4 | 5E | FC | 26 | 8B | 07 | 32 | E4 | 2B | 46 | 08 | 40 | 50 | 9A | 97 | 00 |
| 0CBB8 | EE | 09 | 9A | 2D | 00 | EE | 09 | 8B | E5 | 5D | CA | 0A | 00 | E8 | DA | 02 | 04 | 00 | B8 | 10 | 00 | 50 | 9A | 00 |
| 0CBD0 | 00 | EE | 09 | C4 | 5E | 08 | 26 | 8B | 07 | 32 | E4 | 03 | 46 | 12 | 3B | 46 | 0C | 7F | 0B | 26 | 8B | 07 | 32 | E4 |
| 0CBE8 | 40 | 3B | 46 | 06 | 7D | 05 | 9A | 61 | 00 | 89 | 0B | C4 | 5E | 08 | 89 | 5E | FC | 8C | 46 | FE | 03 | 5E | 06 | 06 |
| 0CC00 | 53 | 8B | 46 | 12 | 03 | 46 | 06 | C4 | 5E | FC | 03 | D8 | 06 | 53 | C4 | 5E | FC | 26 | 8B | 07 | 32 | E4 | 2B | 46 |
| 0CC18 | 06 | 40 | 50 | 9A | BB | 00 | EE | 09 | C4 | 5E | 0E | 06 | 53 | C4 | 5E | 08 | 03 | 5E | 06 | 06 | 53 | FF | 76 | 12 |
| 0CC30 | 9A | 97 | 00 | EE | 09 | C4 | 5E | 08 | 26 | 8B | 07 | 32 | E4 | 03 | 46 | 12 | 26 | 88 | 07 | 9A | 2D | 00 | EE | 09 |
| 0CC48 | 8B | E5 | 5D | CA | 0E | 00 | E8 | 51 | 02 | 04 | 00 | B8 | 0E | 00 | 50 | 9A | 00 | 00 | EE | 09 | 8B | 46 | 10 | 3B |
| 0CC60 | 46 | 0A | 7E | 05 | 9A | 61 | 00 | 89 | 0B | 8B | 46 | 10 | 89 | 46 | FC | 83 | 7E | FC | 01 | 72 | 25 | C7 | 46 | FE |
| 0CC78 | 01 | 00 | 8B | 76 | FE | 4E | C4 | 5E | 0C | 26 | 8B | 00 | C4 | 5E | 06 | 03 | 5E | FE | 26 | 88 | 07 | 8B | 46 | FE |
| 0CC90 | 40 | 89 | 46 | FE | 3B | 46 | FC | 75 | E0 | C4 | 5E | 06 | 8B | 46 | 10 | 26 | 88 | 07 | 9A | 2D | 00 | EE | 09 |
| 0CCA8 | 8B | E5 | 5D | CA | 0C | 00 | E8 | F1 | 01 | 04 | 00 | B8 | 0E | 00 | 50 | 9A | 00 | 00 | EE | 09 | 8B | 46 | 10 | 3B |
| 0CCC0 | 46 | 0A | 7E | 05 | 9A | 36 | 00 | 89 | 0B | C4 | 5E | 06 | 06 | 53 | FF | 76 | 0A | B8 | 20 | 00 | 50 | 9A | E1 | 00 |
| 0CCD8 | EE | 09 | 8B | 46 | 10 | 89 | 46 | FC | 83 | 7E | FC | 01 | 72 | 24 | C7 | 46 | FE | 01 | 00 | 8B | 76 | FE | 4E | C4 |
| 0CCF0 | 5E | 0C | 26 | 8B | 00 | C4 | 5E | 06 | 03 | DE | 26 | 88 | 07 | 8B | 46 | FE | 40 | 89 | 46 | FE | 48 | 3B | 46 | FC |
| 0CD08 | 75 | E1 | 9A | 2D | 00 | EE | 09 | 8B | E5 | 5D | CA | 0C | 00 | E8 | 8A | 01 | 0C | 00 | B8 | 10 | 00 | 50 | 9A | 00 |
| 0CD20 | 00 | EE | 09 | C7 | 46 | FE | 00 | 00 | 8B | 46 | 06 | 89 | 46 | F8 | 8B | 46 | 0C | 89 | 46 | F6 | 8B | 46 | F6 | 3B |
| 0CD38 | 46 | F8 | 72 | 63 | 8B | 46 | F8 | 89 | 46 | FC | 8B | 46 | 12 | 89 | 46 | F4 | 83 | 7E | F4 | 01 | 72 | 3C | C7 | 46 |
| 0CD50 | FA | 01 | 00 | 8B | 46 | FC | 03 | 46 | FA | 48 | 3B | 46 | 0C | 77 | 1C | 8B | 76 | FC | 03 | 76 | FA | 4E | 4E | C4 |
| 0CD68 | 5E | 08 | 26 | 8B | 00 | 8B | 76 | FA | 4E | C4 | 5E | 0E | 26 | 8B | 08 | 3A | C1 | 74 | 02 | EB | 15 | 8B | 46 | FA |
| 0CD80 | 40 | 89 | 46 | FA | 48 | 3B | 46 | F4 | 75 | C9 | 8B | 46 | FC | 89 | 46 | FE | EB | 0D | 8B | 46 | FC | 40 | 89 | 46 |
| 0CD98 | FC | 48 | 3B | 46 | F6 | 75 | A3 | 9A | 2D | 00 | EE | 09 | 8B | 46 | FE | 8B | E5 | 5D | CA | 0E | 00 | E8 | F2 | 00 |
| 0CDB0 | 04 | 00 | B8 | 10 | 00 | 50 | 9A | 00 | 00 | EE | 09 | C7 | 46 | FE | 00 | 00 | 83 | 7E | 12 | 00 | 7E | 07 | C7 | 46 |
| 0CDC8 | FC | 01 | 00 | EB | 05 | C7 | 46 | FC | FF | FF | 83 | 7E | 12 | 00 | 74 | 34 | 8B | 76 | 08 | 4E | C4 | 5E | 0A | 26 |
| 0CDE0 | 8B | 00 | 3A | 46 | 10 | B9 | 00 | 00 | 75 | 01 | 41 | 3A | 4E | 06 | 75 | 1C | 83 | 7E | 08 | 01 | 7C | 16 | 8B | 46 |
| 0CDF8 | 0E | 3B | 46 | 08 | 7C | 0E | 8B | 46 | FC | 01 | 46 | 08 | 29 | 46 | 12 | 01 | 46 | FE | EB | C6 | 9A | 2D | 00 | EE |
| 0CE10 | 09 | 8B | 46 | FE | 8B | E5 | 5D | CA | 0E | 00 | E8 | 85 | 00 | 02 | 00 | B8 | 0E | 00 | 50 | 9A | 00 | 00 | EE | 09 |
| 0CE28 | FF | 76 | 10 | FF | 76 | 0E | FF | 76 | 0C | C4 | 5E | 08 | 06 | 53 | FF | 76 | 06 | 33 | C0 | 50 | 9A | 7E | 05 | 23 |
| 0CE40 | 0A | 89 | 46 | FE | 9A | 2D | 00 | EE | 09 | 8B | 46 | FE | 8B | E5 | 5D | CA | 0C | 00 | E8 | 4D | 00 | 02 | 00 | B8 |
| 0CE58 | 0E | 00 | 50 | 9A | 00 | 00 | EE | 09 | FF | 76 | 10 | FF | 76 | 0E | FF | 76 | 0C | C4 | 5E | 08 | 06 | 53 | FF | 76 |
| 0CE70 | 06 | B8 | 01 | 00 | 50 | 9A | 7E | 05 | 23 | 0A | 89 | 46 | FE | 9A | 2D | 00 | EE | 09 | 8B | 46 | FE | 8B | E5 | 5D |
| 0CE88 | CA | 0C | 00 | E8 | 14 | 00 | 04 | 00 | B8 | 02 | 00 | 50 | 9A | 00 | 00 | EE | 09 | 9A | 2D | 00 | EE | 09 | 8B | E5 |
| 0CEA0 | 5D | CB | 5E | 2E | 8B | 0C | 46 | 46 | 55 | 8B | EC | 2B | E9 | 72 | 06 | 3B | 2E | AC | E8 | 77 | 06 | 56 | 9A | BC |
| 0CEB8 | 01 | EE | 09 | 8B | E5 | 03 | E9 | FF | E6 | 00 | E8 | 87 | 00 | 00 | 00 | B8 | 08 | 00 | 50 | 9A | 35 | 01 | B2 | 0C |
| 0CED0 | A3 | 68 | E8 | 8B | 36 | 68 | E8 | 8B | 46 | 08 | 89 | 04 | 8B | 36 | 68 | E8 | 8B | 46 | 06 | 89 | 44 | 02 | 8B | 36 |
| 0CEE8 | 68 | E8 | A1 | 92 | E8 | 89 | 44 | 04 | 8B | 36 | 68 | E8 | A1 | 90 | E8 | 89 | 44 | 06 | A1 | 68 | E8 | A3 | 90 | E8 |
| 0CF00 | 8B | E5 | 5D | CA | 04 | 00 | E8 | 43 | 00 | 00 | 00 | 8B | 36 | 90 | E8 | 8B | 44 | 04 | A3 | 92 | E8 | 8B | 36 | 90 |
| 0CF18 | E8 | 8B | 44 | 06 | A3 | 68 | E8 | BE | 90 | E8 | 8B | 34 | 80 | 4C | FE | 01 | A1 | 68 | E8 | A3 | 90 | E8 | 8B | E5 |
| 0CF30 | 5D | CB | E8 | 17 | 00 | 00 | 00 | 8B | 46 | 06 | A3 | 92 | E8 | 8B | E5 | 5D | CA | 02 | 00 | E8 | 06 | 00 | 04 | 00 |
| 0CF48 | 8B | E5 | 5D | CB | 5E | 2E | 8B | 0C | 46 | 46 | 55 | 8B | EC | 2B | E9 | 72 | 06 | 3B | 2E | AC | E8 | 77 | 06 | 56 |
| 0CF60 | 9A | BC | 01 | EE | 09 | 8B | E5 | 03 | E9 | FF | E6 | 00 | E8 | 8E | 01 | 02 | 00 | FF | 76 | 0E | FF | 76 | 0C | 8B |
| 0CF78 | 46 | 0A | 99 | 52 | 50 | FF | 76 | 08 | FF | 76 | 06 | 9A | 03 | 00 | 4F | 0B | 88 | 46 | FE | 8B | 46 | FE | 8B | E5 |
| 0CF90 | 5D | CA | 0A | 00 | E8 | 66 | 01 | 02 | 00 | FF | 76 | 0E | FF | 76 | 0C | 33 | D2 | 8B | 46 | 0A | 52 | 50 | FF | 76 |
| 0CFA8 | 08 | FF | 76 | 06 | 9A | 03 | 00 | 4F | 0B | 88 | 46 | FE | 8B | 46 | FE | 8B | E5 | 5D | CA | 0A | 00 | E8 | 3D | 01 |
| 0CFC0 | 04 | 00 | FF | 76 | 10 | FF | 76 | 0E | B8 | 82 | E8 | 1E | 50 | 9A | D6 | 01 | 4F | 0B | 88 | 46 | FE | F6 | 46 | FE |
| 0CFD8 | 01 | 74 | 3E | A1 | 82 | E8 | 8B | 16 | 84 | E8 | 2B | 46 | 0A | 1B | 56 | 0C | B9 | 00 | 00 | 7C | 01 | 41 | 8B | 46 |
| 0CFF0 | 06 | 8B | 56 | 08 | 2B | 06 | 82 | E8 | 1B | 16 | 84 | E8 | 89 | 4E | FC | B9 | 00 | 00 | 7C | 01 | 41 | 22 | 4E | FC |
| 0D008 | A1 | 38 | E9 | 3A | 46 | 04 | BA | 00 | 00 | 77 | 01 | 42 | 22 | CA | 88 | 4E | FE | 8B | 46 | FE | 8B | E5 | 5D | C2 |
| 0D020 | 0E | 00 | E8 | D8 | 00 | 02 | 00 | FF | 76 | 10 | FF | 76 | 0E | 8B | 46 | 08 | 99 | 52 | 50 | 8B | 46 | 06 | 99 | 52 |
| 0D038 | 50 | B8 | 01 | 00 | 50 | E8 | 7D | FF | 88 | 46 | FE | A1 | 82 | E8 | C4 | 5E | 0A | 26 | 89 | 07 | 8B | 46 | FE | 8B |
| 0D050 | E5 | 5D | CA | 0C | 00 | E8 | A5 | 00 | 02 | 00 | FF | 76 | 10 | FF | 76 | 0E | 8B | 46 | 08 | 99 | 52 | 50 | 8B | 46 |
| 0D068 | 06 | 99 | 52 | 50 | B8 | 01 | 00 | 50 | E8 | 4A | FF | 88 | 46 | FE | A1 | 82 | E8 | 32 | E4 | 32 | E4 | C4 | 5E | 0A |
| 0D080 | 26 | 88 | 07 | 8B | 46 | FE | 8B | E5 | 5D | CA | 0C | 00 | E8 | 6E | 00 | 02 | 00 | FF | 76 | 10 | FF | 76 | 0E | 33 |
| 0D098 | D2 | 8B | 46 | 08 | 52 | 50 | 33 | D2 | 8B | 46 | 06 | 52 | 50 | 33 | C0 | 50 | E8 | 12 | FF | 88 | 46 | FE | A1 | 82 |
| 0D0B0 | E8 | C4 | 5E | 0A | 26 | 89 | 07 | 8B | 46 | FE | 8B | E5 | 5D | CA | 0C | 00 | E8 | 3A | 00 | 02 | 00 | FF | 76 | 10 |
| 0D0C8 | FF | 76 | 0E | 33 | D2 | 8B | 46 | 08 | 52 | 50 | 33 | D2 | 8B | 46 | 06 | 52 | 50 | 33 | C0 | 50 | E8 | DE | FE | 88 |
| 0D0E0 | 46 | FE | A1 | 82 | E8 | C4 | 5E | 0A | 26 | 88 | 07 | 8B | 46 | FE | 8B | E5 | 5D | CA | 0C | 00 | E8 | 06 | 00 | 04 |
| 0D0F8 | 00 | 8B | E5 | 5D | CB | 5E | 2E | 8B | 0C | 46 | 46 | 55 | 8B | EC | 2B | E9 | 72 | 06 | 3B | 2E | AC | E8 | 77 | 06 |
| 0D110 | 56 | 9A | BC | 01 | EE | 09 | 8B | E5 | 03 | E9 | FF | E6 | 00 | 00 | E8 | 56 | 03 | 02 | 00 | B8 | 0A | 00 | 50 | 9A |
| 0D128 | 00 | 00 | EE | 09 | FF | 76 | 0C | 33 | C0 | 50 | 9A | DC | 00 | 20 | 09 | D1 | E8 | 72 | 03 | E9 | 82 | 00 | F6 | 06 |
| 0D140 | 40 | E8 | 01 | 74 | 37 | A1 | 42 | E8 | 2B | 06 | 3E | E8 | 3B | 46 | 0A | 73 | 0A | A1 | 42 | E8 | 2B | 06 | 3E | E8 |
| 0D158 | 89 | 46 | 0A | A1 | 3E | E8 | 40 | 03 | 06 | 3C | E8 | 1E | 50 | FF | 76 | 08 | FF | 76 | 06 | FF | 76 | 0A | 9A | 97 |
| 0D170 | 00 | EE | 09 | 8B | 46 | 0A | 01 | 06 | 3E | E8 | EB | 44 | 8B | 76 | 0C | 8B | 74 | 18 | C4 | 5E | 06 | 8B | 04 | 26 |
| 0D188 | 88 | 07 | 8B | 76 | 0C | 8B | 44 | 24 | D1 | E8 | 73 | 07 | C7 | 46 | 0A | 00 | 00 | EB | 25 | FF | 76 | 0C | 8B | 46 |

```
0D1A0    0A 48 50 C4 5E 06 83 C3 01 06 53 9A D3 02 20 09 8B 76 0C 8B 44 24 88 44
0D1B8    1B 8B 44 22 40 89 46 0A 8B 46 0A 89 46 FE FF 76 0C 9A 83 01 20 09 9A 2D
0D1D0    00 EE 09 8B 46 FE 8B E5 5D CA 08 00 E8 98 02 00 00 B8 0C 00 50 9A 00 00
0D1E8    EE 09 FF 76 0E 33 C0 50 9A DC 00 20 09 D1 E8 73 5C F6 06 40 E8 01 74 19
0D200    A1 3E E8 40 A3 3E E8 A1 3E E8 03 06 3C E8 96 C4 5E 0A 8B 04 26 88 07 EB
0D218    0E 8B 76 0E 8B 74 18 C4 5E 0A 8B 04 26 88 07 8B 76 0E C6 44 1B 00 C4 5E
0D230    0A 26 8B 07 8B 4E 08 32 ED 3A C1 72 0C 26 8B 07 8B 4E 06 32 ED 3A C1 76
0D248    0C 8B 76 0E C7 44 04 59 04 C6 44 01 0E FF 76 0E 9A 83 01 20 09 9A 2D 00
0D260    EE 09 8B E5 5D CA 0A 00 E8 0C 02 06 00 B8 0A 00 50 9A 00 00 EE 09 FF 76
0D278    0C FF 76 0A C4 5E 06 06 53 9A 0F 00 B1 0A 40 89 46 FC 8B 46 0A 89 46 FA
0D290    8B 46 FA 3B 46 FC 7C 20 8B 46 FC 89 46 FE 8B 46 FE 48 C4 5E 06 03 D8 26
0D2A8    C6 07 20 8B 46 FE 40 89 46 FE 48 3B 46 FA 75 E6 9A 2D 00 EE 09 8B E5 5D
0D2C0    CA 08 00 E8 B1 01 04 00 B8 0A 00 50 9A 00 00 EE 09 FF 76 0C FF 76 0A C4
0D2D8    5E 06 89 5E FC 8C 46 FE 83 C3 01 06 53 9A 0F 00 B1 0A C4 5E FC 26 88 07
0D2F0    9A 2D 00 EE 09 8B E5 5D CA 08 00 E8 79 01 06 00 B8 0E 00 50 9A 00 00 EE
0D308    09 FF 76 10 B8 01 00 50 9A DC 00 20 09 D1 E8 72 03 E9 CC 00 83 7E 08 00
0D320    75 03 E9 C3 00 8B 46 08 23 C0 79 02 F7 D8 3D FF 7F 75 13 FF 76 10 FF 76
0D338    0E C4 5E 0A 06 53 9A D9 03 20 09 E9 A2 00 8B 46 08 23 C0 79 02 F7 D8 2B
0D350    46 0E 89 46 FE 83 7E FE 00 7D 05 C7 46 FE 00 00 83 7E 08 00 7F 06 83 7E
0D368    FE 00 7E 07 C7 46 FA 01 00 EB 12 8B 46 08 23 C0 79 02 F7 D8 2B 46 0E F7
0D380    D8 40 89 46 FA 83 7E 08 00 7E 0E 83 7E FE 00 75 08 8B 46 08 89 46 FC EB
0D398    06 8B 46 0E 89 46 FC 83 7E 08 00 7E 0B FF 76 10 FF 76 FE 9A 48 03 20 09
0D3B0    8B 76 10 80 7C 01 00 75 2F 96 50 8B 46 FC 2B 46 FA 40 50 8B 46 FA 48 C4
0D3C8    5E 0A 03 D8 06 53 9A D9 03 20 09 D1 E8 73 11 83 7E 08 00 7D 0B FF 76 10
0D3E0    FF 76 FE 9A 48 03 20 09 FF 76 10 9A 83 01 20 09 9A 2D 00 EE 09 8B E5 5D
0D3F8    CA 0C 00 E8 79 00 00 00 B8 0E 00 50 9A 00 00 EE 09 FF 76 10 C4 5E 0A 26
0D410    8B 07 32 E4 50 83 C3 01 06 53 FF 76 08 FF 76 06 9A EC 01 B1 0A 9A 2D 00
0D428    EE 09 8B E5 5D CA 0C 00 E8 44 00 00 00 B8 0A 00 50 9A 00 00 EE 09 FF 76
0D440    0C B8 01 00 50 8D 46 0A 1E 50 FF 76 08 FF 76 06 9A EC 01 B1 0A 9A 2D 00
0D458    EE 09 8B E5 5D CA 08 00 E8 14 00 04 00 B8 02 00 50 9A 00 00 EE 09 9A 2D
0D470    00 EE 09 8B E5 5D CB 5E 2E 8B 0C 46 46 55 8B EC 2B E9 72 06 3B 2E AC E8
0D488    77 06 56 9A BC 01 EE 09 8B E5 03 E9 FF E6 00 00 E8 A0 04 02 00 B8 0A 00
0D4A0    50 9A 00 00 EE 09 C6 46 FE 00 8B 46 0C D1 E8 D1 E8 D1 E8 3B 46 0A 77 1B
0D4B8    96 C4 5E 06 26 8B 00 8B 76 0C 81 E6 07 00 22 84 66 FD B9 00 00 74 01 41
0D4D0    88 4E FE 9A 2D 00 EE 09 8B 46 FE 8B E5 5D CA 08 00 E8 57 04 02 00 B8 06
0D4E8    00 50 9A 00 00 EE 09 8B 46 06 3B 46 08 76 08 8B 46 08 89 46 FE EB 06 8B
0D500    46 06 89 46 FE 9A 2D 00 EE 09 8B 46 FE 8B E5 5D CA 04 00 E8 25 04 04 00
0D518    B8 10 00 50 9A 00 00 EE 09 C7 46 FE 00 00 8B 76 FE 03 76 06 C6 04 00 8B
0D530    46 FE 40 89 46 FE 3D 20 00 75 EB 8B 46 12 89 46 FC C7 46 FE 00 00 8B 76
0D548    06 03 76 FE 8B 7E FE C4 5E 0E 26 8B 01 88 04 8B 46 FE 40 89 46 FE 48 3B
0D560    46 FC 75 E2 8B 46 0C 89 46 FC C7 46 FE 00 00 8B 76 06 03 76 FE 8B 04 8B
0D578    7E FE C4 5E 08 26 8B 09 0A C1 88 04 8B 46 FE 40 89 46 FE 48 3B 46 FC 75
0D590    DE 9A 2D 00 EE 09 8B 46 06 8B E5 5D CA 0E 00 E8 99 03 04 00 B8 10 00 50
0D5A8    9A 00 00 EE 09 C7 46 FE 00 00 8B 76 FE 03 76 06 C6 04 00 8B 46 FE 40 89
0D5C0    46 FE 3D 20 00 75 EB 8B 46 12 89 46 FC C7 46 FE 00 00 8B 76 06 03 76 FE
0D5D8    8B 7E FE C4 5E 0E 26 8B 01 88 04 8B 46 FE 40 89 46 FE 48 3B 46 FC 75 E2
0D5F0    8B 46 0C 89 46 FC C7 46 FE 00 00 8B 76 06 03 76 FE 8B 04 8B 7E FE C4 5E
0D608    08 26 8B 09 F7 D1 22 C1 88 04 8B 46 FE 40 89 46 FE 48 3B 46 FC 75 DC 9A
0D620    2D 00 EE 09 8B 46 06 8B E5 5D CA 0E 00 E8 0B 03 04 00 B8 10 00 50 9A 00
0D638    00 EE 09 C7 46 FE 00 00 8B 76 FE 03 76 06 C6 04 00 8B 46 FE 40 89 46 FE
0D650    3D 20 00 75 EB FF 76 12 FF 76 0C 9A 52 00 E9 0A 89 46 FC C7 46 FE 00 00
0D668    8B 76 06 03 76 FE 8B 7E FE C4 5E 0E 26 8B 01 C4 5E 08 26 8B 09 22 C1 88
0D680    04 8B 46 FE 40 89 46 FE 48 3B 46 FC 75 DA 9A 2D 00 EE 09 8B 46 06 8B E5
0D698    5D CA 0E 00 E8 9C 02 0A 00 B8 0E 00 50 9A 00 00 EE 09 C6 46 FE 01 FF 76
0D6B0    10 FF 76 0A 9A 52 00 E9 0A 89 46 FA 8B 46 FA 89 46 F8 C7 46 FC 00 00 8B
0D6C8    76 FC C4 5E 0C 26 8B 00 C4 5E 06 26 8B 08 3A C1 74 04 C6 46 FE 00 8B 46
0D6E0    FC 40 89 46 FC 48 3B 46 F8 75 DC 8B 46 FA 40 89 46 F8 8B 46 10 89 46 F6
0D6F8    8B 46 F6 3B 46 F8 72 24 8B 46 F8 89 46 FC 8B 76 FC C4 5E 0C 26 8B 00 22
0D710    C0 74 04 C6 46 FE 00 8B 46 FC 40 89 46 FC 48 3B 46 F6 75 E2 8B 46 FA 40
0D728    89 46 F8 8B 46 0A 89 46 F6 8B 46 F6 3B 46 F8 72 24 8B 46 F8 89 46 FC 8B
0D740    76 FC C4 5E 06 26 8B 00 22 C0 74 04 C6 46 FE 00 8B 46 FC 40 89 46 FC 48
0D758    3B 46 F6 75 E2 9A 2D 00 EE 09 8B 46 FE 8B E5 5D CA 0C 00 E8 CD 01 0A 00
0D770    B8 0E 00 50 9A 00 00 EE 09 C6 46 FE 01 FF 76 10 FF 76 0A 9A 52 00 E9 0A
0D788    89 46 FA 8B 46 FA 89 46 F8 C7 46 FC 00 00 8B 76 FC C4 5E 0C 26 8B 00 C4
0D7A0    5E 06 26 8B 08 F7 D1 22 C1 74 04 C6 46 FE 00 8B 46 FC 40 89 46 FC 48 3B
0D7B8    46 F8 75 DA 8B 46 FA 40 89 46 F8 8B 46 10 89 46 F6 8B 46 F6 3B 46 F8 72
0D7D0    24 8B 46 F8 89 46 FC 8B 76 FC C4 5E 0C 26 8B 00 22 C0 74 04 C6 46 FE 00
```

```
0D7E8   8B 46 FC 40 89 46 FC 48 3B 46 F6 75 E2 9A 2D 00 EE 09 8B 46 FE 8B E5 5D
0D800   CA 0C 00 E8 35 01 04 00 B8 9A DC 02 E9 0A FF 76 10 C4 5E 0C 06
0D818   53 FF 76 0A C4 5E 06 06 53 9A 0D 02 E9 0A 34 01 22 46 FC 88 46 FE 9A 2D
0D830   0A C4 5E 06 06 53 89 46 FC 5D CA 0C 00 E8 E4 00 02 00 B8 04 00 50 9A 00 00
0D848   00 EE 09 8B 46 FE 8B E5 5D CA 0C 00 E8 E4 00 02 00 B8 04 00 50 9A 00 00
0D860   EE 09 C7 46 FE 00 00 8B 76 FE 03 76 06 C6 04 00 8B 46 FE 40 89 46 FE 3D
0D878   20 00 75 EB 9A 2D 00 EE 09 8B E5 5D CA 02 00 E8 B1 00 00 00 B8 06 00 50
0D890   9A 00 00 EE 09 81 7E 06 FF 00 76 05 9A 8C 00 89 0B 8B 76 06 D1 EE D1 EE
0D8A8   D1 EE 03 76 08 8B 04 8B 7E 06 81 E7 07 00 0A 85 66 FD 88 04 9A 2D 00 EE
0D8C0   09 8B E5 5D CA 04 00 E8 71 00 06 00 B8 08 00 50 9A 00 00 EE 09 8B 46 08
0D8D8   3B 46 06 76 0A FF 76 0A 9A C5 03 E9 0A EB 32 8B 46 08 89 46 FC 8B 46 06
0D8F0   89 46 FA 8B 46 FA 3B 46 FC 72 1E 8B 46 FC 89 46 FE FF 76 0A FF 76 FE 9A
0D908   F8 03 E9 0A 8B 46 FE 40 89 46 FE 48 3B 46 FA 75 E8 9A 2D 00 EE 09 8B E5
0D920   5D CA 06 00 E8 14 00 04 00 B8 02 00 50 9A 00 00 EE 09 9A 2D 00 EE 09 8B
0D938   E5 5D CB 5E 2E 8B 0C 46 46 55 8B EC 2B E9 72 06 3B 2E AC E8 77 06 56 9A
0D950   BC 01 EE 09 8B E5 03 E9 FF E6 00 00 00 00 00 4E 6F 74 20 45 6E 6F 75 67
0D968   68 20 4D 65 6D 6F 72 79 24 00 00 00 00 0E 1F BA 00 00 B4 09 CD 21 2E 8C
0D980   06 14 00 2E FF 2E 12 00 BA 78 01 B4 25 B0 00 8C C9 8E D9 CD 21 B8 4F 0B
0D998   8E D8 80 3E 00 00 FF 75 0E BB FF FF B4 4A CD 21 83 EB 61 B4 4A CD 21 BA
0D9B0   70 B6 D1 EA B9 00 80 2B CA D1 EA D1 EA D1 EA 42 26 A1 02 00 80 3E 00 00
0D9C8   FF 75 03 2D 61 00 8B E8 2D E6 11 72 A0 33 DB 2B C2 73 02 2B D8 2B D3 B8
0D9E0   E5 01 8E D8 8C 06 BE E8 BE 9C 10 2B F0 D1 E6 D1 E6 D1 E6 D1 E6 81 FE 70
0D9F8   EB 73 08 01 54 02 83 C6 04 EB F2 03 D0 8E C2 BE FE FF 8B FE FD F3 A5 FC
0DA10   8E DA FA 8E D2 BC 70 B7 FB 89 26 AA E8 83 2E AA E8 06 D1 E3 D1 E3 D1 E3
0DA28   D1 E3 89 1E A4 E8 89 1E A6 E8 C7 07 01 00 83 C3 02 89 1E A8 E8 81 C3 80
0DA40   01 89 1E AC E8 89 16 B4 E8 81 EA E5 01 81 C2 E6 11 89 16 B0 E8 89 2E B2
0DA58   E8 33 ED 89 2E AE E8 89 2E 9A E8 89 2E 90 E8 89 2E 94 E8 89 2E 96 E8 89
0DA70   2E 98 E8 89 2E B6 E8 1E 07 83 3E 62 EB 00 74 04 FF 1E 62 EB 9A 09 00 EF
0DA88   0C 9A 0F 00 05 0D 9A 01 00 00 00 9A 18 00 05 0D 9A 8B 00 09 0D 9A 34 00
0DAA0   EF 0C 83 3E 66 EB 00 74 04 FF 1E 66 EB B4 4C A0 B6 E8 CD 21 C7 06 BC E8
0DAB8   00 00 FF 2E BC E8 5E 5F 5A 58 8A E0 8B 0E B8 E8 57 56 55 CD 21 89 0E B8
0DAD0   E8 89 16 BA E8 5D CB 58 5B 9D 89 26 9A E8 89 2E 9C E8 89 1E A0 E8 A3 9E
0DAE8   E8 EA 03 01 CD 0B 00 00 00 00 E8 84 03 2E 00 81 7E 08 FF 7F 75 05 C7 46
0DB00   08 0E 00 81 7E 06 FF 7F 75 05 C7 46 06 0A 00 8B 46 0A 8B 56 0C 2D 00 00
0DB18   83 DA 00 B9 00 00 7D 01 41 88 4E D4 8B 46 0A 8B 56 0C 23 D2 79 07 F7 D8
0DB30   83 D2 00 F7 DA 89 46 0A 89 56 0C 8B 76 0E C6 04 00 83 7E 06 02 B8 00 00
0DB48   75 01 40 83 7E 06 08 B9 00 00 75 01 41 0A C1 83 7E 06 0A B9 00 00 75 01
0DB60   41 0A C1 83 7E 06 10 B9 00 00 75 01 41 0A C1 8B C8 8B 46 0A 8B 56 0C 2D
0DB78   00 00 83 DA 00 89 4E D2 B9 00 00 7C 01 41 22 4E D2 88 4E FE F6 46 FE 01
0DB90   75 03 E9 27 01 C7 46 DA 21 00 FF 4E DA 8B 76 DA 8B 46 06 99 52 50 8B 46
0DBA8   0A 8B 56 0C 9A 4D 01 25 0D 05 30 00 88 42 DD 80 7A DD 39 76 0B
0DBC0   8B 42 DD 32 E4 05 07 00 88 42 DD 8B 46 06 99 52 50 8B 46 0A 8B 56 0C 9A
0DBD8   35 01 25 0D 89 46 0A 89 56 0C 8B 46 0A 8B 56 0C 2D 00 00 83 DA 00 0B C2
0DBF0   75 A8 F6 46 D4 01 74 0A FF 4E DA 8B 76 DA C6 42 DD 2D B8 21 00 2B 46 DA
0DC08   89 46 DC 8B 46 08 23 C0 79 02 F7 D8 3B 46 DC 7D 06 8B 46 DC 89 46 08 8B
0DC20   46 08 23 C0 79 02 F7 D8 3B 46 10 B9 00 00 7F 01 41 88 4E FE F6 46 FE 01
0DC38   75 03 E9 7F 00 83 7E 08 00 7E 0C 83 7E 06 0A 74 06 C6 46 D6 30 EB 04 C6
0DC50   46 D6 20 83 7E 08 00 7E 0C 8B 46 08 2B 46 DC 40 89 46 D8 EB 05 C7 46 D8
0DC68   01 00 8B 76 0E 8B 46 08 23 C0 79 02 F7 D8 88 04 46 96 50 8B 76 0E 8B 04
0DC80   32 E4 50 FF 76 D6 9A 79 00 EE 09 8D 46 DD 03 46 DA 50 8B 46 D8 03 46 0E
0DC98   50 FF 76 DC 9A 3F 00 EE 09 8B 76 0E 80 7C 01 30 75 12 03 76 D8 80 3C 2D
0DCB0   75 0A C6 04 30 8B 76 0E C6 44 01 2D 8B 46 FE 8B E5 5D CA 0C 00 E8 B1 01
0DCC8   12 00 C6 46 FE 01 C6 46 FC 00 C7 46 F6 0A 00 C6 46 FA 00 C7 46 F2 00 00
0DCE0   C6 06 38 E9 00 C7 46 EE 00 00 C7 46 F0 00 00 8B 76 0A 80 3C 00 75 03 E9
0DCF8   69 01 8B 76 0A 8B 04 32 E4 3B 46 F2 7F 33 F6 06 38 E9 01 74 19 8B 46 EE
0DD10   8B 56 F0 F7 D8 83 D2 00 F7 DA C4 5E 06 26 89 07 26 89 57 02 EB 10 C4 5E
0DD28   06 8B 46 EE 8B 56 F0 26 89 07 26 89 57 02 E9 2E 01 FF 46 F2 8B 76 F2 03
0DD40   76 0A 8B 04 88 46 F4 80 7E F4 20 74 06 80 7E F4 09 75 0C 80 7E FA 01 75
0DD58   04 C6 46 FA 02 EB 9B 80 7E FA 02 75 03 E9 FB 00 80 7E FA 00 75 21 80 7E
0DD70   F4 2D B8 00 00 75 01 40 A2 38 E9 80 7E F4 2B 74 07 F6 06 38 E9 01 74 07
0DD88   C6 46 FA 01 E9 6B FF C6 46 FA 01 80 7E F4 30 72 13 80 7E F4 39 77 0D 8B
0DDA0   46 F4 32 E4 05 D0 FF 89 46 F8 EB 76 80 7E F4 61 72 0D 8B 46 F4 32 E4 05
0DDB8   A9 FF 89 46 F8 EB 63 80 7E F4 41 72 0D 8B 46 F4 32 E4 05 C9 FF 89 46 F8
0DDD0   EB 50 80 7E F4 23 75 48 F6 46 FC 01 75 42 C6 46 FC 01 8B 46 EE 8B 56 F0
0DDE8   2D 24 00 83 DA 00 7C 06 0B C2 74 02 EB 6D 8B 46 EE 8B 56 F0 2D 00 00 83
0DE00   DA 00 0B C2 75 07 C7 46 F6 10 00 EB 10 8B 46 EE 89 46 F6 C7 46 EE 00 00
0DE18   C7 46 F0 00 00 E9 DA FE EB 41 8B 46 F8 3B 46 F6 7C 02 EB 37 FF 76 F0 FF
```

| | | | | | | | | | | | | | | | | | | | | | |
|---|---|---|---|---|---|---|---|---|---|---|---|---|---|---|---|---|---|---|---|---|---|
| 0DE30 | 76 | EE | 8B | 46 | F6 | 99 | 52 | 50 | 8D | 46 | EE | 50 | 9A | 9E | 01 | 25 | 0D | D1 | E8 | 73 | 19 | FF | 76 | F0 |
| 0DE48 | FF | 76 | EE | 8B | 46 | F8 | 99 | 52 | 50 | 8D | 46 | EE | 50 | 9A | 7D | 01 | 25 | 0D | D1 | E8 | 72 | 02 | EB | 03 |
| 0DE60 | E9 | 97 | FE | C6 | 46 | FE | 00 | 8B | 46 | FE | 8B | E5 | 5D | CA | 08 | 00 | E8 | 06 | 00 | 04 | 00 | 8B | E5 | 5D |
| 0DE78 | CB | 5E | 2E | 8B | 0C | 46 | 46 | 55 | 8B | EC | 2B | E9 | 72 | 06 | 3B | 2E | AC | E8 | 77 | 06 | 56 | 9A | BC | 01 |
| 0DE90 | EE | 09 | 8B | E5 | 03 | E9 | FF | E6 | 00 | 00 | E8 | 0B | 04 | 00 | 00 | B8 | 02 | 00 | 50 | 9A | 00 | 00 | EE | 09 |
| 0DEA8 | B8 | 1E | 00 | 50 | B8 | 74 | FD | 50 | B8 | 02 | 08 | 50 | 33 | C0 | 50 | 9A | A3 | 00 | CC | 0C | 9A | 2D | 00 | EE |
| 0DEC0 | 09 | 8B | E5 | 5D | CB | E8 | E0 | 03 | 00 | 00 | B8 | 02 | 00 | 50 | 9A | 00 | 00 | EE | 09 | B8 | 1A | 00 | 50 | B8 |
| 0DED8 | 94 | FD | 50 | B8 | 66 | 08 | 50 | 33 | C0 | 50 | 9A | A3 | 00 | CC | 0C | 9A | 2D | 00 | EE | 09 | 8B | E5 | 5D | CB |
| 0DEF0 | E8 | B5 | 03 | 00 | 00 | B8 | 02 | 00 | 50 | 9A | 00 | 00 | EE | 09 | B8 | 27 | 00 | 50 | B8 | B0 | FD | 50 | B8 | 67 |
| 0DF08 | 08 | 50 | 33 | C0 | 50 | 9A | A3 | 00 | CC | 0C | 9A | 2D | 00 | EE | 09 | 8B | E5 | 5D | CB | E8 | 8A | 03 | 00 | 00 |
| 0DF20 | B8 | 02 | 00 | 50 | 9A | 00 | 00 | EE | 09 | B8 | 1C | 00 | 50 | B8 | D8 | FD | 50 | B8 | 84 | 08 | 50 | 33 | C0 | 50 |
| 0DF38 | 9A | A3 | 00 | CC | 0C | 9A | 2D | 00 | EE | 09 | 8B | E5 | 5D | CB | E8 | 5F | 03 | 00 | 00 | B8 | 02 | 00 | 50 | 9A |
| 0DF50 | 00 | 00 | EE | 09 | B8 | 1C | 00 | 50 | B8 | F6 | FD | 50 | B8 | 92 | 09 | 50 | 33 | C0 | 50 | 9A | A3 | 00 | CC | 0C |
| 0DF68 | 9A | 2D | 00 | EE | 09 | 8B | E5 | 5D | CB | E8 | 34 | 03 | 00 | 00 | B8 | 02 | 00 | 50 | 9A | 00 | 00 | EE | 09 | B8 |
| 0DF80 | 0D | 00 | 50 | B8 | 14 | FE | 50 | B8 | 60 | 09 | 50 | 33 | C0 | 50 | 9A | A3 | 00 | CC | 0C | 9A | 2D | 00 | EE | 09 |
| 0DF98 | 8B | E5 | 5D | CB | E8 | 09 | 03 | 02 | 00 | B8 | 08 | 00 | 50 | 9A | 00 | 00 | EE | 09 | 8B | 46 | 0A | 89 | 46 | FE |
| 0DFB0 | 3B | 46 | 08 | 72 | 05 | 3B | 46 | 06 | 76 | 14 | B8 | 1B | 00 | 50 | B8 | 22 | FE | 50 | B8 | 07 | 08 | 50 | 33 | C0 |
| 0DFC8 | 50 | 9A | A3 | 00 | CC | 0C | 9A | 2D | 00 | EE | 09 | 8B | 46 | FE | 8B | E5 | 5D | CA | 06 | 00 | E8 | C9 | 02 | 02 |
| 0DFE0 | 00 | B8 | 08 | 00 | 50 | 9A | 00 | 00 | EE | 09 | 8B | 46 | 0A | 89 | 46 | FE | 3B | 46 | 08 | 7C | 05 | 3B | 46 | 06 |
| 0DFF8 | 7E | 14 | B8 | 19 | 00 | 50 | B8 | 3E | FE | 50 | B8 | 08 | 08 | 50 | 33 | C0 | 50 | 9A | A3 | 00 | CC | 0C | 9A | 2D |
| 0E010 | 00 | EE | 09 | 8B | 46 | FE | 8B | E5 | 5D | CA | 06 | 00 | E8 | 89 | 02 | 02 | 00 | B8 | 04 | 00 | 50 | 9A | 00 | 00 |
| 0E028 | EE | 09 | 81 | 7E | 06 | 00 | 80 | 75 | 14 | B8 | 21 | 00 | 50 | B8 | 58 | FE | 50 | B8 | 09 | 08 | 50 | 33 | C0 | 50 |
| 0E040 | 9A | A3 | 00 | CC | 0C | 8B | 46 | 06 | 89 | 46 | FE | 9A | 2D | 00 | EE | 09 | 8B | 46 | FE | 8B | E5 | 5D | CA | 02 |
| 0E058 | 00 | E8 | 4C | 02 | 02 | 00 | B8 | 04 | 00 | 50 | 9A | 00 | 00 | EE | 09 | 80 | 7E | 06 | 80 | 74 | 0A | 8B | 46 | 06 |
| 0E070 | 32 | E4 | 3D | 80 | FF | 75 | 14 | B8 | 20 | 00 | 50 | B8 | 7A | FE | 50 | B8 | 0A | 08 | 50 | 33 | C0 | 50 | 9A | A3 |
| 0E088 | 00 | CC | 0C | 8B | 46 | 06 | 88 | 46 | FE | 9A | 2D | 00 | EE | 09 | 8B | 46 | FE | 8B | E5 | 5D | CA | 02 | 00 | E8 |
| 0E0A0 | 06 | 02 | 02 | 00 | B8 | 04 | 00 | 50 | 9A | 00 | 00 | EE | 09 | 8B | 46 | 06 | 89 | 46 | FE | 23 | C0 | 75 | 14 | B8 |
| 0E0B8 | 15 | 00 | 50 | B8 | 9C | FE | 50 | B8 | EF | 07 | 50 | 33 | C0 | 50 | 9A | A3 | 00 | CC | 0C | 83 | 7E | 06 | 01 | 75 |
| 0E0D0 | 14 | B8 | 15 | 00 | 50 | B8 | B2 | FE | 50 | B8 | F0 | 07 | 50 | 33 | C0 | 50 | 9A | A3 | 00 | CC | 0C | A1 | A4 | E8 |
| 0E0E8 | 3B | 46 | 06 | 77 | 12 | A1 | A8 | E8 | 3B | 46 | 06 | 76 | 0A | 8B | 46 | 06 | 25 | 01 | 00 | D1 | E8 | 73 | 16 | B8 |
| 0E100 | 15 | 00 | 50 | B8 | C8 | FE | 50 | B8 | F1 | 07 | 50 | 33 | C0 | 50 | 9A | A3 | 00 | CC | 0C | EB | 22 | 8B | 76 | 06 |
| 0E118 | 4E | 4E | 8B | 04 | 25 | 01 | 00 | D1 | E8 | 73 | 14 | B8 | 17 | 00 | 50 | B8 | DE | FE | 50 | B8 | F2 | 07 | 50 | 33 |
| 0E130 | C0 | 50 | 9A | A3 | 00 | CC | 0C | 9A | 2D | 00 | EE | 09 | 8B | 46 | FE | 8B | E5 | 5D | CA | 02 | 00 | E8 | 60 | 01 |
| 0E148 | 00 | 00 | B8 | 06 | 00 | 50 | 9A | 00 | 00 | EE | 09 | FF | 76 | 06 | 9A | 10 | 02 | 89 | 0B | 48 | 48 | 89 | 46 | 06 |
| 0E160 | 8B | 76 | 06 | 8B | 04 | 3B | 46 | 08 | 74 | 14 | B8 | 1A | 00 | 50 | B8 | F6 | FE | 50 | B8 | F3 | 07 | 50 | 33 | C0 |
| 0E178 | 50 | 9A | A3 | 00 | CC | 0C | 9A | 2D | 00 | EE | 09 | 8B | E5 | 5D | CA | 04 | 00 | E8 | 1C | 01 | 08 | 00 | B8 | 0C |
| 0E190 | 00 | 50 | 9A | 00 | 00 | EE | 09 | 8B | 46 | 06 | 89 | 46 | F8 | C7 | 46 | FA | 00 | 00 | 8B | 46 | FA | 3B | 46 | 0A |
| 0E1A8 | 72 | 05 | 3B | 46 | 08 | 76 | 30 | 8B | 76 | FA | D1 | EE | D1 | EE | D1 | EE | C4 | 5E | 0C | 26 | 8B | 00 | 8B | 76 |
| 0E1C0 | FA | 81 | E6 | 07 | 00 | 22 | 84 | 12 | FF | 74 | 14 | B8 | 18 | 00 | 50 | B8 | 1A | FF | 50 | B8 | 85 | 08 | 50 | 33 |
| 0E1D8 | C0 | 50 | 9A | A3 | 00 | CC | 0C | 8B | 46 | FA | 40 | 89 | 46 | FA | 48 | 3B | 46 | F8 | 75 | B6 | C4 | 5E | 0C | 89 |
| 0E1F0 | 5E | FC | 8C | 46 | FE | 9A | 2D | 00 | EE | 09 | 8B | 46 | FC | 8B | 56 | FE | 8B | E5 | 5D | CA | 0A | 00 | E8 | 9F |
| 0E208 | 00 | 08 | 00 | B8 | 0A | 00 | 50 | 9A | 00 | 00 | EE | 09 | 8B | 46 | 0C | 3B | 46 | 0A | 74 | 05 | 9A | B7 | 00 | 89 |
| 0E220 | 0B | C6 | 46 | FE | 01 | A1 | 94 | E8 | 89 | 46 | FC | 83 | 7E | FC | 00 | 74 | 3C | 8B | 76 | 06 | 8B | 04 | 32 | E4 |
| 0E238 | 89 | 46 | F8 | C7 | 46 | FA | 00 | 00 | 8B | 76 | FC | 8B | 7C | 02 | 03 | 7E | FA | 8B | 05 | 8B | 7E | FA | 03 | 7E |
| 0E250 | 06 | 3A | 05 | 74 | 07 | 8B | 04 | 89 | 46 | FC | EB | CF | 8B | 46 | FA | 40 | 89 | 46 | FA | 48 | 3B | 46 | F8 | 75 |
| 0E268 | D7 | EB | 18 | EB | BE | 8B | 76 | 08 | 8B | 46 | 06 | 89 | 44 | 02 | A1 | 94 | E8 | 89 | 04 | 89 | 36 | 94 | E8 | C6 |
| 0E280 | 46 | FE | 00 | 9A | 2D | 00 | EE | 09 | 8B | 46 | FE | 8B | E5 | 5D | CA | 08 | 00 | E8 | 14 | 00 | 04 | 00 | B8 | 02 |
| 0E298 | 00 | 50 | 9A | 00 | 00 | EE | 09 | 9A | 2D | 00 | EE | 09 | 8B | E5 | 5D | CB | 5E | 2E | 8B | 0C | 46 | 46 | 55 | 8B |
| 0E2B0 | EC | 2B | E9 | 72 | 06 | 3B | 2E | AC | E8 | 77 | 06 | 56 | 9A | BC | 01 | EE | 09 | 8B | E5 | 03 | E9 | FF | E6 | 00 |
| 0E2C8 | 00 | 00 | 00 | 00 | 00 | 00 | 81 | 41 | 52 | 43 | 54 | 41 | 4E | 80 | 75 | 6E | 73 | 69 | 67 | 6E | 65 | 64 | 80 |
| 0E2E0 | 64 | 69 | 76 | 69 | 64 | 65 | 20 | 62 | 79 | 20 | 7A | 65 | 72 | 6F | 80 | 52 | 45 | 41 | 4C | 80 | 6C | 6F | 6E | 67 |
| 0E2F8 | 20 | 69 | 6E | 74 | 65 | 67 | 65 | 72 | 80 | 6D | 61 | 74 | 68 | 20 | 6F | 76 | 65 | 72 | 66 | 6C | 6F | 77 | 80 | 53 |
| 0E310 | 49 | 4E | 20 | 6F | 72 | 20 | 43 | 4F | 53 | 80 | 61 | 72 | 67 | 75 | 6D | 65 | 6E | 74 | 80 | 72 | 61 | 6E | 67 | 65 |
| 0E328 | 80 | 45 | 58 | 50 | 80 | 53 | 51 | 52 | 54 | 80 | 6F | 66 | 80 | 4C | 4E | 80 | 54 | 52 | 55 | 4E | 43 | 2F | 52 | 4F |
| 0E340 | 55 | 4E | 44 | 80 | 54 | 41 | 4E | 80 | 41 | 52 | 43 | 53 | 49 | 4E | 20 | 6F | 72 | 20 | 41 | 52 | 43 | 43 | 4F | 46 |
| 0E358 | 80 | 3E | 20 | 31 | 2E | 30 | 80 | 6E | 65 | 67 | 61 | 74 | 69 | 76 | 65 | 80 | 74 | 6F | 80 | 70 | 6F | 77 | 65 | 72 |
| 0E370 | 80 | 6D | 61 | 74 | 68 | 20 | 75 | 6E | 64 | 65 | 72 | 66 | 6C | 6F | 77 | 80 | 73 | 74 | 61 | 63 | 6B | 80 | 6E | 6F |
| 0E388 | 20 | 72 | 6F | 6F | 6D | 20 | 69 | 6E | 80 | 69 | 73 | 20 | 69 | 6E | 76 | 61 | 6C | 69 | 64 | 80 | 61 | 6C | 6C | 6F |
| 0E3A0 | 63 | 61 | 74 | 6F | 72 | 20 | 69 | 6E | 74 | 65 | 72 | 72 | 75 | 70 | 74 | 65 | 64 | 80 | 68 | 65 | 61 | 70 | 80 | 6E |
| 0E3B8 | 6F | 6E | 2D | 70 | 6F | 73 | 69 | 74 | 69 | 76 | 65 | 80 | 33 | 08 | 11 | 00 | BB | F5 | 00 | E9 | 2E | 01 | 34 | 0A |
| 0E3D0 | 11 | 00 | BB | FF | 00 | E9 | 24 | 01 | 64 | 20 | 11 | 00 | BB | 09 | 01 | E9 | 1A | 01 | C8 | 25 | 11 | 00 | BB | 13 |
| 0E3E8 | 01 | E9 | 10 | 01 | 35 | 08 | 32 | 00 | BB | 1D | 01 | E9 | 06 | 01 | 36 | 0A | 32 | 00 | BB | 27 | 01 | E9 | FC | 00 |
| 0E400 | 65 | 20 | 32 | 00 | BB | 31 | 01 | E9 | F2 | 00 | C9 | 25 | 32 | 00 | BB | 3B | 01 | E9 | E8 | 00 | 66 | 40 | 4B | 54 |
| 0E418 | 00 | BB | 45 | 01 | E9 | DD | 00 | 67 | 5A | 4B | 54 | 00 | BB | 50 | 01 | E9 | D2 | 00 | 68 | 5E | 63 | 90 | 4B | 00 |
| 0E430 | BB | 5B | 01 | E9 | C6 | 00 | 69 | 66 | 63 | E8 | 4B | 00 | BB | 67 | 01 | E9 | BA | 00 | 6A | 69 | 4B | 54 | 00 | BB |
| 0E448 | 73 | 01 | E9 | AF | 00 | 83 | 01 | 4B | 1B | 00 | BB | 7E | 01 | E9 | A4 | 00 | 84 | 79 | 63 | 20 | 8A | 00 | BB | 89 |
| 0E460 | 01 | E9 | 98 | 00 | 85 | 90 | 20 | 99 | 20 | 9C | 00 | BB | 95 | 01 | E9 | 8B | 00 | 54 | 2A | 1B | 99 | 90 | 9C | 00 |

| | | | | | | | | | | | | | | | | | |
|---|---|---|---|---|---|---|---|---|---|---|---|---|---|---|---|---|---|
| 0E478 | BB | A2 | 01 | EB | 7F | 90 | EA | 25 | 99 | 90 | 9C | 00 | BB | AF | 01 | EB | 73 | 90 | 86 | 20 | 1B | 99 | 90 | 9C |
| 0E490 | 00 | BB | BB | 01 | EB | 66 | 90 | 87 | 20 | A2 | 00 | BB | C8 | 01 | EB | 5C | 90 | 00 | B1 | 37 | 00 | BB | D2 | 01 |
| 0E4A8 | EB | 52 | 90 | 91 | 20 | B1 | 37 | 00 | BB | DC | 01 | EB | 47 | 90 | 01 | B7 | E3 | 00 | BB | E7 | 01 | EB | 3D | 90 |
| 0E4C0 | 02 | E3 | C2 | 00 | BB | F1 | 01 | EB | 33 | 90 | 03 | E3 | CD | 00 | BB | FB | 01 | EB | 29 | 90 | BB | 40 | E9 | B2 |
| 0E4D8 | 88 | EB | 53 | 90 | BB | 72 | E9 | B2 | 89 | EB | 4B | 90 | BB | 8F | E9 | B2 | 8A | EB | 43 | 90 | BB | A6 | E9 | B2 |
| 0E4F0 | 8B | EB | 3B | 90 | BB | BA | E9 | B2 | 8C | EB | 33 | 90 | BF | F9 | E9 | 2E | 8A | 17 | 1E | 07 | FC | 43 | 2E | 8A |
| 0E508 | 07 | 32 | E4 | BE | 00 | 00 | 03 | F0 | EB | 02 | 90 | AA | 2E | AC | 3C | 80 | 72 | F9 | 74 | 03 | EB | 06 | 90 | B0 |
| 0E520 | 20 | AA | EB | E1 | 8B | C7 | BB | F8 | E9 | 2B | C3 | 48 | 88 | 07 | 8A | 07 | 98 | 50 | 53 | B6 | 00 | 81 | C2 | D0 |
| 0E538 | 07 | 52 | 33 | C0 | 50 | 9A | A3 | 00 | CC | 0C | CB | 00 | E8 | 00 | 0B | 02 | 00 | 8B | 76 | 06 | 8B | 44 | 2A | 89 |
| 0E550 | 46 | FE | 8B | 46 | FE | 8B | E5 | 5D | CA | 02 | 00 | E8 | E9 | 0A | 06 | 00 | 8B | 46 | 06 | 89 | 46 | FE | 8B | 76 |
| 0E568 | FE | 8B | 44 | 0F | D1 | E8 | 73 | 2D | 8B | 44 | 30 | 3B | 44 | 2E | 7C | 25 | FF | 74 | 2A | 99 | 89 | 46 | FA | 89 |
| 0E580 | 56 | FC | 8B | 44 | 2E | 99 | 2B | 46 | FA | 1B | 56 | FC | 05 | FF | FF | 83 | D2 | FF | 52 | 50 | B8 | 01 | 00 | 50 |
| 0E598 | 9A | 5A | 00 | 17 | 0D | 8B | 76 | FE | C7 | 44 | 2E | 01 | 00 | C7 | 44 | 30 | 00 | 00 | 8B | E5 | 5D | CA | 02 | 00 |
| 0E5B0 | E8 | 94 | 0A | 0A | 00 | 8B | 46 | 06 | 89 | 46 | F6 | 50 | 9A | 1C | 00 | F4 | 0B | 8B | 76 | F6 | C6 | 44 | 25 | 01 |
| 0E5C8 | FF | 74 | 2A | 33 | C0 | 33 | D2 | 52 | 50 | B8 | 01 | 00 | 50 | 9A | 5A | 00 | 17 | 0D | 89 | 46 | FA | 89 | 56 | FC |
| 0E5E0 | 8B | 46 | FA | 8B | 56 | FC | 2D | 00 | 00 | 83 | DA | 00 | 7C | 16 | 8B | 76 | F6 | FF | 74 | 2A | 8D | 46 | F8 | 50 |
| 0E5F8 | 33 | C0 | 50 | 9A | 51 | 00 | 17 | 0D | 0B | C0 | 7D | 08 | FF | 76 | 06 | 9A | CF | 0A | F4 | 0B | 8B | 76 | F6 | 80 |
| 0E610 | 7C | 01 | 00 | B8 | 00 | 00 | 74 | 01 | 40 | 32 | E4 | 89 | 46 | FE | 8B | 46 | FE | 8B | E5 | 5D | CA | 02 | 00 | E8 |
| 0E628 | 1D | 0A | 12 | 00 | C6 | 46 | FE | 01 | 8B | 46 | 06 | 89 | 46 | F0 | 8B | 76 | F0 | C6 | 44 | 2C | 00 | 8B | 44 | 28 |
| 0E640 | 48 | 89 | 46 | F8 | 8B | 74 | 26 | 03 | 76 | F8 | 80 | 7C | FF | 3A | 75 | 05 | FF | 4E | F8 | EB | 29 | 8B | 46 | F8 |
| 0E658 | 89 | 46 | F2 | 83 | 7E | F2 | 00 | 7C | 1D | 8B | 76 | F0 | 8B | 74 | 26 | 03 | 76 | F2 | 80 | 7C | FF | 2E | 75 | 09 |
| 0E670 | 8B | 46 | F2 | 48 | 89 | 46 | F8 | EB | 05 | FF | 4E | F2 | EB | DD | 83 | 7E | F8 | 00 | 7F | 03 | E9 | AA | 00 | 83 |
| 0E688 | 7E | F8 | 04 | 7E | 03 | E9 | A1 | 00 | 8D | 7E | F4 | BE | 37 | FF | 1E | 07 | FC | A5 | A5 | 8B | 46 | F8 | 89 | 46 |
| 0E6A0 | EE | 83 | 7E | EE | 01 | 7C | 3B | C7 | 46 | FA | 01 | 00 | 8B | 76 | F0 | 8B | 74 | 26 | 03 | 76 | FA | 8B | 44 | FF |
| 0E6B8 | 88 | 46 | FC | 80 | 7E | FC | 61 | 72 | 0B | 8B | 46 | FC | 32 | E4 | 05 | E0 | FF | 88 | 46 | FC | 8B | 76 | FA | 8B |
| 0E6D0 | 46 | FC | 88 | 42 | F3 | 8B | 46 | FA | 40 | 89 | 46 | FA | 48 | 3B | 46 | EE | 75 | CA | C7 | 46 | FA | 00 | 00 | 8B |
| 0E6E8 | 76 | FA | D1 | E6 | D1 | E6 | D1 | E6 | 8B | D6 | 81 | C6 | 7A | EA | B9 | 04 | 00 | 8D | 7E | F4 | 1E | 07 | FC | F3 |
| 0E700 | A6 | 75 | 22 | 8B | 76 | F0 | 8B | 44 | 0F | 32 | E4 | D1 | E0 | 03 | C2 | 97 | 8B | 85 | 7E | EA | 89 | 44 | 2A | C6 |
| 0E718 | 44 | 2C | 01 | C6 | 44 | 08 | 01 | C6 | 46 | FE | 00 | EB | 0C | 8B | 46 | FA | 40 | 89 | 46 | FA | 3D | 06 | 00 | 75 |
| 0E730 | B6 | 8B | 46 | FE | 8B | E5 | 5D | CA | 02 | 00 | E8 | 0A | 09 | 04 | 00 | 8B | 76 | 06 | 8B | 44 | 2D | D1 | E8 | 72 |
| 0E748 | 09 | 8B | 44 | 26 | 3B | 06 | 3C | FF | 75 | 0F | 8B | 76 | 06 | C6 | 44 | 01 | 07 | C7 | 44 | 04 | 03 | 04 | E9 | B1 |
| 0E760 | 00 | FF | 76 | 06 | 9A | E8 | 00 | F4 | 0B | D1 | E8 | 72 | 03 | E9 | A2 | 00 | 8B | 76 | 06 | 8B | 44 | 0E | D1 | E8 |
| 0E778 | 73 | 2E | FF | 74 | 26 | B8 | 02 | 00 | 50 | 9A | 15 | 00 | 17 | 0D | 8B | 76 | 06 | 89 | 44 | 2A | 8B | 76 | 06 | 83 |
| 0E790 | 7C | 2A | 00 | 7D | 11 | FF | 74 | 26 | 33 | C0 | 50 | 9A | 15 | 00 | 17 | 0D | 8B | 76 | 06 | 89 | 44 | 2A | EB | 6A |
| 0E7A8 | 8B | 76 | 06 | 80 | 7C | 08 | 02 | 75 | 20 | FF | 74 | 26 | B8 | 02 | 00 | 50 | 9A | 15 | 00 | 17 | 0D | 8B | 76 | 06 |
| 0E7C0 | 89 | 44 | 2A | 8B | 76 | 06 | 83 | 7C | 2A | 00 | 7D | 03 | E9 | 02 | 00 | EB | 41 | 8B | 76 | 06 | FF | 74 | 26 | 33 |
| 0E7D8 | C0 | 50 | 9A | 39 | 00 | 17 | 0D | 8B | 76 | 06 | 89 | 44 | 2A | 8B | 76 | 06 | 83 | 7C | 2A | 00 | 7C | 24 | FF | 74 |
| 0E7F0 | 2A | 9A | 32 | 00 | 17 | 0D | 0B | C0 | 7D | 03 | E9 | 70 | 00 | 8B | 76 | 06 | FF | 74 | 26 | B8 | 02 | 00 | 50 | 9A |
| 0E808 | 15 | 00 | 17 | 0D | 8B | 76 | 06 | 89 | 44 | 2A | 8B | 76 | 06 | 83 | 7C | 2A | 00 | 7C | 49 | 8B | 44 | 09 | D1 | E8 |
| 0E820 | 72 | 42 | 80 | 7C | 08 | 01 | 75 | 3C | FF | 74 | 2A | 8D | 46 | FC | 50 | 33 | C0 | 50 | 9A | 04 | 00 | 17 | 0D | 0B |
| 0E838 | C0 | 7D | 03 | E9 | 2F | 00 | 8B | 46 | FC | 0D | 20 | 00 | 25 | FF | 00 | 89 | 46 | FC | 8B | 76 | 06 | FF | 74 | 2A |
| 0E850 | 8D | 46 | FC | 50 | B8 | 01 | 00 | 50 | 9A | 04 | 00 | 17 | 0D | 0B | C0 | 7D | 03 | E9 | 09 | 00 | 8B | 76 | 06 | 83 |
| 0E868 | 7C | 2A | 00 | 7D | 19 | FF | 76 | 06 | 9A | CF | 0A | F4 | 0B | 8B | 76 | 06 | 83 | 7C | 2A | 00 | 7C | 08 | FF | 74 |
| 0E880 | 2A | 9A | 32 | 00 | 17 | 0D | 8B | 76 | 06 | 8B | 44 | 01 | 32 | E4 | 89 | 46 | FE | C7 | 44 | 22 | 00 | 00 | C6 | 44 |
| 0E898 | 0C | 00 | C6 | 44 | 24 | 01 | C6 | 44 | 32 | 00 | 8B | 44 | 0F | 34 | 01 | 88 | 44 | 25 | C6 | 44 | 21 | 01 | 8B | 46 |
| 0E8B0 | FE | 8B | E5 | 5D | CA | 02 | 00 | E8 | 8D | 07 | 06 | 00 | FF | 76 | 06 | 9A | 1C | 00 | F4 | 0B | 8B | 46 | 06 | 89 |
| 0E8C8 | 46 | FA | 8B | 76 | FA | 8B | 4C | 09 | D1 | E9 | 72 | 40 | 80 | 7C | 08 | 01 | 75 | 3A | 96 | FF | 74 | 2A | 8D | 46 |
| 0E8E0 | FC | 50 | 33 | C0 | 50 | 9A | 04 | 00 | 17 | 0D | 0B | C0 | 7D | 03 | E9 | 82 | 00 | 8B | 46 | FC | 25 | DF | 00 | 89 |
| 0E8F8 | 46 | FC | 8B | 76 | 06 | FF | 74 | 2A | 8D | 46 | FC | 50 | B8 | 01 | 00 | 50 | 9A | 04 | 00 | 17 | 0D | 0B | C0 | 7D |
| 0E910 | 03 | E9 | 5F | 00 | 8B | 76 | FA | 8B | 44 | 0F | D1 | E8 | 72 | 3F | 8B | 44 | 0C | D1 | E8 | 73 | 19 | 80 | 7C | 08 |
| 0E928 | 01 | 75 | 13 | FF | 76 | 06 | B8 | 20 | 00 | 50 | 9A | DE | 07 | F4 | 0B | 23 | C0 | 74 | 03 | E9 | 3D | 00 | 8B | 76 |
| 0E940 | FA | 80 | 7C | 08 | 00 | 75 | 16 | 8B | 44 | 09 | D1 | E8 | 73 | 0F | FF | 76 | 06 | 9A | 71 | 00 | F4 | 0B | 23 | C0 |
| 0E958 | 74 | 03 | E9 | 1E | 00 | 8B | 76 | FA | 8B | 44 | 2C | D1 | E8 | 72 | 14 | FF | 74 | 2A | 9A | 32 | 00 | 17 | 0D | 0B |
| 0E970 | C0 | 7D | 08 | FF | 76 | 06 | 9A | CF | 0A | F4 | 0B | 8B | 76 | FA | 8B | 44 | 01 | 32 | E4 | 89 | 46 | FE | 8B | 46 |
| 0E988 | FE | 8B | E5 | 5D | CA | 02 | 00 | E8 | B5 | 06 | 02 | 00 | FF | 76 | 06 | 9A | 78 | 03 | F4 | 0B | 23 | C0 | 75 | 0F |
| 0E9A0 | 8B | 76 | 06 | FF | 74 | 26 | 9A | 41 | 00 | 17 | 0D | 23 | C0 | 74 | 08 | FF | 76 | 06 | 9A | CF | 0A | F4 | 0B | 8B |
| 0E9B8 | 76 | 06 | 8B | 44 | 01 | 32 | E4 | 89 | 46 | FE | 8B | 46 | FE | 8B | E5 | 5D | CA | 02 | 00 | E8 | 79 | 06 | 02 | 00 |
| 0E9D0 | 8B | 46 | 04 | 89 | 46 | FE | 8B | 76 | FE | C7 | 44 | 2E | 01 | 00 | 80 | 7C | 08 | 01 | 75 | 19 | FF | 74 | 2A | 83 |
| 0E9E8 | C6 | 34 | 96 | 50 | B8 | 01 | 00 | 50 | 9A | 48 | 00 | 17 | 0D | 8B | 76 | FE | 89 | 44 | 30 | EB | 1A | 8B | 76 | FE |
| 0EA00 | FF | 74 | 2A | 83 | C6 | 34 | 96 | 50 | B8 | 00 | 02 | 50 | 9A | 48 | 00 | 17 | 0D | 8B | 76 | FE | 89 | 44 | 30 | 8B |
| 0EA18 | E5 | 5D | C2 | 02 | 00 | E8 | 27 | 06 | 08 | 00 | 8B | 46 | 0C | 89 | 46 | F8 | 8B | 76 | F8 | C7 | 44 | 22 | 00 | 00 |
| 0EA30 | 8B | 44 | 25 | D1 | E8 | 73 | 03 | E9 | AA | 01 | 83 | 7E | 0A | 00 | 75 | 03 | E9 | A1 | 01 | 8B | 44 | 09 | D1 | E8 |
| 0EA48 | 72 | 7B | 83 | 7E | 0A | 00 | 76 | 65 | 8B | 76 | F8 | 8B | 44 | 2E | 3B | 44 | 30 | 7E | 06 | FF | 76 | 0C | E8 | 6A |
| 0EA60 | FF | 8B | 76 | F8 | 8B | 44 | 30 | 3B | 44 | 2E | 7C | 45 | 2B | 44 | 2E | 40 | 89 | 46 | FC | 8B | 46 | FC | 3B | 46 |
| 0EA78 | 0A | 76 | 06 | 8B | 46 | 0A | 89 | 46 | FC | 8B | 76 | F8 | 8B | 44 | 2E | 05 | 33 | 00 | 03 | C6 | 1E | 50 | 8B | 44 |
| 0EA90 | 22 | C4 | 5E | 06 | 03 | D8 | 06 | 53 | FF | 76 | FC | 9A | 97 | 00 | EE | 09 | 8B | 46 | FC | 8B | 76 | F8 | 01 | 44 |
| 0EAA8 | 22 | 01 | 44 | 2E | 29 | 46 | 0A | EB | 02 | EB | 02 | EB | 95 | 8B | 76 | F8 | 83 | 7C | 22 | 00 | 75 | 04 | C6 | 44 |

```
0EAC0  25 01 E9 1F 01 8B 76 F8 8B 44 32 0A 44 25 88 44 25 C6 44 32 00 8B 44 25
0EAD8  D1 E8 73 0B 8B 44 01 32 E4 89 46 FE E9 1E 01 8B 76 F8 C6 44 24 00 8B 76
0EAF0  F8 8B 44 22 3B 46 0A 72 03 E9 E8 00 8B 44 2E 3B 44 30 7E 26 FF 76 0C E8
0EB08  C1 FE 8B 76 F8 8B 44 2E 3B 44 30 7E 15 C6 44 24 01 8B 44 14 03 44 22 23
0EB20  C0 75 04 C6 44 25 01 E9 BA 00 8B 76 F8 8B 7C 2E 03 FE 8B 45 33 88 46 FA
0EB38  80 7E FA 1A 75 1E C6 44 24 01 8B 44 14 03 44 22 23 C0 75 06 C6 44 25 01
0EB50  EB 07 8B 76 F8 C6 44 32 01 E9 88 00 80 7E FA 0D 75 4A 8B 76 F8 8B 44 2E
0EB68  3B 44 30 75 0E FF 76 0C E8 58 FE 8B 76 F8 C7 44 2E 00 00 8B 76 F8 83 7C
0EB80  30 00 7E 18 03 74 2E 80 7C 34 0A 75 0D 8B 76 F8 C6 44 24 01 83 44 2E 02
0EB98  EB 4A EB 0E 8B 76 F8 83 7C 2E 00 75 05 C7 44 2E 01 00 EB 19 80 7E FA 1A
0EBB0  75 13 8B 76 F8 C6 44 24 01 83 7C 22 00 75 04 C6 44 25 01 EB 1F 8B 46 FA
0EBC8  32 E4 8B 76 F8 8B 4C 22 C4 5E 06 03 D9 26 88 07 8B 76 F8 FF 44 22 FF 44
0EBE0  2E E9 0A FF 8B 76 F8 83 7C 30 00 7D 0D C7 44 22 00 00 FF 76 0C 9A CF 0A
0EBF8  F4 0B 8B 76 F8 8B 44 01 32 E4 89 46 FE 8B 46 FE 8B E5 5D CA 08 00 E8 36
0EC10  04 02 01 8B 46 0C 89 86 FE FE 8B B6 FE FE 8B 44 09 D1 E8 73 0A 80 7C 08
0EC28  02 74 04 C6 44 24 00 8B B6 FE FE C7 44 22 00 00 81 7E 0A FA 00 77 08 8B
0EC40  46 0A 89 46 FA EB 05 C7 46 FA FA 00 8B B6 FE FE 8B 44 22 C4 5E 06 03 D8
0EC58  06 53 8D 86 00 FF 1E 50 FF 76 FA 9A 97 00 EE 09 8B B6 FE FE FF 74 2A 8D
0EC70  86 00 FF 50 FF 76 FA 9A 51 00 17 0D 89 46 FC 8B 46 FC 3B 46 FA 74 1E 0B
0EC88  C0 7C 0F 8B B6 FE FE C7 44 04 04 04 C6 44 01 08 EB 08 FF 76 0C 9A CF 0A
0ECA0  F4 0B E9 18 00 8B 46 FA 8B B6 FE FE 01 44 22 81 46 0A 06 FF 83 7E 0A 00
0ECB8  7E 03 E9 7B FF 8B B6 FE FE 8B 44 01 32 E4 89 46 FE 8B 46 FE 8B E5 5D CA
0ECD0  08 00 E8 72 03 04 00 8B 46 06 89 46 FC 8B 76 FC 8B 4C 09 D1 E9 73 2D 80
0ECE8  7C 08 01 74 14 50 B8 02 00 50 B8 41 FF 1E 50 9A CF 06 F4 0B 89 46 FE EB
0ED00  0C 8B 76 FC C6 44 0C 01 C7 46 FE 00 00 8B 76 FC C6 44 24 01 8B 46 FE 8B
0ED18  E5 5D CA 02 00 E8 27 03 08 00 C7 46 FE 00 00 8B 76 08 80 7C 08 01 74 03
0ED30  E9 8C 00 8B 44 09 D1 E8 72 03 E9 82 00 C7 46 FC 02 00 BB 45 FF 1E 07 89
0ED48  5E F8 8C 46 FA 8B 5E 06 32 FF EB 2D C7 46 FC 01 00 EB 45 BB 49 FF 1E 07
0ED60  89 5E F8 8C 46 FA C7 46 FC 03 00 EB 33 BB 4D FF 1E 07 89 5E F8 8C 46 FA
0ED78  C7 46 FC 06 00 EB 21 EB 1F 83 FB 31 77 F9 83 EB 2B 72 F4 D1 E3 2E FF A7
0ED90  53 08 15 08 40 08 40 08 40 08 40 08 1C 08 2E 08 FF 76 08 FF 76 FC FF 76
0EDA8  FA FF 76 F8 9A CF 06 F4 0B 89 46 FE 8B 76 08 C6 44 24 00 C6 44 0C 00 8B
0EDC0  46 FE 8B E5 5D CA 04 00 E8 7C 02 0C 00 8B 46 0A 89 46 F8 8B 76 F8 C7 44
0EDD8  30 00 00 8B 56 06 8B 46 08 05 FF FF 83 D2 FF 89 46 FA 89 56 FC FF 76 FC
0EDF0  FF 76 FA B8 02 00 33 D2 52 50 8B 44 09 32 E4 99 9A CB 00 25 0D 8B 76 F8
0EE08  89 46 F4 89 56 F6 8B 44 0A 99 03 46 F4 13 56 F6 52 50 8D 46 FA 50 9A 9E
0EE20  01 25 0D D1 E8 72 0E 8B 76 F8 C6 44 01 03 C7 44 04 FF 03 EB 3D 8B 76 F8
0EE38  FF 74 2A FF 76 FC FF 76 FA 33 C0 50 9A 5A 00 17 0D 2D 00 00 83 DA 00 7C
0EE50  19 8B 76 F8 8B 46 08 89 44 10 8B 46 06 89 44 12 C6 44 32 00 C6 44 25 00
0EE68  EB 08 FF 76 0A 9A CF 0A F4 0B 8B 76 F8 8B 44 01 32 E4 89 46 FE 8B 46 FE
0EE80  8B E5 5D CA 06 00 E8 BE 01 04 00 8B 76 0C 8B 44 26 3B 06 54 FF 75 07 C7
0EE98  46 FE 00 00 EB 34 8B 76 0C 8B 44 28 48 89 46 FC 8B 46 FC 3B 46 0A 76 06
0EEB0  8B 46 0A 89 46 FC 8B 76 0C 8B 44 26 1E 50 FF 76 08 FF 76 06 FF 76 FC 9A
0EEC8  97 00 EE 09 8B 46 FC 89 46 FE 8B 46 FE 8B E5 5D CA 08 00 E8 69 01 04 00
0EEE0  8B 46 0C 89 46 FC 8B 76 FC C6 44 2D 00 8B 44 26 3B 06 58 FF 74 09 83 C6
0EEF8  26 8B 34 80 4C FE 01 83 7E 0A 00 76 14 8B 76 0A 4E C4 5E 06 26 8B 00 3C
0EF10  20 75 06 83 46 0A FF EB E6 C7 46 FE 00 00 8B 46 0A 3B 46 FE 76 29 8B 76
0EF28  FE C4 5E 06 26 8B 00 32 E4 50 B8 1F 00 50 B8 3A EA 50 9A F1 02 EE 09 D1
0EF40  E8 72 07 8B 76 FC C6 44 2D 01 FF 46 FE EB CF 83 7E 0A 00 76 3F 8B 76 FC
0EF58  8B 46 0A 40 89 44 28 8B 44 28 40 25 FE FF 50 9A 35 01 B2 0C 8B 76 FC 89
0EF70  44 26 FF 76 08 FF 76 06 8B 76 FC 8B 44 26 1E 50 FF 76 0A 9A 97 00 EE 09
0EF88  8B 76 0C 8B 74 26 03 76 0A C6 04 00 8B E5 5D CA 08 00 E8 AA 00 06 00 C7
0EFA0  46 FE 01 00 F6 06 AA EA 01 74 5A C6 06 AA EA 00 C7 46 FE 00 00 A1 BE E8
0EFB8  89 46 FC C7 46 FA 80 00 8B 76 06 C4 5E FA 26 8B 07 0A C0 B9 00 00 74 01
0EFD0  41 91 32 E4 26 8B 0F 91 32 E4 2B C1 88 04 26 8B 07 32 E4 3B 46 08 77 18
0EFE8  83 C3 02 06 53 46 96 1E 50 8B 76 06 8B 04 32 E4 50 9A 97 00 EE 09 EB 05
0F000  C7 46 FE 01 00 8B 46 FE 8B E5 5D CA 08 00 E8 36 00 00 00 8B 76 06 8B 3E
0F018  40 EB 8B 85 AC EA 32 E4 88 44 01 A1 40 EB 05 06 04 89 44 04 A1 40 EB 89
0F030  44 06 C7 06 40 EB 00 00 8B E5 5D CA 02 00 E8 06 00 04 00 8B E5 5D CB 5E
0F048  2E 8B 0C 46 46 55 8B EC 2B E9 72 06 3B 2E AC E8 77 06 56 9A BC 01 EE 09
0F060  8B E5 03 E9 FF E6 00 00 E8 9E 00 00 00 8B 76 06 C6 44 21 01 8B E5 5D CA
0F078  02 00 E8 8C 00 00 00 8B 76 06 81 C6 7A 02 96 8B 76 06 89 44 18 A1 5E FF
0F090  8B 16 60 FF 89 44 26 89 54 28 C7 44 2E 01 00 C7 44 30 00 00 8B E5 5D CA
0F0A8  02 00 E8 5C 00 0A 00 8D 7E F6 BE 63 FF 1E 07 FC A5 A5 A5 A5 8D 46 F6 50
0F0C0  B8 02 00 50 9A 15 00 17 0D 89 46 FE 83 7E FE 00 7C 11 8B 46 FD 32 E4 40
```

```
0F0D8   88 46 FD FF 76 FE 9A 32 00 17 0D 83 7E FE 00 7D D3 FF 76 06 B8 08 00 50
0F0F0   8D 46 F6 1E 50 9A 9C 09 F4 0B 8B E5 5D CA 02 00 E8 06 00 04 00 8B E5 5D
0F108   CB 5E 2E 8B 0C 46 46 55 8B EC 2B E9 72 06 3B 2E AC E8 77 06 56 9A BC 01
0F120   EE 09 8B E5 03 E9 FF E6 00 00 E8 7D 01 02 00 C7 06 E8 EA 00 00 C7 06 EE
0F138   EA 00 00 8B 46 06 40 25 FE FF 89 46 06 A1 A6 E8 3B 06 A8 E8 72 03 E9 9F
0F150   00 8B 36 A6 E8 8B 04 A3 EC EA A1 A8 E8 2B 06 A6 E8 3B 06 EC EA 77 08 C7
0F168   46 FE 01 00 E9 DC 00 A1 EC EA 25 01 00 75 0E A1 EC EA A3 EA EA C7 06 E8
0F180   EA 00 00 EB 5F 83 3E E8 EA 00 74 13 A1 EC EA 03 06 EA EA 40 A3 EA EA A1
0F198   E8 EA A3 A6 E8 EB 07 A1 EC EA 48 A3 EA EA A1 EA EA 3B 46 06 73 08 A1 A6
0F1B0   E8 A3 E8 EA EB 2E A1 A6 E8 40 40 89 46 FE 8B 46 06 8B 36 A6 E8 89 04 8B
0F1C8   46 FE 03 46 06 A3 A6 E8 A1 EA EA 3B 46 06 76 0A 2B 46 06 48 8B 36 A6 E8
0F1E0   89 04 EB 67 A1 EA EA 03 06 A6 E8 40 40 A3 A6 E8 A1 A8 E8 3B 06 A6 E8 75
0F1F8   4F 83 3E EE EA 02 75 07 C7 46 FE 00 00 EB 44 83 3E E8 EA 00 74 0F FF 36
0F210   E8 EA 9A 05 00 41 0D A1 A8 E8 A3 A6 E8 83 3E EE EA 01 75 0D 8B 46 06 40
0F228   40 50 9A 1F 00 41 0D A1 A8 E8 3B 06 A6 E8 75 06 A1 A4 E8 A3 A6 E8 FF 06
0F240   EE EA C7 06 E8 EA 00 00 E9 FA FE 8B 46 FE 8B E5 5D CA 02 00 E8 53 00 02
0F258   00 B8 04 00 50 9A 00 00 EE 09 FF 76 06 9A 0B 00 B2 0C 89 46 FE 83 7E FE
0F270   02 73 12 83 7E FE 00 75 07 9A EB 01 CD 0B EB 05 9A F5 01 CD 0B 9A 2D 00
0F288   EE 09 8B 46 FE 8B E5 5D CA 02 00 E8 14 00 04 00 B8 02 00 50 9A 00 00 EE
0F2A0   09 9A 2D 00 EE 09 8B E5 5D CB 5E 2E 8B 0C 46 46 55 8B EC 2B E9 72 06 3B
0F2B8   2E AC E8 77 06 56 9A BC 01 EE 09 8B E5 03 E9 FF E6 00 55 8B EC 81 EC 00
0F2D0   00 FF 76 08 1E FF 76 06 9A C3 00 EF 0C 8B E5 5D C2 06 00 55 8B EC 81 EC
0F2E8   08 00 83 3E F4 EA 10 75 0E 8D 7E F8 BE 71 FF 1E 07 FC A5 A5 A5 EB 0C 8D
0F300   7E F8 BE 77 FF 1E 07 FC A5 A5 A5 C7 46 FE 05 00 83 7E 06 00 74 2F 8B 76
0F318   FE 8B 46 06 33 D2 F7 36 F4 EA 83 C2 30 88 52 F7 80 7A F7 39 76 0B 8B 42
0F330   F7 32 E4 05 07 00 88 42 F7 8B 46 06 33 D2 F7 36 F4 EA 89 46 06 8B 46 FE
0F348   48 89 46 FE 75 C2 B8 05 00 50 8D 46 F8 50 FF 76 04 E8 6E FF 8B E5 5D C2
0F360   04 00 55 8B EC 81 EC 04 00 B8 0A 00 50 9A 00 00 EE 09 9A 2B 01 EF 0C B8
0F378   09 00 50 B8 7D FF 50 55 E8 47 FF 8B 76 0A 8B 04 32 E4 50 46 96 50 55 E8
0F390   38 FF 9A 2B 01 EF 0C B8 0C 00 50 B8 87 FF 50 55 E8 27 FF C7 06 F4 EA 0A
0F3A8   00 FF 76 08 55 E8 33 FF 83 7E 06 00 74 19 B8 09 00 50 B8 95 FF 50 55 E8
0F3C0   08 FF C7 06 F4 EA 10 00 FF 76 06 55 E8 14 FF 9A 2B 01 EF 0C 83 3E 90 E8
0F3D8   00 74 71 83 3E 92 E8 00 74 1A B8 06 00 50 B8 9F FF 50 55 E8 DC FE C7 06
0F3F0   F4 EA 0A 00 FF 36 92 E8 55 E8 E7 FE B8 04 00 50 B8 A7 FF 50 55 E8 C2 FE
0F408   8B 36 90 E8 8B 74 02 8B 44 04 32 E4 50 8B 36 90 E8 8B 44 02 05 05 00 50
0F420   55 E8 A6 FE B8 04 00 50 B8 AD FF 50 55 E8 9A FE 8B 36 90 E8 8B 34 8B 04
0F438   32 E4 50 8B 36 90 E8 8B 04 40 50 55 E8 83 FE 9A 2B 01 EF 0C 83 3E 9A E8
0F450   00 74 7A C7 06 F4 EA 10 00 B8 04 00 50 B8 B3 FF 50 55 E8 65 FE FF 36 A0
0F468   E8 55 E8 76 FE B8 01 00 50 B8 B9 FF 50 55 E8 51 FE FF 36 9E E8 55 E8 62
0F480   FE B8 06 00 50 B8 BB FF 50 55 E8 3D FE BB 92 E8 1E 07 89 5E FC 8C 46 FE
0F498   8C C3 93 50 55 E8 43 FE B8 06 00 50 B8 C3 FF 50 55 E8 1E FE FF 36 9C E8
0F4B0   55 E8 2F FE B8 06 00 50 B8 CB FF 50 55 E8 0A FE FF 36 9A E8 55 E8 1B FE
0F4C8   9A 2B 01 EF 0C 9A 34 01 36 0B 9A 2D 00 EE 09 8B E5 5D CA 08 00 55 8B EC
0F4E0   81 EC 04 00 B8 02 00 50 9A 00 00 EE 09 9A 2D 00 EE 09 8B E5 5D CB 00 00
0F4F8   E8 42 01 00 00 B8 30 00 50 33 C0 50 9A 5F 01 36 0B 3C 02 73 12 B8 09 00
0F510   50 B8 D5 FF 50 9A 5F 01 36 0B 9A 34 01 36 0B 8B E5 5D CB E8 17 01 00 00
0F528   8B E5 5D CB E8 0E 01 0A 00 C7 46 F8 00 00 C6 46 FA 0A 8B 46 FA 88 46 FC
0F540   33 C0 50 8D 46 FA 50 B8 01 00 50 9A 48 00 17 0D 89 46 F6 83 7E F6 00 7F
0F558   02 EB 3D 80 7E FC 0D 75 1C 80 7E FA 0A 75 16 8B 46 F8 3B 46 0A 76 08 8B
0F570   46 0A 89 46 F8 EB 04 83 46 F8 FF EB 1B 8B 46 0A 3B 46 F8 76 0E 8B 46 FA
0F588   32 E4 C4 5E 06 03 5E F8 26 88 07 FF 46 F8 EB A2 8B 46 F8 89 46 FE 83 7E
0F5A0   F6 00 7D 05 C7 46 FE 00 00 8B 46 FE 8B E5 5D CA 06 00 E8 88 00 FE 00 C7
0F5B8   46 FE 00 00 81 7E 0A FA 00 77 08 8B 46 0A 89 46 FC EB 05 C7 46 FC FA 00
0F5D0   C4 5E 06 03 5E FE 06 53 8D 86 02 FF 1E 50 FF 76 FC 9A 97 00 EE 09 B8 01
0F5E8   00 50 8D 86 02 FF 50 FF 76 FC 9A 51 00 17 0D 0B C0 7D 02 EB 17 81 46 FE
0F600   FA 00 81 46 0A 06 FF 83 7E 0A 00 74 07 81 7E 0A FF 7F 76 A8 8B E5 5D CA
0F618   06 00 E8 20 00 00 00 B8 01 00 50 B8 ED FF 50 B8 02 00 50 9A 51 00 17 0D
0F630   8B E5 5D CB E8 06 00 04 00 8B E5 5D CB 5E 2E 8B 0C 46 46 55 8B EC 2B E9
0F648   72 06 3B 2E AC E8 77 06 56 9A BC 01 EE 09 8B E5 03 E9 FF E6 00 00 E8 18
0F660   00 00 00 8B E5 5D CB E8 0F 00 00 00 8B E5 5D CB E8 06 00 04 00 8B E5 5D
0F678   CB 5E 2E 8B 0C 46 46 55 8B EC 2B E9 72 06 3B 2E AC E8 77 06 56 9A BC 01
0F690   EE 09 8B E5 03 E9 FF E6 00 00 FF 76 06 A8 00 00 00 8B 76 06 8B 04 50 9A 50 04 F4 0B EB
0F6A8   34 8B 44 1A D1 E8 73 11 C6 44 01 00 8B 76 06 8B 04 50 9A 50 04 F4 0B EB
0F6C0   47 8B 76 06 8B 34 8B 44 09 D1 E8 73 30 8B 44 24 D1 E8 72 29 8B 44 0F D1
0F6D8   E8 72 22 80 7C 08 00 75 1C 80 7C 01 00 75 16 96 50 9A 93 07 F4 0B 8B 76
0F6F0   06 8B 04 50 B8 20 00 50 9A DE 07 F4 0B 8B 76 06 8B 04 50 9A 78 03 F4 0B
0F708   8B 76 06 8B 3C 8B 45 16 89 04 EB 8B 8B E5 5D C2 04 00 E8 28 00 00 00 B8
```

```
0F720  96 E8 50 55 E8 73 FF B8 98 E8 50 55 E8 6B FF 8B E5 5D CB E8 0F 00 00 00
0F738  8B E5 5D CB E8 06 00 04 00 8B E5 5D CB 5E 2E 8B 0C 46 46 55 8B EC 2B E9
0F750  72 06 3B 2E AC E8 77 06 56 9A BC 01 EE 09 8B E5 03 E9 FF E6 00 00 00 00
0F768  00 00 00 00 00 00 00 40 EB E5 01 5F 5E 58 8B 4B 8B 17 55 8B EC 87 5E 02 5D
0F780  B4 44 EB 56 5F 5E 58 8B 1E 42 EB D1 E3 D1 E3 D1 E3 D1 E3 0B C3 C7 06 42
0F798  EB 00 00 5A B4 3D EB 58 CB 5F 5E 5B B4 3E EB 3D 5F 5E 59 5A B4 3C EB 48
0F7B0  5F 5E 5A B4 41 EB 2E 5F 5E 59 5A 5B B4 3F EB 38 5F 5E 59 5A 5B B4 40 EB
0F7C8  2F 5F 5E 58 5A 59 5B B4 42 EB 25 5F 5E 58 B4 4C CD 21 CD 21 5B 89 17 72
0F7E0  0C 33 C0 EB 17 CD 21 72 04 33 C0 EB 0F A3 40 EB B8 FF FF 8B D0 56 57 CB
0F7F8  CD 21 72 F1 33 DB 89 1E 40 EB 56 57 CB 50 33 C0 B4 30 CD 21 58 CB 8B C7
0F810  5B 5B 5B 5B 5B 59 5A 5E 5F 5D 1F 07 FB 9A 96 00 17 0D F9 CF 06 53 B8 24
0F828  35 CD 21 89 1E 48 EB 8C 06 4A EB 5B 07 CB 1E 52 C5 16 48 EB EB 06 1E 52
0F840  C5 16 44 EB B8 24 25 CD 21 5A 1F CB 00 00 00 8B CA 97 99 3B F2 97 75 13
0F858  99 3B CA 75 0E F7 FF 0B C0 8B D8 8B C2 99 8B CA 93 99 C3 8B D1 BD FF FF
0F870  0B D2 7F 17 75 09 0B C0 75 11 8B CE 8B DF C3 F7 D0 F7 D2 05 01 00 83 D2
0F888  00 F7 DD 0B F6 7F 14 75 07 0B FF 74 C8 EB 0C 90 F7 D7 F7 D6 83 C7 01 83
0F8A0  D6 00 4D 55 33 C9 8B D9 BD 20 00 0B D2 75 04 92 83 ED 10 0A F6 75 09 86
0F8B8  F2 86 D4 86 E0 83 ED 08 0B F6 75 18 0B FF 78 14 83 ED 01 7C 2D D1 D0 D1
0F8D0  D2 D1 D3 3B DF 72 F1 2B DF 40 EB EC 83 ED 01 7C 19 D1 D0 D1 D2 D1 D3 D1
0F8E8  D1 3B CE 72 EF 77 04 3B DF 72 E9 2B DF 1B CE 40 EB E2 5D 0B ED 78 0A F7
0F900  D3 F7 D1 83 C3 01 83 D1 00 0B ED 7A 0A F7 D0 F7 D2 05 01 00 83 D2 00 0B
0F918  ED C3 55 8B EC 56 57 8B 76 08 8B 7E 06 8B EA 0B D2 79 0A F7 D0 F7 D2 05
0F930  01 00 83 D2 00 33 EE 0B F6 79 0A F7 D7 F7 D6 83 C7 01 83 D6 00 0B F6 75
0F948  0D 87 F2 0B F6 75 0C F7 E7 0B D2 EB 12 90 0B D2 75 23 97 96 F7 E7 72 1D
0F960  96 F7 E7 03 D6 72 16 78 14 0B ED 79 0A F7 D0 F7 D2 05 01 00 83 D2 00 5F
0F978  5E 5D CA 04 00 BA FF 7F 03 D2 EB F3 55 8B EC 56 57 51 53 8B 76 08 8B 7E
0F990  06 E8 BB FE 5B 59 5F 5E 5D CA 04 00 55 8B EC 56 57 51 53 8B 76 08 8B 7E
0F9A8  06 E8 A3 FE 8B D1 8B C3 5B 59 5F 5E 5D CA 04 00 58 58 5B 50 53 EA 3F 01
0F9C0  CD 0B 58 58 5B 50 53 EA 17 01 CD 0B 55 8B EC 8B 5E 06 8B 46 0C 03 46 08
0F9D8  89 07 8B 46 0E 13 46 0A 89 47 02 B8 00 00 70 01 40 5D CA 0A 00 55 8B EC
0F9F0  8B 56 0E 8B 46 0C FF 76 0A FF 76 08 9A CB 00 25 0D 8B 5E 06 89 57 02 89
0FA08  07 B8 00 00 70 01 40 5D CA 0A 00 E8 87 00 00 00 8B 46 06 A3 A8 E8 A1
0FA20  A8 E8 05 80 01 A3 AC E8 8B E5 5D CA 02 00 E8 6D 00 06 00 8D 5E FC 1E 07
0FA38  89 5E FC 8C 46 FE 8B 46 FC 2B 06 A8 E8 89 46 FA 81 7E FA 80 01 76 40 81
0FA50  46 FA 80 FE 81 7E 06 00 04 73 0C 81 7E FA 00 04 76 05 C7 46 06 00 04 8B
0FA68  46 FA 3B 46 06 76 20 A1 A8 E8 89 46 FC 8B 46 06 48 C4 5E FC 26 89 07 8B
0FA80  46 06 01 06 A8 E8 A1 A8 E8 05 80 01 A3 AC E8 8B E5 5D CA 02 00 E8 06 00
0FA98  04 00 8B E5 5D CB 5E 2E 8B 0C 46 46 55 8B EC 2B E9 72 06 3B 2E AC E8 77
0FAB0  06 56 9A BC 01 EE 09 8B E5 03 E9 FF E6 00 00 00 00 00 00 00 00 00 00 00
.......ALL ZERO'S
0FBB8  00 00 00 00 00 00 00 42 57 02 00 08 52 57 2E 50 41 53 20 20 00 00 00 00
.......ALL ZERO'S
12528  00 00 00 00 00 00 00 00 00 00 00 00 00 00 00 00 00 00 00 00 00 00 00 42
12540  57 02 00 0C 43 4B 45 59 53 2E 50 41 53 20 20 20 00 00 00 42 57 02 00 0C
12558  47 45 4E 57 4F 52 44 2E 50 41 53 20 00 00 00 42 57 02 00 0C 43 4C 4F 53
12570  45 55 50 2E 50 41 53 20 00 00 00 42 57 02 00 0C 47 45 4E 49 4E 49 54 2E
12588  50 41 53 20 00 00 00 42 57 02 00 10 53 45 54 5F 44 49 43 54 2E 50 41 53
125A0  20 20 20 20 00 00 00 42 57 02 00 0C 43 48 4F 52 44 2E 50 41 53 20 20 20
125B8  00 00 00 42 57 02 00 10 54 58 54 50 52 49 4E 54 2E 50 41 53 20 20 20 20
125D0  00 00 00 42 57 02 00 10 4D 41 49 4E 4D 41 49 4E 2E 50 41 53 20 20 20 20
125E8  00 00 00 42 57 02 00 0C 4D 4F 44 43 48 52 44 2E 50 41 53 20 00 00 00 42
12600  57 02 00 0C 49 4E 53 52 45 50 2E 50 41 53 20 20 00 00 00 42 57 02 00 10
12618  46 49 4C 45 50 47 4D 53 2E 50 41 53 20 20 20 20 00 00 00 42 57 02 00 0C
12630  53 43 52 45 45 4E 53 2E 50 41 53 20 00 00 00 42 57 02 00 0C 43 55 52 53
12648  4F 52 53 2E 50 41 53 20 00 00 00 42 57 02 00 0C 50 41 47 45 53 2E 50 41
12660  53 20 20 20 00 00 00 42 57 02 00 0C 44 45 4C 45 54 45 53 2E 50 41 53 20
12678  00 00 00 42 57 02 00 0C 52 45 47 49 4F 4E 53 2E 50 41 53 20 00 00 00 42
12690  57 00 00 00 00 00 00 00 00 00 00 00 00 00 00 00 00 00 00 00 00 00 00 00
.......ALL ZERO'S
12B88  00 00 00 0F 20 65 72 72 6F 72 20 69 6E 20 66 69 6C 65 20 09 48 61 72 64
12BA0  20 64 61 74 61 00 00 00 00 00 0B 44 65 76 69 63 65 20 6E 61 6D 65 00
12BB8  00 00 00 09 4F 70 65 72 61 74 69 6F 6E 00 00 00 00 00 00 0B 46 69 6C 65
12BD0  20 73 79 73 74 65 6D 00 00 00 0E 44 65 76 69 63 65 20 6F 66 66 6C 69
12BE8  6E 65 00 09 4C 6F 73 74 20 66 69 6C 65 00 00 00 00 00 09 46 69 6C 65
12C00  20 6E 61 6D 65 00 00 00 00 00 0B 44 65 76 69 63 65 20 66 75 6C 6C 00
12C18  00 00 00 0E 55 6E 6B 6E 6F 77 6E 20 64 65 76 69 63 65 00 0E 46 69 6C 65
12C30  20 6E 6F 74 20 66 6F 75 6E 64 00 0E 50 72 6F 74 65 63 74 65 64 20 66 69
12C48  6C 65 00 0B 46 69 6C 65 20 69 6E 20 75 73 65 00 00 00 00 00 0D 46 69 6C 65
```

```
12C60   20 6E 6F 74 20 6F 70 65 6E 00 00 0B 44 61 74 61 20 66 6F 72 6D 61 74 00
12C78   00 00 00 0D 4C 69 6E 65 20 74 6F 6F 20 6C 6F 6E 67 00 00 00 00 00 00 00
12C90   00 00 00 00 00 00 00 00 00 00 00 00 00 00 42 57 00 00 42 57 02 00 0C
12CA8   64 65 62 65 2E 70 61 73 20 20 20 20 00 00 00 00 00 00 00 00 00 42 57 02
12CC0   00 0C 6F 72 64 63 2E 70 61 73 20 20 20 20 00 00 00 00 00 00 00 42 57 00
12CD8   00 42 57 00 00 00 00 00 00 00 00 00 00 00 00 00 00 00 00 00 00 00 00
12CF0   00 00 00 00 00 00 00 00 00 00 00 00 00 00 00 00 00 00 00 00 00 00 00
12D08   00 00 00 00 00 00 00 31 32 38 30 30 30 30 30 30 20 20 20 20 20 20 20
12D20   20 20 20 28 43 29 43 6F 70 79 72 69 67 68 74 20 49 42 4D 20 43 6F 72 70
12D38   20 31 39 38 31 2C 20 31 39 38 34 28 43 29 43 6F 70 79 72 69 67 68 74 20
12D50   4D 69 63 72 6F 73 6F 66 74 20 43 6F 72 70 20 31 39 38 31 2C 20 31 39 38
12D68   34 20 20 20 20 20 20 20 20 20 42 57 02 00 0C 6C 6F 6E 63 2E 70 61 73
12D80   20 20 20 20 00 00 00 00 00 42 57 00 00 00 00 31 52 45 41 4C 20 49 6E 64
12D98   65 66 69 6E 69 74 65 20 28 75 6E 69 6E 69 74 69 61 6C 69 7A 65 64 20 6F
12DB0   72 20 70 72 65 76 69 6F 75 73 20 65 72 72 6F 72 29 1C 4D 69 73 73 69 6E
12DC8   67 20 41 72 69 74 68 6D 65 74 69 63 20 50 72 6F 63 65 73 73 6F 72 16 52
12DE0   45 41 4C 20 44 65 6E 6F 72 6D 61 6C 20 44 65 74 65 63 74 65 64 13 52 45
12DF8   41 4C 20 50 72 65 63 69 73 69 6F 6E 20 4C 6F 73 73 3D 52 45 41 4C 20 41
12E10   72 69 74 68 6D 65 74 69 63 20 50 72 6F 63 65 73 73 6F 72 20 49 6E 73 74
12E28   72 75 63 74 69 6F 6E 20 49 6C 6C 65 67 61 6C 20 6F 72 20 6E 6F 74 20 45
12E40   6D 75 6C 61 74 65 64 3D 20 20 20 20 20 20 20 20 20 20 20 20 20 20 20 20
12E58   20 20 20 20 20 20 20 20 20 20 20 20 20 20 20 20 20 20 20 20 20 20 20 20
12E70   20 20 20 20 20 20 20 20 20 20 20 20 20 20 20 20 20 20 20 20 20 42 57 32
12E88   00 00 00 00 00 5F C6 FF EA FF FF FF FF FF FF FE FF FF FF FF FF FF FF FF
12EA0   FF FF FF FF FF FF FF FF F8 55 53 45 52 20 20 20 20 55 53 45 52 20 20 20
12EB8   20 0C 66 69 6C 75 78 75 2E 70 61 73 20 20 00 00 00 55 53 45 52 01 00 00
12ED0   00 43 4F 4E 20 01 00 00 00 4C 49 4E 45 03 00 03 00 4C 50 54 31 04 00 04
12EE8   00 50 52 4E 20 04 00 04 00 45 52 52 20 02 00 02 00 01 00 04 03 0A 0A 04
12F00   0B 04 04 04 04 04 0E 04 0E 04 09 04 04 04 00 42 57 02 00 0C 70 61 73 75
12F18   78 75 2E 70 61 73 20 20 00 00 00 42 57 02 00 0C 68 65 61 68 2E 70 61 73
12F30   20 20 20 20 00 00 00 00 00 00 00 00 00 00 00 42 57 00 00 00 00 42 57 02
12F48   00 0C 63 6F 6E 75 78 75 2E 70 61 73 20 20 00 00 00 42 57 02 00 0C 6D 69
12F60   73 6F 2E 70 61 73 20 20 20 20 00 00 00 42 57 02 00 0C 6D 69 73 79 2E 70
12F78   61 73 20 20 20 20 00 00 00 00 00 00 00 00 00 00 00 00 00 00 00 00 00 00
12F90   00 00 00 9F 00 17 0D 00 00 00 42 57 02 00 0C 6D 69 73 68 6D 2E 70 61
12FA8   73 20 20 20 00 00 00 00 00 00 00 00 00 00 00 00 FF 00 00 00 00 00 00
12FC0   00 1D 00 00 00 02 52 57 F7 15 43 55 52 52 45 4E 54 20 44 49 43 54 49 4F
12FD8   4E 41 52 59 20 3D 20 00 00 00 00 13 00 00 00 07 47 45 54 5F 4B 45 59 12
12FF0   00 78 43 3A 00 00 00 08 4E 45 58 54 5F 4B 45 59 E5 F7 E5 45 00 00 00 0E
13008   47 45 54 5F 4B 45 59 5F 53 54 52 49 4E 47 00 03 84 0C 02 00 00 00 00 00
13020   00 00 00 00 00 00 00 08 00 00 00 00 01 00 00 00 00 00 B0 C4 00 18 5A
13038   00 00 00 06 4D 4E 4B 45 59 53 16 00 00 32 00 00 00 08 47 45 4E 5F 45 44
13050   49 54 60 0C 00 00 00 01 20 68 00 00 00 08 4D 47 45 4E 57 4F 52 44 D9 16
13068   00 00 00 0F 00 00 00 07 53 41 56 45 44 49 43 0C 00 A6 23 23 00 00 00 07
13080   43 4C 4F 53 45 55 50 0C 00 0C 25 00 00 2A 00 00 00 08 4D 43 4C 4F 53 45
13098   55 50 00 16 00 00 00 00 00 00 00 22 00 00 00 0A 45 4E 54 45 52 5F 4E 41
130B0   4D 45 00 00 84 00 10 00 00 FF E0 7F FF FF E0 7F FF FF E0 00 00 00 00 00
130C8   00 00 00 00 00 00 00 00 00 08 00 00 0E 20 20 20 20 20 20 20 20 20
130E0   20 20 20 20 00 54 00 00 00 08 44 45 46 5F 44 49 43 54 00 16 00 13 51 55
130F8   49 58 4F 54 45 20 52 61 70 69 64 57 72 69 74 65 72 04 2E 64 69 63 00 2E
13110   45 4E 54 45 52 20 54 48 45 20 4E 41 4D 45 20 4F 46 20 54 48 45 20 44 49
13128   43 54 49 4F 4E 41 52 59 20 54 4F 20 42 45 20 55 53 45 44 20 20 20 00 31
13140   74 68 65 6E 20 70 72 65 73 73 20 3C 52 65 74 75 72 6E 3E 20 6F 72 20 3C
13158   45 73 63 3E 20 74 6F 20 6C 65 61 76 65 20 52 61 70 69 64 57 72 69 74 65
13170   72 11 49 4E 56 41 4C 49 44 20 46 49 4C 45 20 4E 41 4D 45 31 49 73 20 74
13188   68 69 73 20 61 20 6E 65 77 20 64 69 63 74 69 6F 6E 61 72 79 3F 20 20 20
131A0   20 20 20 20 20 20 20 20 20 20 20 20 20 20 20 20 20 20 20 20 11 50 72
131B8   65 73 73 20 3C 59 3E 20 6F 72 20 3C 4E 3E 20 0A 44 4F 4F 44 49 53 4B 52
131D0   4F 52 00 12 4C 4F 41 44 49 4E 47 20 44 49 43 54 49 4F 4E 41 52 59 00 A6
131E8   00 00 00 08 53 45 54 5F 44 49 43 54 49 4F 14 00 04 55 53 45 52 00 0F 4B
13200   59 42 4F 41 52 44 20 45 52 52 4F 52 21 C0 00 00 00 09 4D 53 45 54 5F 44
13218   49 43 54 16 00 00 00 11 00 00 00 08 43 48 52 44 53 4F 52 54 00 0C 00 00
13230   00 00 00 00 00 00 00 00 00 00 7F FF FF E0 2B 00 00 0A 46 49 4E 44
13248   5F 43 48 4F 52 44 00 59 00 00 00 06 4D 43 48 4F 52 44 49 00 00 19 00 00
13260   00 09 50 41 47 45 50 52 49 4E 54 10 00 03 50 52 4E 01 7C 0D 50 52 49 4E
13278   54 49 4E 47 20 4C 49 4E 45 0D 20 20 20 20 20 20 20 20 20 20 20 20 20 4B
13290   00 00 00 08 54 58 54 50 52 49 4E 54 00 10 00 03 50 52 4E 01 7C 0D 50 52
```

```
132A8  49 4E 54 49 4E 47 20 4C 49 4E 45 0D 20 20 20 20 20 20 20 20 20 20 20 20
132C0  20 84 00 00 00 08 47 45 4E 50 52 49 4E 54 00 10 00 00 00 15 50 52 49 4E
132D8  54 20 46 49 4C 45 20 50 41 52 41 4D 45 54 45 52 53 0E 46 6F 72 6D 20 4C
132F0  65 6E 67 74 68 20 3D 20 00 0D 54 6F 6E 65 20 3D 20 00 0F 4C 69 6E 65 20 53
13308  42 6F 74 74 6F 6D 20 4D 61 72 67 69 6E 73 1F 3C 45 73 63 3E 20 20 20
13320  70 61 63 69 6E 67 20 3D 20 05 53 65 6C 20 70 72 69 6E 74 20 66 69 6C 65 27
13338  20 20 20 74 6F 20 63 61 6E 20 20 20 74 6F 20 73 65 74 20 68 69 67 68 6C 69
13350  3C 52 65 74 75 72 6E 3E 20 72 61 6D 65 74 65 72 1D 3C 46 38 3E 20 20 20 20
13368  67 68 74 65 64 20 70 61 20 74 68 69 73 20 70 61 67 65 1F 3C 53
13380  20 20 20 74 6F 20 70 72 6F 20 74 6F 20 70 72 69 6E 74 20 65 6E 74 69 72 65
13398  68 69 66 74 2D 46 38 3E 20 20 00 00 09 4D 54 58 54 50 52 49 4E 54 16 00 00 00 06
133B0  20 66 69 6C 65 C3 00 00 00 01 AF 0A 43 48 4F 52 44 20 3D 20 3C 3C 00 02 3E 3E
133C8  43 48 4F 52 44 AE 00 01 20 3C 45 73 63 3E 20 6B 65 79 20 74 6F 20 72 65 74
133E0  00 21 50 72 65 73 73 20 6D 65 6E 75 02 4F 52 00 32 45 4E 54 45 52 20 54 48
133F8  75 72 6E 20 74 6F 20 6D 65 6E 75 3A 20 54 65 72 6D 69 6E 61 74 65 20 63 68 6F 72 64
13410  45 20 43 48 4F 52 44 20 3C 52 65 74 75 72 6E 3E 20 6B 65 79 00 00 00 00 00 00
13428  20 77 69 74 68 20 3C 52 65 74 75 72 6E 3E 20 6B 65 79 00 00 00 00 00 00
13440  00 00 00 00 00 00 7F FF FF E0 00 00 00 00 00 00 00 00 00 00 00 00 00 00
13458  E0 00 84 00 10 00 00 00 00 08 13 51 55 49 58 4F 54 45 20 52 61 70 69 64 57
13470  00 00 00 00 00 00 00 00 72 69 74 65 72 15 43 55 52 52 45 4E 54 20 44 49 43 54 49 4F 4E 41 52 59
13488  20 3D 20 0C 43 52 45 41 54 45 20 43 48 4F 52 44 00 3A 54 45 58 54 20 46
134A0  49 4C 45 20 46 55 4C 4C 20 20 20 3E 3E 3E 45 6E 74 65 72 20 61 6E 79 20
134B8  6B 65 79 20 74 6F 20 72 65 74 75 72 6E 20 74 6F 20 74 68 65 20 6D 65 6E
134D0  75 3C 3C 3C 00 33 43 48 4F 52 44 20 41 4C 52 45 41 44 59 20 45 58 49 53
134E8  54 53 20 3C 45 6E 74 72 79 3E 15 43 48 4F 52 44 20 43 41 50 41 43 49 54 59
13500  78 74 20 65 6E 74 72 79 3E 15 43 48 4F 52 44 20 43 41 50 41 43 49 54 59
13518  20 46 49 4C 4C 45 44 3C 44 49 43 54 49 4F 4E 41 52 59 20 43 48 4F 52 44
13530  20 43 41 50 41 43 49 54 59 20 45 58 43 45 45 44 45 44 20 3C 45 6E 74 65
13548  72 20 61 6E 79 20 6B 65 79 20 74 6F 20 72 65 74 75 72 6E 3E 00 1C 52 45 41
13560  4D 4F 56 45 20 43 48 4F 52 44 20 46 52 4F 4D 20 44 49 43 54 49 4F 4E 41
13578  52 59 00 1C 43 48 4F 52 44 20 4E 4F 54 20 46 4F 55 4E 44 20 49 4E 20 44
13590  49 52 45 43 54 4F 52 59 00 29 3E 3E 3E 45 6E 74 65 72 20 61 6E 79 20 6B
135A8  65 79 20 74 6F 20 72 65 74 75 72 6E 20 74 6F 20 74 68 65 20 6D 65 6E 75
135C0  3C 3C 3C 17 54 48 45 20 44 49 43 54 49 4F 4E 41 52 59 20 6B 65 79 20 74 6F 20
135D8  50 54 59 29 3E 3E 3E 50 72 65 73 73 20 61 6E 79 20 6B 65 79 20 74 6F 20
135F0  72 65 74 75 72 6E 20 74 6F 20 74 68 65 20 6D 65 6E 75 3C 3C 3C 2D 3E 3E
13608  72 65 74 75 72 6E 20 74 6F 20 74 68 65 20 6D 65 6E 75 3C 3C 3C 2D 3E 3E
13620  3E 50 72 65 73 73 20 61 6E 79 20 6B 65 79 20 74 6F 20 73 74 61 72 74 20
13638  6F 72 20 73 74 6F 70 20 70 72 69 6E 74 69 6E 67 3C 3C 3C 03 50 52 4E 0D
13650  50 52 49 4E 54 45 52 20 45 52 52 4F 52 05 20 20 20 4F 52 26 3E 3E 3E 50
13668  72 65 73 73 20 61 6E 79 20 6F 74 68 65 72 20 6B 65 79 20 74 6F 20 74 72
13680  79 20 61 67 61 69 6E 3C 3C 3C 00 2D 3E 3E 3E 50 72 65 73 73 20 61 6E 79
13698  20 6B 65 79 20 74 6F 20 73 74 61 72 74 20 6F 72 20 73 74 6F 70 20 70 72
136B0  69 6E 74 69 6E 67 3C 3C 3C 11 2A 2A 45 4E 44 20 4F 46 20 54 45 58 54
136C8  2A 2A 2A 11 2A 2A 2A 45 4E 44 20 4F 46 20 54 45 58 54 2A 2A 2A 25 2A 2A
136E0  2A 2A 2A 2A 2A 2A 2A 45 4E 44 20 4F 46 20 44 49 43 54 49 4F 4E 41 52
136F8  59 2A 2A 2A 2A 2A 2A 2A 2A 2A 4F 4E 41 52 59 2A 2A 2A 2A 2A 2A 2A 2A 2A
13710  44 20 4F 46 20 44 49 43 54 49 4F 4E 41 52 59 20 6B 65 79 20 74 6F 20 72 65
13728  2A 29 3E 3E 3E 50 72 65 73 73 20 61 6E 79 20 6D 65 6E 75 3C 3C 3C 15 4E 6F 20 64
13740  74 75 72 6E 20 74 6F 20 74 68 65 20 6D 65 6E 75 3C 3C 3C 15 4E 6F 20 64
13758  69 63 74 69 6F 6E 61 72 79 20 63 6F 6E 74 69 6E 75 65 13 51 55 49 58
13770  61 6E 79 20 6B 65 79 20 74 6F 20 69 64 57 72 69 74 65 72 0B 4D 41 49 4E 54 45 4E 41
13788  4F 54 45 20 52 61 70 69 64 57 72 69 74 65 72 0B 4D 41 49 4E 54 45 4E 41
137A0  4E 43 45 1E 50 52 45 53 53 20 4B 45 59 20 46 4F 52 20 44 45 53 49 52 45
137B8  44 20 46 55 4E 43 54 49 4F 4E 00 25 3C 45 73 63 3E 20 20 20 20 20 20 20
137D0  20 20 20 52 65 74 75 72 6E 20 74 6F 20 50 72 69 6D 61 72 79 20 4D 65 6E
137E8  75 26 3C 43 74 72 6C 2D 41 6C 74 2D 4C 3E 20 20 20 4C 69 73 74 20 61 6E
13800  64 20 44 69 73 70 6C 61 79 20 43 68 6F 72 64 73 00 26 3C 50 3E 20 20 20
13818  20 20 20 20 20 20 20 20 20 50 72 69 6E 74 20 43 68 6F 72 64 20 44 65 66
13830  69 6E 69 74 69 6F 6E 73 00 1C 3C 43 3E 20 20 20 20 20 20 20 20 20 20 20
13848  20 41 64 64 20 4E 65 77 20 43 68 6F 72 64 00 1D 3C 52 3E 20 20 20 20 20
13860  20 20 20 20 20 20 20 52 65 6D 6F 76 65 20 61 20 43 68 6F 72 64 1D 3C 4D
13878  3E 20 20 20 20 20 20 20 20 20 20 20 4D 6F 64 69 66 79 20 61 20 43 68
13890  6F 72 64 15 43 55 52 52 45 4E 54 20 44 49 43 54 49 4F 4E 41 52 59 20 3D
138A8  20 00 00 0C 4D 4F 44 49 46 59 20 43 48 4F 52 44 00 1C 43 48 4F 52 44 20
138C0  4E 4F 54 20 46 4F 55 4E 44 20 49 4E 20 44 49 52 45 43 54 4F 52 59 00 21
138D8  50 72 65 73 73 20 3C 45 73 63 3E 20 6B 65 79 20 74 6F 20 72 65 74 75 72
138F0  6E 20 74 6F 20 6D 65 6E 75 05 20 20 20 4F 52 30 3E 3E 3E 45 6E 74 65 72
```

```
13908   20 61 6E 79 20 6F 74 68 65 72 20 6B 65 79 20 74 6F 20 65 6E 74 65 72 20
13920   61 6E 6F 74 68 65 72 20 63 68 6F 72 64 3C 3C 3C 00 13 20 49 53 20 41 20
13938   43 4F 4D 4D 41 4E 44 20 4D 41 43 52 4F 00 00 00 00 11 4D 41 52 47 49 4E
13950   20 52 45 53 45 54 20 4D 45 4E 55 0B 48 6F 6C 64 20 64 6F 77 6E 20 3A 24
13968   4C 45 46 54 20 53 48 49 46 54 20 4B 45 59 20 74 6F 20 73 65 6C 65 63 74
13980   20 4C 45 46 54 20 4D 41 52 47 49 4E 00 26 52 49 47 48 54 20 53 48 49 46
13998   54 20 4B 45 59 20 74 6F 20 73 65 6C 65 63 74 20 52 49 47 48 54 20 4D 41
139B0   52 47 49 4E 00 08 45 6E 74 65 72 20 3A 20 00 28 4C 45 46 54 20 43 55 52
139C8   53 4F 52 20 74 6F 20 6D 6F 76 65 20 73 65 6C 65 63 74 65 64 20 6D 61 72
139E0   67 69 6E 20 4C 45 46 54 00 2A 52 49 47 48 54 20 43 55 52 53 4F 52 20 74
139F8   6F 20 6D 6F 76 65 20 73 65 6C 65 63 74 65 64 20 6D 61 72 67 69 6E 20 52
13A10   49 47 48 54 00 1D 3C 45 73 63 3E 20 74 6F 20 73 65 74 20 73 65 6C 65 63
13A28   74 65 64 20 6D 61 72 67 69 6E 73 01 20 01 E6 00 00 15 00 00 00 0C 44 55
13A40   4D 4D 59 5F 42 55 46 46 45 52 00 0E 00 1D 00 00 00 0A 46 49 4C 45 5F 53
13A58   45 54 55 50 00 24 00 00 00 0E 55 4E 4C 4F 41 44 5F 43 4F 4E 54 52 4F 4C
13A70   01 29 00 00 00 09 46 49 4C 45 5F 49 4E 49 54 1B E5 42 00 00 00 08 4F 50
13A88   45 4E 54 45 58 54 02 12 00 04 2E 74 78 74 00 01 00 00 00 12 49 4E 56 41
13AA0   4C 49 44 20 46 49 4C 45 20 4E 41 4D 45 20 00 16 50 72 65 73 73 20 61 6E
13AB8   79 20 6B 65 79 20 74 6F 20 72 65 74 72 79 00 13 49 73 20 74 68 69 73 20
13AD0   61 20 6E 65 77 20 66 69 6C 65 3F 30 20 20 20 20 20 20 20 20 20 20 20 20
13AE8   20 20 20 20 20 20 20 20 20 20 20 20 20 20 20 20 20 20 20 20 20 20 20 20
13B00   20 20 20 20 20 20 20 20 20 20 20 00 10 50 72 65 73 73 20 3C 59 3E 20
13B18   6F 72 20 3C 4E 3E 00 0A 44 49 53 4B 20 45 52 52 4F 52 00 69 00 00 00 0C
13B30   4C 4F 41 44 5F 43 4F 4E 54 52 4F 4C 00 EB E4 73 00 00 00 0C 4C 4F 41 44
13B48   5F 42 55 46 46 45 52 53 03 0E 00 8F 00 00 00 0F 55 4E 4C 4F 41 44 5F 4F
13B60   56 45 52 46 4C 4F 57 10 00 66 48 AD 00 00 00 0E 55 4E 4C 4F 41 44 5F 42
13B78   55 46 46 45 52 53 00 B9 00 00 00 09 4D 46 49 4C 45 50 47 4D 53 16 00 00
13B90   00 12 00 00 00 0D 55 4E 4C 4F 41 44 5F 53 43 52 45 45 4E 14 00 1E 00 00
13BA8   00 06 41 57 52 49 54 45 4F 27 00 00 00 0D 42 52 49 47 48 54 5F 53 43 52
13BC0   45 45 4E 0C 00 2F 00 00 00 0B 4C 4F 41 44 5F 53 43 52 45 45 4E 14 00 3A
13BD8   25 3B 00 00 00 06 53 57 52 49 54 45 4F 46 00 00 00 0A 53 43 52 45 45 4E
13BF0   5F 42 4F 58 1A 01 C9 01 BB 01 C8 01 BC 01 BA 5E 00 00 00 07 49 53 43 52
13C08   45 45 4E 14 00 62 2C 07 47 65 6E 57 6F 72 64 1F 43 6F 70 79 72 69 67 68
13C20   74 20 31 39 38 36 20 62 79 20 44 2E 20 59 75 6B 69 6F 20 4B 65 6E 6F 13
13C38   41 6C 6C 20 72 69 67 68 74 73 20 72 65 73 65 72 76 65 64 28 45 4E 54 45
13C50   52 20 54 48 45 20 4E 41 4D 45 20 4F 46 20 54 48 45 20 46 49 4C 45 20 54
13C68   4F 20 42 45 20 45 44 49 54 45 44 20 00 3C 74 68 65 6E 20 70 72 65 73 73
13C80   20 3C 52 65 74 75 72 6E 3E 20 6F 72 20 70 72 65 73 73 20 3C 45 73 63 3E
13C98   20 74 6F 20 72 65 74 75 72 6E 20 74 6F 20 50 72 69 6D 61 72 79 20 4D 65
13CB0   6E 75 00 6E 00 00 00 07 43 53 43 52 45 45 4E 14 00 EA 45 27 51 55 49 58
13CC8   4F 54 45 20 52 61 70 69 64 57 72 69 74 65 72 20 20 20 20 20 20 20 20 20
13CE0   20 20 20 20 72 65 76 20 31 2E 31 25 43 6F 70 79 72 69 67 68 74 20 31 39
13CF8   38 36 20 62 79 20 51 75 69 78 6F 74 65 20 43 6F 72 70 6F 72 61 74 69 6F
13D10   6E 13 41 6C 6C 20 52 69 67 68 74 73 20 52 65 73 65 72 76 65 64 13 50 61
13D28   74 65 6E 74 20 50 65 6E 64 69 6E 67 20 31 39 38 36 0C 50 52 49 4D 41 52
13D40   59 20 4D 45 4E 55 00 05 50 52 45 53 53 36 3C 45 73 63 3E 20 6B 65 79 20
13D58   66 6F 72 20 44 4F 53 20 70 72 6F 6D 70 74 20 28 74 6F 20 6C 6F 61 64 20
13D70   61 70 70 6C 69 63 61 74 69 6F 6E 20 70 72 6F 67 72 61 6D 29 00 1C 3C 54
13D88   3E 20 20 20 6B 65 79 20 66 6F 72 20 47 65 6E 57 6F 72 64 20 45 64 69 74
13DA0   6F 72 00 2B 3C 4D 3E 20 20 20 6B 65 79 20 66 6F 72 20 52 61 70 69 64 57
13DB8   72 69 74 65 72 20 63 68 6F 72 64 20 6D 61 69 6E 74 65 6E 61 6E 63 65 26
13DD0   3C 46 36 3E 20 20 6B 65 79 20 74 6F 20 6C 6F 61 64 20 64 69 66 66 65 72
13DE8   65 6E 74 20 64 69 63 74 69 6F 6E 61 72 79 00 15 43 55 52 52 45 4E 54 20
13E00   44 49 43 54 49 4F 4E 41 52 59 20 3D 20 88 00 00 00 05 49 43 4D 4E 44 0C
13E18   00 0C 20 20 20 20 20 4D 61 72 67 69 6E 73 00 01 7C 06 46 49 4C 45 3A 20
13E30   00 0D 52 45 47 49 4F 4E 20 44 45 46 49 4E 45 08 20 20 20 3C 46 31 30 3E
13E48   00 0B 44 49 43 54 49 4F 4E 41 52 59 3A 07 20 20 20 3C 46 36 3E 07 20 20
13E60   20 3C 46 38 3E 07 20 20 50 52 49 4E 54 0E 43 52 45 41 54 49 4E 47 20 43
13E78   48 4F 52 44 00 08 4D 4F 44 49 46 59 20 AE 00 01 AF C3 00 00 00 08 4D 53
13E90   43 52 45 45 4E 53 54 16 00 00 00 14 00 00 00 0B 43 55 52 53 4F 52 5F 53
13EA8   48 4F 57 12 00 D0 2A 1E 00 00 00 0B 43 55 52 53 4F 52 5F 4C 45 46 54 0C
13EC0   00 D0 2A 37 00 00 00 0C 43 55 52 53 4F 52 5F 52 49 47 48 54 00 10 00 50
13ED8   00 00 00 09 43 55 52 53 4F 52 5F 55 50 0C 00 61 00 00 00 0B 43 55 52 53
13EF0   4F 52 5F 44 4F 57 4E 0C 00 FE 42 6D 00 00 00 0B 43 55 52 53 4F 52 5F 48
13F08   4F 4D 45 AE E5 00 00 77 00 00 00 08 46 49 4E 44 5F 45 4F 57 10 00 00
13F20   04 00 00 E1 CA 00 01 00 00 00 14 00 00 00 14 87 00 00 00 08 46 49 4E 44
13F38   5F 53 4F 57 00 10 00 00 04 00 00 E1 CA 00 01 00 00 00 14 00 00 00 14 00
```

```
13F50  00 00 00 00 02 93 00 00 00 0B 44 43 55 52 53 4F 52 5F 46 41 52 6B E5 00
13F68  00 96 00 00 00 0B 55 43 55 52 53 4F 52 5F 46 41 52 53 E5 00 00 9B 00 00
13F80  00 0B 4C 43 55 52 53 4F 52 5F 45 4F 57 3B E5 00 00 A5 00 00 00 0B 52 43
13F98  55 52 53 4F 52 5F 45 4F 57 23 E5 00 00 AC 00 00 00 08 4D 43 55 52 53 4F
13FB0  52 53 0D 16 00 00 00 15 00 00 00 09 4D 4F 56 45 5F 44 4F 57 4E 10 00 2B
13FC8  00 00 00 07 4D 4F 56 45 5F 55 50 10 00 B2 2B 46 00 00 00 09 50 41 47 45
13FE0  5F 44 4F 57 4E 19 E6 49 00 00 00 07 50 41 47 45 5F 55 50 05 E6 00 00 4C
13FF8  00 00 00 0B 53 43 52 4F 4C 4C 5F 44 4F 57 4E ED E5 00 00 4F 00 00 00 09
14010  53 43 52 4F 4C 4C 5F 55 50 D7 E5 51 00 00 00 06 4D 50 41 47 45 53 45 00
14028  00 18 00 00 00 0B 44 45 4C 45 54 45 5F 4C 49 4E 45 0E 00 0C 24 3C 00 00
14040  00 0C 44 45 4C 45 54 45 5F 43 48 41 52 53 00 0C 00 57 00 00 00 0B 44 45
14058  4C 45 54 45 5F 42 41 43 4B 0C 00 5E 43 68 00 00 00 0B 44 45 4C 45 54 45
14070  5F 57 4F 52 44 10 00 30 2B 71 00 00 00 08 4D 44 45 4C 45 54 45 53 0D 16
14088  00 00 00 1B 00 00 00 0D 52 45 47 49 4F 4E 5F 43 41 4E 43 45 4C FD E4 05
140A0  20 20 20 20 20 29 00 00 00 09 47 52 41 42 5F 54 45 58 54 12 00 0F 54 45
140B8  58 54 20 46 49 4C 45 20 46 55 4C 4C 20 1B 3E 3E 3E 45 6E 74 65 72 20 61
140D0  6E 79 20 6B 65 79 20 74 6F 20 65 78 69 74 3C 3C 3C 47 00 00 00 0C 52 45
140E8  47 49 4F 4E 5F 43 48 4F 52 44 00 12 00 58 00 00 00 0D 52 45 47 49 4F 4E
14100  5F 44 45 46 49 4E 45 10 00 05 20 45 4E 44 20 0B 52 45 47 49 4F 4E 20 4D
14118  45 4E 55 0B 53 65 6C 65 63 74 20 6F 6E 65 3A 16 3C 43 3E 20 20 20 20 20
14130  20 20 44 65 66 69 6E 65 20 43 68 6F 72 64 00 19 3C 52 3E 20 20 20 20 20
14148  20 20 52 65 64 65 66 69 6E 65 20 72 65 67 69 6F 6E 18 3C 45 73 63 3E 20
14160  20 20 20 20 52 65 74 75 72 6E 20 74 6F 20 65 64 69 74 00 05 20 20 20 20
14178  20 05 53 54 41 52 54 8A 00 00 00 08 4D 52 45 47 49 4F 4E 53 00 16 00 00
14190  00 10 20 20 20 20 20 20 20 20 20 20 20 20 20 20 00 02 3A 20 00 02
141A8  0C 0C 00 00 00 00 00 00 00 00 00 00 80 40 20 10 08 04 02 01 00 00 00
141C0  00 00 00 1E 4E 6F 20 43 41 53 45 20 56 61 6C 75 65 20 4D 61 74 63 68 65
141D8  73 20 53 65 6C 65 63 74 6F 72 00 1A 53 74 72 69 6E 67 20 54 6F 6F 20 4C
141F0  6F 6E 67 20 69 6E 20 43 4F 50 59 53 54 52 00 27 4C 73 74 72 69 6E 67 20
14208  54 6F 6F 20 4C 6F 6E 67 20 69 6E 20 49 6E 74 72 69 6E 73 69 63 20 50 72
14220  6F 63 65 64 75 72 65 1C 53 65 74 20 45 6C 65 6D 65 6E 74 20 47 72 65 61
14238  74 65 72 20 54 68 61 6E 20 32 35 35 00 1C 55 6E 69 74 20 56 65 72 73 69
14250  6F 6E 20 4E 75 6D 62 65 72 20 4D 69 73 6D 61 74 63 68 00 0D 49 6C 6C 65
14268  67 61 6C 20 50 63 6F 64 65 1B 55 6E 73 69 67 6E 65 64 20 56 61 6C 75 65
14280  20 4F 75 74 20 6F 66 20 52 61 6E 67 65 19 53 69 67 6E 65 64 20 56 61 6C
14298  75 65 20 4F 75 74 20 6F 66 20 52 61 6E 67 65 21 55 6E 69 6E 69 74 69 61
142B0  6C 69 7A 65 64 20 31 36 20 42 69 74 20 49 6E 74 65 67 65 72 20 55 73 65
142C8  64 20 55 6E 69 6E 69 74 69 61 6C 69 7A 65 64 20 38 20 42 69 74 20 49 6E
142E0  74 65 67 65 72 20 55 73 65 64 00 15 4E 49 4C 20 50 6F 69 6E 74 65 72 20
142F8  52 65 66 65 72 65 6E 63 65 15 55 6E 69 6E 69 74 69 61 6C 69 7A 65 64 20
14310  50 6F 69 6E 74 65 72 15 49 6E 76 61 6C 69 64 20 50 6F 69 6E 74 65 72 20
14328  52 61 6E 67 65 17 50 6F 69 6E 74 65 72 20 54 6F 20 44 69 73 70 6F 73 65
14340  64 20 56 61 72 1A 4C 6F 6E 67 20 44 49 53 50 4F 53 45 20 53 69 7A 65 73
14358  20 55 6E 65 71 75 61 6C 00 80 40 20 10 08 04 02 01 18 53 65 74 20 45 6C
14370  65 6D 65 6E 74 20 4F 75 74 20 6F 66 20 52 61 6E 67 65 00 00 00 04 20 20
14388  20 20 00 00 00 00 02 0D 0A 00 02 0D 0A 00 03 0D 0A 0A 06 0D 0A 0C 08
143A0  20 0D 00 00 00 00 00 00 00 00 00 00 00 00 00 08 50 41 53 46 49 4C 4C
143B8  45 41 00 00 00 00 05 20 30 30 30 30 05 20 20 20 20 30 09 3F 20 45 72
143D0  72 6F 72 3A 20 0C 20 20 45 72 72 6F 72 20 43 6F 64 65 00 09 2C 20 53 74
143E8  61 74 75 73 20 06 20 4C 69 6E 65 20 00 04 20 49 6E 20 00 04 20 4F 66 20
14400  00 04 50 43 20 3D 00 01 3A 06 3B 20 53 53 20 3D 00 06 2C 20 46 50 20 3D
14418  00 06 2C 20 53 50 20 3D 00 00 00 16 49 6E 63 6F 72 72 65 63 74 20 44 4F
14430  53 20 76 65 72 73 69 6F 6E 24 00 02 0D 0A 00 00 00 00 00 00 00 00 00 00
14448  00 00 00 00 00 00 00 55 8B EC B4 00 CD 16 5D CB CB
```

We claim:

1. A keyboard entry system for a selected language, said system comprising:

a keyboard comprising a plurality of keys, said plurality of keys comprising a set of letter keys comprising a respective key for each letter of said selected language;

first means, responsive to the plurality of letter keys, for generating keying signals in response to activation of the letter keys, each keying signal characterized by a respective depression time when the keying signal is generated in response to depression of the respective letter key, and a respective release time when the keying signal is generated in response to release of the respective letter key;

second means, responsive to the first means, for generating output signals in response to the keying signals, said second means comprising:

means for classifying a plurality of keying signals as a key chord in the event the respective depression and release times satisfy predetermined criteria, said criteria comprising the component criterion that the elapsed time between a first one of the release times and an immediately preceding one of the depression times is greater than a preselected time interval;

means for storing a list of stored texts, each corresponding to a respective chord;

means, responsive to the key chord, for utilizing the key chord to select the one of the stored texts in the list of stored texts which corresponds to the key chord;

means for setting the output signal to correspond to the selected one of the stored texts; and means for setting the output signal to correspond to the letters corresponding to the activated letter keys in the event the respective depression and release times fail to satisfy said criteria.

2. The invention of claim 1 wherein the selected language is written in the Roman alphabet and said set of letter keys comprises a respective letter key for each letter of the Roman alphabet.

3. The invention of claim 2 wherein the keyboard comprises a QWERTY keyboard which comprises the plurality of letter keys.

4. The invention of claim 1 further comprising means for notifying an operator when a key chord fails to correspond to any of the stored texts in the list of stored texts.

5. The invention of claim 4 wherein the notifying means sounds a tone when a key chord fails to correspond to any of the stored texts.

6. A keyboard entry system for a selected language which comprises a multiplicity of words formed of the 26 letters of the Roman alphabet, said system operative to supply a plurality of output signals to a utilization device and comprising:

a keyboard comprising a plurality of keys, said plurality of keys comprising at least 26 letter keys, each corresponding to an associated one of the 26 letters of the Roman alphabet, said letter keys arranged in a QWERTY keyboard configuration;

means, responsive to the letter keys, for generating key signals in response to depression and release of the letter keys, each of said key signals comprising a key code identifying the activated key and a time code identifying the time of depression or release;

means, responsive to the key signals, for classifying a plurality of key codes as a key chord in the event the time codes of the corresponding plurality of key signals satisfy predetermined criteria and for classifying the plurality of key codes as a plurality of discrete letters in the event the time codes of the corresponding plurality of key signals fail to satisfy the predetermined criteria, said predetermined criteria comprising the component criterion that the elapsed time between the time of release of a selected key signal and the time of depression of a preceding key signal is greater than a stored value;

means for supplying the plurality of discrete letters as a plurality of the output signals;

means for maintaining a list of stored texts, each of which is identified with a respective stored index;

means, responsive to the key chord, for comparing the key chord with the stored indexes and for selecting the corresponding one of the stored texts in the event the key chord matches one of the stored indexes; and means for supplying the selected stored text as one of the output signals, said system cooperating to allow conventional sequential key entry to be intermixed with chorded key entry.

7. The invention of claim 6 wherein the stored value is in the range of 70-85 milliseconds.

8. The invention of claim 6 wherein the means for generating the key signals is included in the keyboard.

9. The invention of claim 6 wherein the classifying means is included in a computer, and wherein the means for generating the key signals is included in a module interconnected between the keyboard and the computer.

10. The invention of claim 6 further comprising means for notifying an operator in the event the key chord fails to match any of the stored indexes.

11. The invention of claim 10 wherein the notifying means sounds a tone in the event the key chord fails to match any of the stored indexes.

12. A keyboard entry system for a language comprised of a plurality of letters, said system comprising:

a keyboard comprising a plurality of letter keys, each associated with a respective letter;

first means, responsive to the letter keys, for generating keying signals in response to depression and release of the letter keys;

second means, responsive to the first means, for generating output signals in response to the keying signals, said second means comprising:

means for storing a list of stored texts, each of which is associated with a respective stored index;

means for measuring a plurality of time intervals, each characteristic of the elapsed time separating a keying signal generated in response to release of the respective letter key and the immediately preceding keying signal generated in response to depression of the respective letter key;

means for classifying a set of keying signals as a nonchord in the event the respective time interval is less than a predetermined value, and for setting the output signal to correspond to respective ones of the letters corresponding to the set of keying signals;

means for classifying the set of keying signals as a key chord in the event the respective time interval is greater than the predetermined value;

means, responsive to the key chord, for comparing the key chord with the stored indexes and for selecting the corresponding one of the stored texts in the event the key chord matches one of the stored indexes; and means for setting the output signal to correspond with the selected stored text;

said keyboard and first and second means cooperating automatically to set the output signal to correspond to associated ones of the letters in response to nonchorded activation of the letter keys, and to set the output signal to correspond to an associated one of the stored texts in response to chorded activation of the letter keys.

13. The invention of claim 12 wherein the plurality of letter keys comprises a respective letter key for each of the 26 letters of the Roman alphabet.

14. The invention of claim 12 wherein the keyboard comprises a QWERTY keyboard which includes the plurality of letter keys.

15. The invention of claim 12 further comprising means for storing the predetermined value such that the predetermined value remains unchanged over multiple chords.

16. The invention of claim 12 further comprising means for notifying an operator in the event the key chord fails to match any of the stored indexes.

17. The invention of claim 16 wherein the notifying means sounds a tone in the event the key chord fails to match any of the stored indexes.

18. A keyboard entry system comprising:
- a keyboard comprising a plurality of keys, each of which is movable between a released state and a depressed state;
- means for generating keying signals in response to depression and release of the keys, selected ones of said keying signals comprising key depression timing signals, each indicative of a respective time of key depression, and selected other ones of said keying signals comprising key release timing signals, each indicative of a respective time of key release;
- means for storing a parameter indicative of a selected time interval;
- means for comparing the elapsed time between a selected one of the key release timing signals and an immediately preceding key depression timing signal with the selected time interval;
- first means for classifying the keying signals corresponding to the keys in the depressed state at a time immediately prior to generation of the selected one of the key release timing signals as a key chord when the comparing means indicates that the elapsed time is greater than the selected time interval;
- second means for classifying the keying signals corresponding to the keys in the depressed state immediately prior to generation of the selected one of the key release timing signals as indicative of individual character signals when the comparing means indicates that the elapsed time is less than the selected time interval;
- means for storing a plurality of texts, each associated with a respective index;
- means for comparing the key chord with the indexes and, in the event the key chord matches one of the indexes, for supplying a respective one of the stored texts as an output signal;
- means for supplying the individual character signals as the output signal.

19. The invention of claim 18 wherein the storing means maintains the parameter in an unchanged state while the first and second means classify a plurality of key chords and individual character signals, respectively.

20. The invention of claim 18 wherein the selected time interval is in the range of about 70-85 milliseconds.

21. A keyboard entry system comprising:
- a keyboard comprising a plurality of keys each corresponding to a respective character;
- first means for generating keying signals in response to activation of the keys, each keying signal characterized by a respective activation time;
- second means for generating output signals in response to the keying signals, said second means comprising:
  - means for classifying a plurality of keying signals as a key chord in the event the respective activation times satisfy predetermined criteria indicative of near simultaneous key activation;
  - means for storing a list of stored texts, each associated with a respective index;
  - means for comparing the key chord with the indexes and, in the event the key chord corresponds to one of the indexes, for selecting the one of the stored texts associated with the index which corresponds to the key chord;
  - means for setting the output signal to correspond to the selected one of the stored texts; and
  - means for setting the output signal to correspond to the characters corresponding to the activated keys in the event the respective activation times fail to satisfy said criteria; and
  - biofeedback means for alerting an operator when the key chord fails to correspond to any of the indexes.

22. The invention of claim 21 wherein the biofeedback means comprises means for sounding a tone when the key chord fails to correspond to any of the indexes.

* * * * *